United States Patent [19]
Koga et al.

[11] Patent Number: 6,028,886
[45] Date of Patent: Feb. 22, 2000

[54] DIGITAL COMMUNICATION APPARATUS

[75] Inventors: Shoichi Koga; Yuji Igata; Satoshi Hasako; Masahiro Maki; Michinori Kishimoto, all of Fukuoka, Japan

[73] Assignee: Matsushita Electric Industrial Co., Ltd., Osaka, Japan

[21] Appl. No.: 09/111,886

[22] Filed: Jul. 8, 1998

Related U.S. Application Data

[62] Division of application No. 08/763,338, Dec. 11, 1996, Pat. No. 5,837,529.

[30] Foreign Application Priority Data

| Dec. 12, 1995 | [JP] | Japan | 7-322957 |
|---|---|---|---|
| Dec. 12, 1995 | [JP] | Japan | 7-322967 |
| Jan. 11, 1996 | [JP] | Japan | 8-002838 |
| Jul. 12, 1996 | [JP] | Japan | 8-183000 |
| Nov. 22, 1996 | [JP] | Japan | 8-311132 |

[51] Int. Cl.[7] ............................................. H04B 15/00
[52] U.S. Cl. .......................... 375/202; 375/200; 375/202; 375/324; 370/344
[58] Field of Search ........................... 375/202, 260, 375/200, 324; 370/479, 344

[56] References Cited

U.S. PATENT DOCUMENTS

| 4,227,255 | 10/1980 | Carrick et al. | 455/226 |
|---|---|---|---|
| 4,271,524 | 6/1981 | Goodman et al. | 375/202 |
| 4,320,514 | 3/1982 | Haskell | 375/202 |
| 4,383,323 | 5/1983 | Timor | 375/1 |
| 4,392,231 | 7/1983 | Henry | 375/202 |
| 5,136,611 | 8/1992 | Kirimoto et al. | 375/1 |
| 5,166,953 | 11/1992 | Hershey et al. | 375/1 |
| 5,307,376 | 4/1994 | Castelain et al. | 375/38 |
| 5,311,550 | 5/1994 | Fouche et al. | 375/38 |
| 5,410,538 | 4/1995 | Roche et al. | 370/479 |
| 5,442,660 | 8/1995 | Kuo et al. | 375/202 |

FOREIGN PATENT DOCUMENTS

| 0 544 991 | 6/1993 | European Pat. Off. . |
|---|---|---|
| 0 565 506 | 10/1993 | European Pat. Off. . |
| 63-107242 | 5/1988 | Japan . |
| 5-219021 | 8/1993 | Japan . |
| WO 92/00639 | 1/1992 | WIPO . |
| WO95/10144 | 4/1995 | WIPO . |

OTHER PUBLICATIONS

Dominguez et al., "A General Approach to the Automatic Classification of Radiocommunication Signals", Signal Processing European Journal, vol. 22, No. 3, Mar. 1991, pp. 239–250.

D. J. Goodman et al., Frequency–Hopped Multilevel FSK for Mobile Radio, Bell System Technical Journal, vol. 59, No. 7, Sep. 1980, pp. 1257–1275.

Maric et al., "A New Frequency Hopping—Multilevel FSK System for Mobile Radio", IEEE, vol. 1/3, Jan. 1991, pp. 154–158.

G. Einarsson, "Address Assignment for a Time–Frequency––Coded, Spread–Spectrum", Bell Systems Technical Journal, vol. 59, No. 7, pp. 1241–1255, Sep. 1980.

*Primary Examiner*—Stephen Chin
*Assistant Examiner*—Shuwang Liu
*Attorney, Agent, or Firm*—McDermott, Will & Emery

[57] ABSTRACT

A highly reliable and high-speed data transmission is made by using an FH or MFSK mode as suitably selected according to the usage of channels. When a reception signal is entered into a receiver through a transmission line, (i) a signal processing unit supplies the spectrum intensity values of carrier frequencies, (ii) a channel detection unit controls the phase of a time slot based on the spectrum intensity values, selects the MFSK or FH modulation mode, and supplies reception code data corresponding to detected carrier frequencies, and (iii) a decoder supplies reception information data based on the reception code data. When transmission information data are entered into a transmitter, (i) a coding unit supplies, according to the selected modulation mode, transmission code data based on the transmission information data, (ii) a channel generation unit supplies, based on the transmission code data, carrier frequencies to be used and (iii) a waveform generation unit supplies a transmission signal to a transmission line.

2 Claims, 101 Drawing Sheets

FIG. 5

| 4-BIT XMSN CODE DATA | CARRIER FREQ |
|---|---|
| 0 0 0 0 | F (1) |
| 0 0 0 1 | F (2) |
| 0 0 1 0 | F (3) |
| 0 0 1 1 | F (4) |
| 0 1 0 0 | F (5) |
| 0 1 0 1 | F (6) |
| 0 1 1 0 | F (7) |
| 0 1 1 1 | F (8) |
| 1 0 0 0 | F (9) |
| 1 0 0 1 | F (10) |
| 1 0 1 0 | F (11) |
| 1 0 1 1 | F (12) |
| 1 1 0 0 | F (13) |
| 1 1 0 1 | F (14) |
| 1 1 1 0 | F (15) |
| 1 1 1 1 | F (16) |

FIG. 6

| CARRIER FREQ | 4-BIT RECEP CODE DATA |
|---|---|
| F (1) | 0 0 0 0 |
| F (2) | 0 0 0 1 |
| F (3) | 0 0 1 0 |
| F (4) | 0 0 1 1 |
| F (5) | 0 1 0 0 |
| F (6) | 0 1 0 1 |
| F (7) | 0 1 1 0 |
| F (8) | 0 1 1 1 |
| F (9) | 1 0 0 0 |
| F (10) | 1 0 0 1 |
| F (11) | 1 0 1 0 |
| F (12) | 1 0 1 1 |
| F (13) | 1 1 0 0 |
| F (14) | 1 1 0 1 |
| F (15) | 1 1 1 0 |
| F (16) | 1 1 1 1 |

FIG. 18

T : 1 SYMBOL TIME

| TIME | UP-CHIRP CODE DATA |
|---|---|
| 0T~1T | 0 0 0 0 |
| ~2T | 0 0 0 1 |
| ~3T | 0 0 1 0 |
| ~4T | 0 0 1 1 |
| ~5T | 0 1 0 0 |
| ~6T | 0 1 0 1 |
| ~7T | 0 1 1 0 |
| ~8T | 0 1 1 1 |
| ~9T | 1 0 0 0 |
| ~10T | 1 0 0 1 |
| ~11T | 1 0 1 0 |
| ~12T | 1 0 1 1 |
| ~13T | 1 1 0 0 |
| ~14T | 1 1 0 1 |
| ~15T | 1 1 1 0 |
| ~16T | 1 1 1 1 |

FIG. 19

T : 1 SYMBOL TIME

| TIME | DOWN-CHIRP CODE DATA |
|---|---|
| 0T~1T | 1 1 1 1 |
| ~2T | 1 1 1 0 |
| ~3T | 1 1 0 1 |
| ~4T | 1 1 0 0 |
| ~5T | 1 0 1 1 |
| ~6T | 1 0 1 0 |
| ~7T | 1 0 0 1 |
| ~8T | 1 0 0 0 |
| ~9T | 0 1 1 1 |
| ~10T | 0 1 1 0 |
| ~11T | 0 1 0 1 |
| ~12T | 0 1 0 0 |
| ~13T | 0 0 1 1 |
| ~14T | 0 0 1 0 |
| ~15T | 0 0 0 1 |
| ~16T | 0 0 0 0 |

FIG. 24

| 4-BIT XMSN CODE DATA | CARRIER FREQ |
|---|---|
| 0 0 0 0 | F (1) |
| 0 0 0 1 | F (2) |
| 0 0 1 0 | F (4) |
| 0 0 1 1 | F (3) |
| 0 1 0 0 | F (8) |
| 0 1 0 1 | F (7) |
| 0 1 1 0 | F (5) |
| 0 1 1 1 | F (6) |
| 1 0 0 0 | F (16) |
| 1 0 0 1 | F (15) |
| 1 0 1 0 | F (13) |
| 1 0 1 1 | F (14) |
| 1 1 0 0 | F (9) |
| 1 1 0 1 | F (10) |
| 1 1 1 0 | F (12) |
| 1 1 1 1 | F (11) |

FIG. 25

| CARRIER FREQ | 4-BIT RECEP CODE DATA |
|---|---|
| F (1) | 0 0 0 0 |
| F (2) | 0 0 0 1 |
| F (3) | 0 0 1 1 |
| F (4) | 0 0 1 0 |
| F (5) | 0 1 1 0 |
| F (6) | 0 1 1 1 |
| F (7) | 0 1 0 1 |
| F (8) | 0 1 0 0 |
| F (9) | 1 1 0 0 |
| F (10) | 1 1 0 1 |
| F (11) | 1 1 1 1 |
| F (12) | 1 1 1 0 |
| F (13) | 1 0 1 0 |
| F (14) | 1 0 1 1 |
| F (15) | 1 0 0 1 |
| F (16) | 1 0 0 0 |

FIG. 26

T : 1 SYMBOL TIME

| TIME | UP-CHIRP CODE DATA |
|---|---|
| 0T~1T | 0 0 0 0 |
| ~2T | 0 0 0 1 |
| ~3T | 0 0 1 1 |
| ~4T | 0 0 1 0 |
| ~5T | 0 1 1 0 |
| ~6T | 0 1 1 1 |
| ~7T | 0 1 0 1 |
| ~8T | 0 1 0 0 |
| ~9T | 1 1 0 0 |
| ~10T | 1 1 0 1 |
| ~11T | 1 1 1 1 |
| ~12T | 1 1 1 0 |
| ~13T | 1 0 1 0 |
| ~14T | 1 0 1 1 |
| ~15T | 1 0 0 1 |
| ~16T | 1 0 0 0 |

FIG. 27

T : 1 SYMBOL TIME

| TIME | DOWN-CHIRP CODE DATA |
|---|---|
| 0 T ~ 1 T | 1 0 0 0 |
| ~ 2 T | 1 0 0 1 |
| ~ 3 T | 1 0 1 1 |
| ~ 4 T | 1 0 1 0 |
| ~ 5 T | 1 1 1 0 |
| ~ 6 T | 1 1 1 1 |
| ~ 7 T | 1 1 0 1 |
| ~ 8 T | 1 1 0 0 |
| ~ 9 T | 0 1 0 0 |
| ~ 1 0 T | 0 1 0 1 |
| ~ 1 1 T | 0 1 1 1 |
| ~ 1 2 T | 0 1 1 0 |
| ~ 1 3 T | 0 0 1 0 |
| ~ 1 4 T | 0 0 1 1 |
| ~ 1 5 T | 0 0 0 1 |
| ~ 1 6 T | 0 0 0 0 |

FIG. 29

| 4-BIT DATA | CARRIER FREQ |
|---|---|
| 0 0 0 0 | F (1) |
| 0 0 0 1 | F (2) |
| 0 0 1 1 | F (3) |
| 0 0 1 0 | F (4) |
| 0 1 1 0 | F (5) |
| 0 1 1 1 | F (6) |
| 0 1 0 1 | F (7) |
| 0 1 0 0 | F (8) |
| 1 1 0 0 | F (9) |
| 1 1 0 1 | F (10) |
| 1 1 1 1 | F (11) |
| 1 1 1 0 | F (12) |
| 1 0 1 0 | F (13) |
| 1 0 1 1 | F (14) |
| 1 0 0 1 | F (15) |
| 1 0 0 0 | F (16) |

FIG. 42

| TIME SLOT $(r = 0, 1, \cdots)$ | RECEP CHANNEL 1 | RECEP CHANNEL 2 |
|---|---|---|
| $(16 \times r + 1)$ T | F(1) | F(3) |
| $(16 \times r + 2)$ T | F(2) | F(4) |
| $(16 \times r + 3)$ T | F(3) | F(5) |
| $(16 \times r + 4)$ T | F(4) | F(6) |
| $(16 \times r + 5)$ T | F(5) | F(7) |
| $(16 \times r + 6)$ T | F(6) | F(8) |
| $(16 \times r + 7)$ T | F(7) | F(9) |
| $(16 \times r + 8)$ T | F(8) | F(10) |
| $(16 \times r + 9)$ T | F(9) | F(11) |
| $(16 \times r + 10)$ T | F(10) | F(12) |
| $(16 \times r + 11)$ T | F(11) | F(13) |
| $(16 \times r + 12)$ T | F(12) | F(14) |
| $(16 \times r + 13)$ T | F(13) | F(15) |
| $(16 \times r + 14)$ T | F(14) | F(16) |
| $(16 \times r + 15)$ T | F(15) | F(1) |
| $(16 \times r + 16)$ T | F(16) | F(2) |

FIG. 44

| TIME SLOT (r = 0, 1, ···) | RECEP CHANNEL 1 | RECEP CHANNEL 2 |
|---|---|---|
| (16×r+1) T | F(1) | F(2) |
| (16×r+2) T | F(2) | F(3) |
| (16×r+3) T | F(3) | F(4) |
| (16×r+4) T | F(4) | F(5) |
| (16×r+5) T | F(5) | F(6) |
| (16×r+6) T | F(6) | F(7) |
| (16×r+7) T | F(7) | F(8) |
| (16×r+8) T | F(8) | F(9) |
| (16×r+9) T | F(9) | F(10) |
| (16×r+10) T | F(10) | F(11) |
| (16×r+11) T | F(11) | F(12) |
| (16×r+12) T | F(12) | F(13) |
| (16×r+13) T | F(13) | F(14) |
| (16×r+14) T | F(14) | F(15) |
| (16×r+15) T | F(15) | F(16) |
| (16×r+16) T | F(16) | F(1) |

FIG. 46

| TIME SLOT (r = 0, 1, ··) | RECEP CHANNEL 1 | RECEP CHANNEL 2 | RECEP CHANNEL 3 |
|---|---|---|---|
| (16×r+1) T | F(1) | F(5) | F(9) |
| (16×r+2) T | F(2) | F(6) | F(10) |
| (16×r+3) T | F(3) | F(7) | F(11) |
| (16×r+4) T | F(4) | F(8) | F(12) |
| (16×r+5) T | F(5) | F(9) | F(13) |
| (16×r+6) T | F(6) | F(10) | F(14) |
| (16×r+7) T | F(7) | F(11) | F(15) |
| (16×r+8) T | F(8) | F(12) | F(16) |
| (16×r+9) T | F(9) | F(13) | F(1) |
| (16×r+10) T | F(10) | F(14) | F(2) |
| (16×r+11) T | F(11) | F(15) | F(3) |
| (16×r+12) T | F(12) | F(16) | F(4) |
| (16×r+13) T | F(13) | F(1) | F(5) |
| (16×r+14) T | F(14) | F(2) | F(6) |
| (16×r+15) T | F(15) | F(3) | F(7) |
| (16×r+16) T | F(16) | F(4) | F(8) |

FIG. 48

| TIME SLOT (r = 0, 1, · ·) | RECEP CHANNEL 1 | RECEP CHANNEL 2 | RECEP CHANNEL 3 |
|---|---|---|---|
| (16×r+1) T | F(1) | F(2) | F(3) |
| (16×r+2) T | F(2) | F(3) | F(4) |
| (16×r+3) T | F(3) | F(4) | F(5) |
| (16×r+4) T | F(4) | F(5) | F(6) |
| (16×r+5) T | F(5) | F(6) | F(7) |
| (16×r+6) T | F(6) | F(7) | F(8) |
| (16×r+7) T | F(7) | F(8) | F(9) |
| (16×r+8) T | F(8) | F(9) | F(10) |
| (16×r+9) T | F(9) | F(10) | F(11) |
| (16×r+10) T | F(10) | F(11) | F(12) |
| (16×r+11) T | F(11) | F(12) | F(13) |
| (16×r+12) T | F(12) | F(13) | F(14) |
| (16×r+13) T | F(13) | F(14) | F(15) |
| (16×r+14) T | F(14) | F(15) | F(16) |
| (16×r+15) T | F(15) | F(16) | F(1) |
| (16×r+16) T | F(16) | F(1) | F(2) |

FIG. 50

| TIME SLOT (r = 0, 1, ··) | RECEP CHANNEL 1 |
|---|---|
| $(16 \times r + 1)$ T | F(1) |
| $(16 \times r + 2)$ T | F(2) |
| $(16 \times r + 3)$ T | F(3) |
| $(16 \times r + 4)$ T | F(4) |
| $(16 \times r + 5)$ T | F(5) |
| $(16 \times r + 6)$ T | F(6) |
| $(16 \times r + 7)$ T | F(7) |
| $(16 \times r + 8)$ T | F(8) |
| $(16 \times r + 9)$ T | F(9) |
| $(16 \times r + 10)$ T | F(10) |
| $(16 \times r + 11)$ T | F(11) |
| $(16 \times r + 12)$ T | F(12) |
| $(16 \times r + 13)$ T | F(13) |
| $(16 \times r + 14)$ T | F(14) |
| $(16 \times r + 15)$ T | F(15) |
| $(16 \times r + 16)$ T | F(16) |

FIG. 74A FIG. 74B FIG. 74C

FIG. 75A THR JUD PATT (L WORDS)

FIG. 75B MUX CODE

FIG. 75C JUD MAT

FIG. 75D FH DCD PATT (1 WORD)

FIG. 92

| INPUT HAMMING WEIGHT | OUTPUT | | | |
|---|---|---|---|---|
| | $Y_0$ | $Y_1$ | $Y_2$ | $Y_3$ |
| 0, 1 | 1 | 0 | 0 | 0 |
| 2 | 0 | 1 | 0 | 0 |
| 3 | 0 | 0 | 1 | 0 |
| 4 – 1 6 | 0 | 0 | 0 | 1 |

FIG. 94A
PRIOR ART

| + | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

FIG. 94B
PRIOR ART

| · | 0 | 1 | 2 | 3 |
|---|---|---|---|---|
| 0 | 0 | 0 | 0 | 0 |
| 1 | 0 | 1 | 2 | 3 |
| 2 | 0 | 2 | 3 | 1 |
| 3 | 0 | 3 | 1 | 2 |

FIG. 95
PRIOR ART

| USER ID NUM | DATA VALUE | | | |
|---|---|---|---|---|
| | 0 | 1 | 2 | 3 |
| 0 | (0, 0, 0) | (1, 2, 3) | (2, 3, 1) | (3, 1, 2) |
| 1 | (1, 1, 1) | (0, 3, 2) | (3, 2, 0) | (2, 0, 3) |
| 2 | (2, 2, 2) | (3, 0, 1) | (0, 1, 3) | (1, 3, 0) |
| 3 | (3, 3, 3) | (2, 1, 0) | (1, 0, 2) | (0, 2, 1) |

FIG. 97A

| + | 0 | 1 | 2 | 3 | 4 |
|---|---|---|---|---|---|
| 0 | 0 | 1 | 2 | 3 | 4 |
| 1 | 1 | 2 | 3 | 4 | 0 |
| 2 | 2 | 3 | 4 | 0 | 1 |
| 3 | 3 | 4 | 0 | 1 | 2 |
| 4 | 4 | 0 | 1 | 2 | 3 |

FIG. 97B

| · | 0 | 1 | 2 | 3 | 4 |
|---|---|---|---|---|---|
| 0 | 0 | 0 | 0 | 0 | 0 |
| 1 | 0 | 1 | 2 | 3 | 4 |
| 2 | 0 | 2 | 4 | 1 | 3 |
| 3 | 0 | 3 | 1 | 4 | 2 |
| 4 | 0 | 4 | 3 | 2 | 1 |

FIG. 98

| USER ID NUM | DATA VALUE | | | |
|---|---|---|---|---|
| | 0 | 1 | 2 | 3 |
| 0 | (1, 2, 4) | (2, 4, 3) | (3, 1, 2) | (4, 3, 1) |
| 1 | (2, 3, 0) | (3, 0, 4) | (4, 2, 3) | (0, 4, 2) |
| 2 | (3, 4, 1) | (4, 1, 0) | (0, 3, 4) | (1, 0, 3) |
| 3 | (4, 0, 2) | (0, 2, 1) | (1, 4, 0) | (2, 1, 4) |
| 4 | (0, 1, 3) | (1, 3, 2) | (2, 0, 1) | (3, 2, 0) |

| x | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| w | 1 | 2 | 3 | 4 | 5 | 6 | 7 | 8 | 9 | 10| 11 | 12 | 13 | 14 | 15 | 16 |

| c   | 0 | 1 | 2 | 3 | 4 | 5 | 6  | 7  | 8 | 9  | 10| 11 | 12 | 13 | 14 |
|-----|---|---|---|---|---|---|----|----|---|----|---|----|----|----|----|
| p p | 1 | 2 | 4 | 8 | 3 | 6 | 12 | 11 | 5 | 10 | 7 | 14 | 15 | 13 | 9  |

FIG. 106

| y | z |
|---|---|
| 0 ~ 1 5 | 1 |
| 1 6 | 0 |

FIG. 107

| M | Q |
|---|---|
| 4 | 5 |
| 8 | 9 |
| 16 | 17 |
| 32 | 37 |
| 64 | 67 |
| 128 | 131 |
| 256 | 257 |
| 512 | 521 |
| 1024 | 1031 |
| 2048 | 2053 |
| 4096 | 4099 |
| 8192 | 8209 |

DIGITAL COMMUNICATION APPARATUS

This is a divisional of application Ser. No. 08/763,338, filed Dec. 11, 1996 now U.S. Pat. No. 5,837,529.

BACKGROUND OF THE INVENTION

The present invention relates to a digital communication apparatus.

In the communication field, a spread-spectrum communication technique is suitable for a high-speed data transmission in the environment where the channel characteristics such as multipath fading undergo a considerable dynamic change.

Typical examples of spread-spectrum communication technique include a direct spread (DS) system and a frequency hopping (FH) system. The DS system is advantageous in view of small circuit size and high-speed data transmission, while the FH system is advantageous in view of channel capacity and communication reliability. Examples of the FH system include a high-speed FH system and a low-speed FH system. The high-speed FH system in which communication is made while the carrier frequency is being switched in a short period of time, is considerably increased in hardware size as compared with the low-speed FH system, but is advantageous in view of reliability against multipath fading.

Examples of a primary modulation in the FH system include a frequency shift keying (FSK) modulation, a phase shift keying (PSK) modulation and the like. In view of simplicity in circuit configuration requiring no phase control, the FSK modulation is relatively often used.

According to an arrangement-of an FH digital communication apparatus of prior art, the transmission throughput per channel, even for one-channel communication, is the same as that in communication using a plurality of channels.

According to another arrangement of the FH digital communication apparatus of prior art, carrier frequency waveforms are synthesized by a PLL synthesizer in the transmitter. This makes it difficult to switch the carrier frequency at a high speed of the order of micro second. Thus, such an arrangement is not suitable for the high-speed FH system. Further, the receiver requires, at its envelop line detector unit, analog band-pass filters having sharp amplitude characteristics in number equal to the number of carrier frequencies. This results in an increase in hardware. To achieve the high-speed FH system, it would be proposed that both the generation of waveforms and the detection of frequencies are conducted by a digital signal process. However, this disadvantageously excessively increases the frequency of a sampling clock for a digital signal process. On the other hand, when detecting frequencies using a discrete Fourier transform (DFT), it is required that the DFT operation interval is accurately in synchronism with the time slot. This has hitherto been difficult.

There is known a digital communication apparatus using a code multiplexing MFSK modulation using M carrier frequencies, M being an integer not less than 4. According to D. J. Goodman et al., "Frequency-Hopped Multilevel FSK for Mobile Radio", Bell System Technical Journal, Vol. 59, No. 7, pp. 1257–1275, September 1980, M frequencies (tones) are prepared in a predetermined band according to the high-speed FH system, and a unique code is assigned to each user on a time-frequency matrix. However, a high sampling rate is required in the DFT process, making it practically difficult to achieve the hardware.

There is now considered a digital communication apparatus of the mode changeover type arranged to make a frequency multiplex communication with either the MFSK or FH mode selected according to multiplicity. However, when the transmitter is not provided with a data scrambling function and the appearance probability of transmission data is uneven, the spectra of a transmission signal are also uneven. Further, when specific frequency components appear continuously, timing extraction becomes difficult in the receiver. This lengthens the time required for pulling into synchronism. Further, in the receiver, there are instances where, in an operation mode according to the MFSK mode, a plurality of reception signals are detected under the influence of noise, a spurious response or the like. In such a case, the maximum likelihood word cannot be determined. Further, in an operation mode according to the FH mode, too, when a plurality of words are calculated by a majority judgment, the maximum likelihood word can neither be determined.

In G. Einarsson, "Address Assignment for a Time-Frequency-Coded, Spread-Spectrum System", Bell System Technical Journal, Vol. 59, No. 7, pp 1241–1255, September 1980, two methods are proposed for generating hopping codes from data in a digital FH-MFSK communication system. One is based on the premise of a synchronous system, while the other is based on the premise of an asynchronous system (a code multiplexing system providing a chip synchronism between users, but not providing a frame synchronism between users). Both methods are based on a Reed-Solomon code. However, under the influence of frequency-selective fading, there might occur a miss detection (deletion) of all specific frequency components.

SUMMARY OF THE INVENTION

It is an object of the present invention to provide a digital communication apparatus in which a high-speed data transmission is made using a multilevel frequency shift keying (MFSK) modulation mode when all the channels become vacant.

It is another object of the present invention to provide a digital communication apparatus in which a data communication is made according to a high-speed FH mode with no considerable increase in both sampling clock frequency and hardware size even though reception carrier frequencies are detected by a DFT operation unit in the receiver.

It is a further object of the present invention to provide a digital communication apparatus in which, using a low sampling-rate DFT processor capable of processing a ½ band width of a sub-band, a specific sub-band is modulated/demodulated according to the MFSK or code multiplexing MFSK mode even in the environment where simultaneous communications are made using a plurality of sub-bands.

It is still another object of the present invention to provide a digital communication apparatus of the mode changeover type capable of randomizing transmission data without use of a scrambler and having maximum likelihood word determining means.

It is a still further object of the present invention to provide a digital communication apparatus highly invulnerable to fading such that random hopping codes are acquired.

To achieve the objects above-mentioned, the present invention provides a digital communication apparatus to be used for a communication system in which a plurality of digital communication apparatus share a time slot (network synchronization) and in which, using N carrier frequencies out of M carrier frequencies per time slot, an N-channel frequency multiplex communication is made with an MFSK modulation mode selected when N is equal to 1 and with an FH modulation mode selected when N is not less than 2, each of N and M being an integer. More specifically, the digital communication apparatus of the present invention comprises: the following receiver comprising a signal processing unit, a channel detection unit and a decoding unit; and the following transmitter comprising a coding unit, a channel generation unit and a waveform generation unit. In the receiver, the signal processing unit is arranged such that, when a reception signal is entered through a transmission line, there are calculated, for the reception signal, the spectrum intensity values of the M carrier frequencies per time slot, and that the spectrum intensity values thus calculated are supplied to the channel detection unit. The channel detection unit is arranged such that, when the spectrum intensity values are entered from the signal processing unit, channels are detected based on the spectrum intensity values, that the time slot is controlled in phase, that either the MFSK or FH modulation mode is selected and that reception code data for the channels are supplied to the decoding unit. The decoding unit is arranged such that, when reception code data are entered from the channel detection unit, the reception code data are decoded according to the modulation mode selected by the channel detection unit, and that reception information data are supplied. In the transmitter, the coding unit is arranged such that, when transmission information data are entered, the transmission information data are coded according to the modulation mode selected by the channel detection unit and that transmission code data are supplied to the channel generation unit. The channel generation unit is arranged to assign channels to the transmission code data received from the coding unit, to select carrier frequencies for the channels and to supply the carrier frequencies thus selected to the waveform generation unit. The waveform generation unit is arranged to supply, as a transmission signal, the signal waveforms of the carrier frequencies selected by the channel generation unit, the transmission signal being supplied, in synchronism with the time slot, to the transmission line. According to the digital communication apparatus having the arrangement above-mentioned, the modulation mode can be switched from the FH mode to the MFSK mode and vice versa merely by changing the contents to be processed in the coding and decoding units. This enables the FH or MFSK mode to be used as properly selected according to the usage of channels. This achieves an efficient high-speed data transmission without reliability lost.

In a digital communication system using another digital communication apparatus according to the present invention, a plurality of digital communication apparatus share a time slot (network synchronization) and a frequency multiplex communication is made with carrier frequencies out of M carrier frequencies selected, per time slot, for a plurality of channels, M being an integer not less than 2. This digital communication apparatus comprises; the following transmitter comprising a frequency selection unit and a waveform generation unit; and the following receiver comprising a down-converter unit, a DFT operation unit, a threshold judgment unit, a synchronizing signal generation unit, a latch unit and a decoder. In the transmitter, the frequency selection unit is arranged to determine, for entered transmission data, carrier frequencies to be used out of the M carrier frequencies per $\log_2$ M bits according to a conversion table. The waveform generation unit is arranged to supply, in synchronism with the time slot, frequency waveforms corresponding to the carrier frequencies to be used, the frequency waveforms being supplied, as a transmission signal, to the transmission line for each period of one time slot T. In the receiver, the down-converter unit is arranged such that a reception signal entered through the transmission line is down-converted in frequency to a low frequency band. The DFT operation unit is arranged to successively execute, per sampling clock period $\Delta t$, a discrete Fourier transform (DFT) for a period of the latest one time slot (T=N×$\Delta t$) on the signal after down-converted in frequency, thereby to respectively calculate spectrum values I (k) (k=1, 2, . . . , M) for the M carrier frequencies, N being an integer not less than M. The threshold judgment unit is arranged to detect, out of the M carrier frequencies, carrier frequencies of which spectrum values I(k) exceed a threshold value, these carrier frequencies being detected as candidate carrier frequencies per sampling clock period $\Delta t$. The synchronizing signal generation unit is arranged to generate, based on the spectrum values I(k) and the candidate carrier frequencies, a synchronizing trigger signal for synchronization with the time slot. The latch unit is arranged to determine, as reception carrier frequencies, the candidate carrier frequencies at the time of assertion of the synchronizing trigger signal. The decoder is arranged to supply, based on a conversion table identical with that in the frequency selection unit, $\log_2$M-bit reception data for the reception carrier frequencies. According to the digital communication apparatus having the arrangement above-mentioned, a transmission signal can be pulled, using the results of a DFT operation, into accurate synchronism with the time slot. Thus, such a highly precise frequency detection suitable for the high-speed FH system achieves a highly reliable data communication with a high frequency-utilization efficiency.

The present invention provides a further digital communication apparatus using either an MFSK modulation mode or a code multiplexing MFSK modulation mode, using M carrier frequencies per sub-band, M being an integer not less than 4, and this digital communication apparatus is arranged such that the M carrier frequencies per sub-band are orthogonally disposed at frequency intervals not less than 2/T in which T is a frequency switching period of time. According to the digital communication apparatus having the arrangement above-mentioned, using a low sampling-rate discrete Fourier transform capable of processing a ½ band width of a sub-band, frequencies in the sub-band around a specific frequency can be detected even in the environment where simultaneous communications are made using a plurality of sub-bands.

The present invention provides a further digital communication apparatus using either an MFSK modulation mode or a code multiplexing MFSK modulation mode, using M consecutive carrier frequencies randomly selected per predetermined time interval L, M being an integer not less than 4, and this digital communication apparatus is arranged such that the time interval L is a value equal to the product of a frequency switching period of time T and a positive integer and that the M carrier frequencies are orthogonally disposed at frequency intervals not less than 2/T. According to the digital communication apparatus having the arrangement above-mentioned, using a low sampling-rate discrete Fourier transform capable of processing a ½ band width of a sub-band, frequencies in the sub-band around the desired frequency can be detected even in the environment where simultaneous communications are made using a plurality of sub-bands.

The present invention provides a further digital communication apparatus using either an MFSK modulation mode or a code multiplexing MFSK modulation mode, using M carrier frequencies per sub-band, M being an integer not less than 4, and this digital communication apparatus comprises a transmitter and a receiver. The receiver comprises: N diversity branches in which signals received from N points spatially separated from the diversity branches, are respectively down-converted in frequency to low frequency bands, thereby to supply N-sequence base band signals, N being an integer not less than 2; a frequency detection unit formed of M operation units for respectively calculating the signal levels of the M carrier frequencies; a selector for assigning the N-sequence base band signals to the M operation units; and a timer for controlling the selector to change the base band signal to be assigned to a specific operation unit out of the M operation units when the signal level calculated by the specific operation unit does not exceed a threshold level in a predetermined period of time. According to the digital communication apparatus having the arrangement above-mentioned, signal reception can be made with no fading influence in each of the operation units.

The present invention provides a further digital communication apparatus to be used for a digital communication system in which a plurality of digital communication apparatus share a time slot and in which a half-duplex data communication is made using either an MFSK modulation mode or a code multiplexing MFSK modulation mode, and this digital communication apparatus comprises a transmitter and a receiver which share a single antenna. In this digital communication apparatus, the receiver comprises: first means for storing, as a reference phase error, a phase error which is present immediately before the communication mode is switched from the reception mode to the transmission mode; and second means for generating, after the reception mode has been switched to the transmission mode, a regenerative synchronizing signal for synchronous control of the time slot, using a feedforward control based on the stored reference phase error, and for supplying the regenerative synchronizing signal thus generated to the transmitter. According to the digital communication apparatus having the arrangement above-mentioned, it is possible to maintain a network synchronization at the time when there is made, using the common antenna, a code division multiple access (CDMA) as done in an FH-MFSK mode in the same frequency band.

The present invention provides a further digital communication apparatus comprising: a transmitter in which a convolutional coder and an interleaver are combined to code transmission data without use of a scrambler; and a receiver in which a majority decoder is used to execute a most likelihood word decoding. In this digital communication apparatus, using M carrier frequencies per time slot, a frequency multiplex communication is made with either an MFSK modulation mode or an FH modulation mode selected according to multiplicity, M being an integer not less than 2. This digital communication apparatus comprises (i) the transmitter comprising: the convolutional coder for supplying a convolutional code sequence according to an input information sequence; the interleaver for supplying an interleave sequence according to the convolutional code sequence; an FH coder for supplying an FH code sequence according to the interleave sequence; a first switching unit for supplying, according to a switching signal, either the interleave sequence or the FH code sequence as a transmission sequence; and an M-ary independent signal transmitter unit for supplying, per time slot, a transmission signal containing, out of M mutually independent frequency components, one frequency component corresponding to the transmission sequence, and (ii) the receiver comprising: an M-ary independent signal receiver unit for supplying a threshold judgment pattern generated by making a threshold judgment on each of the intensity values of M frequency components of a reception signal; an operational mode control circuit for judging the multiplicity based on the threshold judgment pattern and for supplying the switching sinal according to the multiplicity; an FH decoder for supplying an FH decoding pattern according to the threshold judgment pattern; a second switching unit for selecting, according to the switching signal, either the threshold judgment pattern or the FH decoding pattern; the majority decoder for supplying a majority decoding sequence according to the pattern selected by the second switching unit; a deinter-leaver for supplying a deinterleave sequence according to the majority decoding sequence; and a Viterbi decoder for supplying an information sequence according to the deinterleave sequence. According to the digital communication apparatus having the arrangement above-mentioned, both the convolutional coder and the interleaver encode transmission data, causing the transmission data to be randomized without use of a scrambler. This not only equalizes the spectra of a transmission signal, but also reduces the frequency in continuous appearance of specific frequency components. Further, the majority decoder in the receiver makes a majority judgment on each of the bits forming a word, thus determining the most likelihood word.

The present invention provides a further digital communication apparatus comprising a frequency hopping generator (FH coder) comprising the following conversion means and the following operation means. More specifically, the conversion means is arranged to convert a data value x which is an element of a Galois field, into a code w which is a non-zero element of the Galois field, according to the following conversion equation using a function f:

$$w=f(x)$$

when the number M of values which a data can present, is equal to $_2k$ (k is a positive integer) and the number Q of the elements of the Galois field is equal to $p^r$ (>M) in which p is a prime number and r is a positive integer. The operation means is to arrange to calculate, according to the code w, a hopping code vector $^-y$ composed of L components using the following Galois operation:

$$^-y = w \cdot {}^-\alpha + i \cdot {}^-e$$

wherein i is the user identification No. which is an element of the Galois field; $\alpha$ is one of the primitive elements of the Galois field; $^-\alpha$ is a spread code vector of L components and is equal to $(1, \alpha, \alpha^2, \ldots \alpha^{L-1})$ in which L is an integer not less than 2 and not greater than $p^r-1$; and $^-e$ is a unit vector of L components and is equal to $(1, 1, \ldots, 1)$. According to the digital communication apparatus having the arrangement above-mentioned, Q is greater than M and the data value x is previously converted into the non-zero code w, based on which the hopping code vector $^-y$ is calculated.

BRIEF DESCRIPTION OF THE DRAWINGS

FIG. 5 shows the contents of the frequency table in the transmitter in FIG. 2;

FIG. 6 shows the contents of the frequency table in the receiver in FIG. 3;

FIG. 18 shows up-chirp code data in the coding unit in FIG. 17;

FIG. 19 shows down-chirp code data in the coding unit in FIG. 17;

FIG. 24 is a view of a modification of the arrangement in FIG. 5;

FIG. 25 is a view of a modification of the arrangement in FIG. 6;

FIG. 26 is a view of a modification of the arrangement in FIG. 18;

FIG. 27 is a view of a modification of the arrangement in FIG. 19;

FIG. 29 shows a correspondence of 4-bit data to carrier frequencies in the frequency selection unit and the decoder in FIG. 28;

FIG. 42 shows two reception channels high in randomized property;

FIG. 44 shows examples of two reception channels low in randomized property;

FIG. 46 shows examples of three reception channels high in randomized property;

FIG. 48 shows examples of three reception channels low in randomized property;

FIG. 50 shows examples of one reception channel;

FIGS. 74A, 74B and 74C respectively show examples of an interleave sequence matrix, a multiplexing code matrix and an FH code sequence matrix in the FH coder in FIG. 73A;

FIGS. 75A, 75B, 75C and 75D respectively show examples of a threshold judgment pattern, a multiplexing code sequence, a judgment matrix and an FH decoding pattern matrix in the FH decoder in FIG. 73B;

FIG. 92 shows the relationship between input and output of the multiplicity judgment logic in FIG. 91;

FIGS. 94A and 94B respectively illustrate the definitions of Galois addition and Galois multiplication used in the FH code generator in FIG. 93;

FIG. 95 shows examples of a hopping code vector generated in the FH code generator in FIG. 93;

FIGS. 97A and 97B respectively illustrate the definitions of Galois addition and Galois multiplication used in the FH code generator in the digital communication system according to the present invention;

FIG. 98 shows examples of a hopping code vector in the digital communication system according to the present invention;

FIG. 106 shows the operation of the FH code judgment unit in FIG. 105; and FIG. 107 shows the relationship between the number M of values which a data can present and the number Q of the elements of a Galois field, in the FH code generator in the digital communication system according to the present invention.

DETAILED DESCRIPTION OF THE INVENTION

The following description will discuss embodiments of a digital communication apparatus according to the present invention with reference to the attached drawings.

Figure 1:
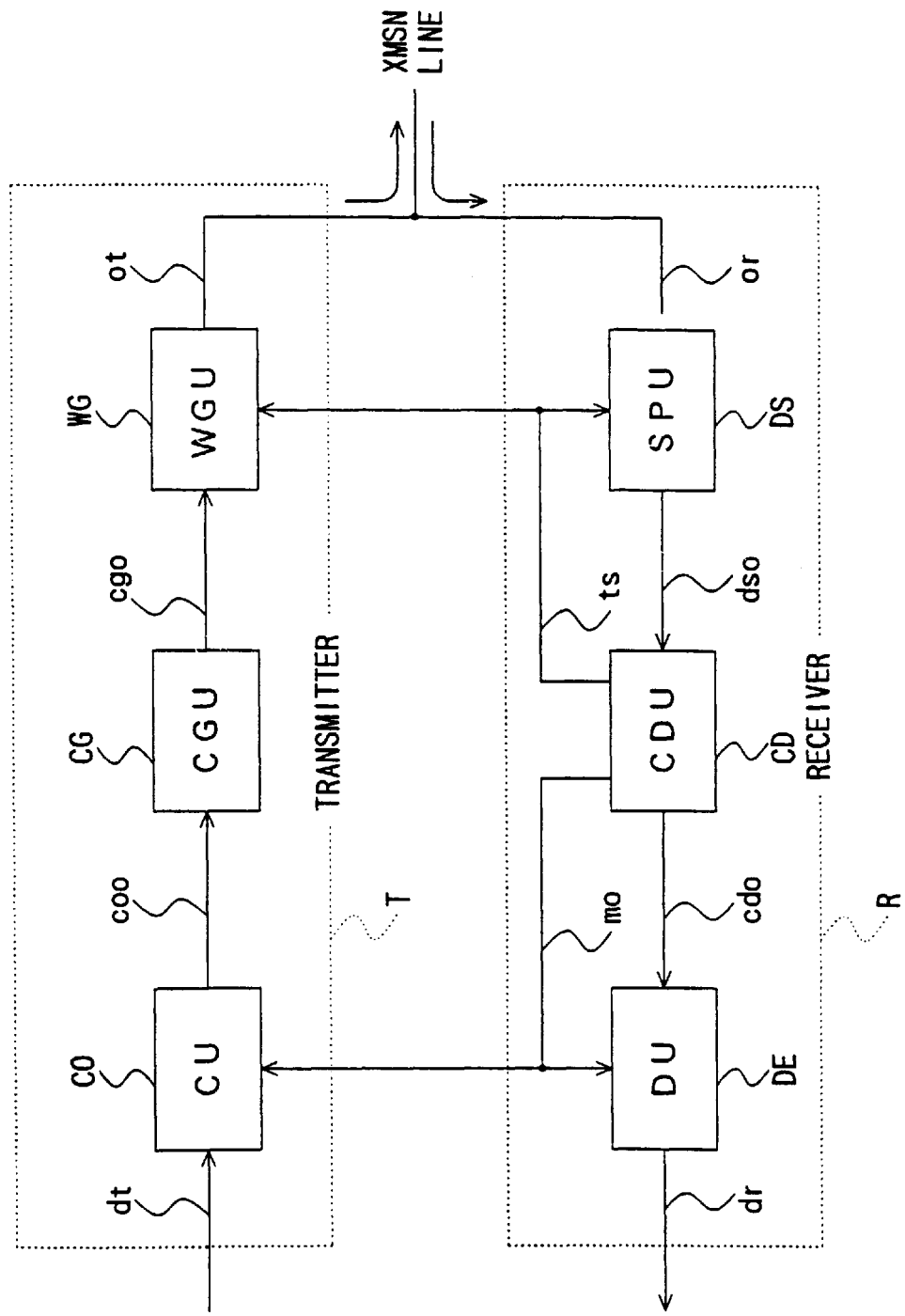
FIG. 1 is a block diagram showing an example of the arrangement of a digital communication apparatus according to the present invention.

FIG. 1 shows an example of the arrangement of a digital communication apparatus according to the present invention. In FIG. 1, the digital communication apparatus comprises a transmitter T, a receiver R, a coding unit CO, a channel generation unit CG, a waveform generation unit WG, a signal processing unit DS, a channel detection unit CD and a decoding unit DE. The transmitter T comprises the coding unit CO, the channel generation unit CG and the waveform generation unit WG. The receiver R comprises the signal processing unit DS, the channel detection unit CD and the decoding unit DE. Shown in FIG. 1 are transmission information data dt, transmission code data coo, carrier frequencies to be used cgo, a transmission signal to, a reception signal or, a spectrum intensity output dso, reception code data cdo, reception information data dr, a time slot signal ts and a mode control signal mo.

In FIG. 1, the binary transmission information data dt are entered into the transmitter T. In the coding unit CO, the transmission information data dt are subjected to error correction coding and then, based on the state of the mode control signal mo, the transmission code data coo according to the FH or MFSK mode are generated. In the channel generation unit CG, based on the block of $\log_2 M$ bits of the transmission code data coo, the carrier frequencies to be used cgo are read out from a memory table containing pieces of carrier frequency information respectively assigned to the blocks. Here, M is an integer and represents the maximum number of carrier frequencies to be utilized in the frequency multiple communication system. In the waveform generation unit WG, the signal waveforms of the carrier frequencies to be used cgo for one symbol, are digitally generated by a digital direct synthesizer (hereinafter simply referred to as digital synthesizer) and then supplied as the transmission signal to to a transmission line in synchronism with the time slot signal ts for setting the symbol interval.

The receiver R receives the reception signal or from a transmission line. In the signal processing unit DS, a DFT process is executed on the reception signal or for one symbol interval in synchronism with the time slot signal ts, and the spectrum intensity values are calculated for the carrier frequencies to supply the spectrum intensity output (DFT output) dso. In the channel detection unit CD, a threshold judgment is made, per symbol, on the spectrum intensity values of the carrier frequencies and there are supplied the reception code data cdo corresponding to carrier frequencies exceeding the threshold value. Here, the mode control signal mo to be supplied from the channel detection unit CD is determined according to the number of received channels or the number of carrier frequencies exceeding the threshold value. Further, supplied from the channel detection unit CD is the time slot signal ts as controlled in phase based on the spectrum intensity values of the carrier frequencies. In the decoding unit DE, the reception code data cdo are decoded according to the FH or MFSK mode dependent on the state of the mode control signal Mo. After error correction, the data decoded according to the FH or MFSK mode, are supplied as regenerated as the binary reception information data dr.

Figure 2:
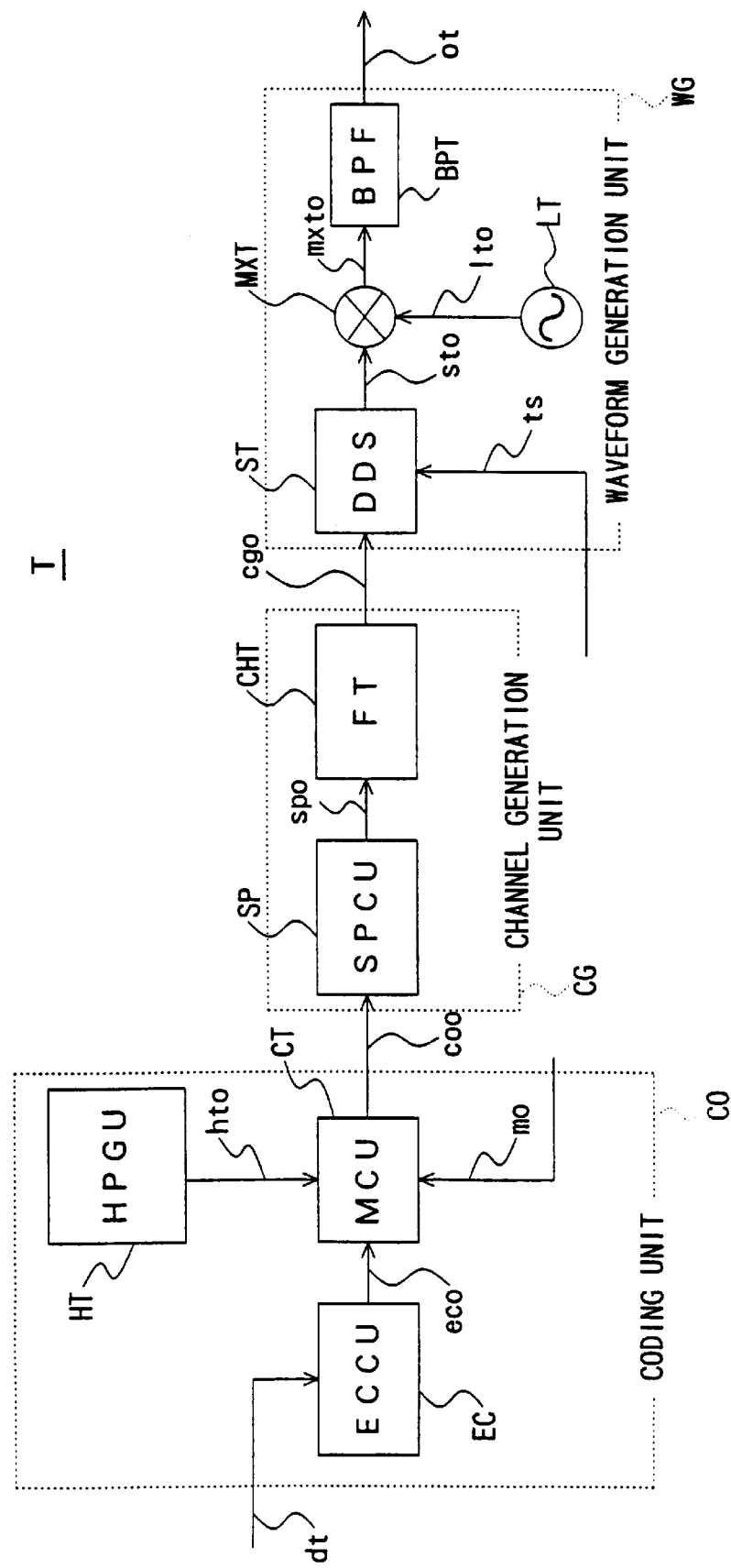
FIG. 2 is a block diagram showing in detail an example of the arrangement of the transmitter in FIG. 1.

FIG. 2 shows in detail an example of the arrangement of the transmitter T in FIG. 1. In FIG. 2, the transmitter T comprises the coding unit CO, the channel generation unit CG, the waveform generation unit WG, an error correction coding unit EC, a hopping pattern generation unit HT, a mode control unit CT, a serial-to-parallel conversion unit SP, a frequency table CHT, a digital synthesizer ST, a mixer MXT, a reference oscillator LT and a band-pass filter BPT. Shown in FIG. 2 are the transmission information data dt, error correction code data eco, a hopping pattern hto, the mode control signal mo, the transmission code data coo, S-bit ($S=\log_2 M$) transmission code data spo, the carrier frequencies to be used cgo, the time slot signal ts, a digital synthesizer ST output sto, a local oscillating signal lto, a mixer MXT output mxto and the transmission signal ot.

In FIG. 2, the coding unit CO comprises the error correction coding unit EC, the hopping pattern generation unit HT and the mode control unit CT. In the error correction coding unit EC, the entered transmission information data dt are coded using a convolutional code, a block code or the like. Generated in the hopping pattern generation unit HT is the hopping pattern hto for a spectrum spread according to the FH mode. In the mode control unit CT, the error correction code data eco as multiplied by the hopping pattern hto are generated and supplied as the transmission code data coo for the FH mode when the mode control signal mo is in the HIGH level, and the error correction code data eco as they are, are generated and supplied as the transmission code data coo for the MFSK mode when the mode control signal mo is in the LOW level.

The channel generation unit CG comprises the serial-to-parallel conversion unit SP and the frequency table CHT. In the serial-to-parallel conversion unit SP, serially entered transmission code data coo are divided into S-bit data and supplied in parallel as S-bit transmission code data spo presenting information for one symbol. The frequency table CHT is formed of a memory such as a ROM or the like containing corresponding information of carrier frequencies for transmission code data spo, and carrier frequencies to be used cgo are read out, from the frequency table CHT, per entered S-bit transmission code data spo.

The waveform generation unit WG comprises the digital synthesizer ST, the reference oscillator LT, the mixer MXT and the band-pass filter BPT. In the digital synthesizer ST, frequency waveforms in the equivalent low band system are digitally generated for the entered carrier frequencies to be used cgo and supplied as hopped per symbol in synchronism with the time slot signal ts. The reference oscillator LT generates the local oscillating signal lto. The digital synthesizer output sto is up-converted in frequency by the local oscillating signal lto in the mixer MXT and, in the band-pass filter BPT, the desired band is taken out from the mixer output mxto and supplied as the transmission signal ot to the transmission line.

Figure 3:
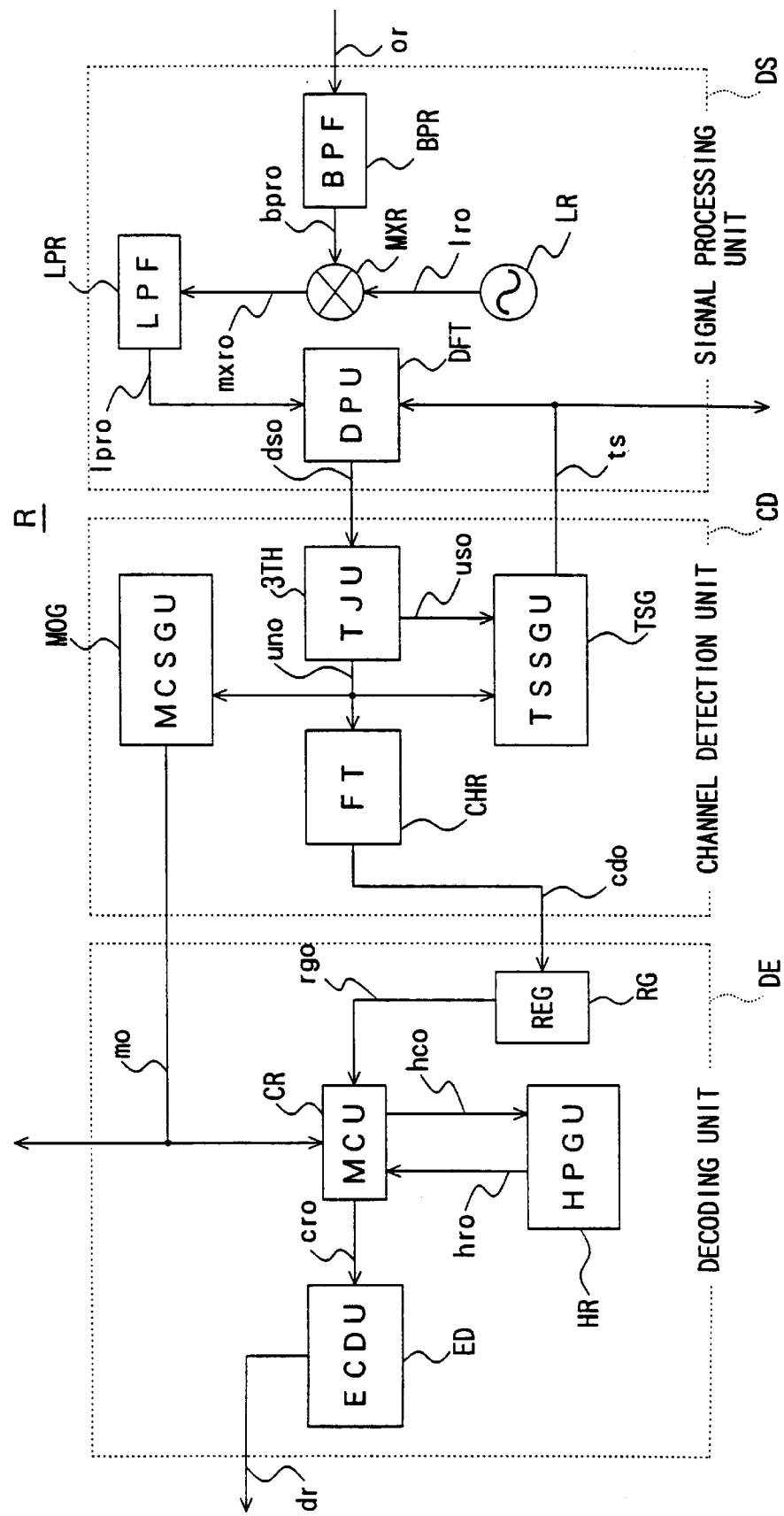
FIG. 3 is a block diagram showing in detail an example of the arrangement of the receiver in FIG. 1.

FIG. 3 shows in detail an example of the arrangement of the receiver R in FIG. 1. In FIG. 3, the receiver R comprises the signal processing unit DS, the channel detection unit CD, the decoding unit DE, a band-pass filter BPR, a reference oscillator LR, a mixer MXR, a low-pass filter LPR, a discrete Fourier transform processing unit DFT, a threshold judgment unit 3TH, a mode control signal generation unit MOG, a time slot signal generation unit TSG, a frequency table CHR, a register RG, a mode control unit CR, a hopping pattern generation unit HR and an error correction decoding unit ED. Shown in FIG. 3 are the reception signal or, a band-pass filter BPR output bpro, a local oscillating signal lro, an mixer MXR output mxro, a low-pass filter LPR output lpro, a DFT output dso, the time slot signal ts, carrier frequencies uno detected as channels, spectrum intensity values uso of carrier frequencies detected as channels, the mode control signal mo, the reception code data cdo, a register RG output rgo, a hopping pattern hro, a hopping pattern control signal hco, a mode control unit CR output cro and the reception information data dr.

In FIG. 3, the signal processing unit DS comprises the band-pass filter BPR, the reference oscillator LR, the mixer MXR, the low-pass filter LPR and the discrete Fourier transform processing unit DFT. The band-pass filter BPR receives the reception signal or through the transmission line. When the reception signal or is down-converted in frequency, the band-pass filter BPR prevents the image frequency components of signals outside of the desired band from overlapping one another. The reference oscillator LR generates the local oscillating signal iro for down-conversion in frequency. In the mixer MXR, the band-pass filter output bpro is down-converted in frequency using the local oscillating signal lro. In the low-pass filter LPR, the unnecessary signal components outside of the DFT processing band are removed from the mixer output mxro. In the discrete Fourier transform processing unit DFT, a DFT process is executed, in synchronism with the time slot signal ts, on the low-pass filter output lpro for one symbol interval and the spectrum intensity for each carrier frequency is calculated. Here, it is required that the number of sample points per symbol cycle in the DFT process is set to 2×M points or more based on a sampling theorem and that the time slot signal ts is accurately in synchronism with the symbol cycle.

The channel detection unit CD comprises the threshold judgment unit 3TH, the mode control signal generation unit MOG, the time slot signal generation unit TSG and the frequency table CHR. In the threshold judgment unit 3TH, a threshold judgment is made, for the DFT output dso having 2×M points or more, on the spectrum intensity values of frequency points corresponding to the carrier frequencies. Carrier frequencies having spectrum intensity values exceeding the threshold value are detected as corresponding to channels, and such spectrum intensity values uso and such carrier frequencies uno are supplied. In the mode control signal generation unit MOG, the channel number N (N=integer) is counted based on the carrier frequencies detected as channels, and the mode control signal mo is supplied in the HIGH level when N is not less than 2, and in the LOW level when N is equal to 1. In the time slot signal generation unit TSG, spectrum intensity values uso at consecutive symbols are compared in level, and based on the comparison result, the time slot signal ts is generated as controlled in phase. In the frequency table CHR, reception code data cdo each for each carrier frequency uno are successively read in S-bit unit from the memory table containing corresponding information identical with that contained in the frequency table CHT in the channel generation unit CG of the transmitter T.

The decoding unit DE comprises the register RG, the hopping pattern generation unit HR, the mode control unit CR and the error correction decoding unit ED. In the register RG, all reception code data cdo read out from the frequency table CHR are updated and stored per symbol cycle, and the register output rgo is supplied to the mode control unit CR. In the mode control unit CR, decoding is executed with the FH mode selected when the mode control signal mo is in the HIGH level, and with the MFSK mode selected when the mode control signal mo is in the LOW level. In the mode control unit CR, when the FH mode is selected, a hopping pattern control signal hco of a channel to be received is generated such that a hopping pattern to be followed is specified to the hopping pattern generation unit HR. The register output rgo is inversely spread in spectrum by the hopping pattern hro such that one of a plurality of reception code data cdo is specified and supplied to the error correction decoding unit ED. In the mode control unit CR, when the MFSK mode is selected, the register output rgo is not inversely spread in spectrum but is supplied, as it is, to the error correction decoding unit ED. In the error correction decoding unit ED, the mode control unit CR output cro is subjected to error correction using a convolutional code, a block code or the like and then, the reception information data dr are regenerated and supplied.

The following description will discuss in detail the circuit operation of the digital communication apparatus with M equal to 16 in the arrangement in FIG. 1. It is noted that carrier frequencies are expressed in terms of F (x) {x=1, 2, 3, . . . 16}.

First, the operation of the transmitter T in FIG. 2 will be discussed.

Figure 4:
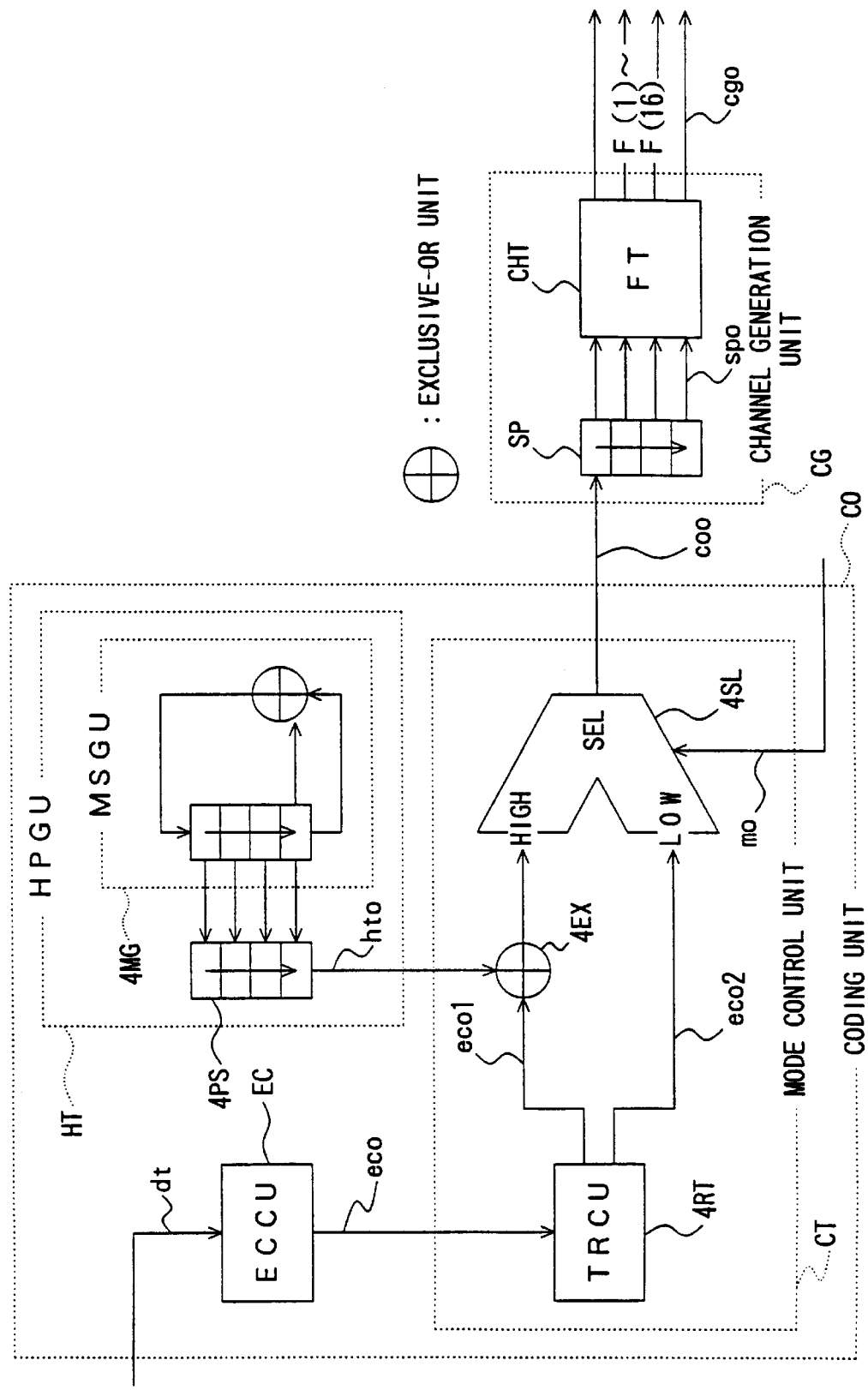
FIG. 4 is a block diagram showing in detail an example of the arrangement of the coding unit in the transmitter in FIG. 2.

FIG. 4 shows in detail an example of the arrangement of the coding unit CO in the transmitter T in FIG. 2. In the coding unit CO in FIG. 4, the mode control unit CT comprises a transmission rate conversion unit 4RT, an exclusive-OR unit 4EX and a data selector 4SL. Shown in FIG. 4 are first error correction code data eco1 and second error correction code data eco2. The hopping pattern generation unit HT comprises a parallel-to-serial conversion unit 4PS and a M-sequence generation unit 4MG.

The transmission information data dt are converted into the error correction code data eco in the error correction coding unit EC and then converted into data of the bit rate corresponding to the FH or MFSK mode in the transmission rate conversion unit 4RT. More specifically, the first error correction code data eco1 are supplied when the FH mode is selected, and the second error correction code data eco2 are supplied when the MFSK mode is selected. Since S is equal to $\log_2$ M which is equal to 4, the second error correction code data eco2 have a bit speed four times of that of the first error correction code data eco1. When the FH mode is selected, the hopping pattern hto is generated in the hopping pattern generation unit HT. In the M-sequence generation unit 4MG, therefore, a pseudorandom code having 15 sequences is generated for every four bits and supplied as the hopping pattern hto after converted into serial data in the parallel-to-serial conversion unit 4PS. In the exclusive-OR unit 4EX, the hopping pattern hto is used for a spectrum spread of the first error correction code data eco1. Entered into the data selector 4SL are the first error correction code data eco1, after spectrum-spread, for the FH mode, or the second error correction code data eco2 for the MFSK mode. When the mode control signal mo is in the HIGH level, the first error correction code data eco1, after spectrum-spread, for the FH mode are supplied as the transmission code data coo. When the mode control signal mo is in the LOW level, the second error correction code data eco2 for the MFSK mode are supplied as the transmission code data coo. The transmission code data coo are converted into the 4-bit transmission code data spo in the serial-to-parallel conversion unit SP in the channel generation unit CG, and the carrier frequencies to be used cgo are read out from the frequency table CHT containing the corresponding information shown in FIG. 5. FIG. 6 shows the contents of the frequency table CHR of the channel detection unit CD in the receiver R corresponding to FIG. 5.

Figure 7:
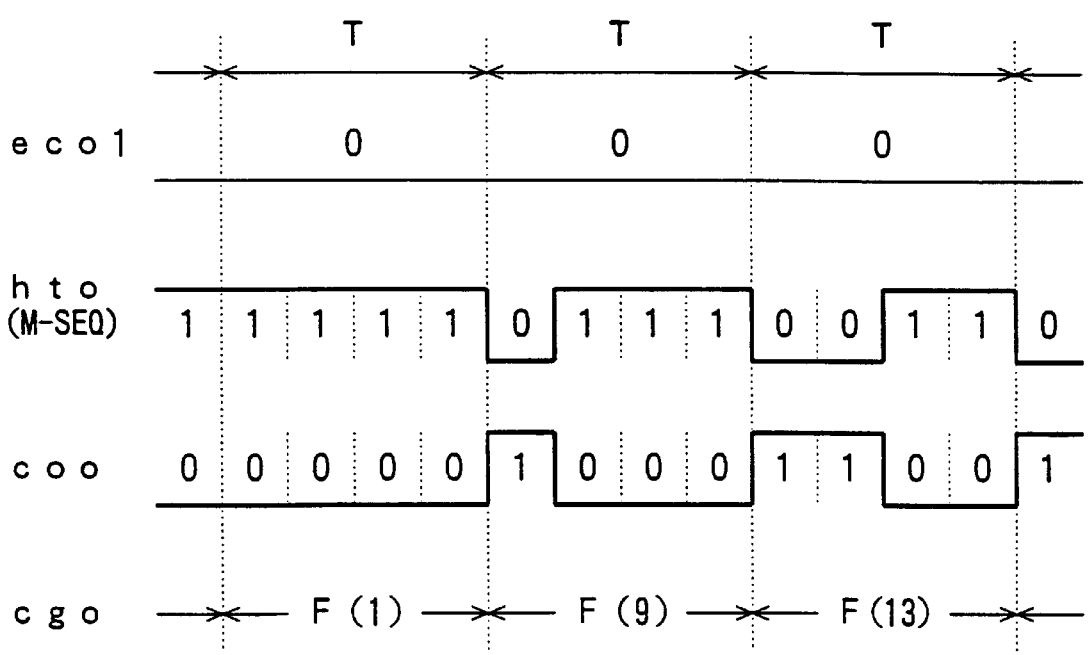
FIG. 7 shows the operational timings at the time when the FH mode is selected in the circuit in FIG. 4.
Figure 8:
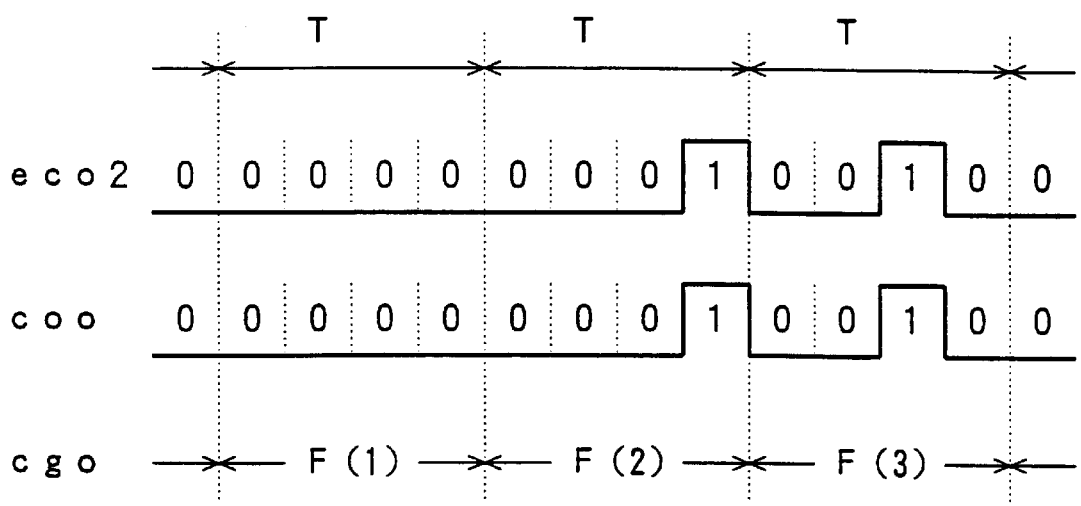
FIG. 8 shows the operational timings at the time when the MFSK mode is selected in the circuit in FIG. 4.

FIG. 7 shows the operational timing at the time when the FH mode is selected in the circuit in FIG. 4, while FIG. 8 shows the operational timing at the time when the MFSK mode is selected in the circuit in FIG. 4. In FIG. 7, carrier frequencies to be used cgo are read out in the order of F(1)→F(9)→F(13) for every symbol time T. The exclusive-OR unit 4EX in the mode control unit CR is arranged to execute an exclusive-NOR operation between the first error correction code data eco1 and the hopping pattern hto. In FIG. 8, carrier frequencies to be used cgo are read out in the order of F(1)→F(2)→F(3) for every symbol time T.

Figure 9:
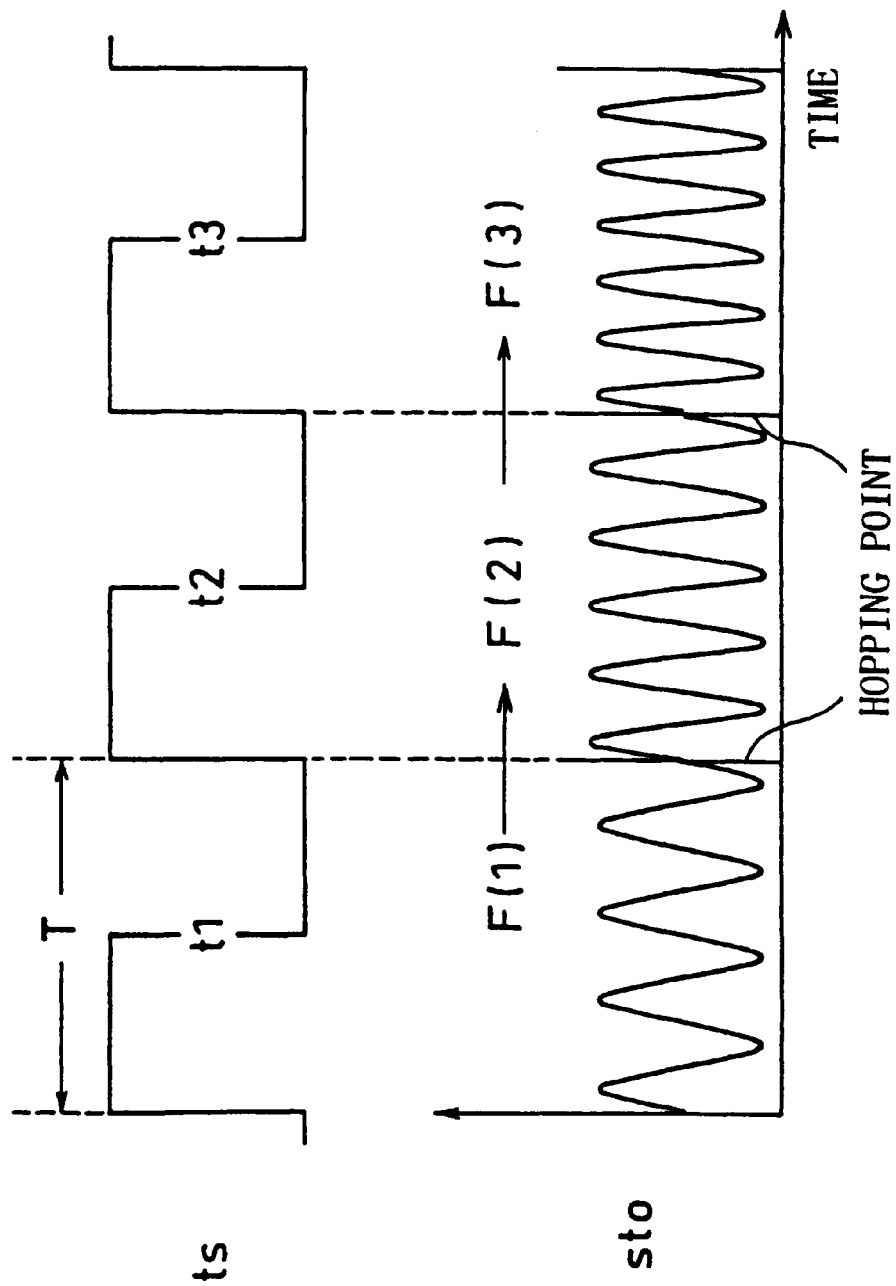
FIG. 9 shows the waveform of a digital synthesizer output together with the waveform of a time slot signal in the case in FIG. 8.

FIG. 9 shows a frequency waveform (digital synthesizer output sto) in the equivalent low band system for every symbol time T (t1, t2, t3) when the MFSK mode in FIG. 8 is selected. The digital synthesizer output sto is supplied with the hopping points thereof synchronized in phase with the rising edges of the time slot signal ts.

Figure 10:
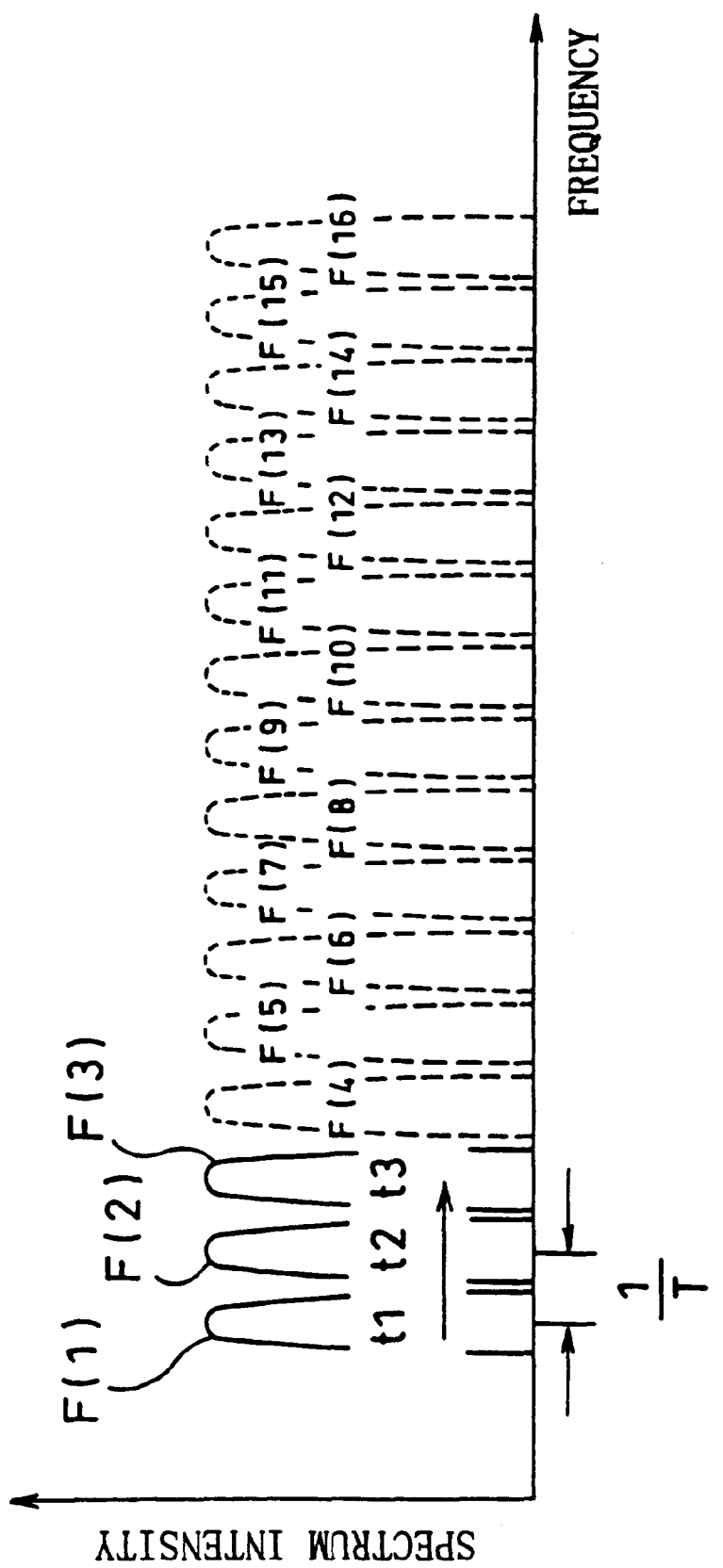
FIG. 10 is a view of transition of carrier frequencies to be used in the case in FIG. 8.

FIG. 10 shows the transition of the carrier frequencies to be used in the equivalent low band system when the MFSK mode in FIG. 8 is selected. In FIG. 10, 16 carrier frequencies are disposed at 1/T intervals, and carrier frequencies to be used are changed from F(1)→F(2)→F(3) with the passage of time (t1, t2, t3). The digital synthesizer output sto is up-converted in frequency to the desired band by the mixer MXT, and then supplied to the transmission line as the transmission signal ot for another digital communication apparatus.

The following description will discuss the operation of the receiver R in FIG. 3.

Figure 11:
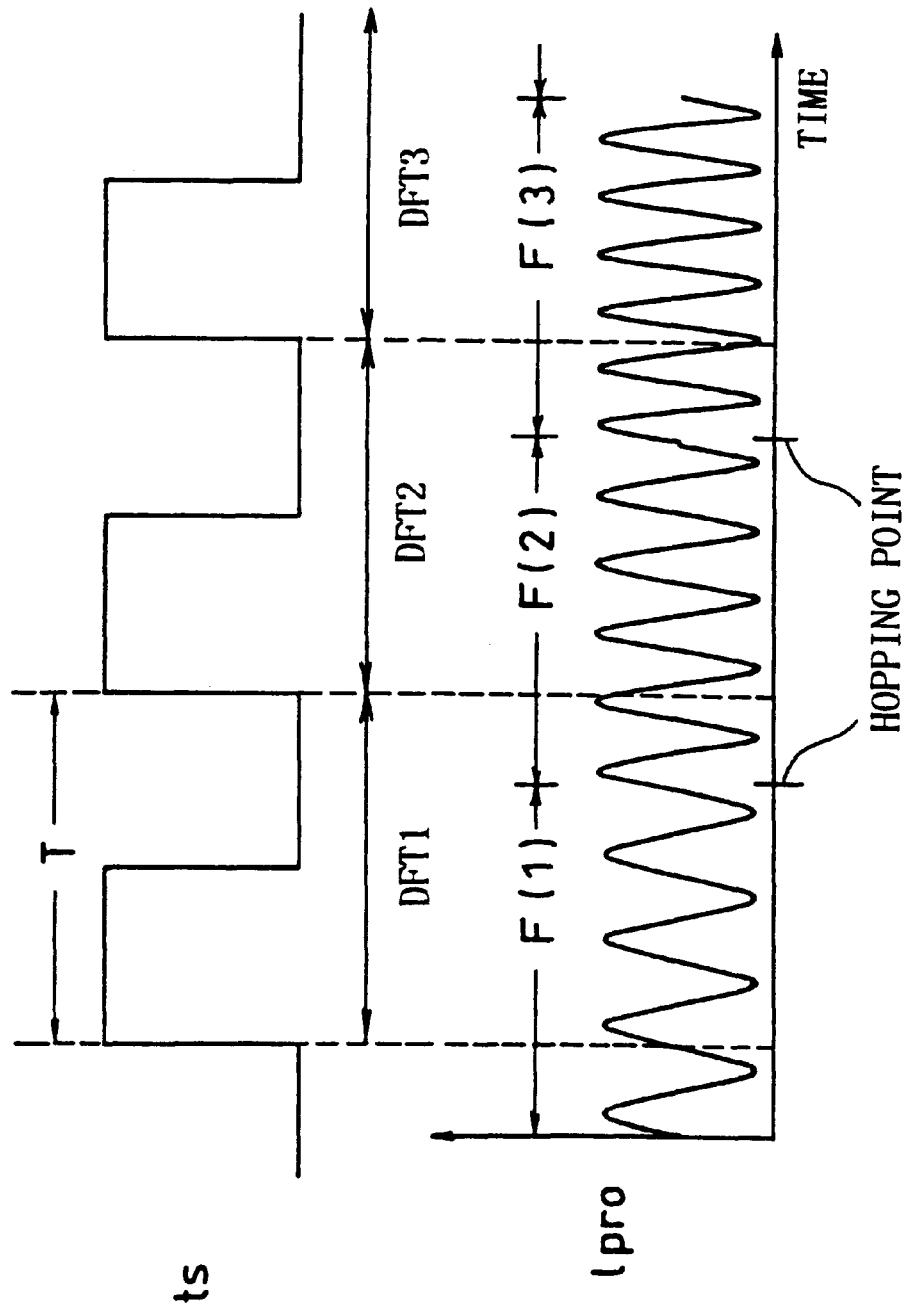
FIG. 11 is an input timing diagram of a DFT process in a phase asynchronous state.
Figure 12:
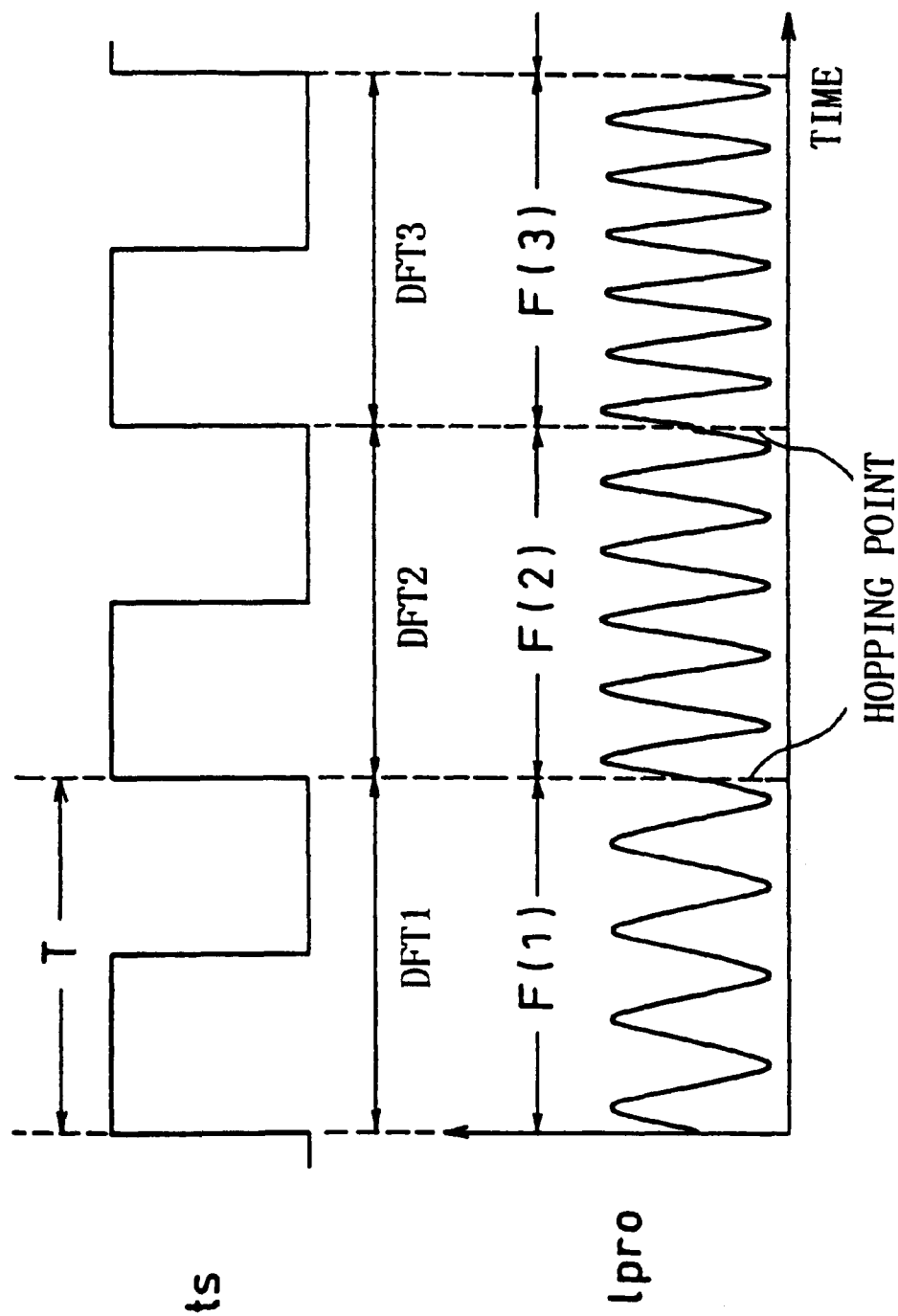
FIG. 12 is an input timing diagram of a DFT process in a phase synchronous state.

FIGS. 11 and 12 show input timings of a DFT process in the signal processing unit DS at the time when the receiver R in another digital communication apparatus has received the MFSK-mode transmission signal ot generated according to FIG. 8. FIG. 11 shows the input timings when the DFT process intervals are not in synchronism in phase with the time slot signal ts, while FIG. 12 shows the input timings when the DFT process intervals are in synchronism in phase with the time slot signal ts.

In FIG. 11, a portion of the signal components of carrier frequency F(2) in addition to a portion of the signal components of carrier frequency F(1) is DFT-processed at a DFT process interval 1. This means that carrier frequencies for two channels are detected for each DFT process interval. At this time, when the level of the carrier frequency F(2) is not less than the threshold level of the threshold judgment unit 3TH, the carrier frequency is lowered in detection precision. This will be an obstacle to radio communication or the like in which, for example, a distance problem or the like is encountered. Accordingly, the time slot signal generation unit TSG controls the phase of the time slot signal ts, thus providing phase synchronization in FIG. 12. In the case of FIG. 10, each of the DFT process intervals 1, 2, 3 is accurately in synchronism in phase with the time slot signal ts. Accordingly, only one carrier frequency uno is detected for each cycle of the time slot signal ts, thus enabling the reception information data dr for the MFSK mode to be accurately decoded.

Figure 13:
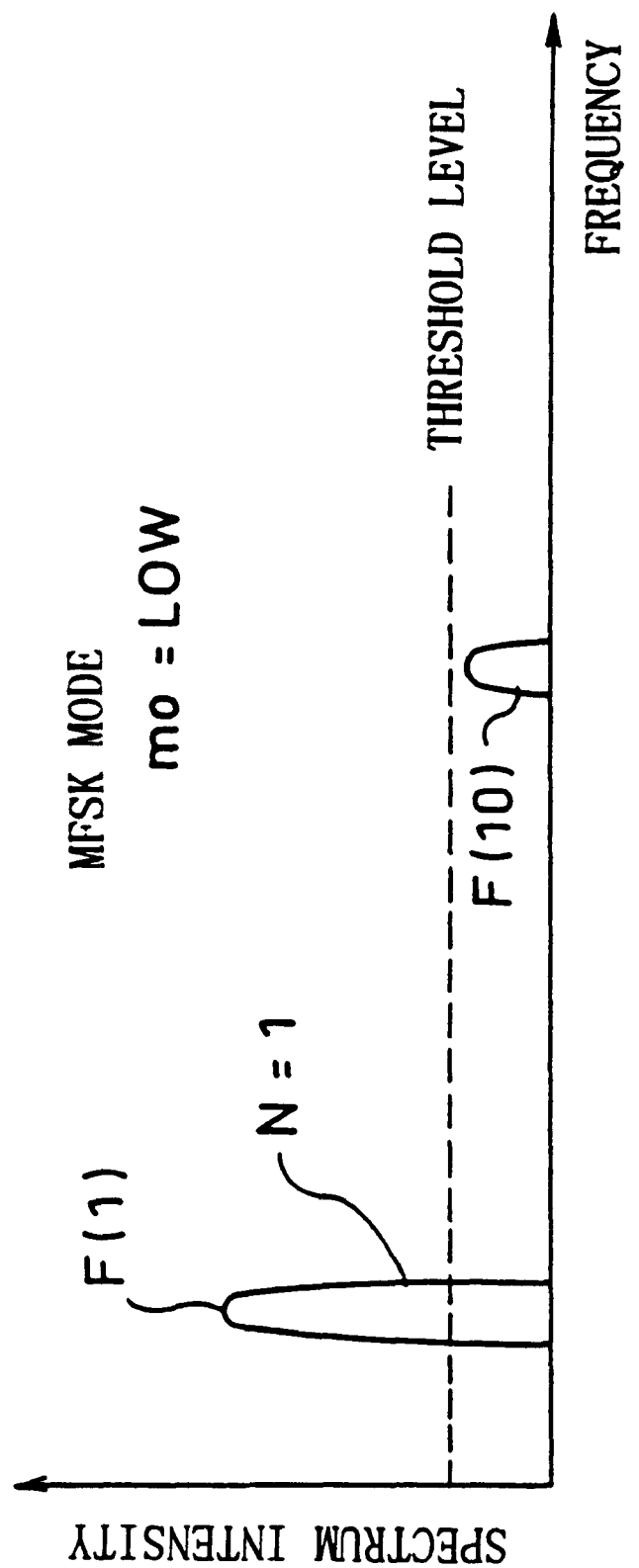
FIG. 13 shows the state of carrier frequencies to be used when the MFSK mode is selected.
Figure 14:
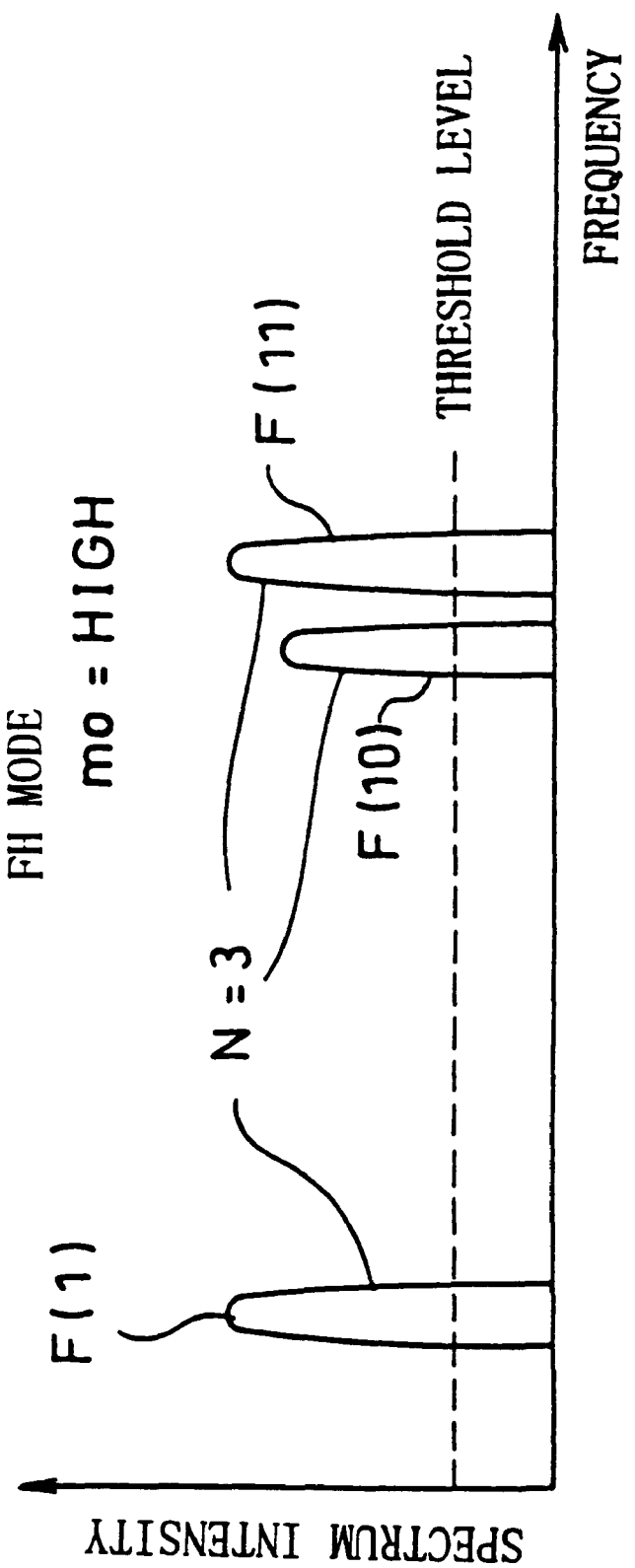
FIG. 14 shows the state of carrier frequencies to be used when the FH mode is selected.

FIG. 13 shows channel detection in the threshold judgment unit 3TH when the MFSK mode is selected, while FIG. 14 shows channel detection in the threshold judgment unit 3TH when the FH mode is selected. It is now supposed that the DFT process intervals are in synchronism in phase with the time slot signal ts in each of FIGS. 13 and 14.

In FIG. 13, the carrier frequency F(1) which is not less than the threshold level, is detected as corresponding to a channel, and its spectrum intensity uso and carrier frequency uno are supplied. Carrier frequency F (10) has more or less spectrum intensity, but its spectrum intensity is not greater than the threshold level. Accordingly, the carrier frequency F(10) is regarded as noise and therefore cannot be detected. In the mode control signal generation unit MOG, the channel number N is counted as 1, and the mode control signal mo is supplied in the LOW level.

In FIG. 14, carrier frequencies F(1), F(10), F(11) which are not less than the threshold level, are detected as corresponding to channels, and their spectrum intensities uso and carrier frequencies uno are supplied. In the mode control signal generation unit MOG, the channel number N is counted as 3, and the mode control signal mo is supplied in the HIGH level.

Figure 15:
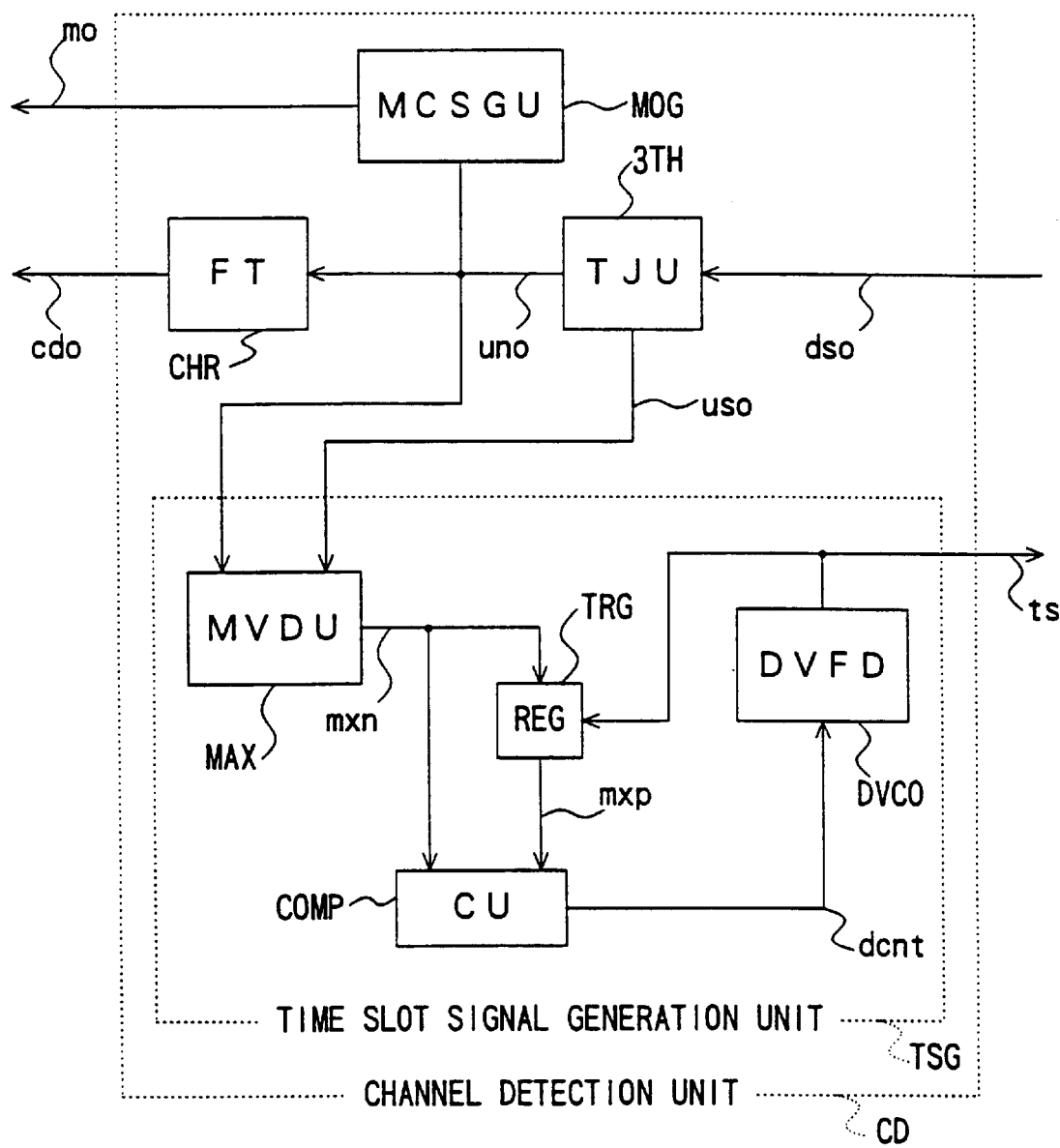
FIG. 15 is a block diagram showing in detail an example of the arrangement of the time slot signal generation unit in the channel detection unit in FIG. 3.

FIG. 15 shows in detail an example of the arrangement of the time slot signal generation unit TSG in the channel detection unit CD in FIG. 3. The time slot signal generation unit TSG in FIG. 15 comprises a maximum value detection unit MAX, a register TRG, a comparison unit COMP and a digital variable frequency divider DVCO. Shown in FIG. 15 are maximum spectrum intensity mxn, a register output mxp and a phase control signal dcnt.

In FIG. 15, the maximum value detection unit MAX is arranged to detect the maximum spectrum intensity value out of the spectrum intensity values of the carrier frequencies detected by the threshold judgment unit 3TH, and to supply the maximum spectrum intensity mxn. In the register TRG, the maximum spectrum intensity detected earlier by one symbol time T is stored and supplied as the register output mxp. In the comparison unit COMP, the maximum spectrum intensity mxn and the register output mxp are compared in level with each other to generate the phase control signal dcnt. When the maximum spectrum intensity mxn is greater in level than the register output mxp, the phase control signal dcnt controls the phase of the digital variable frequency divider DVCO in the same direction as that in phase control done earlier by one symbol time T. When the maximum spectrum intensity mxn is smaller in level than the register output mxp, the phase control signal dcnt controls the phase of the digital variable frequency divider DVCO in the direction opposite to the direction in phase control done earlier by one symbol time T. This achieves the phase synchronization of the time slot signal ts.

Using the arrangement in FIG. 1 discussed in the foregoing, there can be achieved a highly reliable digital communication apparatus increased in operational speed without substantial change in the hardware arrangement of an FH-mode digital communication apparatus of prior art. In FIG. 1, the description has been made with carrier wave transmission taken as an example, but base band transmission may also be applied. Further, in the spectrum analysis in the arrangement in FIG. 1, an envelop analysis using a matched filter for each carrier frequency may also be conducted instead of a DFT process. Such an arrangement increases the hardware size but eliminates the need for synchronization of symbol cycle using the time slot signal ts.

Figure 16:
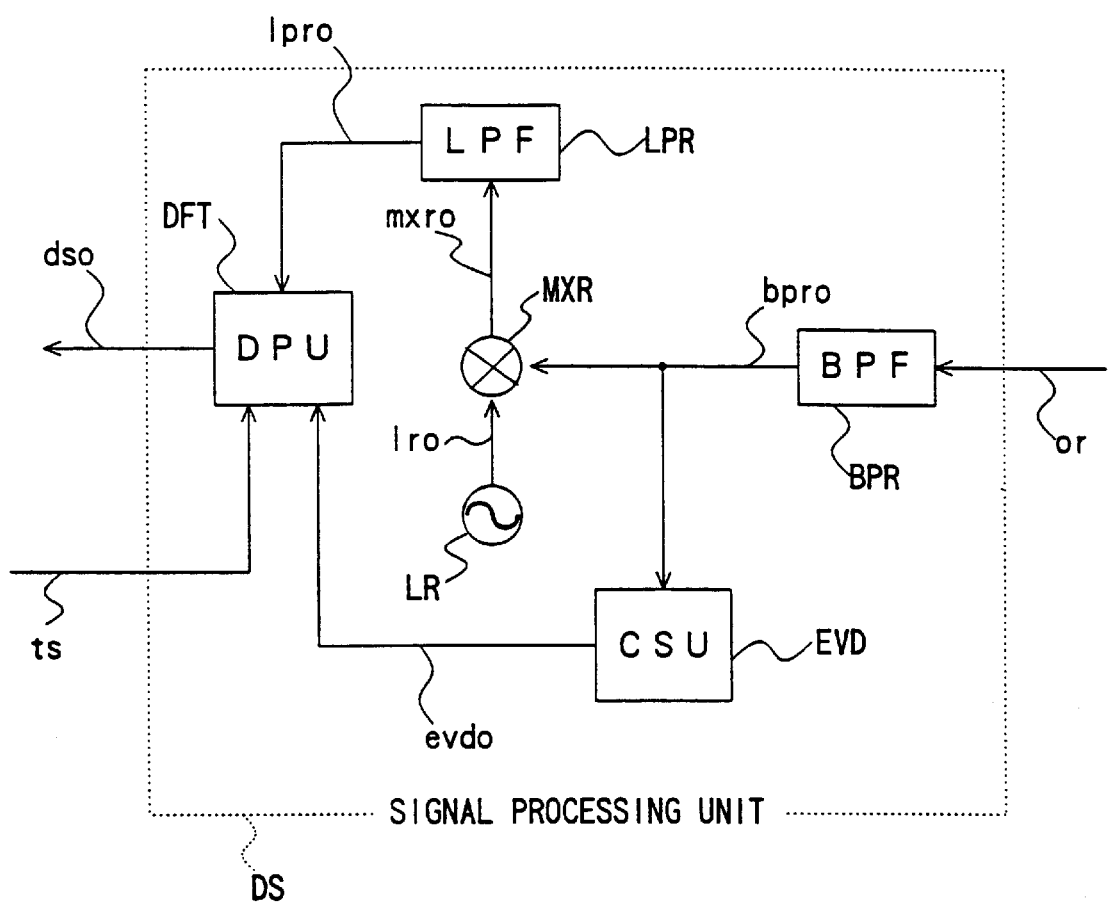
FIG. 16 is a block diagram showing a modification of the signal processing unit in FIG. 3.

FIG. 16 shows a modification of the signal processing unit DS in FIG. 3. The signal processing unit DS in FIG. 16 comprises a band-pass filter BPR, a carrier sense unit EVD, a reference oscillator LR, a mixer MXR, a low-pass filter LPR and a discrete Fourier transform processing unit DFT. Shown in FIG. 16 are a reception signal or, a band-pass filter BPR output bpro, a carrier sense signal evdo, a local oscillating signal lro, a mixer MXR output mxro, a low-pass filter LPR output lpro, a DFT output dso and a time slot signal ts.

In the carrier sense unit EVD in FIG. 16, the band-pass filter output bpro is subjected to envelop detection to generate the carrier sense signal evdo. In the discrete Fourier transform processing unit DFT, the low-pass filter output lpro is subjected to the DFT process only when the carrier sense signal evdo is asserted. This enables the discrete Fourier transform processing unit DFT to be intermittently operated, thus lowering the power consumption for the DFT process. Other circuit operations in the signal processing unit DS are similar to those discussed in connection with FIG. 3.

Figure 17:
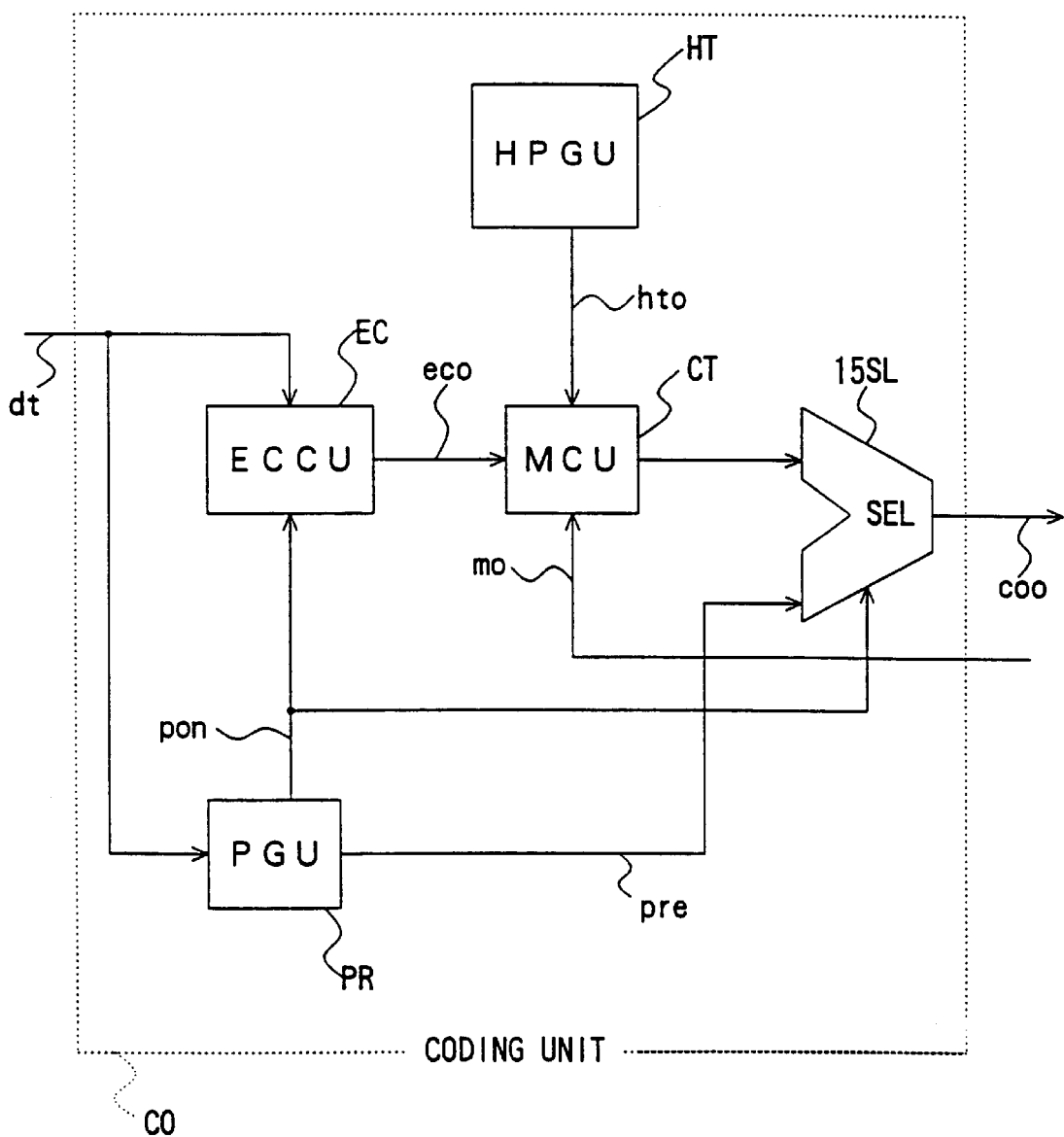
FIG. 17 is a block diagram showing a modification of the coding unit in FIG. 2.

FIG. 17 shows a modification of the coding unit CO in FIG. 2. The coding unit CO in FIG. 17 comprises an error correction coding unit EC, a hopping pattern generation unit HT, a mode control unit CT, a preamble generation unit PR and a data selector 1SSL. Shown in FIG. 17 are transmission information data dt, error correction code data eco, a hopping pattern hto, a mode control signal mo, transmission code data coo, a preamble control signal pon and chirp code data pre.

In FIG. 17, the preamble generation unit PR generates the preamble control signal pon for setting, as a preamble sequence, a predetermined period of time from the point of time when the transmission information data dt have been entered. While the preamble control signal pon is asserted, the operation of the error correction coding unit EC is disabled and the chirp code data pre are selected and supplied from the data selector 1SSL. Assuming that as to the chirp code data pre generated from the preamble generation unit PR, the corresponding information is based on FIG. 5, up-chirp code data shown in FIG. 18 and down-chirp code data shown in FIG. 19 are successively read out, per symbol time T, for up-chirp and down-chirp, respectively. While the preamble control signal pon is being negated, the operation of the error correction coding unit EC is enabled and the output of the mode control unit CT is selectively supplied from the data selector 1SSL. Other circuit operations of the coding unit CO are similar to those discussed in connection with FIG. 2.

Figure 20:
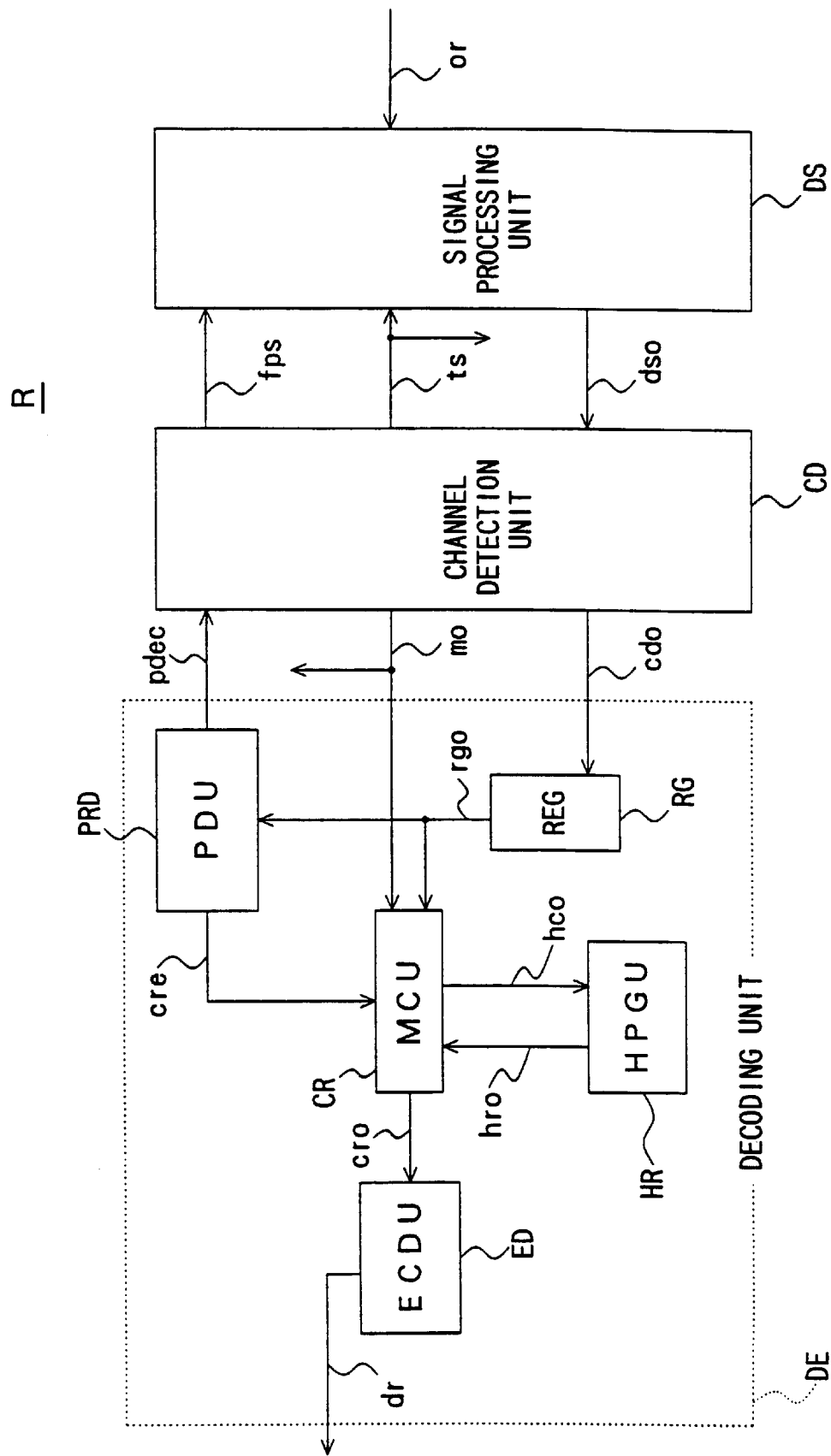
FIG. 20 is a block diagram showing a modification of the receiver in FIG. 3, corresponding to FIG. 17.

FIG. 20 shows a modification of the receiver R in FIG. 3, corresponding to FIG. 17. The receiver R in FIG. 20 comprises a signal processing unit DS, a channel detection unit CD, a decoding unit DE, a register RG, a preamble detection unit PRD, a mode control unit CR, a hopping pattern generation unit HR and an error correction decoding unit ED. Shown in FIG. 20 are a reception signal or, a DFT output dso, a time slot signal ts, a mode control signal mo, reception code data cdo, an identification signal pdec, a DFT control signal fps, an enable signal cre, a register RG output rgo, a hopping pattern hro, a hopping pattern control signal hco, a mode control unit CR output cro and reception information data dr.

In the preamble detection unit PRD in FIG. 20, a preamble using an up-chirp is identified by following carrier frequency while successively changing, per symbol time T, the carrier frequencies from the least significant carrier frequency F(1) to the most significant carrier frequency F(16) from the point of time where the register output rgo coincides with the reception code data cdo corresponding to the least significant carrier frequency F(1). On the other hand, a preamble using a down-chirp is identified by following carrier frequency while successively changing, per symbol time T, the carrier frequencies from the most significant carrier frequency F(16) to the least significant carrier frequency F(1) from the point of time where the register output rgo coincides with the reception code data cdo corresponding to the most significant carrier frequency F(16). In the preamble detection unit PRD, when the preamble identification is determined, the enable signal cre is supplied in synchronism with completion of the preamble to cause the mode control unit CR to start controlling the phase of the hopping pattern hro to be used. In the preamble detection unit PRD, when the preamble identification is established, the identification signal pdec is supplied to the threshold judgment unit 3TH (See FIG. 3) in the channel detection unit CD. In the threshold judgment unit 3TH, when the identification signal pdec is asserted, the DFT control signal fps controls the operation of the discrete Fourier transform processing unit DFT (See FIG. 3) in the signal processing unit DS.

The following description will discuss in detail the operational control (frequency error correction control) for the discrete Fourier transform processing unit DFT in the arrangements in FIGS. 17 and 20.

Figure 21:
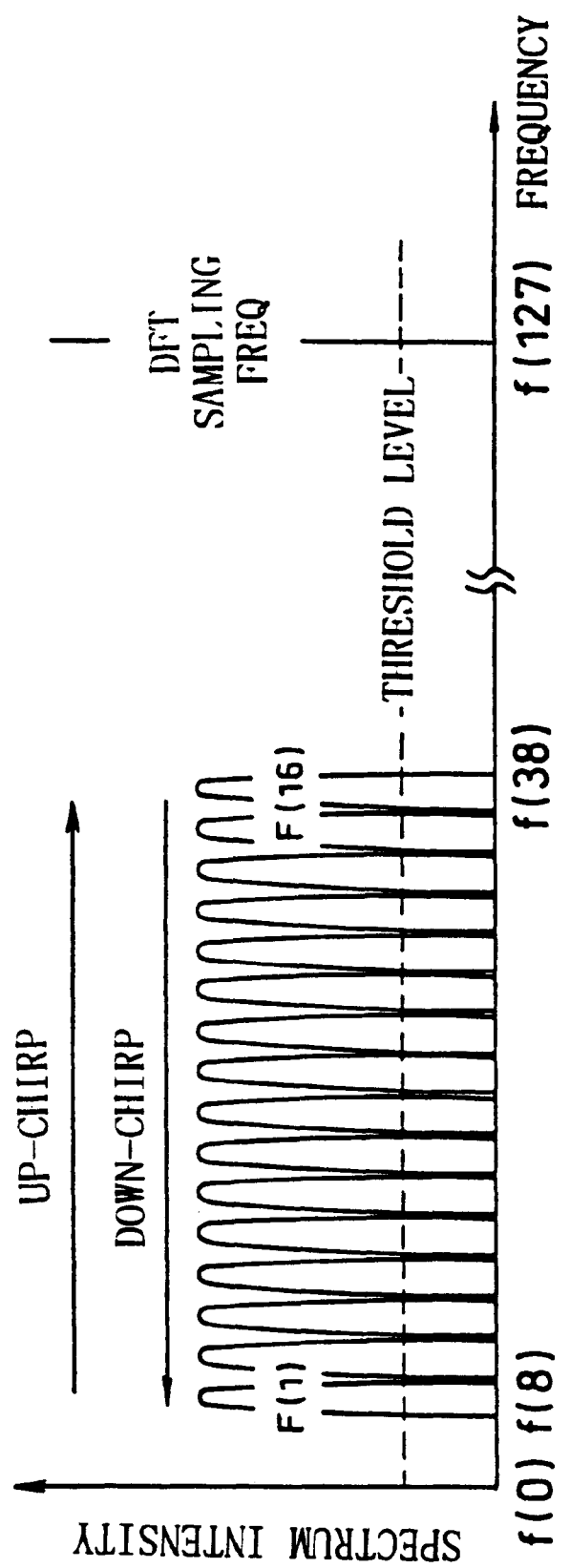
FIG. 21 is a view of frequency transition of a chirp signal in the arrangement in FIGS. 17 and 20.

It is now supposed that, in the digital synthesizer ST of the transmitter T at the preamble sequence, there are successively generated the signal waveforms of carrier frequencies corresponding to the up-chirp signals (F(1)→(F16)) or down-chirp signals (F(16)→F(1)) in FIG. 21. In FIG. 21, f(p) {=0, 1, 2, . . . , 127} refers to the frequency point scaled at equal intervals on the frequency coordinates on the basis of the transmitter T. According to the following formula (1), F(1) generated in the digital synthesizer ST corresponds to the frequency point f(8), F(2) corresponds to the frequency point f(10) and F(16) corresponds to the frequency point f(38):

$$F(x) \to f(2x+6) \ \{x=1, 2, 3, \ldots, 16\} \qquad (1)$$

Figure 22:
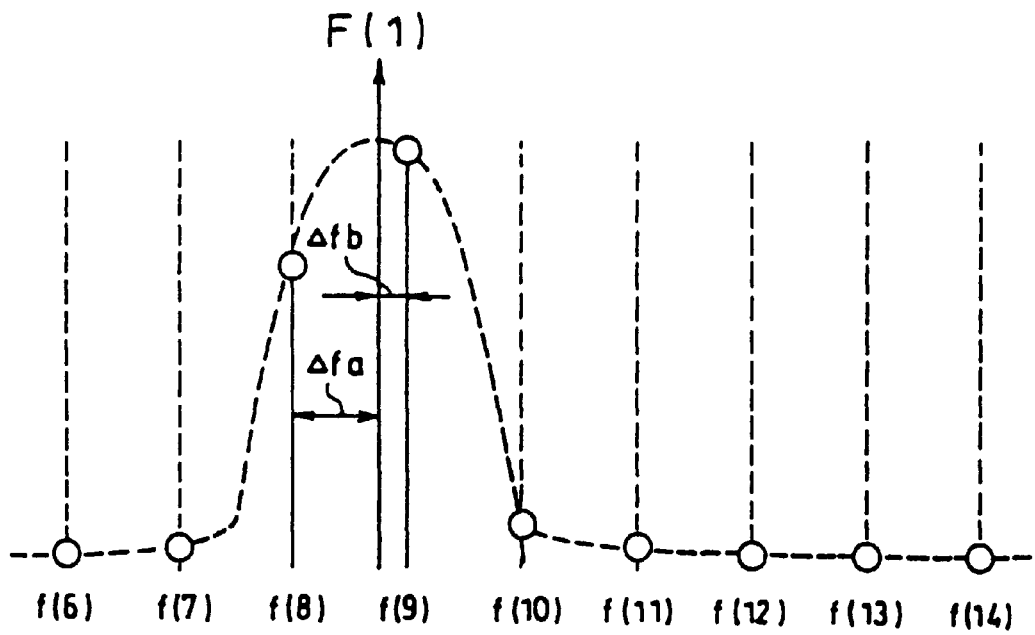
FIG. 22 is a view illustrating a DFT process on the least significant carrier frequency in the arrangements in FIGS. 17 and 20.
Figure 23:
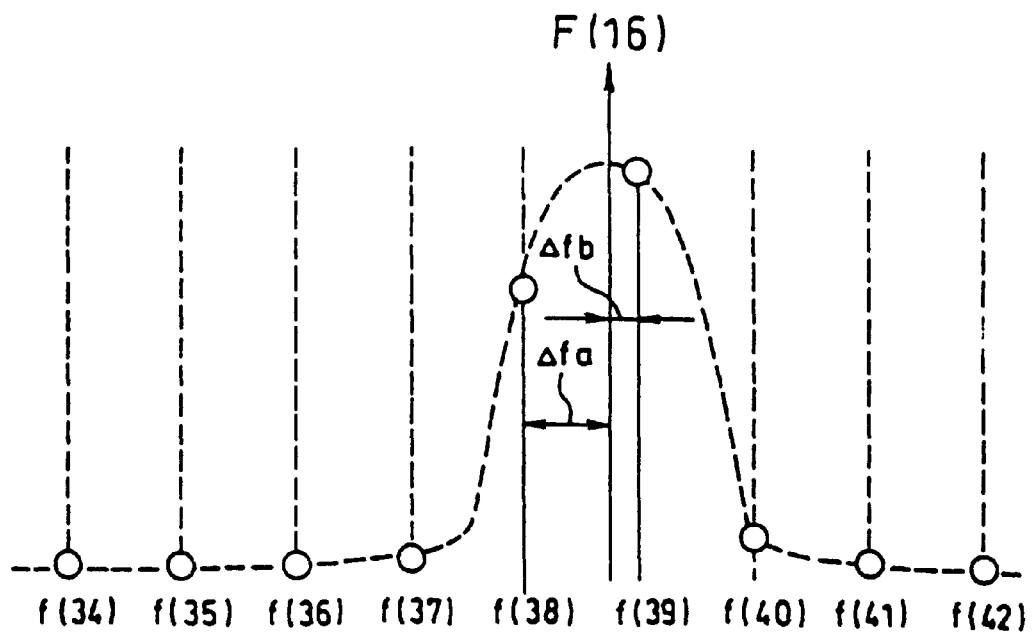
FIG. 23 is a view illustrating a DFT process on the most significant carrier frequency in the arrangements in FIGS. 17 and 20.

In another digital communication apparatus, the discrete Fourier transform processing unit DFT of the signal processing unit DS in the receiver R executes, on the low-pass filter output lpro after down-converted in frequency, a DFT process with frequency resolution of carrier frequency distance 1/(2T). It is now supposed that there is a frequency error Δfa between the frequency of the local oscillating signal lto of the transmitter T and the local oscillating signal lro of the receiver R. In such a case, a DFT process is executed, on the reference frequency coordinates, on the least significant carrier frequency F(1) as shown in FIG. 22 and on the most significant carrier frequency F(16) as shown in FIG. 23. At this time, when the spectrum intensity for the least significant carrier frequency F(1) is not related to the frequency point f(8) but is related to the frequency point f(9), and when the spectrum intensity for the most significant carrier frequency F(16) is not related to the frequency point f(38) but is related to the frequency point f(39), the frequency error becomes Δfb smaller than Δfa and is nearer to the actual value. It is now supposed that the variable frequency range width at the preamble sequence is previously known and that the frequency error Δfa is smaller than the channel interval 1/T. In this case, by detecting the frequency point of the maximum spectrum intensity for the least significant carrier frequency F(1) or the most significant carrier frequency F(16), it becomes possible to correct a frequency error between a plurality of digital communication apparatus. For example, in the case of FIGS. 22 and 23, carrier frequencies in the threshold judgment unit 3TH (See FIG. 3) of the channel detection unit CD may be changed for the frequency point expressed by the following formula (2):

$$F(x) \to f(2x+7) \ \{x=1, 2, 3, \ldots, 16\} \quad (2)$$

Thus, using the arrangements in FIGS. 17 and 20, a preamble for up-chirt or down-chirp can be generated and detected with the use of a simple circuit arrangement. Further, the use of such a preamble facilitates carrier sense in the multipath fading environment. In the arrangement in FIG. 20, frequency error correction is made only when the preamble is detected and, after the completion of the preamble, a partial DFT process with frequency resolution of 1/T is executed on channels after frequency error correction. This not only improves the reception sensibility but also reduces the operations to be executed in amount.

The following description will discuss modifications of the contents stored in the frequency tables in FIGS. 5 and 6. FIG. 24 shows information stored in the frequency table CHT of the channel generation unit CG (See FIG. 2), while FIG. 25 shows information stored in the frequency table CHR of the channel detection unit CD (See FIG. 3). In this modification, the hardware structure is the same as that discussed in connection with FIGS. 1 to 3.

In this modification, 4-bit transmission code data spo and carrier frequencies to be used cgo in FIG. 24 correspond to each other using a Gray code as the progressive code, and carrier frequencies uno and 4-bit reception code data cdo in FIG. 25 correspond to each other using a Gray code as the progressive code. Since the progressive code is used for arrangement of carrier frequencies, adjacent carrier frequencies undergo a change in bit information only by one bit. This lowers the influence of error detection due to frequency error among a plurality of digital communication apparatus.

When using the progressive code and corresponding information in FIGS. 24 and 25, the chirp code data in FIG. 26 may be used for generating an up-chirp signal, and the chirp code data in FIG. 27 may be used for generating a down-chirp signal.

Figure 28:
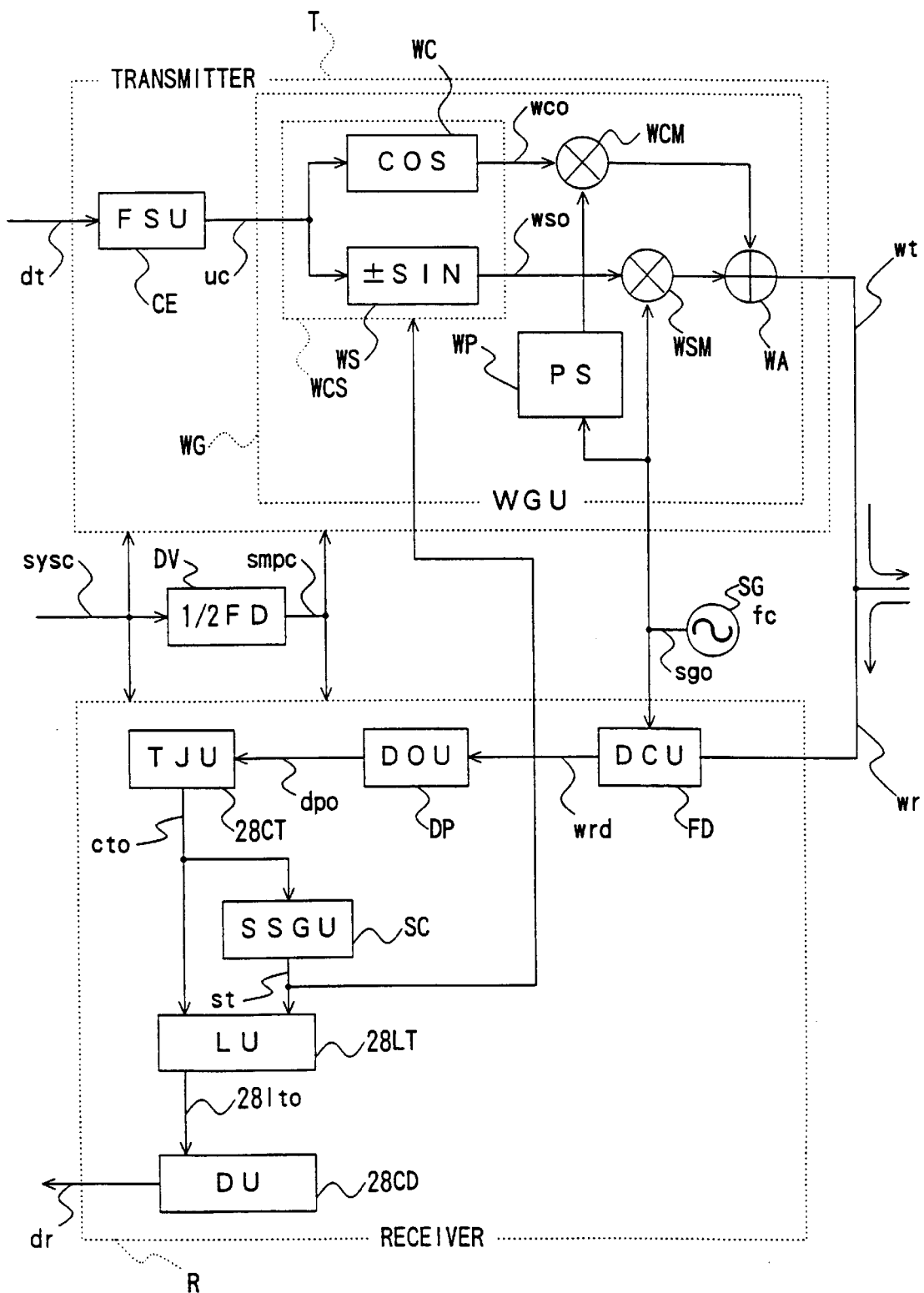
FIG. 28 is a block diagram showing an example of the arrangement of the digital communication apparatus according to the present invention.

FIG. 28 shows an example of the arrangement of the digital communication apparatus according to the present invention. The apparatus in FIG. 28 comprises a transmitter T, a receiver R, a frequency selection unit CE, a waveform generation unit WG, a cosine-wave and sine-wave generation unit WCS, a cosine-wave generation unit WC, a sine-wave generation unit WS, a mixer WCM, a mixer WSM, a 90° phase shifter WP, an adder WA, a ½ frequency divider DV, an oscillator SG, a down-converter unit FD, a DFT operation unit DP, a threshold judgment unit 28CT, a synchronizing signal generation unit SC, a latch unit 28LT and a decoder 28CD. Shown in FIG. 28 are transmission data dt, carrier frequencies to be used uc, a cosine-wave generation unit WC output wco, a sine-wave generation unit WS output wso, a transmission signal wt, a system clock sysc with frequency 2/Δt, a sampling clock smpc with frequency 1/Δt, a reference oscillating signal sgo with frequency fc, a reception signal wr, a down-converter unit FD output wrd, a DFT operation unit DP spectrum value output I(k) dpo, a threshold judgment unit 28CT spectrum value output I(k) and candidate carrier frequency cto, a synchronizing trigger signal st, reception carrier frequencies 28lto and reception data dr. Here, Δt refers to the time period of the sampling clock smpc. The transmitter T and the receiver R share the same ½ frequency divider DV and the same oscillator SG.

In FIG. 28, binary transmission data dt which are coded according to the FH or MFSK mode outside of the apparatus, are serially entered into the transmitter T. In the frequency selection unit CE, serial transmission data dt are divided into blocks each having $\log_2$ M bits for every two time slots, and for each block, corresponding carrier frequencies to be used uc out of the carrier frequencies F(k) (k=1, 2, ..., M) are read out from the internal table. M is an integer not less than 2 and represents the number of carrier frequencies to be used or channels to be used, i.e., the series length of transmission data. In the waveform generation unit WG, the frequency waveforms for the carrier frequencies to be used uc are digitally generated and are supplied, to the transmission line, as the transmission signal wt in synchronism with the time slot by the synchronizing trigger signal st generated in the receiver R.

More specifically, according to the value of k in F(k) of the carrier frequencies to be used uc, the cosine-wave generation unit WC and the sine-wave generation unit WS in the waveform generation unit WG respectively digitally generate, in synchronism with the synchronizing trigger signal st generated in the receiver R, cosine waves and sine waves to be used for a frequency orthogonal transformation. It is now supposed that there is used a frequency orthogonal transformation represented by the following equation (3):

$$\begin{aligned}W1(k = \text{odd number}) &= \sin(2\pi \times fc \times t) \cdot \cos(2\pi \times \Delta f \times (2k-1) \times t) + \quad (3)\\ &\quad \cos(2\pi \times fc \times t) \cdot \sin(2\pi \times \Delta f \times (2k-1) \times t)\\ &= \sin(2\pi \times (fc + \Delta f \times (2k-1)) \times t)\\[4pt] W1(k = \text{even number}) &= \sin(2\pi \times fc \times t) \cdot \cos(2\pi \times \Delta f \times (2k-1) \times t) -\\ &\quad \cos(2\pi \times fc \times t) \cdot \sin(2\pi \times \Delta f \times (2k-1) \times t)\\ &= \sin(2\pi \times (fc - \Delta f \times (2k-1)) \times t)\end{aligned}$$

Then, cosine waves represented by $(2\pi \times \Delta f \times (2k-1) \times t)$ and sine waves represented by $(-1)^{k-1} \times \sin(2\pi \times \Delta f \times (2k-1) \times t)$ are respectively generated by the cosine-wave generation unit WC and the sine-wave generation unit WS. In the equations above-mentioned, Δf refers to a frequency step width and t refers to time. In the two mixers WCM, WSM and in the adder WA, there is conducted, using cosine waves and sine waves, a frequency orthogonal transformation on the reference oscillating signal sgo from the oscillator SG, i.e., cos (2π×fc×t), and on the signal from the 90° phase shifter WP, i.e., sin (2π×fc×t). Thus, in synchronism with the time slot, the frequency waveforms for the carrier frequencies to be used uc are generated and supplied as the transmission signal wt to the transmission line. Instead of the equation (3), the following equation (4) may also be used:

$$\begin{aligned}W2(k = \text{even number}) &= \sin(2\pi \times fc \times t) \cdot \cos(2\pi \times \Delta f \times (2k-1) \times t) + \quad (4)\\ &\quad \cos(2\pi \times fc \times t) \cdot \sin(2\pi \times \Delta f \times (2k-1) \times t)\\ &= \sin(2\pi \times (fc + \Delta f \times (2k-1)) \times t)\end{aligned}$$

-continued $$W2(k = \text{odd number}) = \sin(2\pi \times fc \times t) \cdot \cos(2\pi \times \Delta f \times (2k-1) \times t) - \cos(2\pi \times fc \times t) \cdot \sin(2\pi \times \Delta f \times (2k-1) \times t)$$
$$= \sin(2\pi \times (fc + \Delta f \times (2k-1)) \times t)$$

The reception signal wr is entered into the receiver R through the transmission line. In the down-converter unit FD, signal components in the variable frequency band to be received have been taken from the reception signal wr, and the signal components thus taken are down-converted in frequency, using the reference oscillating signal sgo from the oscillator SG, toward a low frequency band in which a digital signal process can be executed. In the DFT operation unit DP, an N-point DFT process for a period of the latest one time slot (T=N×Δt) is successively executed on the down-converter output wrd for each sampling clock cycle Δt. Here, N is an integer not less than M. At this time, the DFT process is executed only on M frequency points where each carrier frequency is mapped Accordingly, the spectrum value I(k) is calculated for each carrier frequency F(k) (k=1, 2, . . . , M) per sampling clock. In the threshold judgment unit 28CT, a threshold judgment is made on the spectrum value I(k) for each channel using a level determined by a spurious response. Then, each carrier frequency exceeding a threshold value TH is supplied, as a candidate carrier frequency Fd(1) (1=0, . . . , s), together with the spectrum value I(k) of each carrier frequency. In the synchronizing signal generation unit SC, the time slot is synchronously extracted based on the threshold judgment unit output cto, i.e., the spectrum values I(k) and the candidate carrier frequencies Fd(1), thus generating the synchronizing trigger signal st. In the latch unit 28LT, the candidate carrier frequencies Fd(1) at the time when the synchronizing trigger signal st has been asserted, are latched and supplied as the reception carrier frequencies 281to. In the decoder unit 28CD, data of a block having $\log_2$ M bits corresponding to reception carrier frequencies 281to are read out from the internal table and supplied as the reception data dr. The reception data dr are decoded, outside of the apparatus, according to the FH or MFSK mode.

FIG. 29 shows carrier frequencies so arranged as to correspond to 4-bit data with M being equal to 16, using a Gray code as the progressive code in the frequency selection unit CE and the decoder unit 28CD in FIG. 28. Based on FIG. 29, it is possible to reduce the error to one bit or less when 4-bit reception data dr based on the reception carrier frequencies 281 to are decoded, as far as the frequency conversion error is within one carrier frequency interval (2×Δf).

The following description will discuss in detail an example in which M is equal to 16, N is equal to 64, Δt is equal to 1/16 (µs) and R is equal to 1 in the arrangement in FIG. 28. Here, a period of one time slot T is equal to N×Δt which is equal to 4 µs, and the frequency step width Δf is as follows:

$$\Delta f = 1/T \times R = 1/(N \times \Delta t) = 250 \text{ kHz}$$

Figure 30:
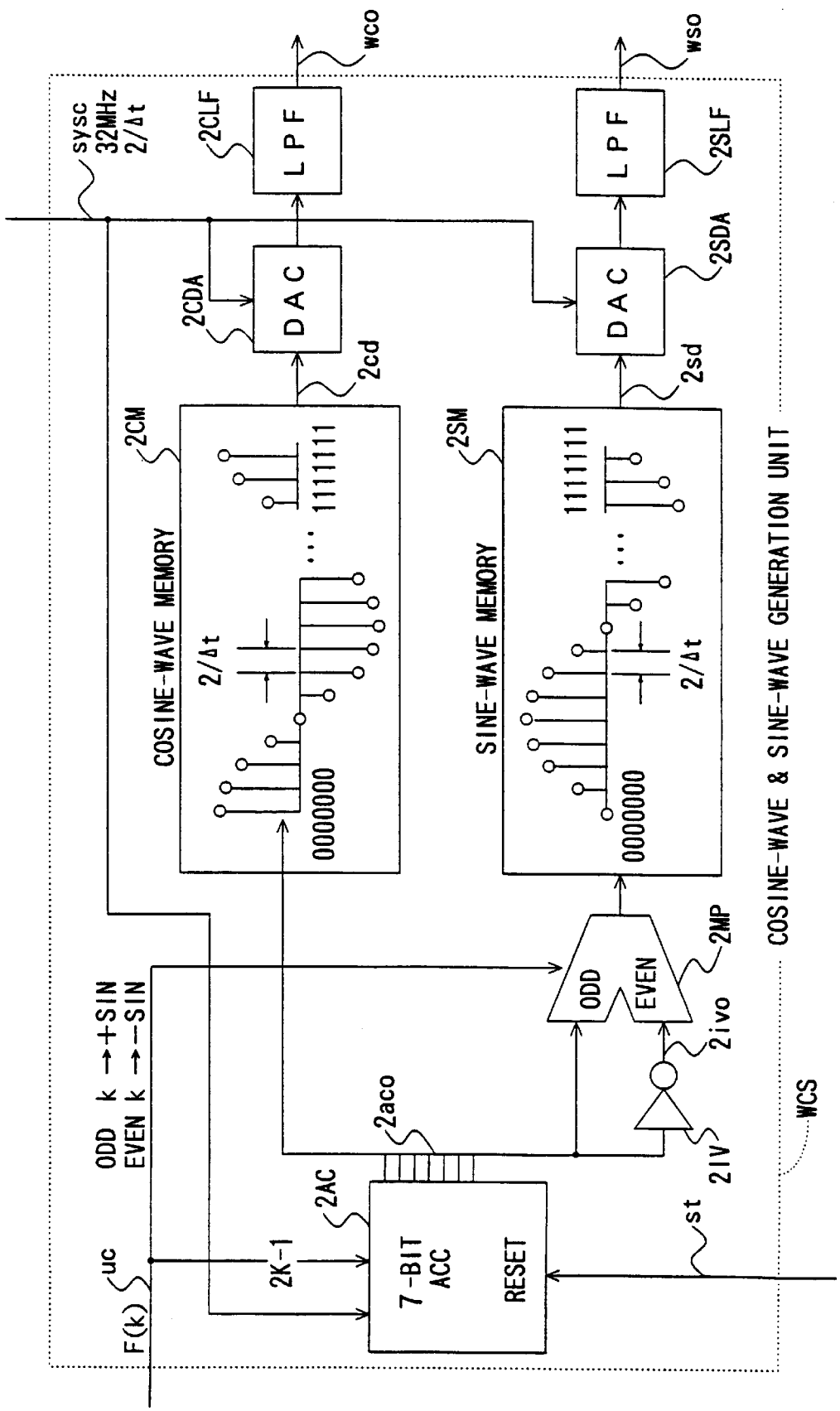
FIG. 30 is a block diagram showing in detail an example of the arrangement of the cosine-wave and sine-wave generation unit in FIG. 28.

FIG. 30 shows in detail an example of the arrangement of the cosine-wave and sine-wave generation unit WCS in FIG. 28. In FIG. 30, the cosine-wave and sine-wave generation unit WCS comprises a 7-bit accumulator 2AC, an inverter 2IV, a data selector 2MP, a cosine-wave memory 2CM, a sine-wave memory 2SM, D/A converters 2CDA, 2SDA, and low-pass filters 2CLF, 2SLF. Shown in FIG. 30 are the synchronizing trigger signal st from the receiver R, the system clock sysc, an accumulator output 2aco, an inverter output 2ivo, carrier frequencies to be used uc of F(k) (k=1, 2, . . . , 16) given from the frequency selection unit CE, cosine-wave data 2cd, sine-wave data 2sd, the cosine-wave generation unit output wco and the sine-wave generation unit output wso.

In FIG. 30, based on the value of k in F(k) (k=1, 2, . . . , 16) of the carrier frequencies to be used uc determined for each time slot, the accumulator 2AC generates, for each system clock sysc (of which frequency is equal to 2/Δt or 32 MHz), the accumulator output 2aco while the values of 2k−1 are successively accumulated in a binary operation. Based on the assumption that waveform data for 2×N=128 (=$2^7$) points are read out per time slot, the accumulator output 2aco has a 7-bit width (0000000~1111111), and is circulatingly operated for every overflow and reset each time the synchronizing trigger signal st is asserted. In the cosine-wave memory 2CM and the sine-wave memory 2SM, cosine-wave data in which one cycle is being sampled to 128 points and sine-wave data in which one cycle is being sampled to 128 points, are respectively stored, as quantized, up to the address of 1111111 with the address 0000000 serving as the phase 0°. In the cosine-wave memory 2CM, the cosine-wave data 2cd are read out with the accumulator output 2aco used as an address. In the sine-wave memory 2SM, based on the data selector 2MP, the sine-wave data 2sd are read out according to the equation (3) dependent on k which is an odd or even number. That is, when k is an odd number, the sine-wave data 2sd are read out with the accumulator output 2aco used as an address, and when k is an even number, the sine-wave data 2sd are read out using, as an address, the inverter output 2ivo in which the polarity of the accumulator output 2aco is being inverted by the inverter 2IV. When conducting the frequency orthogonal transformation represented by the equation (4); there are executed, according to k which is an even or odd number, the operations inverse to those above-mentioned. By the two D/A converters 2CDA, 2SDA, the read cosine-wave data 2cd and sine-wave data 2sd are converted into analog signals which are in synchronism with the system clock sysc. These analog signals are smoothed by the two low-pass filters 2CLF, 2SLF such that there are generated cos (2π×Δf×(2k−1)×t) as the cosine-wave generation unit output wco and $(-1)^{k-1}$×sin (2π×Δf×(2k−1)×t) as the sine-wave generation unit output wso.

Figure 31:
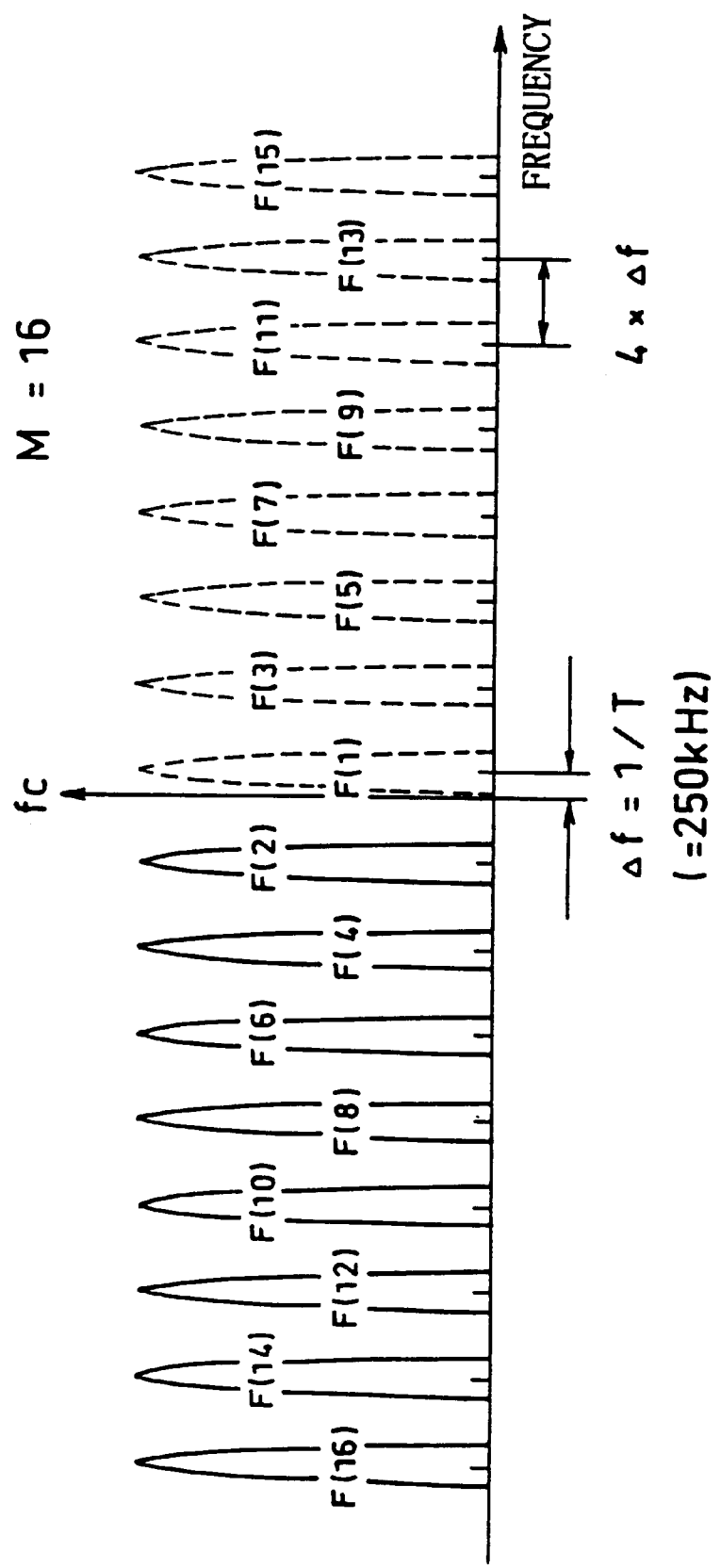
FIG. 31 shows an example of the arrangement of carrier frequencies after frequency orthogonal transformation in the waveform generation unit in FIG. 28.

FIG. 31 shows the arrangement of M (=16) frequencies after frequency orthogonal transformation represented by the equation (3). based on the values of k in the carrier frequencies F(k), the frequencies are alternately arranged, on the basis of the frequency fc, toward the high band side by Δf×(2k−1) when k is an odd number, and toward the low band side by Δf×(2k−1) when k is an even number.

Figure 32:
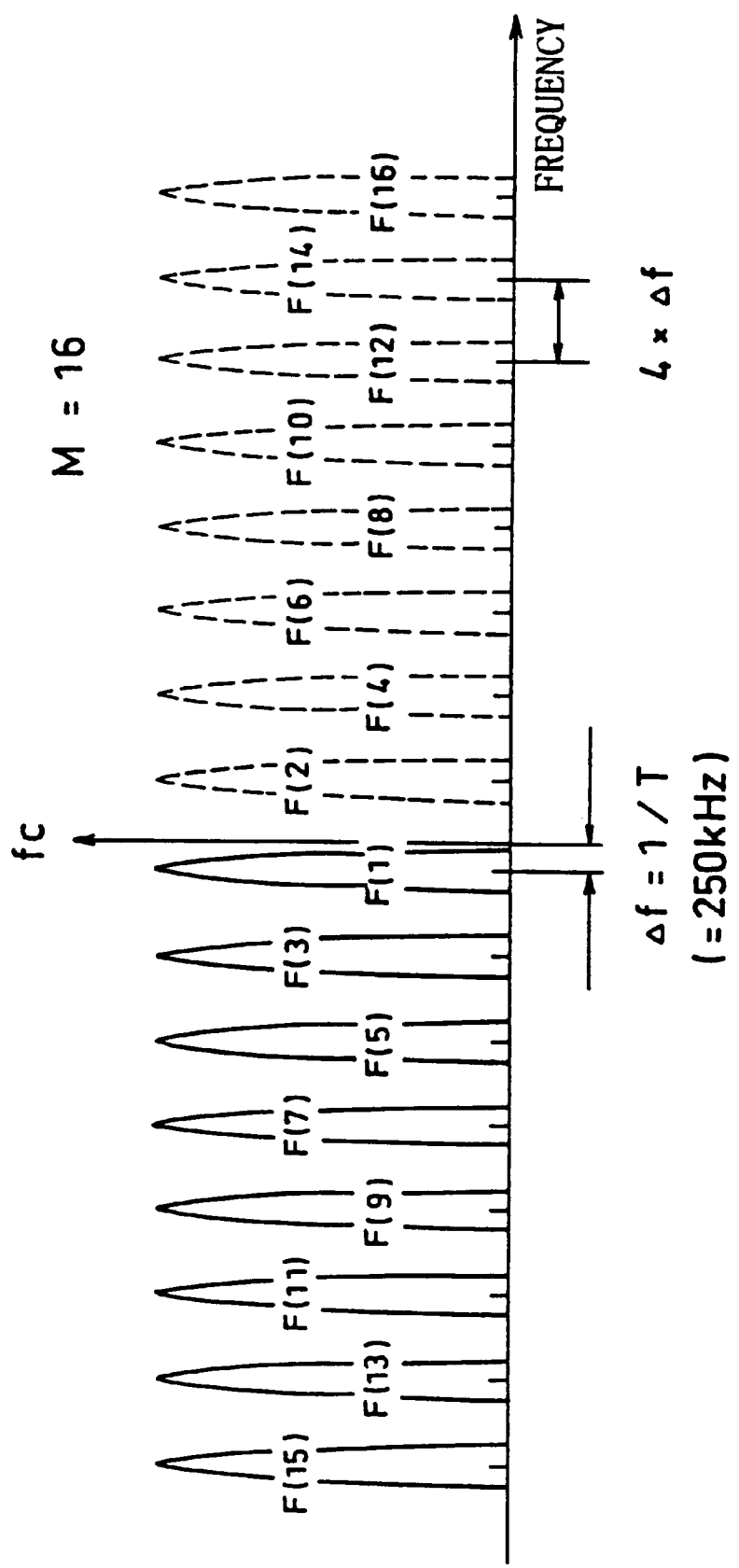
FIG. 32 shows another example of the arrangement of carrier frequencies after frequency orthogonal transformation.

FIG. 32 shows the arrangement of M (=16) frequencies after frequency orthogonal transformation represented by the equation (4). Based on the values of k in the carrier frequencies F(k), the frequencies are alternately arranged, on the basis of the frequency fc, toward the low band side by Δf×(2k−1) when k is an odd number, and toward the high band side by Δf×(2k−1) when k is an even number.

As shown in FIGS. 31 and 32, the carrier frequencies are alternately arranged with respect to the frequency fc serving as the basis. Accordingly, even though a spurious response is generated in side bands due to normalization level error between the sine-wave generation unit output wso and the cosine-wave generation unit output wco at the frequency orthogonal transformation (orthogonal modulation), the influence exerted upon other carrier frequencies can be reduced.

Figure 33:
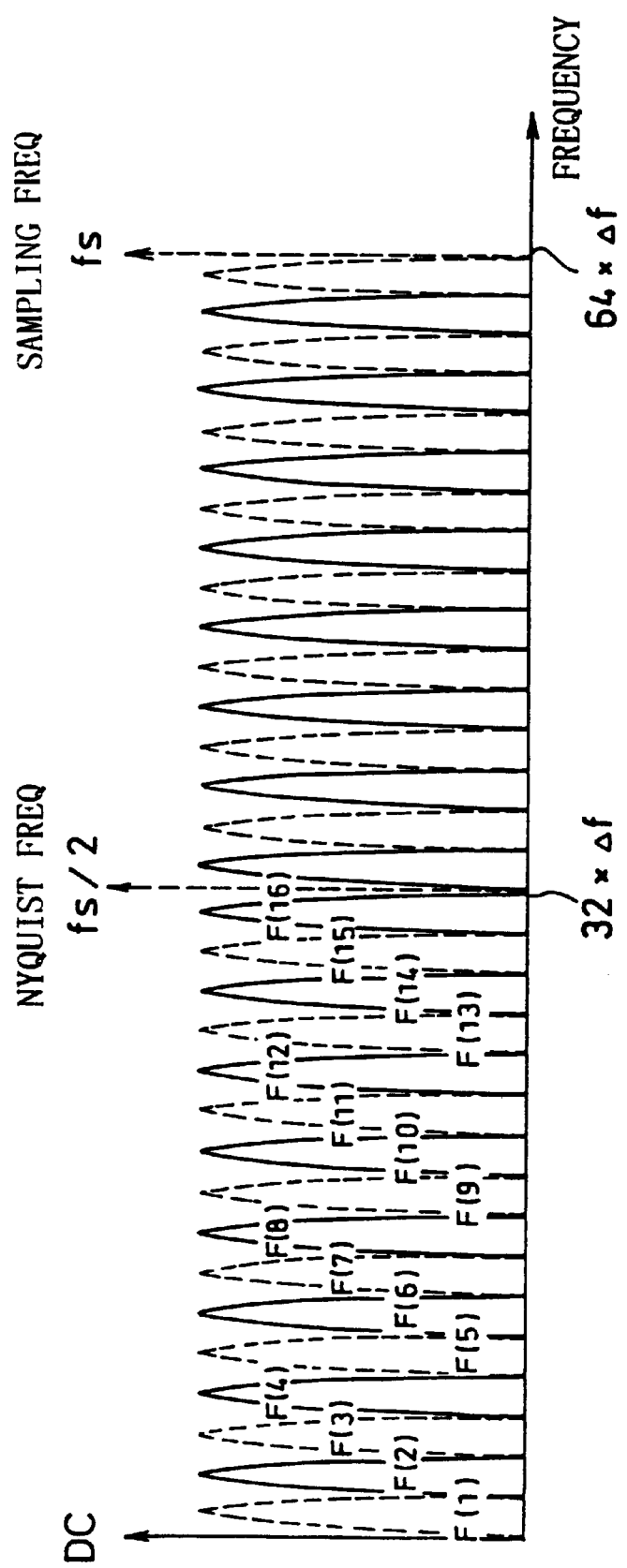
FIG. 33 shows an example of the arrangement of carrier frequencies after down-conversion, corresponding to the arrangement in FIG. 31.

FIG. 33 shows the arrangement of carrier frequencies which will be mapped in frequency when the carrier frequencies F(k) (k 1, 2, . . . , M) after frequency orthogonal transformation shown in FIG. 31, are down-converted in frequency, using the reference oscillating signal sgo having the frequency fc (fc to DC), by the down-converter unit FD of the receiver R. After the carrier frequencies have been down-converted in frequency, the frequency interval is changed from 4×Δf to 2×Δf and therefore the occupied frequency bandwidth becomes a half of the variable frequency range. In the DFT operation unit DP, therefore, a DFT process can be executed using frequency of 16×4×Δf equal to the variable frequency range, i.e., 16 MHz, as sampling frequency fs.

Instead of the frequency orthogonal transformation represented by the equation (3), there may be used a frequency orthogonal transformation represented by the following equation (5):

$$W3(k = \text{odd number}) = \sin(2\pi \times fc \times t) \cdot \cos(2\pi \times \Delta f \times k \times t) + \cos(2\pi \times fc \times t) \cdot \sin(2\pi \times \Delta f \times k \times t)$$
$$= \sin(2\pi \times (fc + \Delta f \times k) \times t) \quad (5)$$

$$W3(k = \text{even number}) = \sin(2\pi \times fc \times t) \cdot \cos(2\pi \times \Delta f \times k \times t) - \cos(2\pi \times fc \times t) \cdot \sin(2\pi \times \Delta f \times k \times t)$$
$$= \sin(2\pi \times (fc - \Delta f \times k) \times t)$$

Instead of the frequency orthogonal transformation represented by the equation (4), there may be used a frequency orthogonal transformation represented by the following equation (6):

$$W4(k = \text{even number}) = \sin(2\pi \times fc \times t) \cdot \cos(2\pi \times \Delta f \times k \times t) + \cos(2\pi \times fc \times t) \cdot \sin(2\pi \times \Delta f \times k \times t)$$
$$= \sin(2\pi \times (fc + \Delta f \times k) \times t) \quad (6)$$

$$W4(k = \text{odd number}) = \sin(2\pi \times fc \times t) \cdot \cos(2\pi \times \Delta f \times k \times t) - \cos(2\pi \times fc \times t) \cdot \sin(2\pi \times \Delta f \times k \times t)$$
$$= \sin(2\pi \times (fc - \Delta f \times k) \times t)$$

Except for a binary number operation of the accumulator 2AC shown in FIG. 30, the hardware arrangements are the same. That is, according to the values of k in the carrier frequencies F(k), k is successively accumulated.

Figure 34:
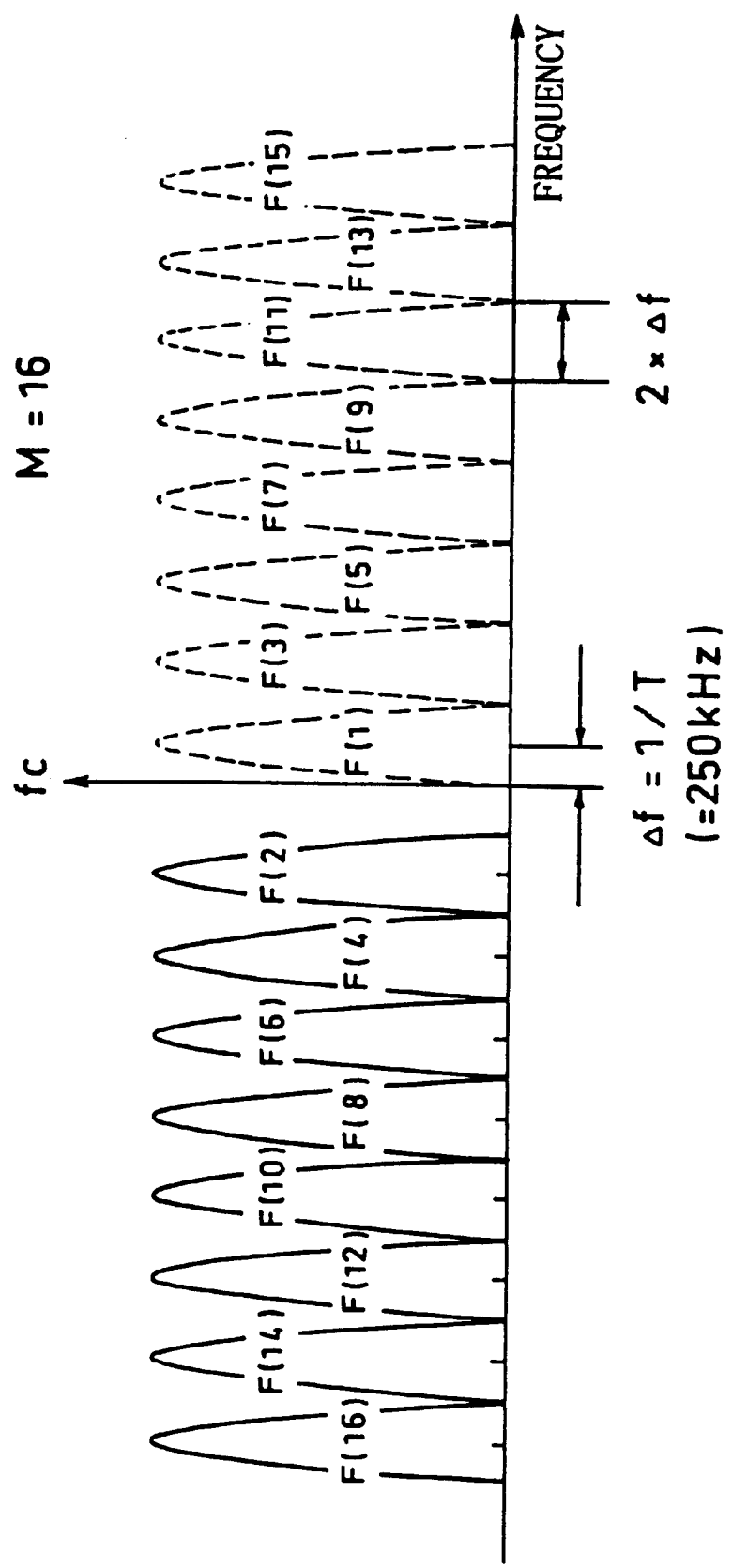
FIG. 34 shows a further example of the arrangement of carrier frequencies after frequency orthogonal transformation.

FIG. 34 shows the arrangement of M (=16) carrier frequencies after frequency orthogonal transformation represented by the equation (5). Based on the values of k in the carrier frequencies F(k), the frequencies are alternately arranged, on the basis of the frequency fc, toward the high band side by Δf×k when k is an odd number, and toward the low band side by Δf×k when k is an even number.

Figure 35:
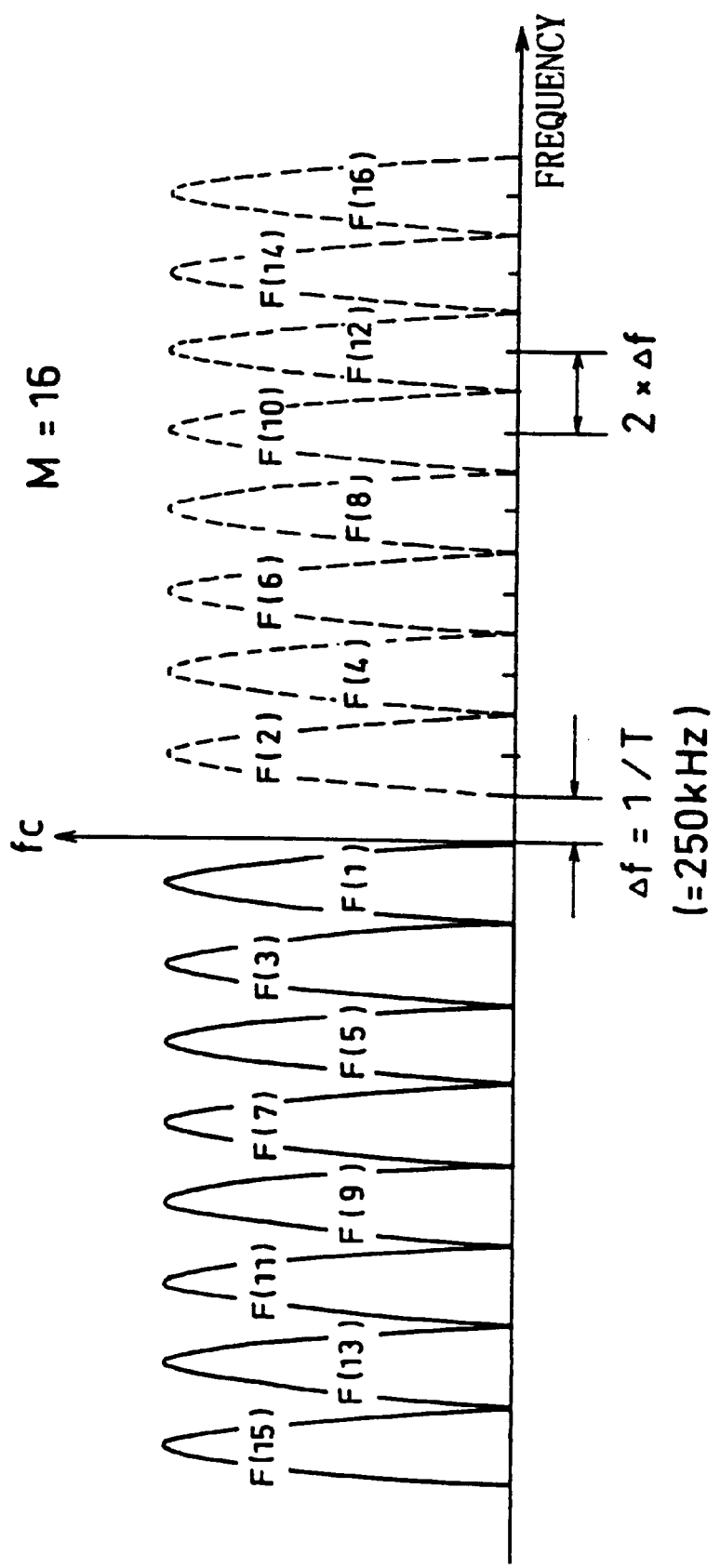
FIG. 35 shows a further example of the arrangement of carrier frequencies after frequency orthogonal transformation.

FIG. 35 shows the arrangement of M (=16) carrier frequencies after frequency orthogonal transformation represented by the equation (6). Based on the values of k in the carrier frequencies F(k), the frequencies are alternately arranged, on the basis of the frequency fc, toward the low band side by Δf×k when k is an odd number, and toward the high band side by Δf×k when k is an even number.

Even though the equation (5) or (6) is used, there can be produced effects similar to those discussed in connection with FIGS. 31 and 32. Further, the carrier frequency interval can be narrower than in FIGS. 31 and 32. It is therefore possible to provide a larger number of carrier frequencies. It is however noted that the influence of a spurious response among the carrier frequencies becomes greater.

Figure 36:
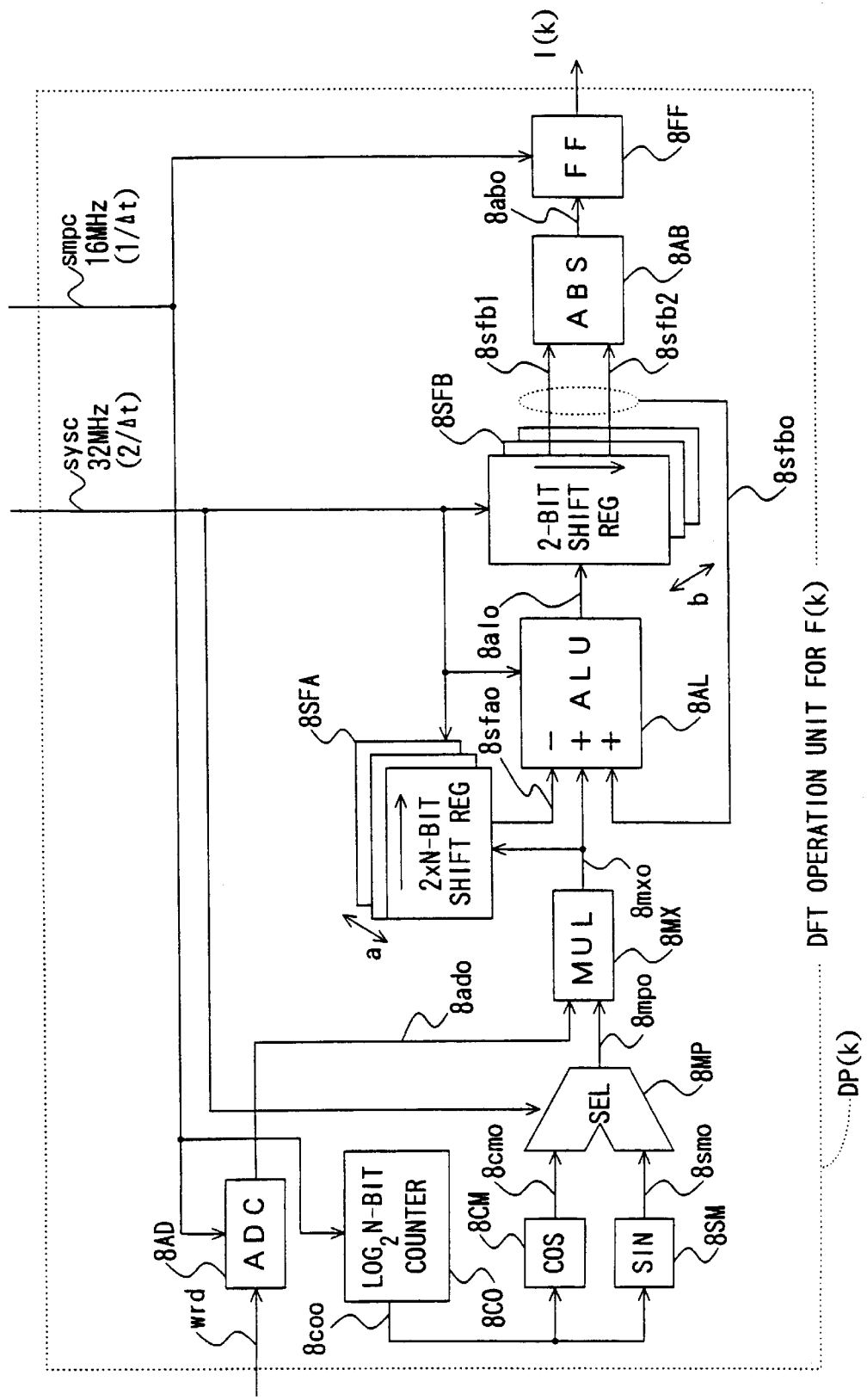
FIG. 36 is a block diagram showing in detail a circuit arrangement for a DFT operation for one carrier frequency in the DFT operation unit in FIG. 28.

FIG. 36 shows in detail an example of the arrangement of the DFT operation unit DP (k) for one carrier frequency F(k) in the DFT operation unit DP in FIG. 28. Shown in FIG. 36 are a DFT operation unit DP(k) for the carrier frequency F(k), an A/D converter 8AD, a $\log_2$ N-bit counter 8CO, a cosine-wave memory 8CM, a sine-wave memory 8SM, a data selector 8MP, a multiplier 8MX, an a-stage 2×N-bit shift register 8SFA, an arithmetic operation unit (ALU) 8AL, a b-stage 2-bit shift register 8SFB, an absolute value operation unit (ABS) 8AB and a flip-flop 8FF. Here, $\log_2$ N is equal to 6, and 2×N is equal to 128. Also shown in FIG. 36 are a down-converter output wrd, a system clock sysc (of which frequency is equal to 2/Δt or 32 MHz), a sampling clock smpc (of which frequency is equal to 1/Δt or 16 MHz), a $\log_2$ N-bit counter 8CO output 8coo, an A/D converter 8AD output 8ado, cosine-wave data 8cmo, sine-wave data 8smo, a data selector 8MP output 8mpo, a multiplier 8MX output 8mxo, a 2×N shift register 8SFA output 8sfao, an arithmetic operation unit 8AL output 8alo, a 2-bit shift register 8SFB output 8sfbo, an absolute value operation unit 8AB output 8abo and a spectrum value I(k) for the carrier frequency F(k). Further shown in FIG. 36 are a 2-bit shift register 8SFB's first bit output 8sfb1 and a 2-bit shift register 8SFB's second bit output 8sfb2.

In the DFT operation unit DP(k) for the carrier frequency F(k), when the down-converter output value is defined as Wd, the spectrum value I(k) is calculated by executing the following operations of equation (7) per k:

$$I(k) = \text{sqrt}(Ic(j)^2 + Is(j)^2) \quad (7)$$

$$Ic(j) = \sum_{j=p-N+1}^{P} (Wd(j) \times \cos(2\pi \times \Delta f \times (2k-1) \times \Delta t \times j))$$

$$Is(j) = \sum_{j=p-N+1}^{P} (Wd(j) \times \sin(2\pi \times \Delta f \times (2k-1) \times \Delta t \times j))$$

$$j = 0, 1, 2, 3, 4, \ldots$$

in which sqrt ( ) means a square root function and p means the absolute time point at this point of time.

In FIG. 36, the down-converter output wrd is converted into an a-bit digital signal by the A/D converter 8AD per sampling clock smpc or per j in the equations (7). Cosine-wave data and sine-wave data for N (=64) points having a time length of one time slot corresponding to the carrier frequency F(k), are respectively stored in the cosine-wave memory 8CM and the sine-wave memory 8SM, and are read out, per sampling clock smpc, using the $\log_2$ N-bit counter 8CO output 8coo as an address. The data selector 8MP is arranged to execute a process using, in time-division multiplexing, the hardware for partial operations (multiplication, addition and subtraction) in the DFT process, and to alternately assign the cosine-wave data 8cmo and the sine-wave data 8smo to the multiplier 8MX per system clock sysc. In the multiplier 8MX, multiplication of Wd(j) x cos (2π×Δf×(2k−i)×Δt×j) in the equation (7) and multiplication of Wd(j)×sin (2π×Δf×(2k−i)×Δt×j) in the equation (7), are alternately executed for the A/D converter 8AD a-bit output 8ado and the cosine-wave data 8cmo, and for the A/D converter 8AD a-bit output 8ado and the sine-wave data 8smo, thus supplying the upper a-bit multiplication result 8mxo. Each of the a-stage 2×N-bit shift register 8SFA and the b-stage 2-bit shift register 8SFB, is operated at the system clock sysc. This provides a delay of the multiplication result 8mxo by a period of one time slot in the 2×N shift register 8SFA and a delay of the arithmetic operation unit output 8alo by a period of one sampling clock in the 2-bit shift register 8SFB. In the arithmetic operation unit 8AL, the shift register output 8sfbo is added to the multiplication result 8mxo per system clock sysc, and the shift register output 8sfao is subtracted from the multiplication result 8mxo per system clock sysc, thus calculating and supplying Ic(j) or Is(j) which is the b-bit accumulation result (correlation value) for a period of the latest one time slot. In the absolute value operation unit 8AB, there is calculated, per system clock sysc, the square mean (sqrt $(Ic(j)^2+Is(j)^2)$ or (sqrt $(Is(j)^2 +Ic(j+1)^2)$ of the 2-bit shift register 8SFB's first bit output 8sfb1 and the 2-bit shift register 8SFB's second bit output 8sfb2, and the absolute value operation unit output 8abo at the same timing j is supplied as the spectrum value I(k) from the flip-flop 8FF.

In FIG. 28, the DFT operation unit DP is formed of 16 DFT operation units DP(k) each shown in FIG. 36, and other arrangement than the 16 DFT operation units DP(k) is common for different k. Further, the sampling frequency for the DFT process is advantageously reduced to ½. In FIG. 36, therefore, the hardware is reduced in size due to the time-division arrangement of the multiplier 8MX and the arithmetic operation unit 8AL. As to the absolute value operation unit 8AB, too, a time-division arrangement can be used between two carrier frequencies, for example, k=(1, 2), k=(3, 4), k=(5, 6), k=(7, 8), k=(9, 10), k=(11, 12), k=(13, 14), k=(15, 16).

Figure 37:
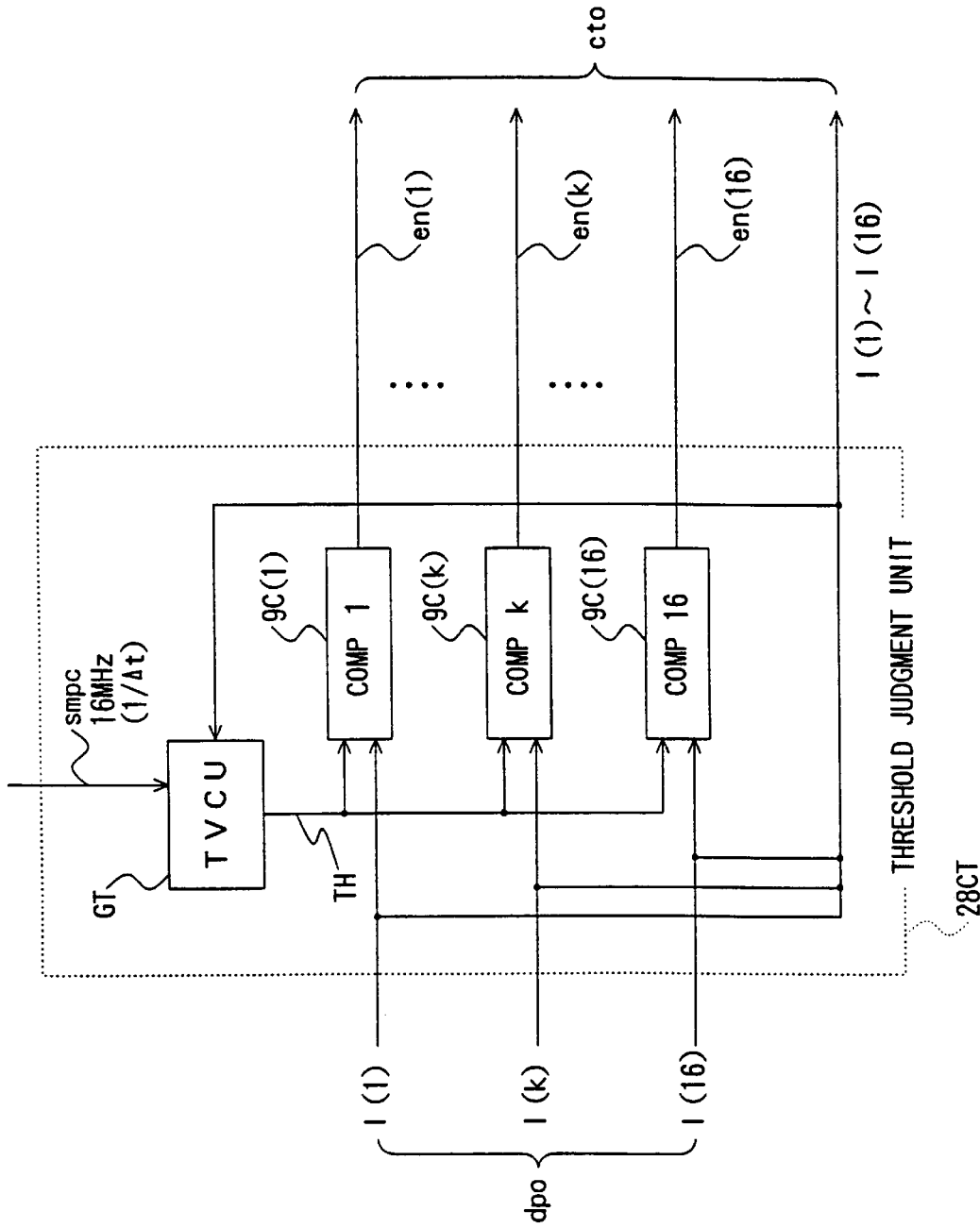
FIG. 37 is a block diagram showing in detail an example of the arrangement of the threshold judgment unit in FIG. 28.

FIG. 37 shows in detail an example of the arrangement of the threshold judgment unit 28CT in FIG. 28. Shown in FIG. 37 are a threshold value control unit GT and the kth comparator 9C(k) (k=1, 2, . . . , 16) for the carrier frequency F(k). Also shown in FIG. 37 are a spectrum value I(k) corresponding to the carrier frequency F(k), a sampling clock smpc (of which frequency is equal to 1/Δt or 16 MHz), a threshold value TH and the kth enable signal en(k) corresponding to the carrier frequency F(k).

In FIG. 37, each spectrum value I(k) calculated in each DFT operation unit DP(k) in FIG. 36 is compared in each comparator 9C(k) with the threshold value TH set by the threshold value control unit GT according to the spurious level at the time of DFT process. Then, there is generated each enable signal en(k) corresponding to each carrier frequency F(k). When the spectrum value I(k) does not exceed the threshold value TH, the enable signal en(k) is asserted in the HIGH level, and when the spectrum value I(k) exceeds the threshold value TH, the enable signal en(k) is negated in the LOW level. From the threshold judgment unit 28CT, 16 enable signals en(k) and 16 spectrum values I(k) are simultaneously supplied as threshold judgment unit output cto (K=1, 2, . . . , 16), and the spectrum value of each carrier frequency negated in the LOW level is set as the spectrum value Id(1) (1=0, . . . , s) of each candidate carrier frequency.

Figure 38:
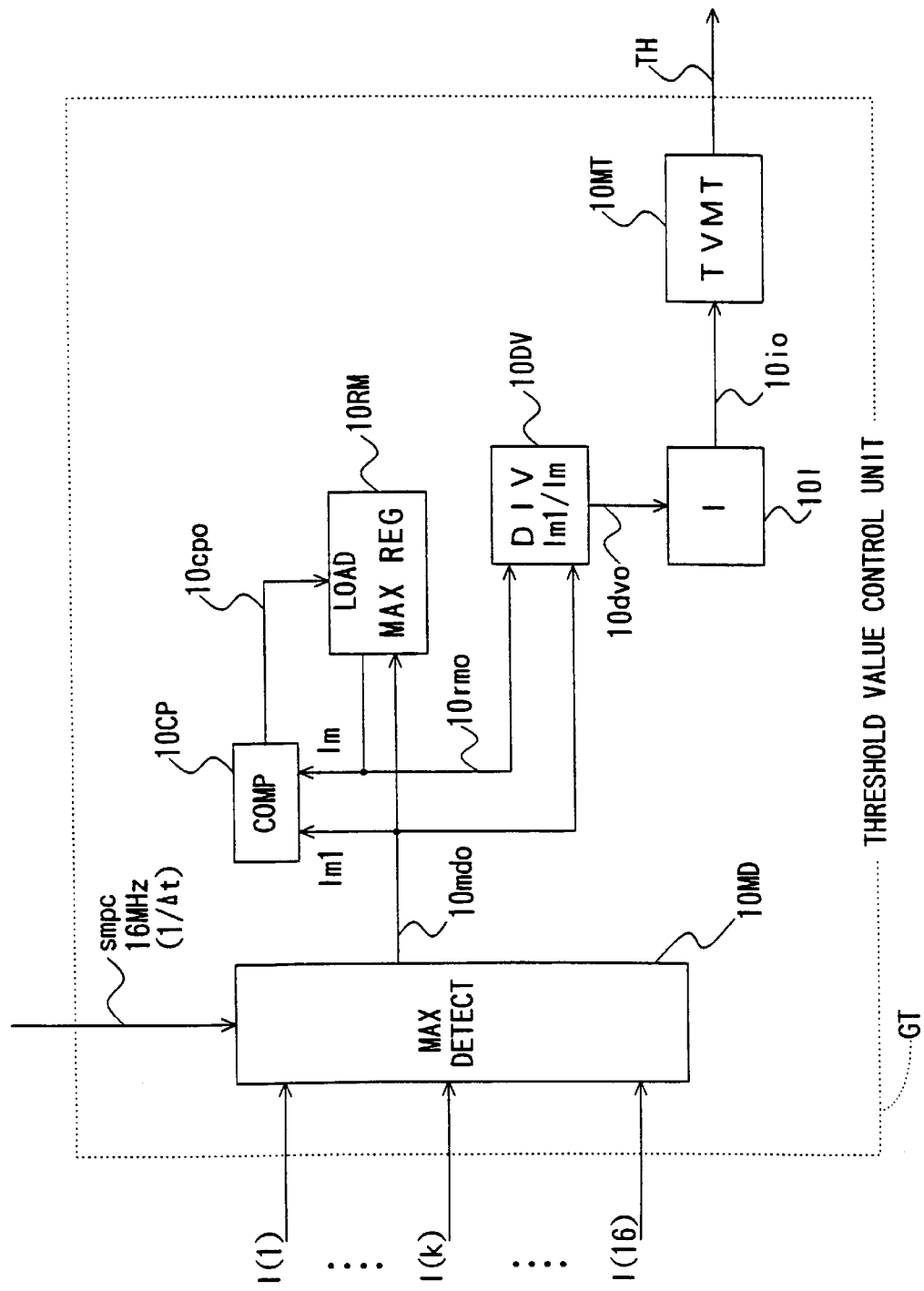
FIG. 38 is a block diagram showing in detail an example of the arrangement of the threshold value control unit in FIG. 37.

FIG. 38 shows in detail an example of the arrangement of the threshold value control unit GT in FIG. 37. Shown in FIG. 38 are a maximum value detection unit 10MD, a comparator 10CP, a maximum value register 10RM, a divider 10DV, an integrator 10I and a threshold value memory table 10MT. Also shown in FIG. 38 are a spectrum value I(k) corresponding to each carrier frequency F(k) (k=1, 2., . . . , 16), a sampling clock smpc (of which frequency is equal to 1/Δt or 16 MHz), a maximum value detection unit 10MD output 10mdo, a comparator 10CP output 10cpo, a register 10RM output 10rmo, a divider 10DV output 10dvo, an integrator 10I output 10io and a threshold value TH.

In FIG. 38, spectrum values I(1)~I(16) are entered into the maximum value detection unit 10MD per sampling clock smpc, and the maximum spectrum value Im1 is selected and supplied as the maximum value detection unit output 10mdo. In the comparator 10CP, the previous maximum value Im which is the maximum register 10RM output 10rmo, is compared in level with the new maximum value Im1. Only when Im1 is greater than Im, the comparator output 10cpo is asserted and IM1 is latched in the register 10RM. In the divider 10DV, normalization is made by an operation of Im1/Im. The divider output 10dvo is smoothed by the integrator 10I and supplied as the integrator output 10io which serves as an address for the threshold value memory table 10MT. From the threshold value memory table 10MT, the threshold value TH is selected and read out.

The threshold value control unit GT in FIG. 38 is advantageous when an automatic gain control (AGC) is made in the down-converter unit FD. When the maximum AGC output is in a predetermined level, the spectrum value of each candidate carrier frequency is smaller as the multiplicity of the transmission channel number s is greater. Accordingly, when the threshold value TH is set in association with the integrator output 10io, the optimum threshold value TH for the transmission channel number s is selected, thus improving the carrier frequency detection precision.

Figure 39:
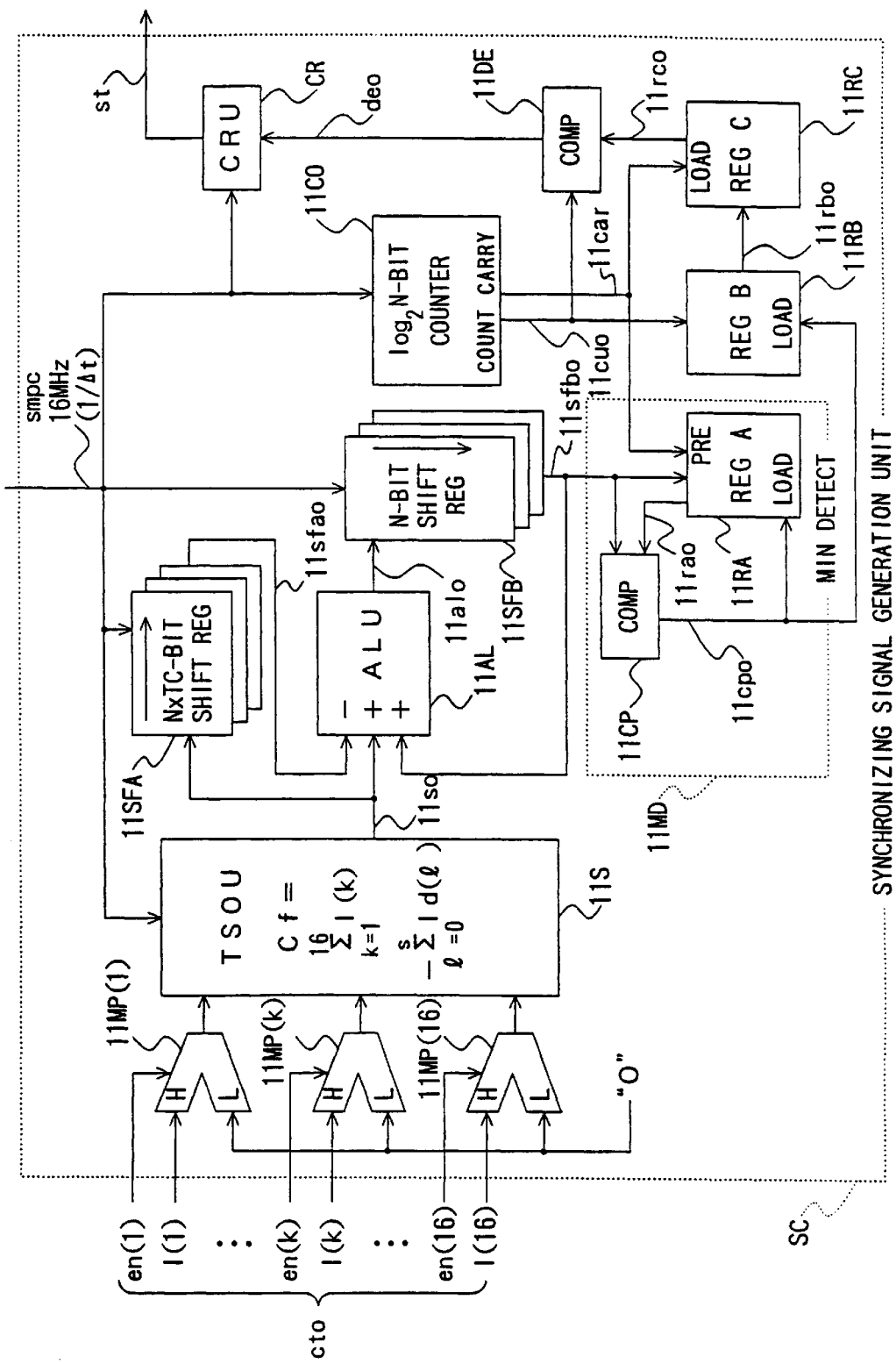
FIG. 39 is a block diagram showing in detail an example of the arrangement of the synchronizing signal generation unit in FIG. 28.

FIG. 39 shows in detail an example of the arrangement of the synchronizing signal generation unit SC in FIG. 28. Shown in FIG. 39 are the kth data selector 11 MP(k) (k=1, 2, . . . , 16) for the carrier frequency F(k), a total sum operation unit 11S, an arithmetic operation unit (ALU) 11AL, an N×TC-bit shift register 11SFA, an N-bit shift register 11SFB, a minimum value detector unit 11MD, a first comparator 11CP, an A register 11RA, a B register 11RB, a C register 11RC, a $\log_2$ N-bit counter 11CO, a second comparator 11DE and a clock regeneration unit CR. Here, TC (which is an integer not less than 1) represents time constant, and $\log_2$ N is equal to 6. In FIG. 39, cto generally designates both spectrum value output I(k) and enable signal en(k) (k=1, 2, . . . , 16) which are given from the threshold judgment unit 28CT in FIG. 37. Also shown in FIG. 39 are a sampling clock smpc (of which frequency is equal to 1/Δt or 16 MHz), a total sum operation unit 11S output 11so, an arithmetic operation unit 11AL output 11alo, an N×TC-bit shift register 11SFA output 11sfao, an N-bit shift register 11SFB output 11sfbo, an A register 11RA output 11rao, a first comparator 11CP output 11cpo, a B register 11RB output 11rbo, a C register 11RC output 11rco, a $\log_2$ N-bit counter 11CO count output 11cuo, a $\log_2$ N-bit counter 11Co carry output 11car, a second comparator 11DE output deo and a synchronizing trigger signal st.

In FIG. 39, whether or not the spectrum values I(1) to I(16) supplied from the threshold judgment unit 28CT are to be entered into the total sum operation unit 11S, is selected, in the 16 data selectors 11MP(1) to 11MP(16), using the enable signals en(1) to en(16) supplied from the threshold judgment unit 28CT. That is, there is selected only the spectrum value I(k) of each carrier frequency of which enable signal en(k) is asserted in the HIGH level, i.e., only the spectrum value I(k) of carrier frequency other than the candidate carrier frequency Id(1) (1=0, 1, . . . , s). Each spectrum value I(k) thus selected is entered and added in the total sum operation unit 11S. Then, there is operated a cost function Cf of the following equation (8):

$$Cf = \sum_{k=1}^{16} (I(k)) - \sum_{l=0}^{s} (Id(l)) \tag{8}$$

Per sampling clock smpc, the total sum operation unit 11S supplies a cost function Cf as the total sum operation unit output 11so. Both the N×TC-bit shift register 11SFA and the N-bit shift register 11SFB are operated at the sampling clock smpc. The total sum operation unit output 11so is delayed by a period of TC time slots in the N×TC-bit shift register 11SFA, and the arithmetic operation unit output halo is delayed by a period of one time slot in the N-bit shift register 11SFB. In the arithmetic operation unit 11AL, the total sum operation unit output 11so is subjected to addition with respect to the N-bit shift register output 11sfbo, and is subjected to subtraction with respect to the N×TC-bit shift register output 11sfao. Per time point i (i=1, 2, ... N) in $\Delta t$ of time slot, a cost function accumulated value C(i) for time constant TC is calculated and supplied as the arithmetic operation unit output 11alo. In the minimum value detection unit 11MD, the A register output 11rao which is a temporary candidate of the minimum cost function accumulated value C(i) in a period of one time slot, is compared with the N-bit shift register output 11sfbo in the first comparator 11CP. Only when the N-bit shift register output 11sfbo is smaller, the first comparator output 11cpo is asserted in the HIGH level and the N-bit shift register output 11sfbo is latched in the A register 11RA. In the $\log_2$ N-bit counter 11CO, counting-up is made per sampling clock smpc to count a period of one time slot (N=64 points). The count output 11cuo at the time when the first comparator output 11cpo has been asserted, is latched in the B register 11RB. Accordingly, when the carry output 11car is asserted, the timing (time point i) at which the cost function accumulated value C(i) is minimized within one time slot, is determined based on the B register output 11rbo, and the B register output 11rbo at this time is latched in the C register 11RC. Simultaneously, the A register output 11rao is preset to 1 by the carry output 11car for detection the minimum value within a period of a subsequent time slot. In the second comparator 11DE, whether or not the C register output 11rco coincides with the count output 11cuo, is detected within a period of a subsequent time slot. When a coincidence is detected, the second comparator output deo is supplied as asserted in the HIGH level. In the clock regeneration unit CR, the time slot for the second comparator output deo is stabilized, thereby to supply the synchronizing trigger signal st.

Figure 40:
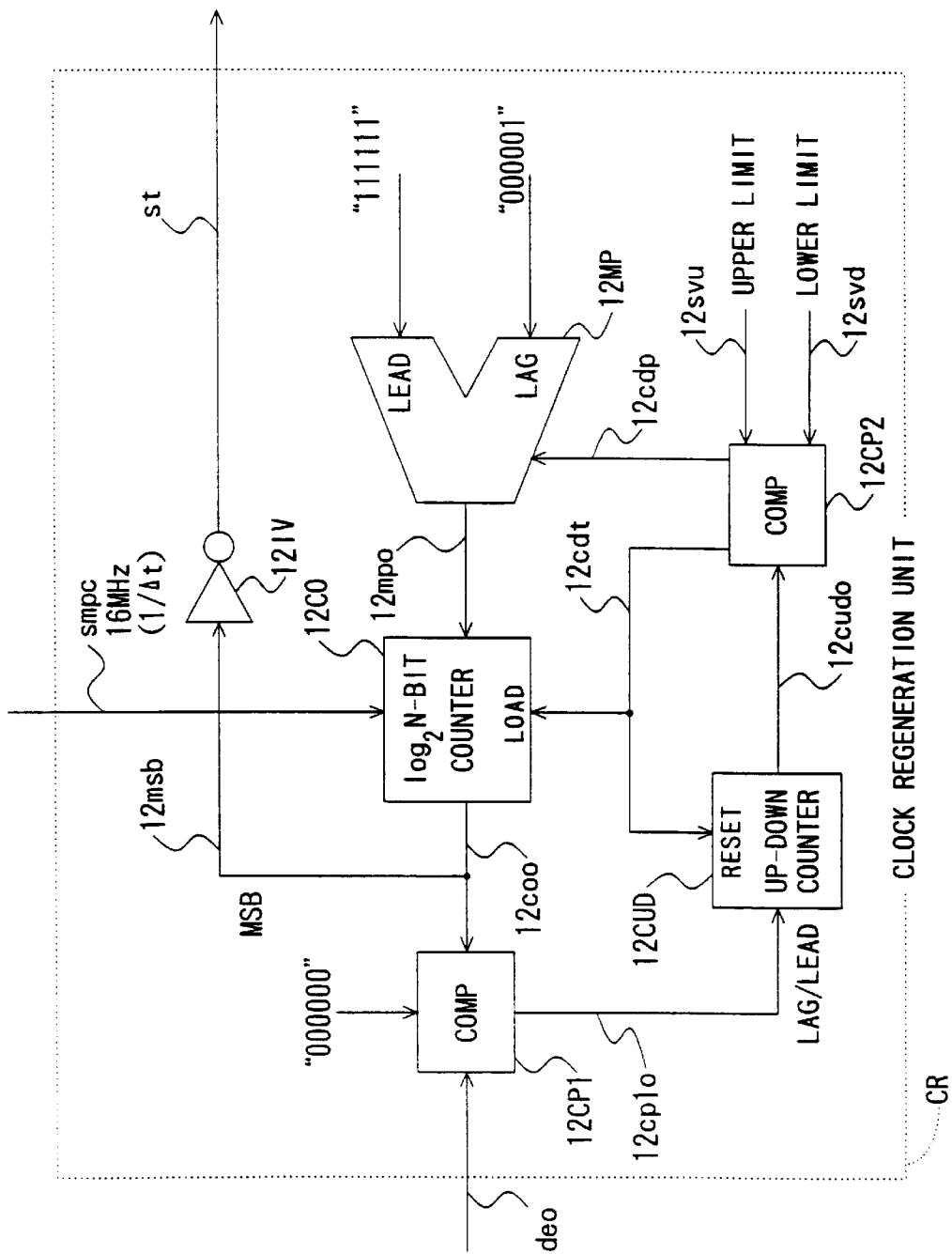
FIG. 40 is a block diagram showing in detail an example of the arrangement of the clock regeneration unit in FIG. 39.

FIG. 40 shows in detail an example of the arrangement of the clock regeneration unit CR in FIG. 39. Shown in FIG. 40 are a first comparator 12CP1, a $\log_2$ N-bit counter 12C0, a data selector 12MP, a second comparator 12CP2, an up/down counter 12CUD and an inverter 12IV. Here, $\log_2$ N is equal to 6. Also shown in FIG. 40 are the output deo of the second comparator 11DE in the synchronizing signal generation unit SC in FIG. 39, a first comparator 12CP1 output 12cplo, sampling clock smpc (of which frequency is equal to 1/$\Delta t$ or 16 MHz), a $\log_2$ N-bit counter 12CO output 12coo, a data selector 12MP output 12mpo, an up/down counter 12CUD output 12cudo, an upper limit value 12svu for the second comparator 12CP2, a lower limit value 12svd for the second comparator 12CP2, a second comparator 12CP2 phase output 12cdp, a second comparator 12CP2 detection output 12cdt, the most significant bit (MSB) 12msb of the $\log_2$ N-bit counter output 12coo and the synchronizing trigger signal st.

In the $\log_2$ N-bit counter 12CO in FIG. 40, counting-up from 000000 to 111111 is repeated per sampling clock smpc. $\Delta t$ this time, the most significant bit (MSB) 12msb of the counter becomes the synchronizing trigger signal St through the inverter 12IV. In the first comparator 12CP1, the counter output 12coo at the timing where the input deo is asserted, is compared with a 6-bit data value 000000 such that the phase information of the synchronizing trigger signal St with respect to the time slot, is detected. More specifically, the first comparator output 12cplo is supplied on the assumption that the phase is led while the counter output 12coo has a value from 000001 to 011111, and that the phase is delayed while the counter output 12coo has a value from 100000 to 111111. In the up/down counter 12CUD, based on the first comparator output 12cplo, counting-up is made when the phase is led, and counting-down is made when the phase is delayed. In the second comparator 12CP2, a threshold judgment is made, based on the upper and lower limit values 12svu, 12svd, on the up/down counter output 12cudo integrated per time slot. When the up/down counter output 12cudo deviates from the upper or lower limit value, there are generated a detection output 12cdt and a phase output 12cpd for phase correction. More specifically, when the up/down counter output 12cudo exceeds the upper limit value 12svu, the phase output 12cdp causes the data selector 12MP to select, at the timing of the counter output 12coo of 000000, the data value 111111, and this data value 111111 is loaded on the $\log_2$ N-bit counter 12CO, such that a 1-bit lead correction is made on the phase. On the other hand, when the up/down counter output 12cudo is below the lower limit value 12svd, the phase output 12cdp causes the data selector 12MP to select, at the timing of the counter output 12coo of 000000, the data value 000001, and this data value 000001 is loaded on the $\log_2$ N-bit counter 12CO, such that a 1-bit lag correction is made on the phase. Each time phase correction is made, the up/down counter output 12cudo is reset by the detection output 12cdt. The operations abovementioned are successively repeated such that the synchronizing trigger signal st is accurately in synchronism with the time slot.

Figure 41:
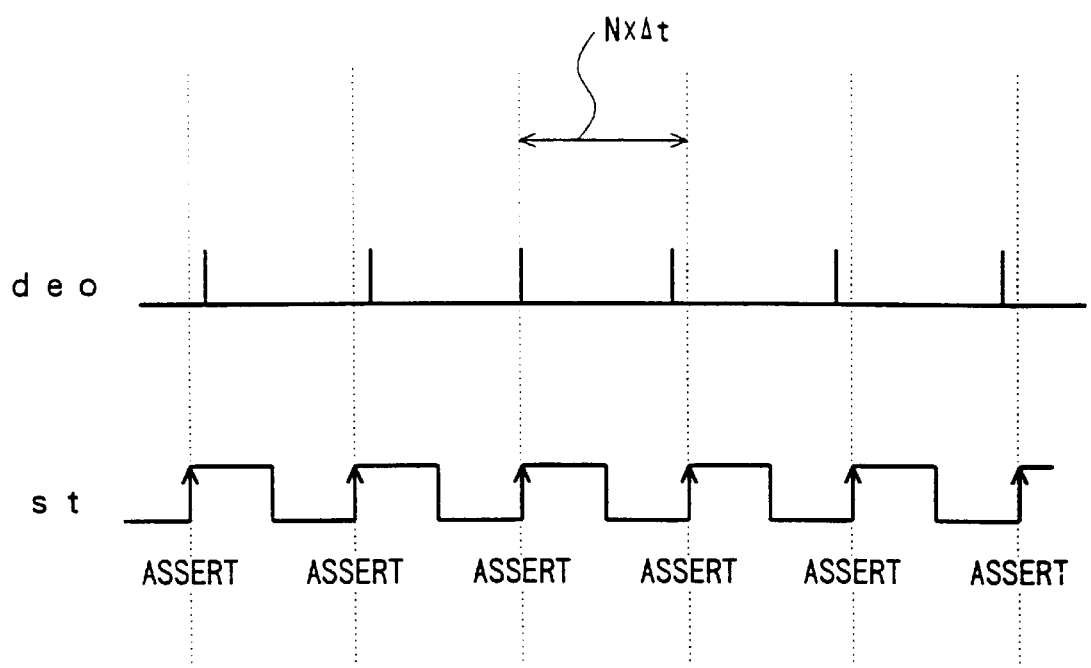
FIG. 41 is a diagram of operational timing of the clock regeneration unit in FIG. 40.

FIG. 41 shows a timing chart illustrating the input/output relation in the clock regeneration unit CR in FIG. 40. Even though a jitter is generated in the input deo, a stable synchronizing trigger signal st is acquired because of the integration effect produced by the up/down counter 12CUD. It is assumed that the synchronizing trigger signal st is asserted at its rising edges.

Figure 43:
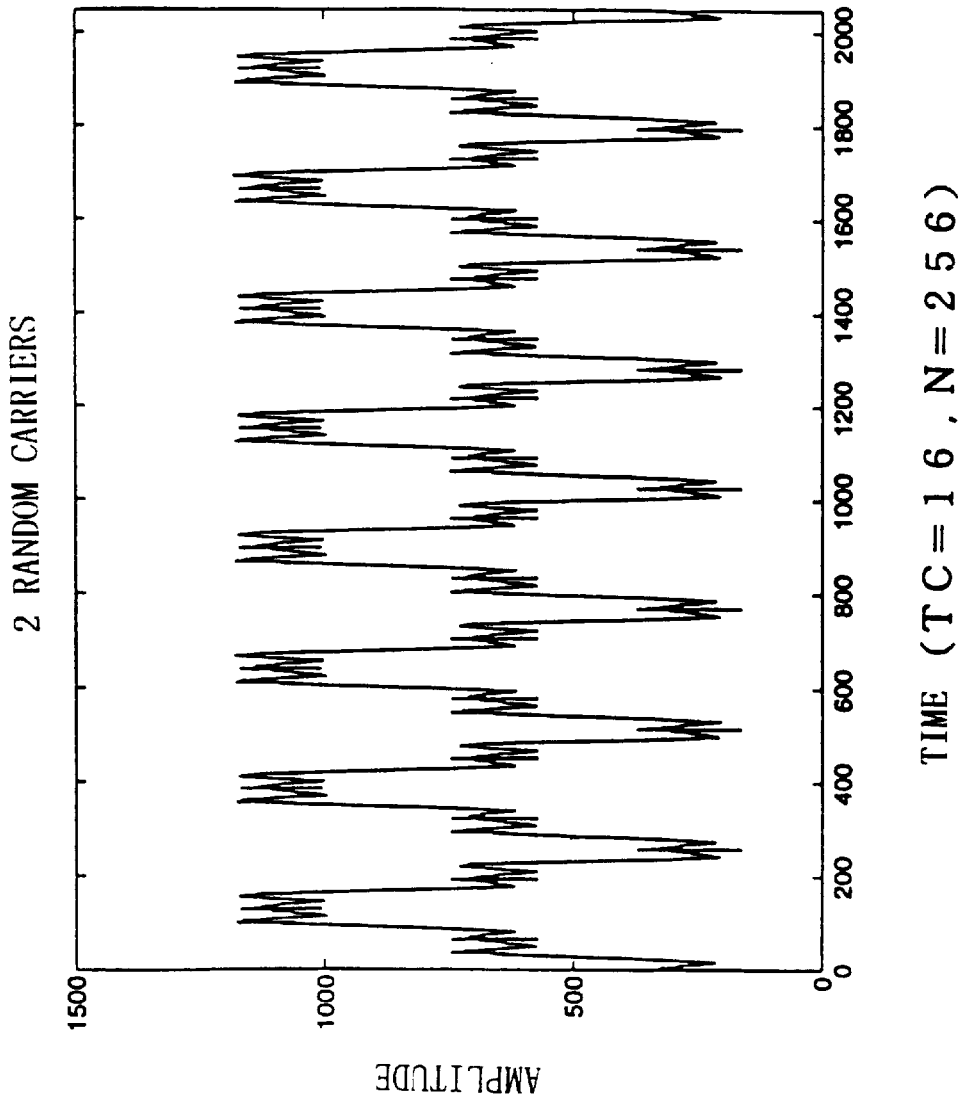
FIG. 43 shows an example of the waveform of a cost function accumulated value in the synchronizing signal generation unit in FIG. 39 when two channels in FIG. 42 are received.
Figure 45:
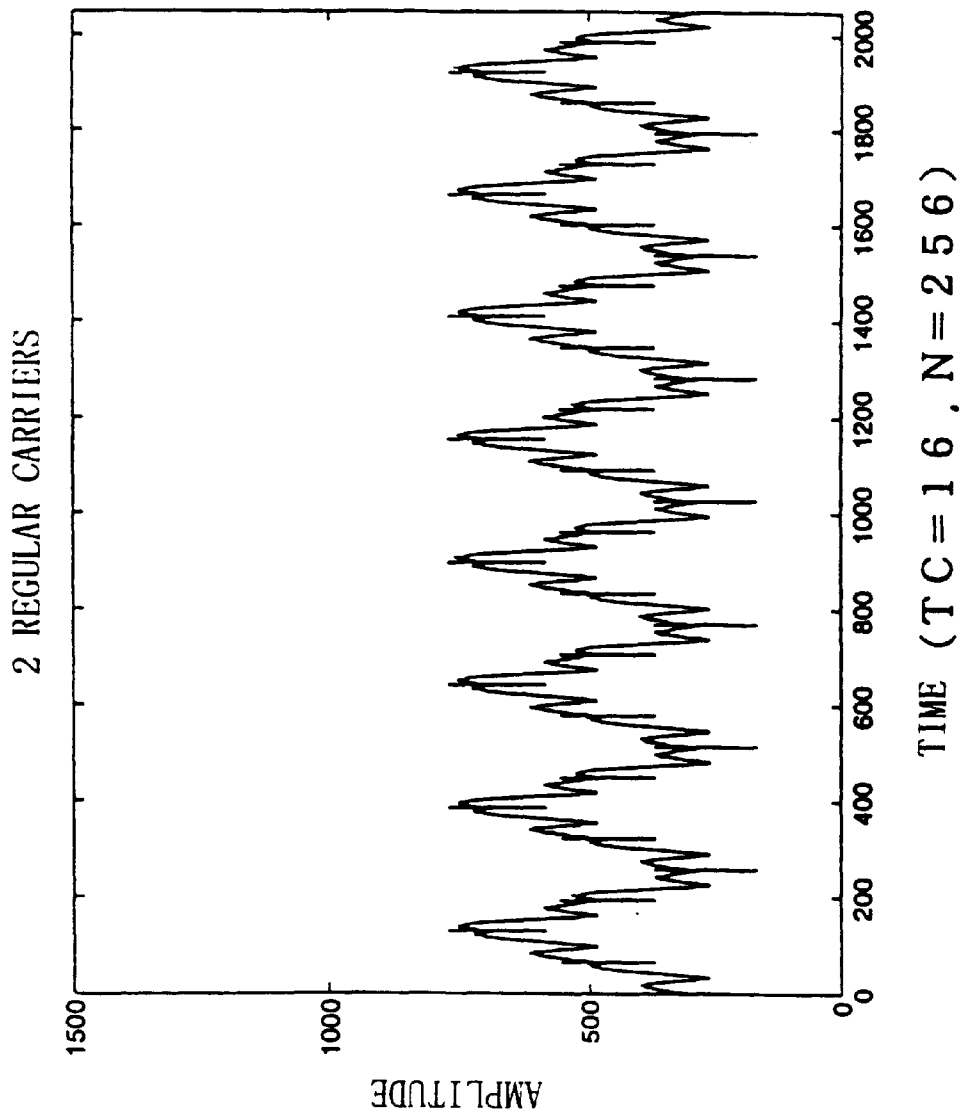
FIG. 45 shows an example of the waveform of a cost function accumulated value in the synchronizing signal generation unit in FIG. 39 when two channels in FIG. 44 are received.

FIG. 43 shows, for 8 time slots (8×256=2048 points), the cost function accumulated values C(i) for time constant TC=16 time slots in the synchronizing signal generation unit SC in FIG. 39 when M is equal to 16 and N is equal to 256 and when two channels shown in FIG. 42 are received. FIG. 45 is a view similar to FIG. 43 at the time when two channels shown in FIG. 44 are received. In each of FIGS. 43 and 45, no noise is being added.

In FIG. 43, there are obtained cost function accumulated values C(i) broad in dynamic range because the carrier frequencies in the reception channel 1 and the reception channel 2 do not overlap each other in the zone extending over two time slots in FIG. 42 such that the randomized property is high. In FIG. 45, however, there are only obtained function accumulated values C(i) narrow in dynamic range because the carrier frequencies in the reception channel 1 and the reception channel 2 overlap each other in the zone extending over two time slots in FIG. 44 such that the randomized property is low.

Figure 47:
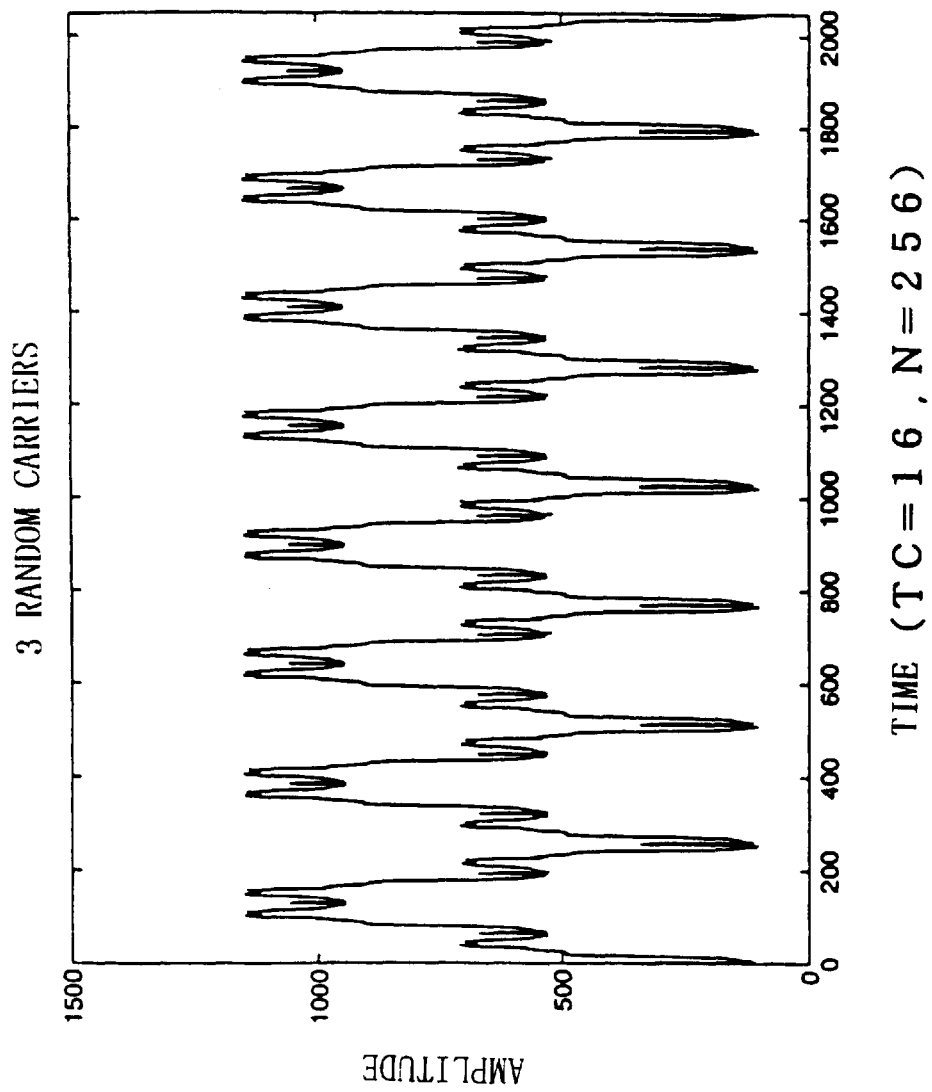
FIG. 47 shows an example of the waveform of a cost function accumulated value in the synchronizing signal generation unit in FIG. 39 when three channels in FIG. 46 are received.
Figure 49:
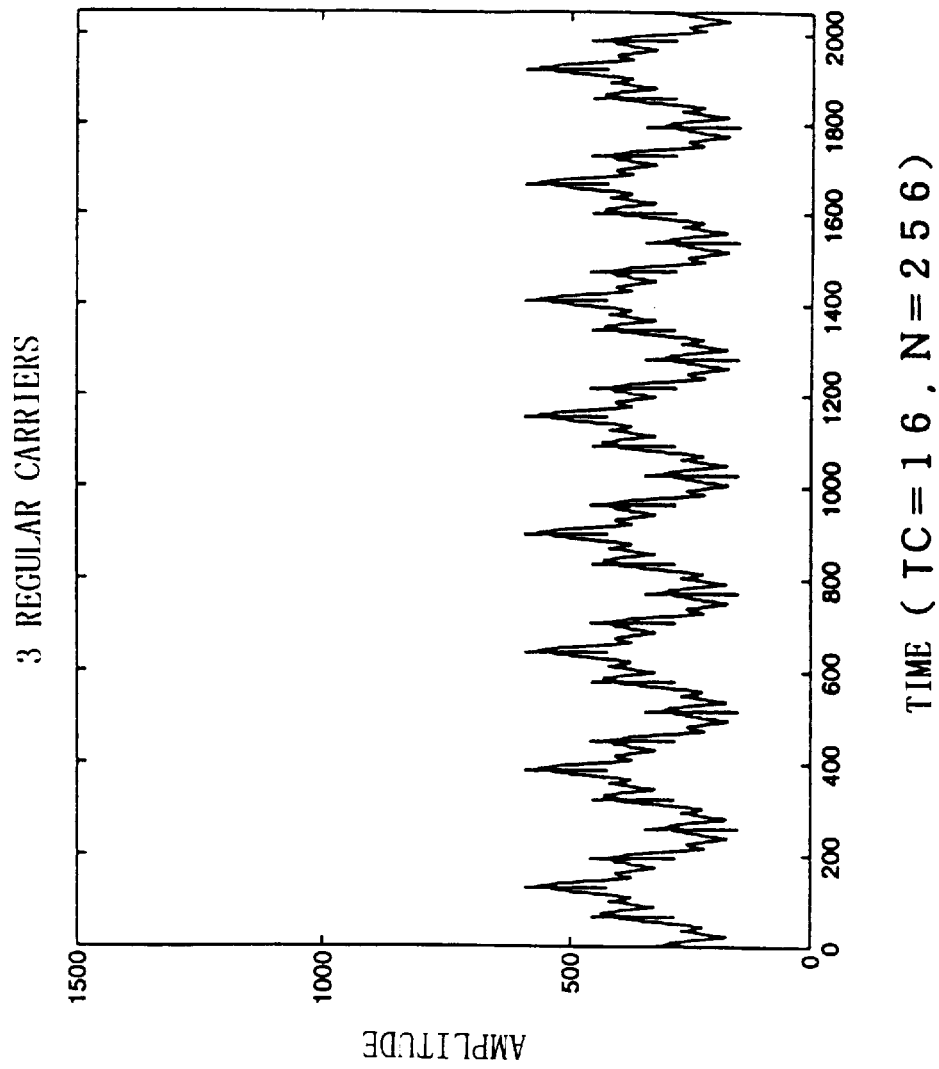
FIG. 49 shows an example of the waveform of a cost function accumulated value in the synchronizing signal generation unit in FIG. 39 when three channels in FIG. 48 are received.

FIG. 47 shows, for 8 time slots (8×256=2048 points), cost function accumulated values C(i) for time constant TC=16 time slots in the synchronizing signal generation unit SC in FIG. 39 when M is equal to 16 and N is equal to 256 and when three channels shown in FIG. 46 are received. FIG. 49 is a view similar to FIG. 47 at the time when three channels in FIG. 48 are received. In each of FIGS. 47 and 49, no noise is being added.

In FIGS. 47 and 49 in which the number of reception channels is three, too, there are obtained the results of cost function accumulated values C(i) similar to those obtained when the number of reception channels is two. When the transmission data are enhanced in randomized property, there are obtained cost function accumulated values C(i) broad in dynamic range. This means that when frequency hopping is made using a Reed-Solomon code or the like, cost function accumulated values C(i) broad in dynamic range are obtained as an inevitable consequence.

Figure 51:
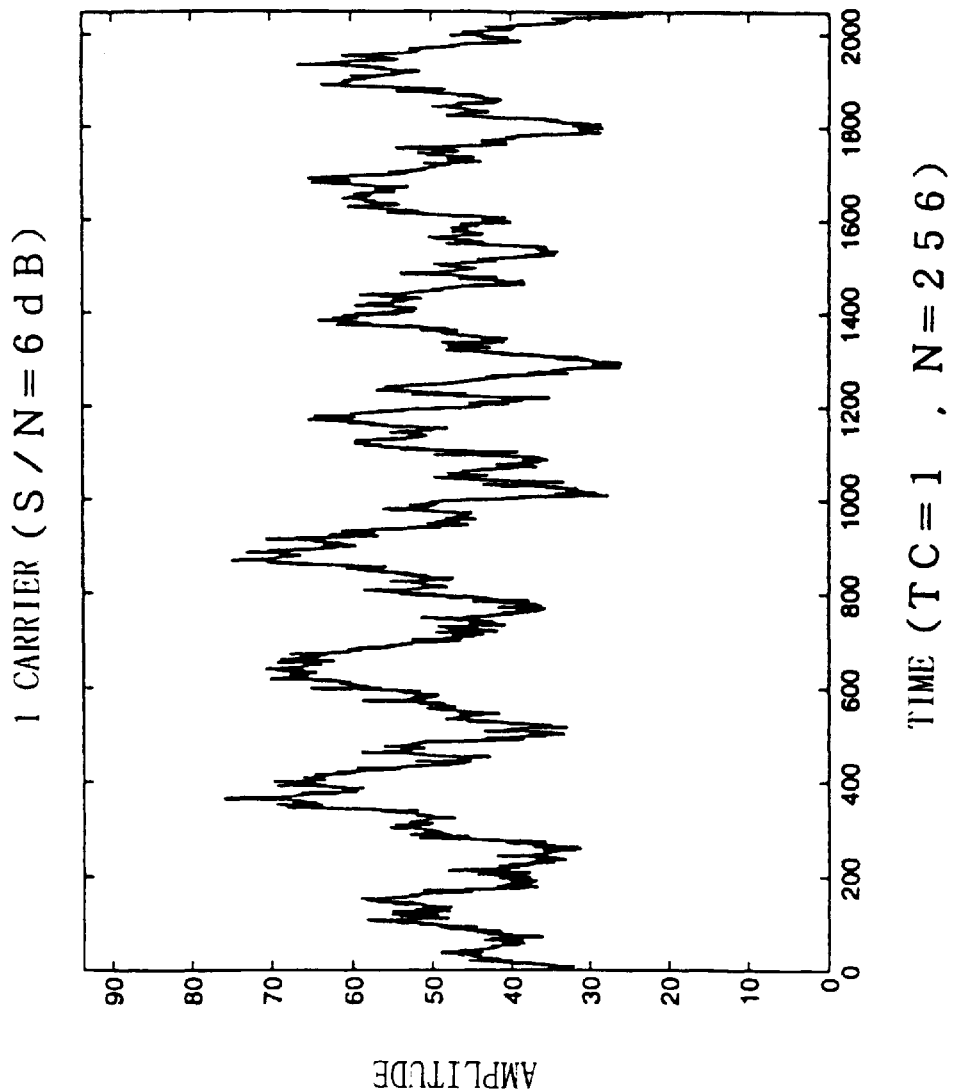
FIG. 51 shows an example of the waveform of a cost function accumulated value in the synchronizing signal generation unit in FIG. 39 when a channel in FIG. 50 is received under a noise environment with time constant TC being equal to 1.
Figure 52:
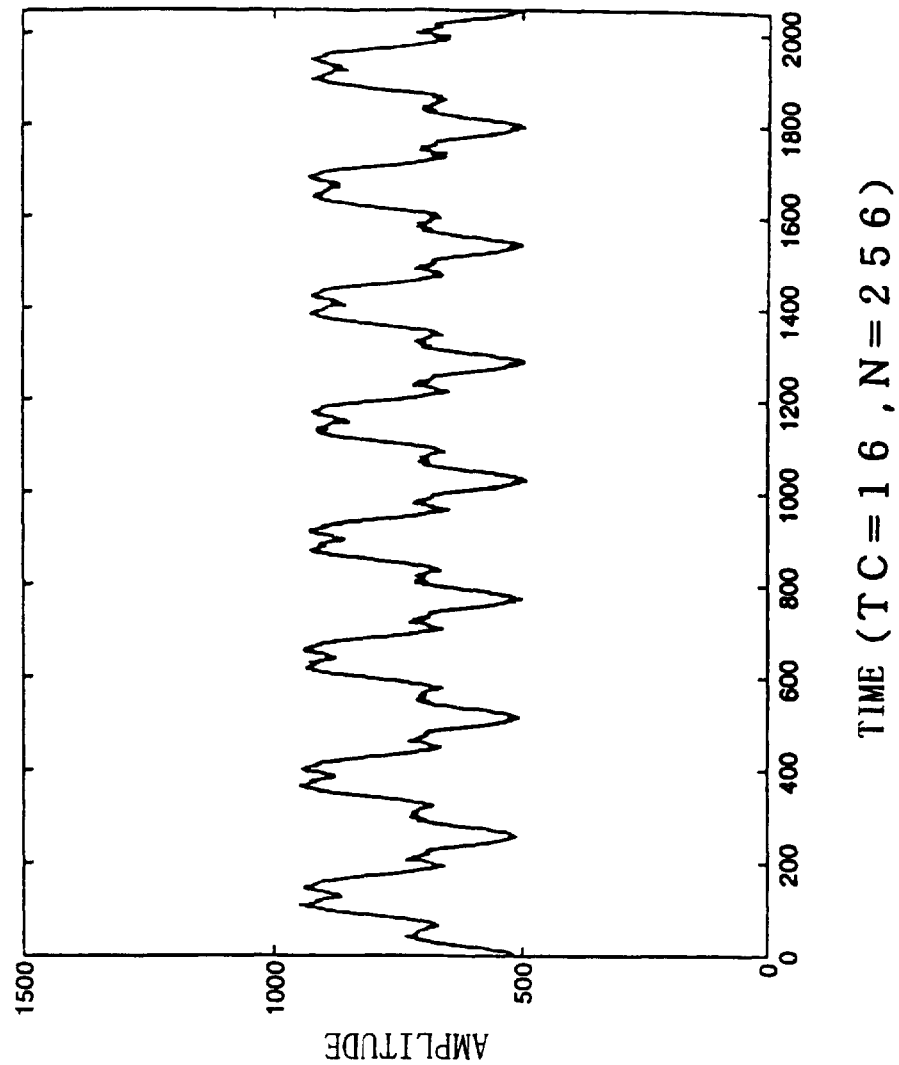
FIG. 52 shows an example of the waveform of a cost function accumulated value in the synchronizing signal generation unit in FIG. 39 when a channel in FIG. 50 is received under a noise environment with time constant TC being equal to 16.

FIG. 51 shows, for 8 time slots (8×256=2048 points), cost function accumulated values C(i) for time constant TC=1 time slot in the synchronizing signal generation unit SC in FIG. 39 when M is equal to 16 and N is equal to 256 and when one channel shown in FIG. 50 is received. FIG. 52 shows, for 8 time slots (8×256=2048 points), cost function accumulated values C(i) for time constant TC=16 time slots in the synchronizing signal generation unit SC in FIG. 39 when M is equal to 16 and N is equal to 256 and when one channel shown in FIG. 50 is received. In each of FIGS. 51 and 52, noise (S/N=6dB) is being added.

As apparent from FIG. 52, on the assumption that, under the environment where noise is present, frequency hopping is conducted using random transmission data having a series length of M, when the time constant TC is set to a value equal to the product of the number of carrier frequencies M and a positive integer, the generated cost function accumulated values C(i) are stabilized by sufficient averaging, thus stabilizing the synchronizing trigger signal st.

Figure 53:
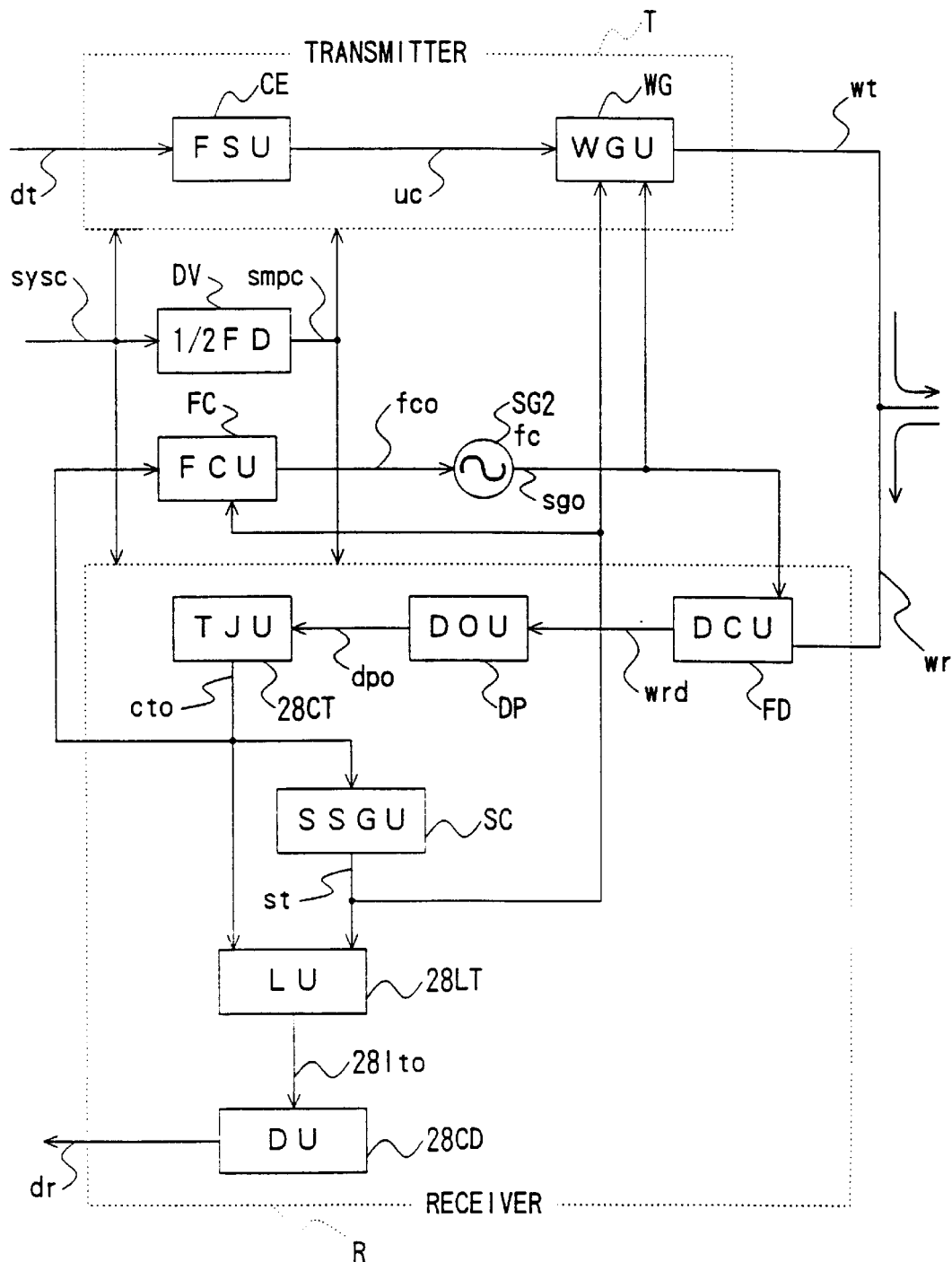
FIG. 53 is a block diagram illustrating a modification of the digital communication apparatus in FIG. 28.

FIG. 53 shows an example of the arrangement of the digital communication apparatus according to the present invention, in which the oscillator SG in FIG. 28 is replaced with an oscillator SG2 variable in frequency and in which a frequency control unit FC is added. Shown in FIG. 53 is a frequency control signal fco supplied from the frequency control unit FC to the oscillator SG2. Given to the frequency control unit FC are a threshold judgment unit output cto and a synchronizing trigger signal st.

In FIG. 53, the oscillator SG2 is formed of a PLL synthesizer. As far as the oscillator SG2 is highly stable in view of temperature and variable in frequency, high-speed pulling-into-synchronism properties are not particularly required. If the oscillator SG2 is formed with the frequency fixed by frequency multiplication, there occurs an frequency error (1 ppm to 50 ppm) due to crystal frequency precision. This means that, when the frequency fc of the oscillator SG2 is set to 2484 Mhz and the channel interval after down-conversion in frequency is set to 2×Δf=500 kHz, an error of 10 ppm will result in frequency error of about 25 kHz.

Figure 54:
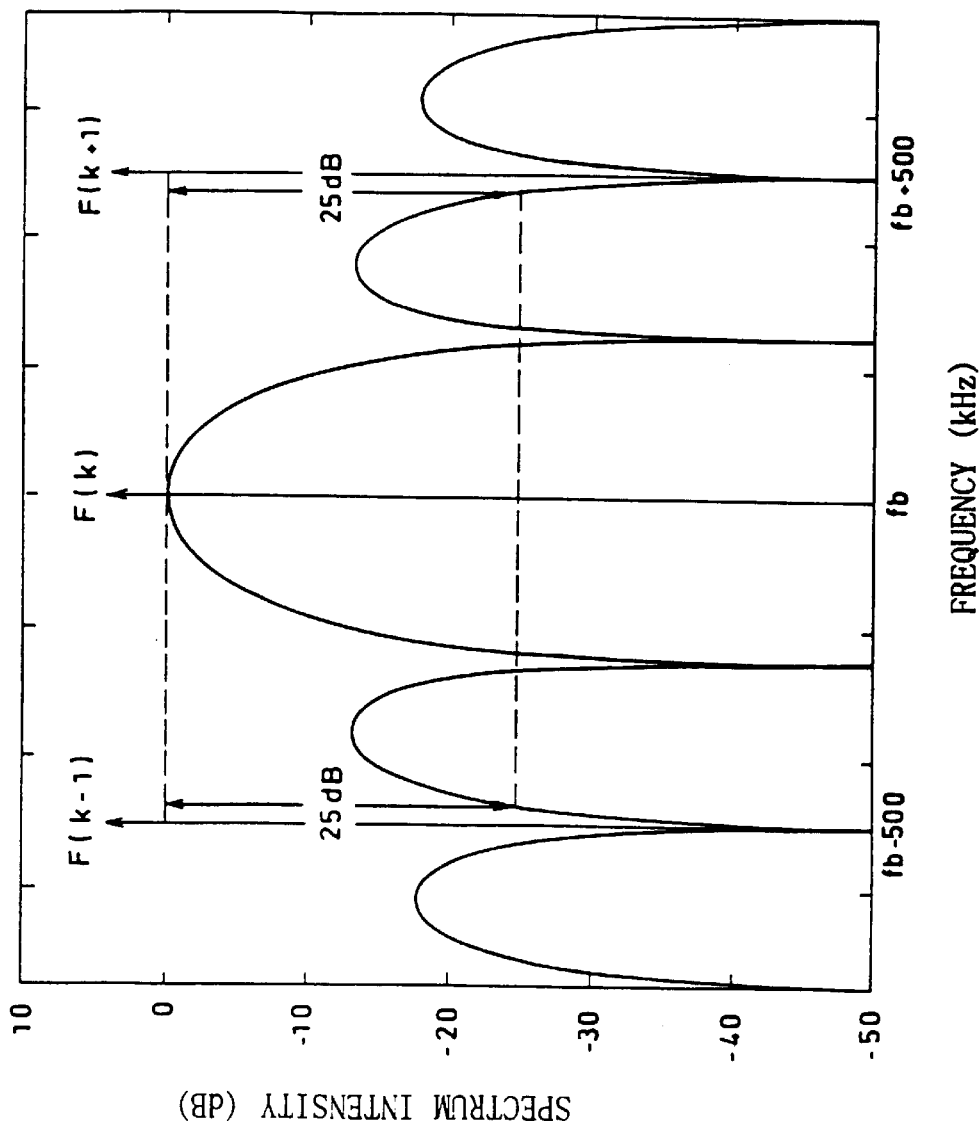
FIG. 54 shows the levels of spurious responses which reception carrier frequency gives to adjacent frequency bands in a comparative example of the digital communication apparatus in FIG. 53.

FIG. 54 shows, in the form of a logarithm, the levels of spurious responses that reception carrier frequency F(k) having frequency fb gives to adjacent frequency bands. When the reception carrier frequency is down-converted in frequency with a frequency error of 25 kHz, a spurious response of about −25dB is generated in the adjacent carrier frequencies F(k-1) and F(k+1). According to the arrangement in FIG. 53, based on the degree of difference in spectrum value, the PPL synthesizer forming the oscillator SG2 is controlled in frequency using the frequency control signal fco generated by the frequency control unit FC. Thus, the oscillator frequencies fc of a plurality of digital communication apparatus can be unified. This lowers the influence of spurious responses to improve the carrier frequency detection precision.

Figure 55:
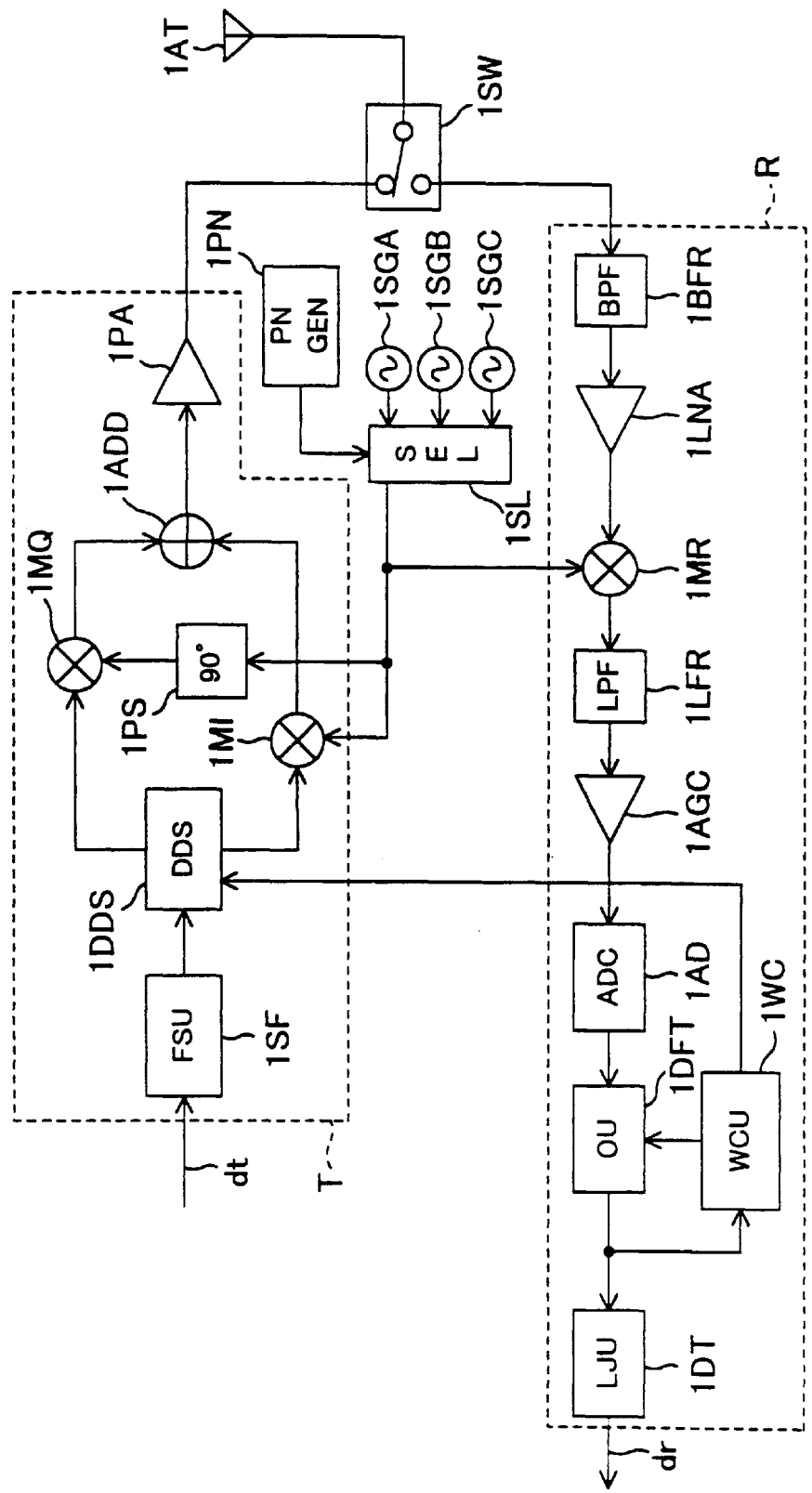
FIG. 55 is a block diagram illustrating an example of the arrangement of the digital communication apparatus according to the present invention.

FIG. 55 shows an example of the arrangement of the digital communication apparatus according to the present invention. Shown at the transmitter T in FIG. 55 are transmission data dt, a frequency selection unit 1SF, a digital direct synthesizer 1DDS, an in-phase-axis mixer 1MI, a quadrature-axis mixer 1MQ, a 90 phase shifter 1PS, an adder 1ADD and a power amplifier 1PA. Shown at the receiver R in FIG. 55 are a band-pass filter 1BFR, a low noise amplifier LLNA, a mixer 1MR, a low-pass filter LLFR, an automatic gain controller (AGC) 1AGC, an A/D converter 1AD, a discrete Fourier transform (DFT) operation unit 1DFT, a window control unit 1WC, a level judgment unit 1DT and reception data dr. Also shown in FIG. 55 are an antenna 1AT, an antenna switch 1SW, a first oscillator ISGA for generating a reference oscillating signal having frequency fc_al, a second oscillator 1SGB for generating a reference oscillating signal having frequency fc_bl, a third oscillator 1SGC for generating a reference oscillating signal having frequency fc_cl, a pseudorandom noise (PN) generator 1PN and a selector 1SL.

In the digital communication apparatus in FIG. 55, there is used an MFSK mode or a code multiplexing MFSK mode using M carrier frequencies per sub-band, M being an integer not less than 4. The digital communication apparatus in FIG. 55 is arranged such that when transmission data dt are entered into the transmitter T, a transmission signal is supplied per time slot and that when a reception signal is entered into the receiver R, all the received frequencies are supplied per time slot. The antenna 1AT and the antenna switch 1SW form a front end unit. The three oscillators 1SGA, 1SGB, 1SGC, the PN generator 1PN and the selector 1SL form a reference oscillator unit for changing the local oscillating frequency according to low-speed hopping of the desired sub-band. In the transmitter T, the frequency selection unit 1SF determines the frequencies according to the transmission data dt. The digital direct synthesizer 1DDS generates, based on the frequencies thus determined, base band signals of two series for in-phase-axis components and quadrature-axis components. A modulation unit composed of the in-phase-axis mixer 1MI, the quadrature-axis mixer 1MQ, the 90° phase shifter 1PS and the adder 1ADD, orthogonally modulates local oscillating frequencies according to the two-series base band signals. The power amplifier 1PA executes a signal amplification such that the output of the modulation unit is supplied from the front end unit. In the receiver R, the band-pass filter 1BFR limits in band a reception signal entered from the front end unit. The low noise amplifier 1LNA amplifies, by predetermined gain, the signal limited in band. A down-converter unit formed of the mixer 1MR converts in frequency an output of the low noise amplifier 1LNA to a low frequency band using the local oscillating frequencies. The low-pass filter 1LFR takes out, from an output of the down-converter unit, a signal component for a ½ band width of the sub-band. The AGC amplifier 1AGC amplifies an output of the low-pass filter 1LFR up to the normalization level. The A/D converter 1AD converts an output of the AGC amplifier 1AGC into a digital value. In the DFT operation unit 1DFT, an output of the A/D converter 1AD is subjected to a discrete Fourier transform (DFT). In the window control unit 1WC, the DFT window is synchronously controlled based on an output of the DFT operation unit 1DFT. The level judgment unit 1DT supplies reception frequency data dr obtained by judging in level the output of the DFT operation unit 1DFT.

The following description will discuss the operations of the respective units in the arrangement in FIG. 55 in which M is equal to 8 and three sub-bands are to be hopped at low speed.

In the frequency selection unit 1SF in the transmitter T, serial transmission data dt are divided, for each period of one time slot T, into blocks each having $\log_2 M$ bits. In the digital direct synthesizer 1DDS, according to the signal from the window control unit 1WC, base band signals BI(k) and BQ(k) (k 1, 2, ..., M) for in-phase axis and quadrature axis, are supplied, in synchronism with the time slot, for each block according to the following equations (9) to (12):

$$BI\ (k=\text{odd number})=\cos\ (2\pi \times \Delta f \times (2k-1) \times t) \qquad (9)$$

$$BQ\ (k=\text{odd number})=\sin\ (2\pi \times \Delta f \times (2k-1) \times t) \qquad (10)$$

$$BI\ (k=\text{even number})=\cos\ (2\pi \times \Delta f \times (2k-1) \times t) \qquad (11)$$

$$BQ\ (k=\text{even number})=-\sin\ (2\pi \times \Delta f \times (2k-1) \times t) \qquad (12)$$

in which $\Delta f$ means the frequency step width ($\Delta f=1/T$) and t means time.

The PN generator 1PN generates a pattern for hopping a sub-band at low speed. In the selector 1SL, there is selected, based on the pattern thus generated, one of the frequencies of the three oscillators 1SGA, 1SGB, 1SGC, i.e., fc_al, fc_bl, fc_cl. It is now supposed that the frequency fc is selected. The signal of frequency fc is multiplied by the base band signal BI(k) in the mixer 1MI and also multiplied by the base band signal BQ(k) in the mixer 1MQ after the signal has passed through the 90° phase shifter 1PS. The respective products are added to each other in the adder 1ADD. Thus, an orthogonal modulation signal W is obtained according to the following equation (13):

$$\begin{aligned} W &= BI \times \sin(2\pi \times fc \times t) + BQ \times \cos(2\pi \times fc \times t) \\ &= \sin(2\pi \times (fc + (-1)^{k-1} \times \Delta f \times (2k-1)) \times t) \end{aligned} \qquad (13)$$

The frequency interval between fc_al and fc_bl and the frequency interval between fc_bl and fc_cl are set to M×4×$\Delta f$ such that the sub-bands do not overlap one another. The frequencies of the sub-bands are maintained as orthogonal. The orthogonal modulation signal W is amplified by the power amplifier 1PA and then supplied from the antenna 1AT through the antenna switch 1SW.

Figure 56:
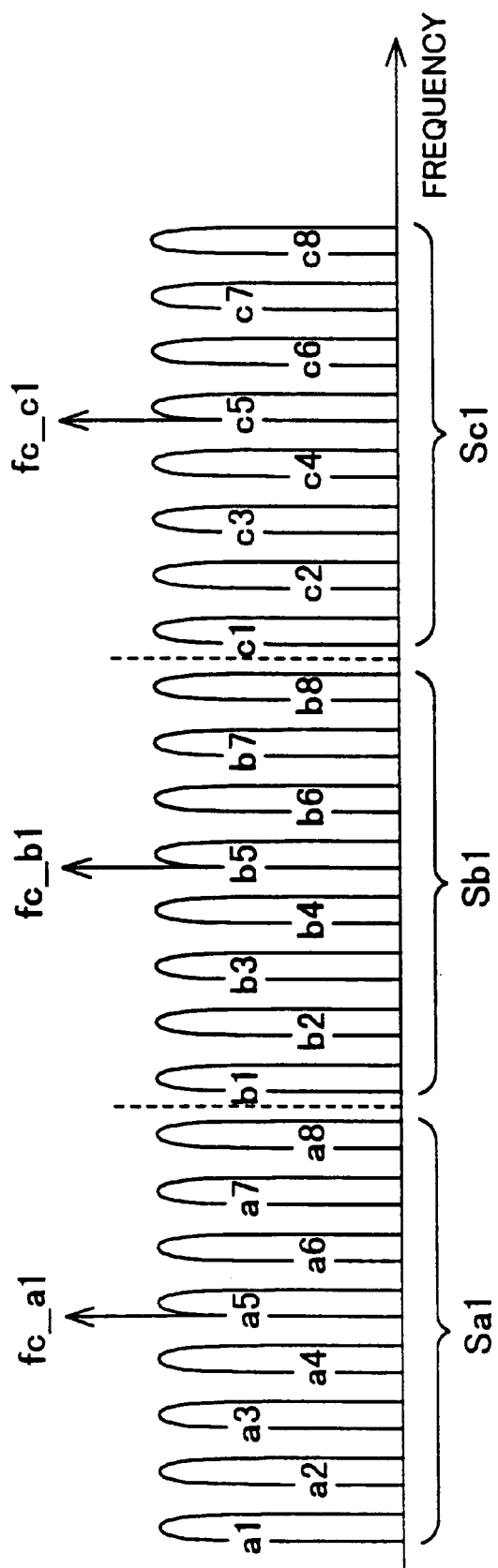
FIG. 56 is a diagram of frequency arrangement, at a certain time, of three sub-bands used in the digital communication apparatus in FIG. 55.

FIG. 56 shows the arrangement of frequencies of the three sub-bands Sa1, Sb1, Sc1, at certain time, used in the digital communication apparatus in FIG. 55. A signal received from the antenna 1AT, is entered into the receiver R through the antenna switch 1SW. In the receiver R, the band-pass filter 1BFR takes out the signal components in the desired band alone. The low noise amplifier 1LNA amplifies, by predetermined gain, the signal components thus taken. In the mixer 1MR, the output of the low noise amplifier 1LNA is down-converted to a base band frequency band using, out of the frequencies (fc_al, fc_bl, fc_cl) of the three oscillators 1SGA, 1SGB, 1SGC, the frequency which is synchronized with the low-speed hopping pattern of the desired sub-band.

Figure 57:
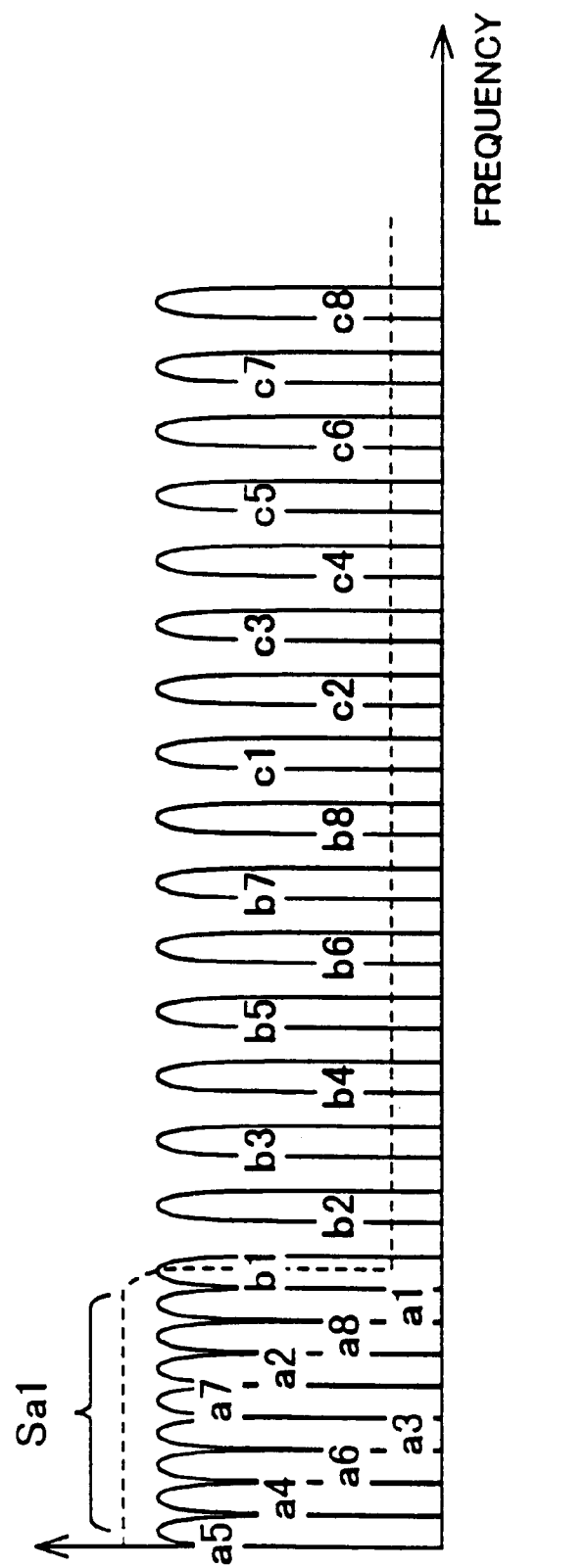
FIG. 57 is a diagram of frequency arrangement obtained after down-conversion of a first sub-band.
Figure 58:
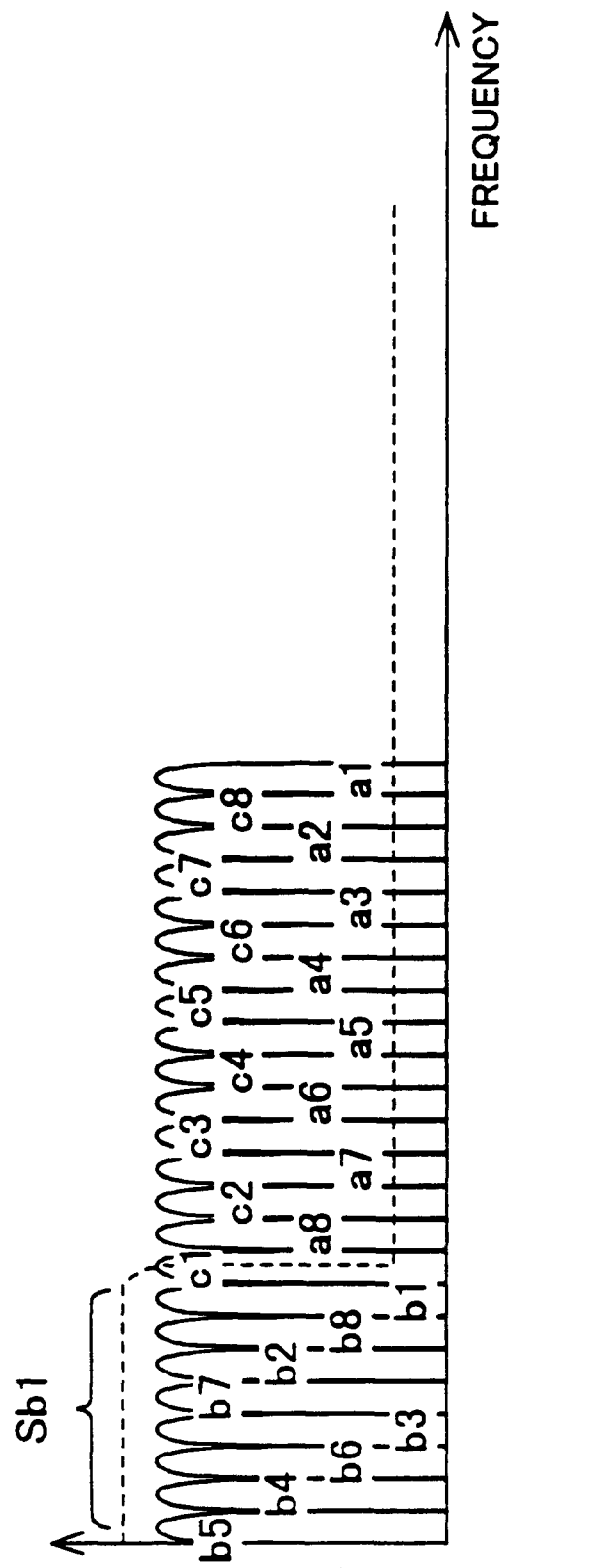
FIG. 58 is a diagram of frequency arrangement obtained after down-conversion of a second sub-band.
Figure 59:
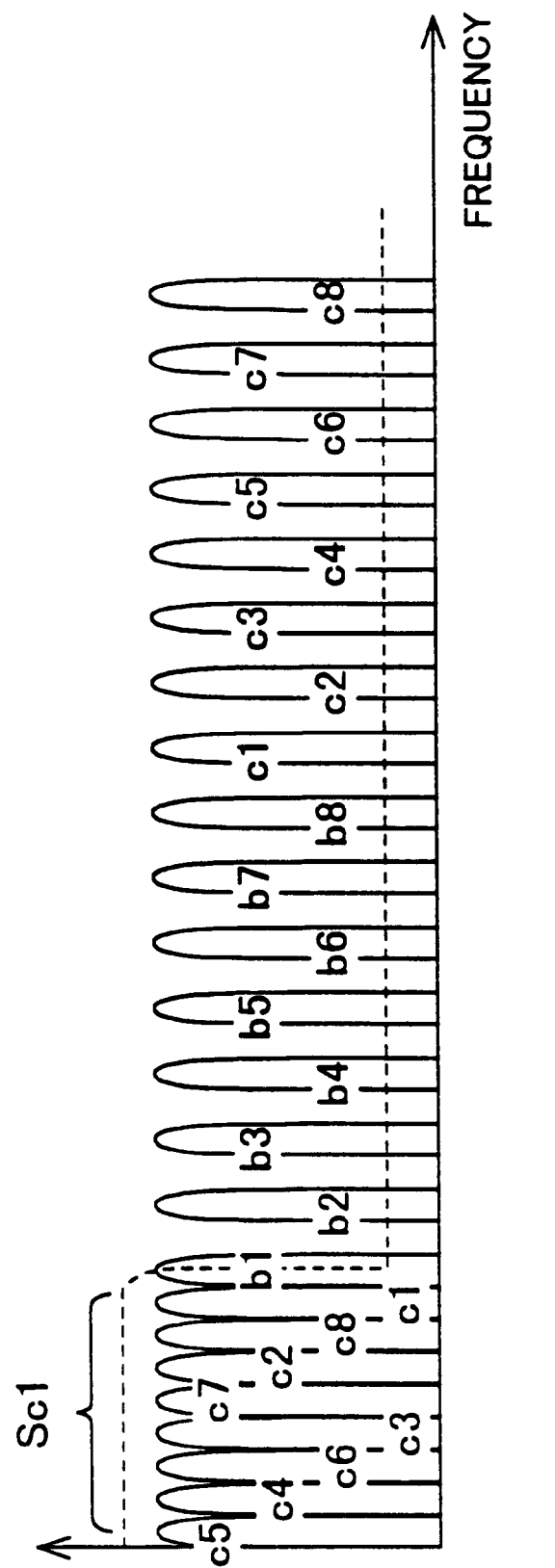
FIG. 59 is a diagram of frequency arrangement obtained after down-conversion of a third sub-band.

FIG. 57 shows the frequency arrangement obtained after the first sub-band Sa1 has been down-converted using the frequency fc_al, FIG. 58 shows the frequency arrangement obtained after the second sub-band Sb1 has been down-converted using the frequency fc_b1 and FIG. 59 shows the frequency arrangement obtained after the third sub-band Sc1 has been down-converted using the frequency fc_cl. In each of FIGS. 57 to 59, a broken line shows the frequency characteristics of the low-pass filter 1LFR. In each of FIGS. 57 to 59, signal components not greater than the frequency fc are turned back on the basis of the DC (0 Hz) point, but are arranged in gaps between frequencies not less than fc with the orthogonal relationship maintained. After down-conversion, a ½ band width of the sub-band is taken out by the low-pass filter 1LFR, amplified up to a predetermined level by the AGC amplifier 1AGC and then converted into a digital value by the A/D converter 1AD. After the digital signal level of frequency has been calculated by the DFT operation unit 1DFT and the window control unit 1WC, the reception frequencies are determined by the level judgment unit 1DT to obtain reception data dr.

Thus, according to the arrangement in FIG. 55, even in the environment where simultaneous communications are conducted with a plurality of sub-bands, frequencies in the sub-band around a specific frequency can be detected using a low sampling-rate discrete Fourier transform capable of processing a ½ band width of a sub-band. This can also be applied to the case where the number of sub-bands is 2 or not less than 4.

Figure 60:
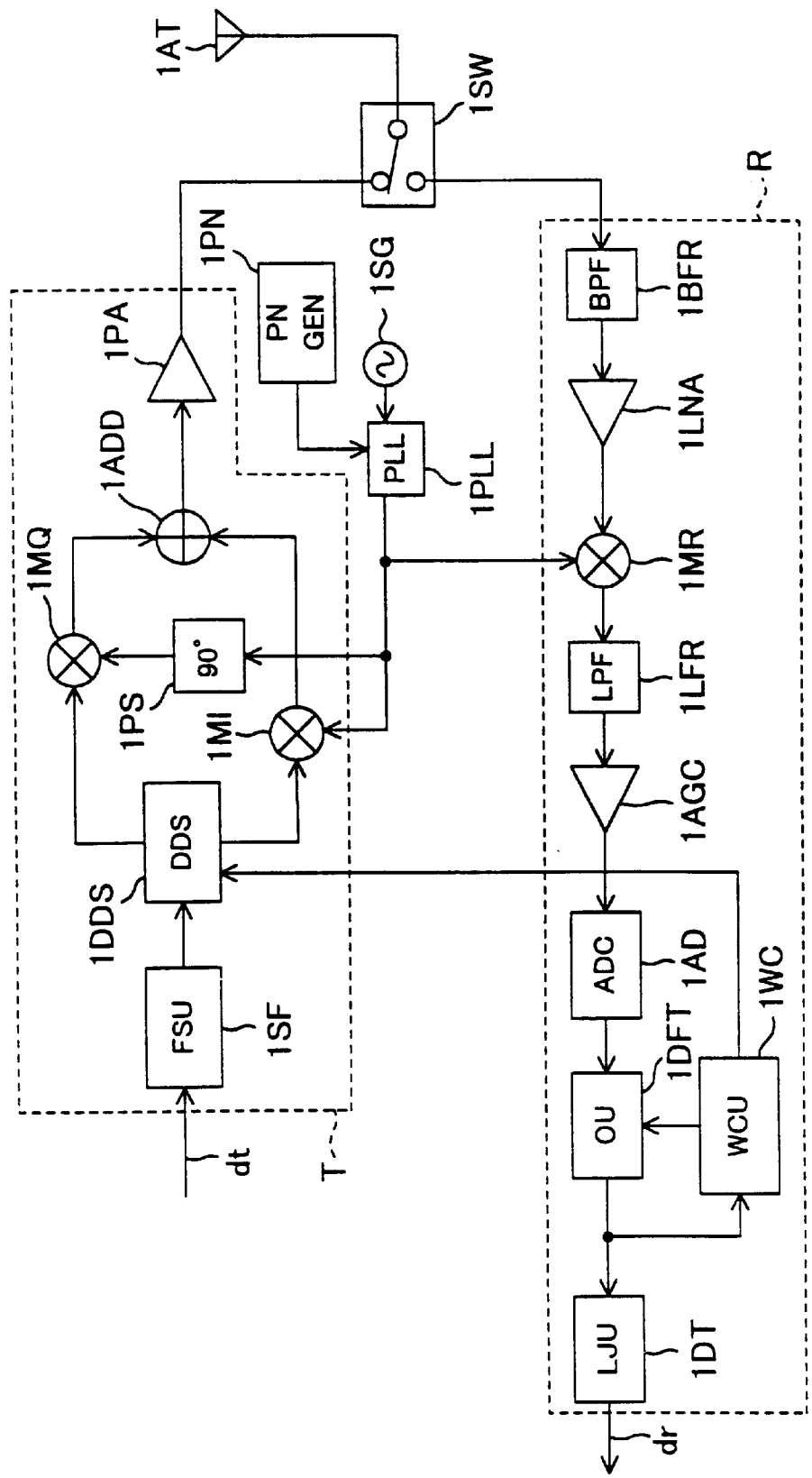
FIG. 60 is a block diagram illustrating a modification of the arrangement in FIG. 55.

FIG. 60 shows a modification of the arrangement in FIG. 55. In the arrangement in FIG. 60, there is used a reference oscillation unit composed of one oscillator 1SG, a phase locked loop circuit 1PLL and a PN generator 1PN. This arrangement achieves a low-speed hopping having an overlap of sub-bands. The operations of other units are the same as those in FIG. 55. More specifically, the digital communication apparatus in FIG. 60 is arranged to use an MFSK mode or a code multiplexing MFSK mode, using M consecutive carrier frequencies randomly selected per predetermined time interval L with M set to an integer not less than 4. Here, the time interval L is a value equal to the product of a period of one time slot T (=1/$\Delta f$) and a positive integer.

Figure 61:
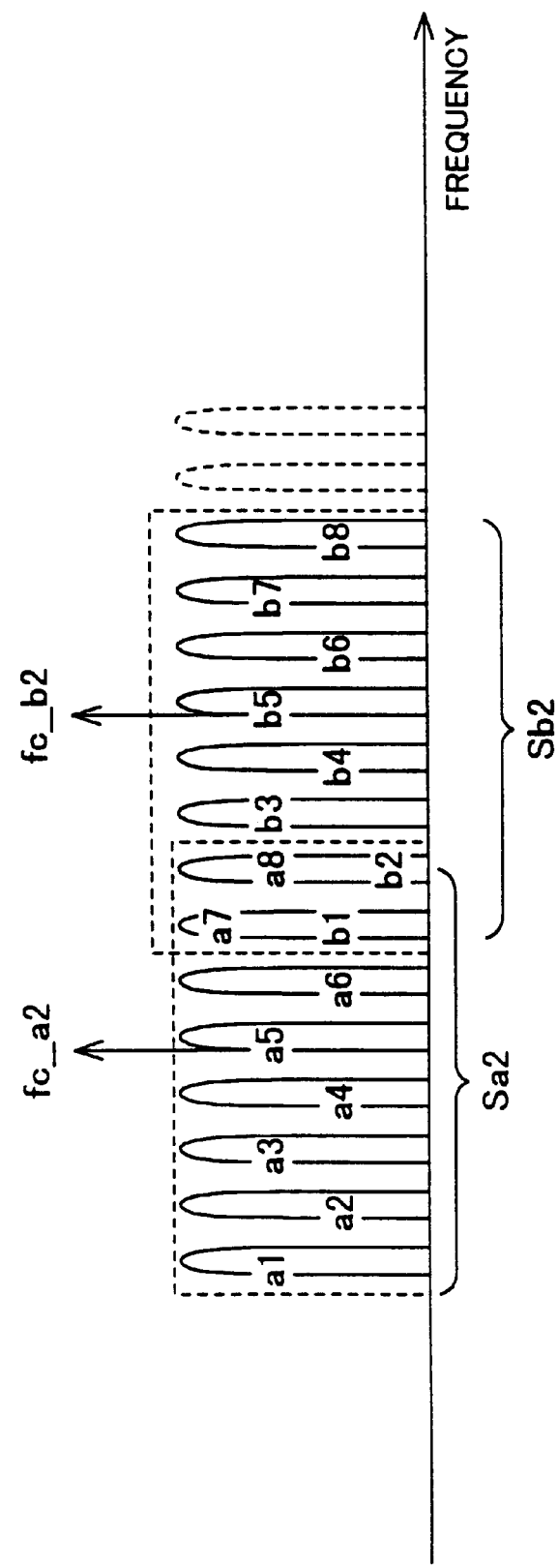
FIG. 61 is a diagram of frequency arrangement, at a certain time, of two sub-bands used in the digital communication apparatus in FIG. 60.

FIG. 61 shows the arrangement of frequencies of two sub-bands Sa2, Sb2, at certain time, used in the digital communication apparatus in FIG. 60 in which M is equal to 8 and eight consecutive carrier frequencies are to be randomly selected out of 16 carrier frequencies. The 16 carrier frequencies are orthogonally disposed at frequency intervals of 4×$\Delta f$.

Figure 62:
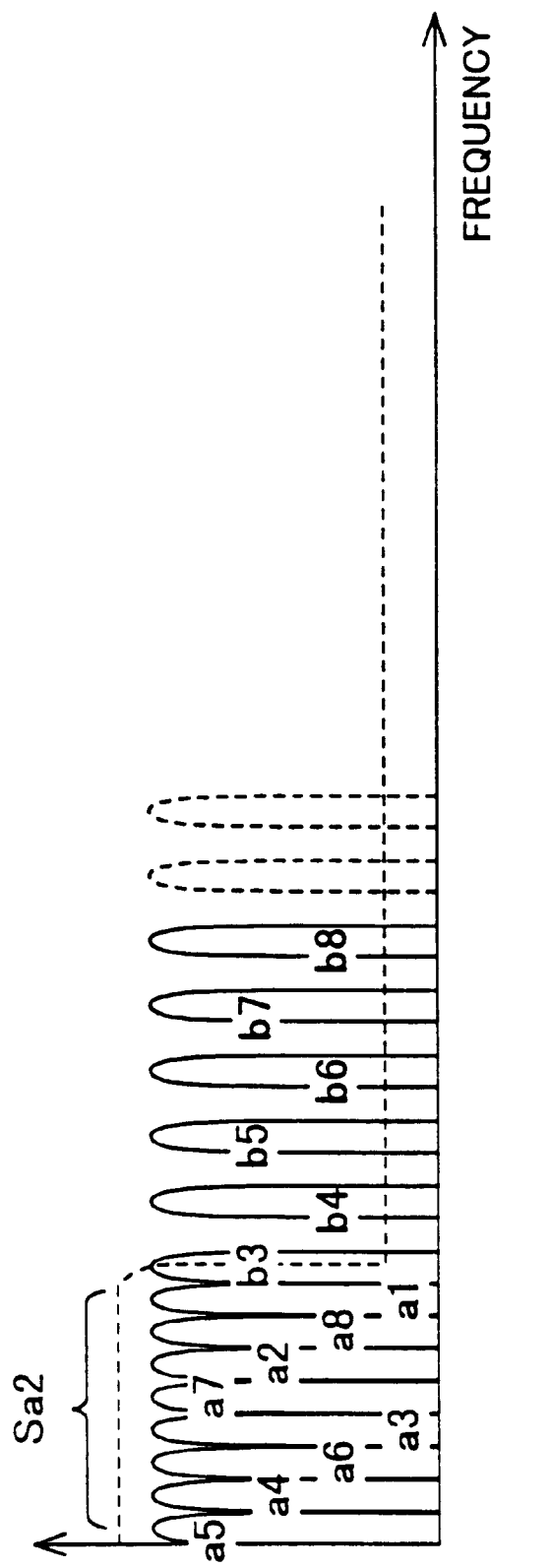
FIG. 62 is a diagram of frequency arrangement obtained after down-conversion of a first sub-band.
Figure 63:
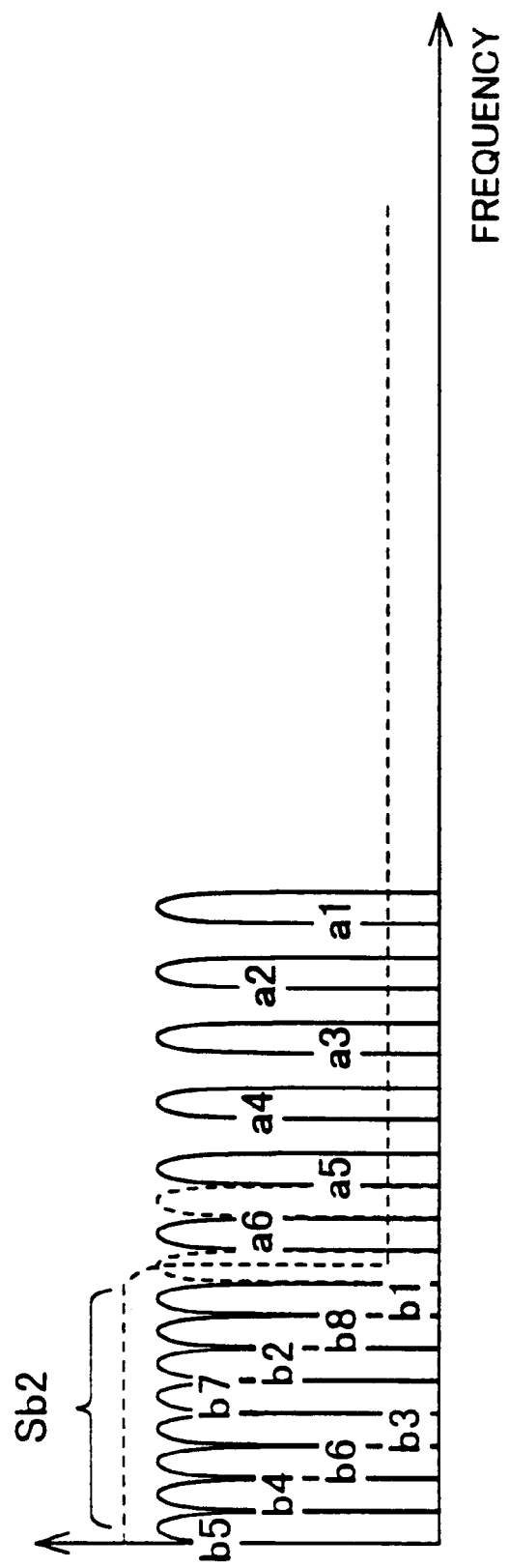
FIG. 63 is a diagram of frequency arrangement obtained after down-conversion of a second sub-band.

FIG. 62 shows the frequency arrangement obtained after the first sub-band Sa2 has been down-converted using the frequency fc_a2, and FIG. 63 shows the frequency arrangement obtained after the second sub-band Sb2 has been down-converted using the frequency fc_b2. In each of FIGS. 62 to 63, a broken line shows the frequency characteristics of the low-pass filter 1LFR.

According to the arrangement in FIG. 60, even in the environment where simultaneous communications are conducted with a plurality of sub-bands, frequencies in the sub-band around a desired frequency can be detected using a low sampling-rate discrete Fourier transform capable of processing a ½ band width of a sub-band. This can also be applied to the case where the number of sub-bands is not less than 3.

Figure 64:
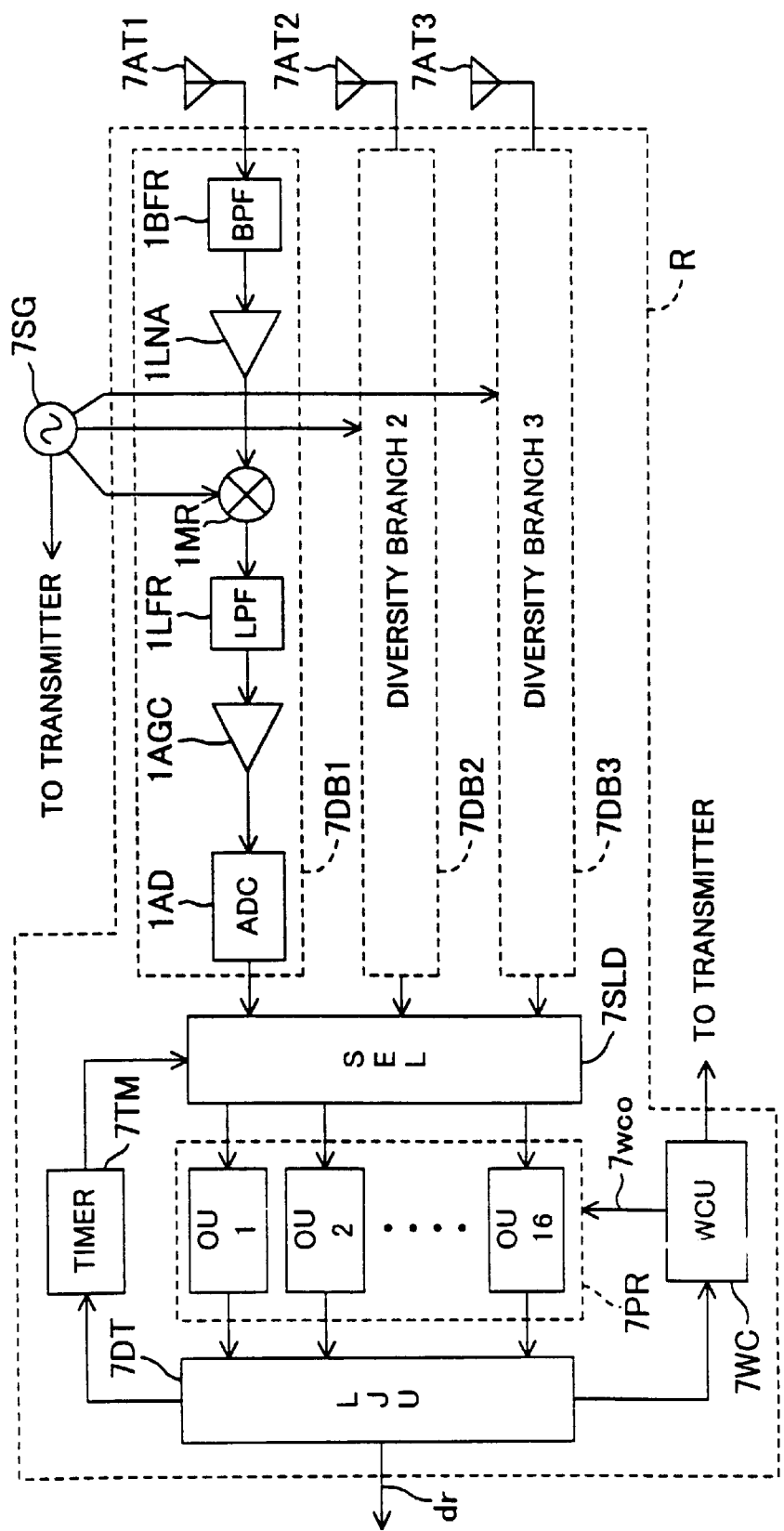
FIG. 64 is a block diagram illustrating a modification of the receiver in FIG. 55.

FIG. 64 shows a modification of the receiver R in FIG. 55 with M equal to 16. In FIG. 64, the reference oscillation unit in FIG. 55 is replaced with a single oscillator 7SG. That is, the number of the sub-bands is equal to 1. In FIG. 64, three antennas 7AT1, 7AT2, 7AT3 are disposed as spatially separated from one another such that the fading influences are independent from one another (without any correlation). The receiver R comprises diversity branches 7DB1, 7DB2, 7DB3, a selector 7SLD, a frequency detection unit 7PR having 16 processing units, a level judgment unit 7DT, a window control unit 7WC and a timer 7TM. Also shown in FIG. 64 is a time slot synchronizing signal 7wco. Each of the three diversity branches 7DB1, 7DB2, 7DB3 comprises a band-pass filter 1BFR, a low noise amplifier 1LNA, a mixer 1MR, a low-pass filter 1LFR, an AGC amplifier 1AGC and an A/D converter 1AD. These three diversity branches 7DB1, 7DB2, 7DB3 respectively down-convert in frequency the signals received from three spatially separated points to low frequency bands, thus supplying 3-sequence base band signals.

Figure 65:
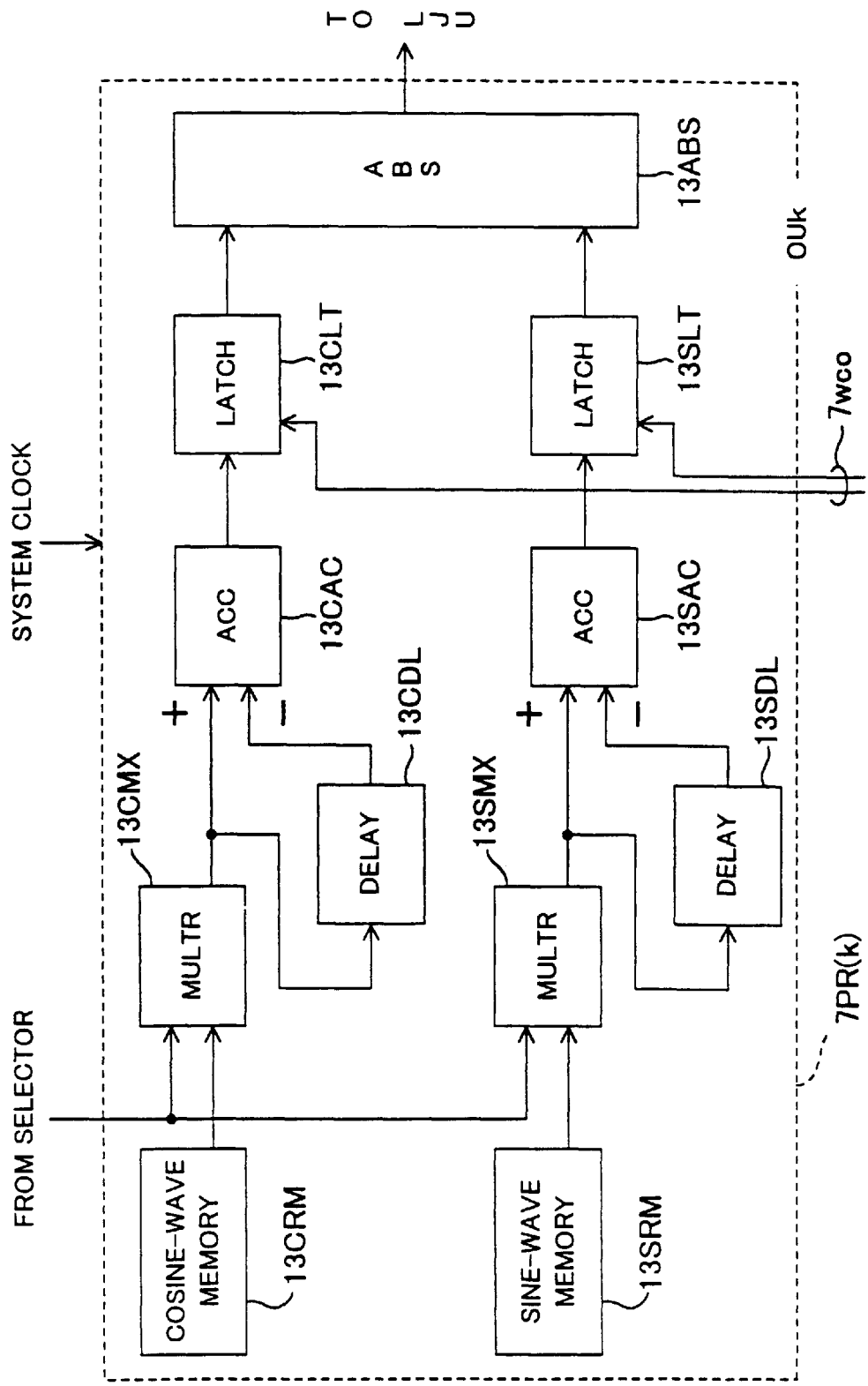
FIG. 65 is a block diagram illustrating in detail an example of the arrangement of one operation unit in FIG. 64.

FIG. 65 shows in detail an example of the arrangement of one operation unit in FIG. 64. The operation unit 7PR(k) in FIG. 65 comprises a cosine-wave memory 13CRM, a sine-wave memory 13SRM, multipliers 13CMX, 13SMX, accumulators 13CAC, 13SAC, delay units 13CDL, 13SDL, latches 13CLT, 13SLT and an absolute value operation unit 13ABS. According to the operation unit 7PR(k) having the arrangement above-mentioned, there are achieved both a correlation operation for the desired frequency out of the 16 frequencies and a signal intensity calculation using the result of the correlation operation. That is, there are accumulated complex correlation values for one time slot between the base band signal after A/D conversion from the selector 7SLD and the cosine and sine waves of the desired frequency. Based on the accumulated 2-sequence components, the signal intensity is calculated by an operation of the absolute values of complex numbers.

Figure 66A:
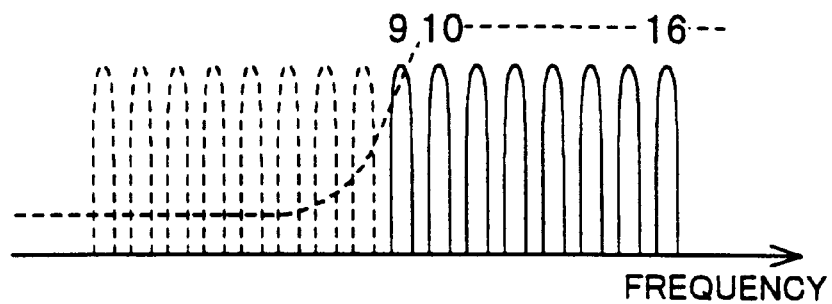
FIGS. 66A, 66B and 66C show frequencies received under the influence of fading in the diversity branches in FIG. 64.
Figure 66B:
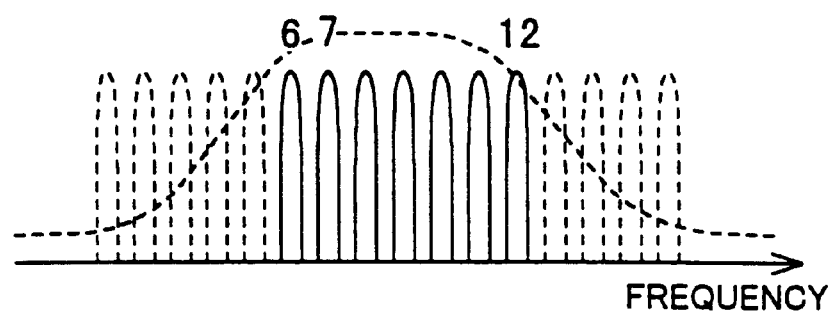
Figure 66C:
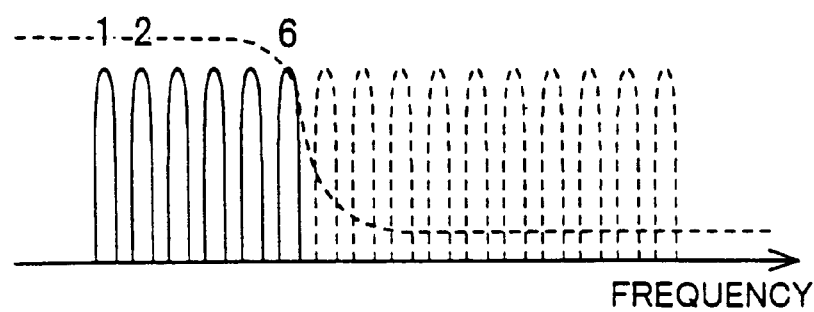

FIGS. 66A, 66B and 66C show the frequencies received by the three diversity branches 7DB1, 7DB2, 7DB3 under the influence of fading. The broken line in FIG. 66A shows the reception characteristics of the first diversity branch 7DB1, the broken line in FIG. 66B shows the reception characteristics of the second diversity branch 7DB2 and the broken line in FIG. 66C shows the reception characteristics of the third diversity branch 7DB3. The frequency detection unit 7PR formed of 16 operation units, calculates the frequency levels for the first diversity branch 7DB1. In FIG. 66A, the first to eighth frequencies cannot be received due to fading influence. Accordingly, through the selector 7SLD, the timer 7TM changes the assignment of a diversity branch to operation units in each of which no frequency has been detected in a determined period of time. That is, the second diversity branch 7DB2 is assigned to the first to eighth operation units. In FIG. 66B, the sixth to eighth frequencies can be received by the second diversity branch 7DB2, but the first to fifth frequencies cannot be received due to fading influence. Through the selector 7SLD, the timer 7TM assigns the third diversity branch 7DB3 to the first to fifth operation units after a subsequent predetermined period of time. This enables the first to fifth frequencies to be received by the third diversity branch 7DB3 as shown in FIG. 66C.

As discussed in the foregoing, the arrangement in FIG. 64 enables frequencies to be received with no fading influence exerted to each operation unit. When two or more diversity branches are disposed, similar effects can be produced. When the oscillator 7SG is replaced with a reference oscillation unit in FIG. 55 or 60, similar effects can also be produced even with a plurality of sub-bands. When fading varies relatively at high speed, the switching period of time of the timer 7TM may be shortened.

Figure 67:
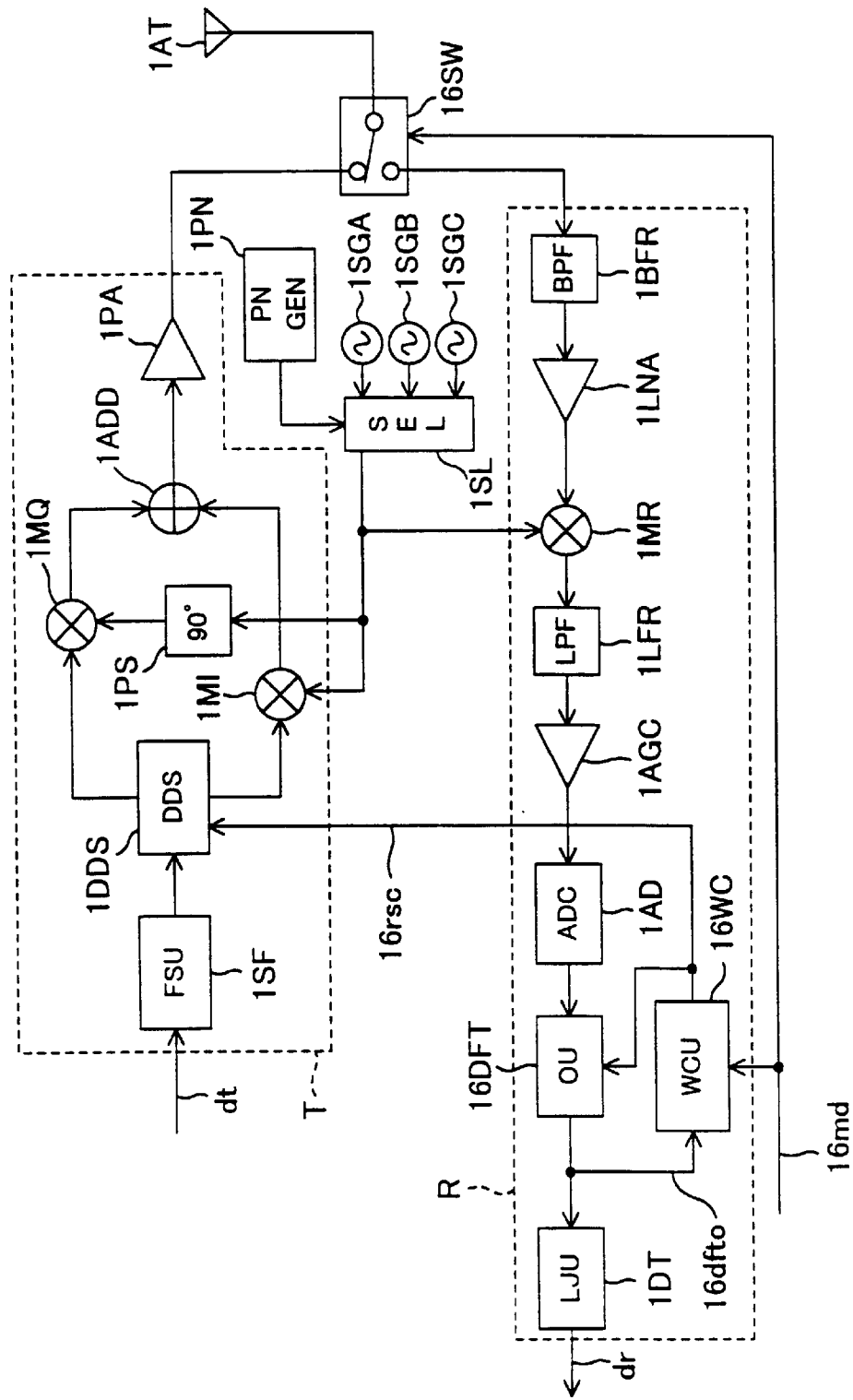
FIG. 67 is a block diagram illustrating a modification of the arrangement in FIG. 55.

FIG. 67 shows a digital communication apparatus to be used for a digital communication system in which a plurality of digital communication apparatus share a time slot and in which a half-duplex data communication is made using an MFSK mode or a code multiplexing MFSK mode. This digital communication apparatus is characterized in that a regenerative synchronizing signal is generated for a synchronous control of the time slot by a feedback control, in the reception mode, based on the detected phase error and by a feedforward control, in the transmission mode, based on the phase error stored immediately before the start of transmission. Shown in FIG. 67 are an antenna switch 16SW, a DFT operation unit 16DFT, a window control unit 16WC, a mode control signal 16md for transmission/reception changeover, a DFT operation unit output 16dfto and a regenerative synchronizing signal 16rsc. The antenna 1AT is commonly used in both the transmission and reception modes through the antenna switch 16SW, and used in time division according to the mode control signal 16md. The regenerative synchronizing signal 16rsc from the window control unit 16WC is used for controlling the digital direct synthesizer 1DDS in the transmitter T and the DFT operation unit 16DFT in the receiver R such that the synthesizer 1DDS and the unit 16DFT are operated in synchronism with the time slot.

Figure 68:
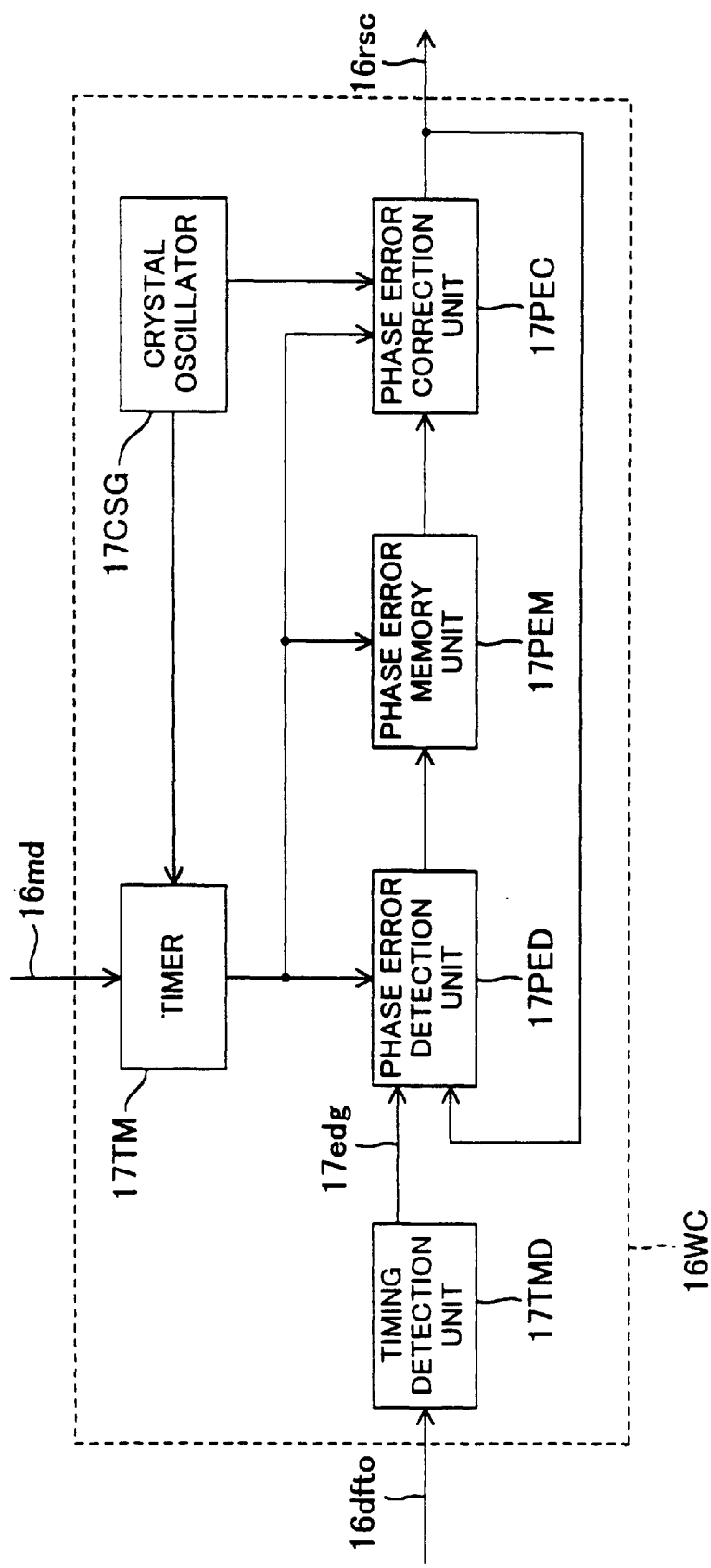
FIG. 68 is a block diagram illustrating in detail an example of the arrangement of the window control unit in FIG. 67.

FIG. 68 shows in detail an example of the arrangement of the window control unit 16WC in FIG. 67. Shown in FIG. 68 are a timing detection unit 17TMD, a phase error detection unit 17PED, a timer 17TM, a phase error memory unit 17PEM, a crystal oscillator 17CSG, a phase error correction unit 17PEC and a time slot edge information 17edg.

When the mode control signal 16md is negated, the timing detection unit 17TMD takes out, from the DFT operation unit output 16dfto, the time slot edge information 17edg which undergoes a momentary change (presenting a jitter). The phase error detection unit 17PED detects a time-average phase error between the current regenerative synchronizing signal 16rsc and the timing detection unit output 17edg. In the phase error memory unit 17PEM, the phase error thus detected is stored as rewritten at predetermined time intervals. The timer 17TM controls the phase error correction unit 17PEC such that the regenerative synchronizing signal 16rsc is feedbacked to the phase error detection unit 17PED at predetermined time intervals on the basis of an output of the crystal oscillator 17CSG.

Figure 69:
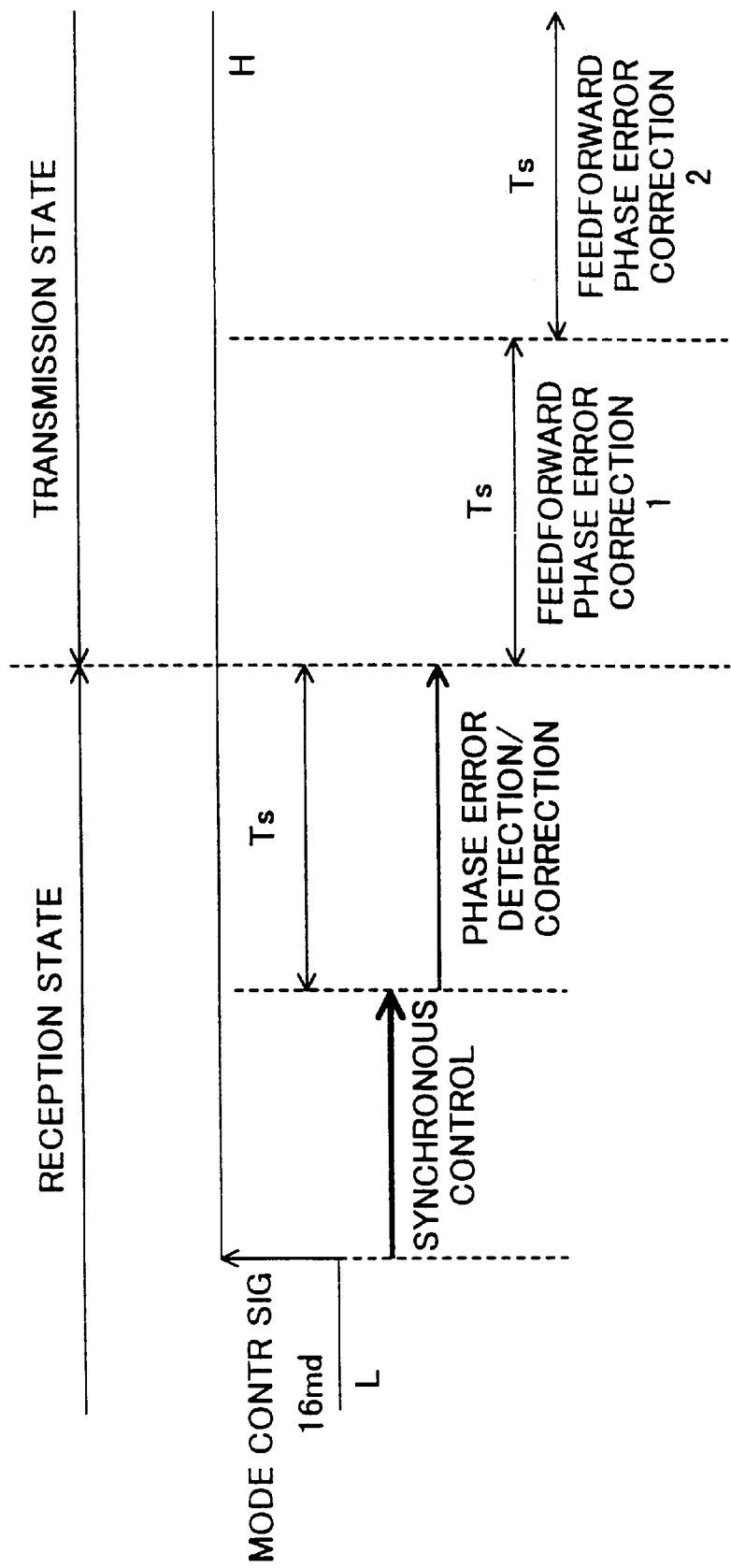
FIG. 69 is a diagram of operational timing of the window control unit in FIG. 68.

FIG. 69 shows the timing chart of the operations of the window control unit 16WC when the mode control signal 16md is asserted. When the mode control signal 16md is asserted from the LOW level to the HIGH level, the timer 17TM controls the phase error detection unit 17PED such that there is calculated the latest offset phase error generated in a predetermined period of time Ts after the phase error has been corrected. The phase error thus calculated is stored as a reference phase error in the phase error memory unit 17PEM, and then held in a unrewritable manner. In the transmission mode, the timer 17TM causes the phase error correction unit 17PEC to feedforward-control, per period of time Ts, the correction of the constant reference phase error. When the mode control signal 16md is negated and the digital communication apparatus is returned to the reception mode, the apparatus is returned to the feedback-control of the regenerative synchronizing signal 16rsc.

As discussed in the foregoing, according to the arrangement in FIG. 67, it is possible to maintain a network synchronization at the time when there is made, using the common antenna, a code division multiple access (CDMA) as done in an FH-MFSK mode in the same frequency band.

Figure 70:
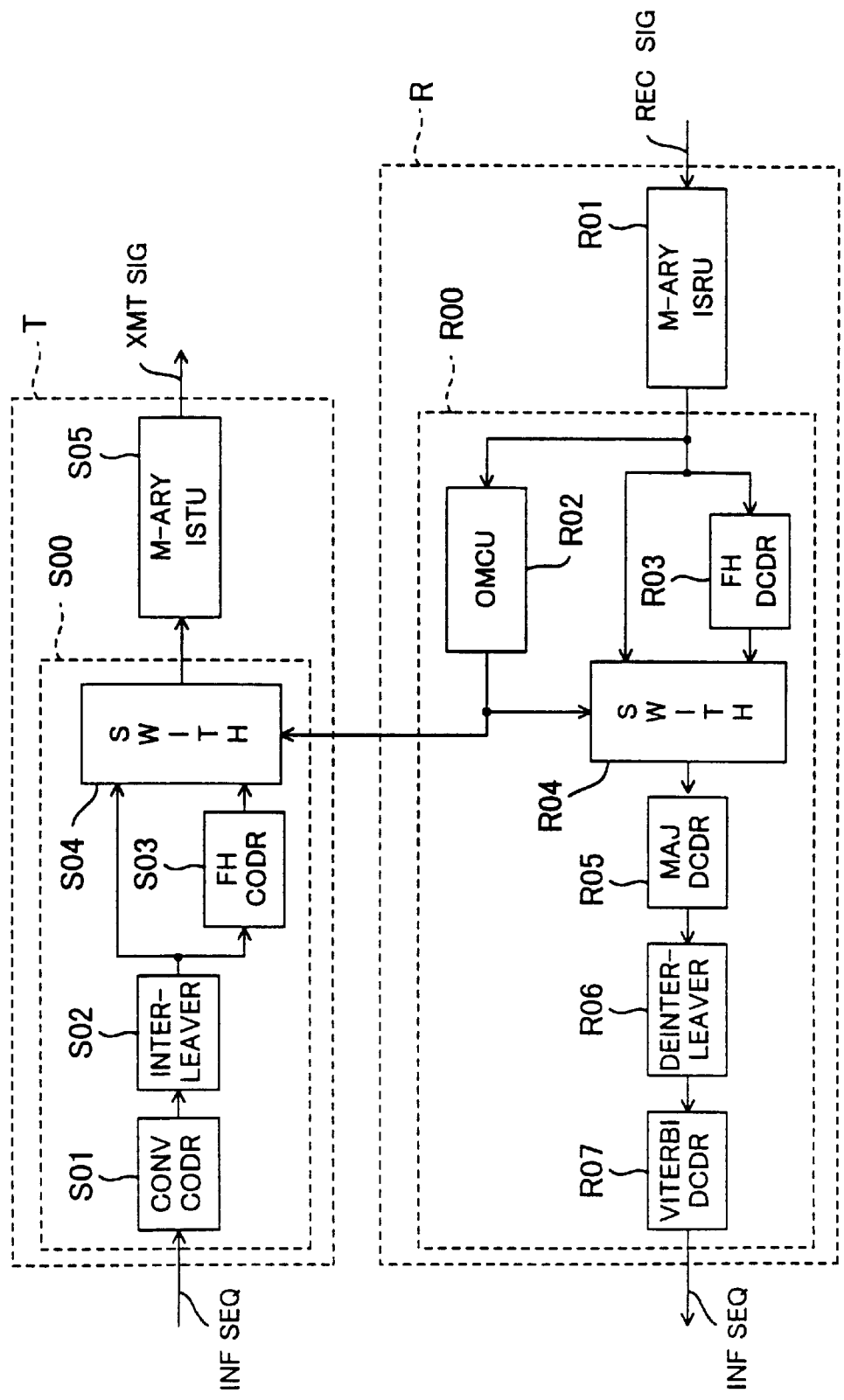
FIG. 70 is a block diagram illustrating an example of the arrangement of the digital communication apparatus according to the present invention.

FIG. 70 shows an example of the arrangement of the digital communication apparatus according to the present invention. In FIG. 70, the transmitter T comprises a coding unit S00, a convolutional coder S01, an interleaver S02, an FH coder S03, a switching unit S04 and an M-ary independent signal transmission unit S05. The receiver R in FIG. 70 comprises a decoding unit R00, an M-ary independent signal reception unit R01, an operational mode control unit R02, an FH decoder R03, a switching unit R04, a majority decoder R05, a deinterleaver R06 and a Viterbi decoder R07.

In the transmitter T, the convolutional coder S01 supplies, to the interleaver S02, a convolutional code sequence according to an entered information sequence. The convolutional coder S01 and the interleaver S02 give, to the input information sequence, invulnerability to random errors and burst errors. An interleave sequence supplied by the interleaver S02 is given to the FH coder S03 and the switching unit S04. The FH coder S03 causes the interleave sequence to be coded using a multiplexing code such that one word is extended to L words. Here, it is noted that M is an integer not less than 2 and L is an integer not greater than M. An FH code sequence supplied by the FH coder S03 is given to the switching unit S04. The switching unit S04 selects, as a transmission sequence, the FH code sequence when the switching signal supplied from the operational mode control unit R02 so instructs as to execute an FH coding, and the interleave sequence when the switching signal instructs otherwise. The M-ary independent signal transmission unit S05 supplies, per time slot, a transmission signal containing, out of mutually independent M frequency components, one frequency component corresponding to the transmission sequence (M-ary sequence) supplied from the switching unit S04.

In the receiver R, the M-ary independent signal reception unit R01 supplies, as a threshold judgment pattern, the results obtained by conducting a threshold judgment on the intensity values of the M frequency components of the reception signal. The threshold judgment pattern is given to the operational mode control unit R02, the FH decoder R03 and the switching unit R04. The operational mode control unit R02 judges the multiplicity based on the threshold judgment pattern, and supplies a switching signal for instructing to execute an FH coding/decoding when the multiplicity is not less than 2, and a switching signal for instructing not to execute the FH coding/decoding when the multiplicity is equal to 1. The FH decoder R03 decodes the threshold judgment pattern using a multiplexing code, and supplies the decoding result as an FH decoding pattern. The switching unit R04 selects the FH decoding pattern when the switching signal instructs to execute the FH decoding, and the threshold judgment pattern when the switching signal instructs not to execute the FH decoding. The majority decoder R05 executes a majority judgment of each of the bits of the pattern selected by the switching unit R04, and determines one word out of M different candidate words, which is then supplied as a majority decoding sequence. The deinterleaver R06 supplies, as a deinterleave sequence, the result of interleave release of the majority decoding sequence. The Viterbi decoder R07 supplies, as an information sequence, the result of error correction of the deinterleave sequence.

Figure 71:
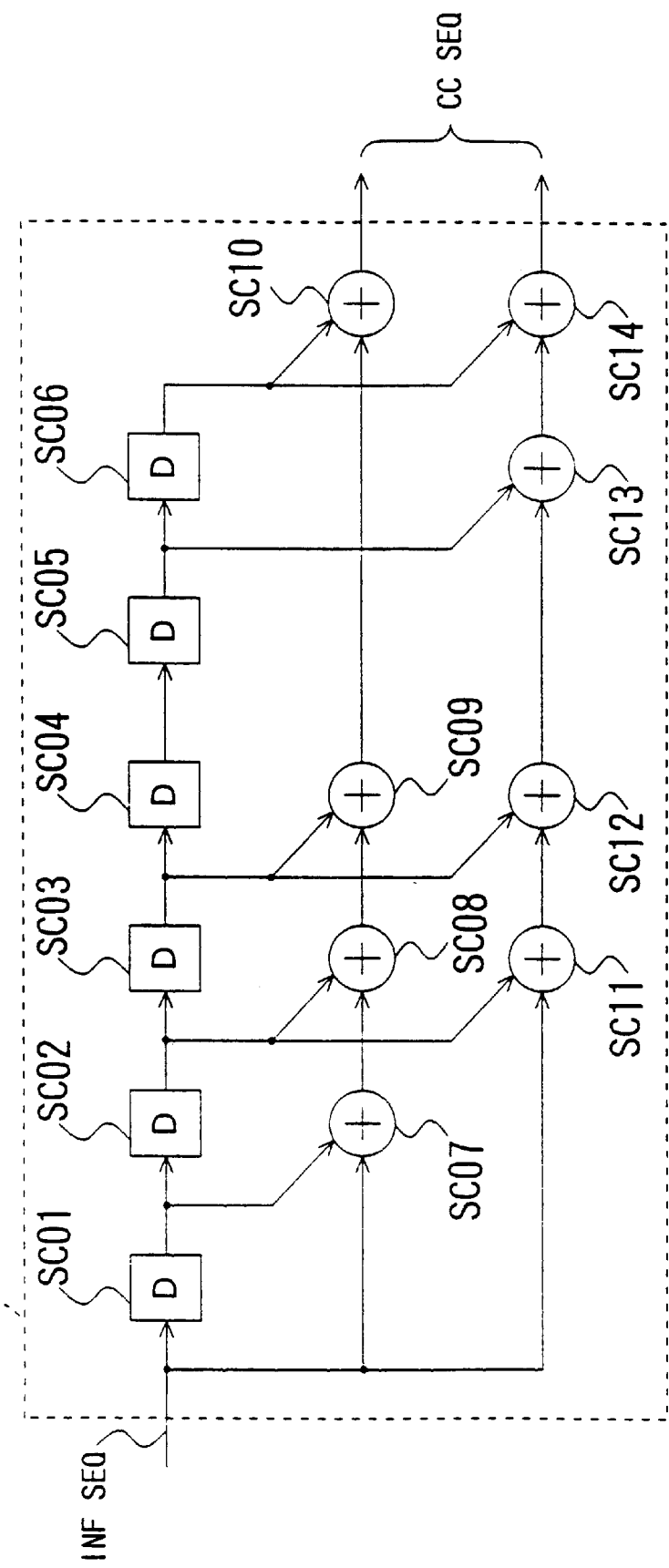
FIG. 71 is a block diagram showing in detail an arrangement of the convolutional coder in FIG. 70.

FIG. 71 shows in detail an example of the arrangement of the convolutional coder S01 in FIG. 70 in which the coding rate is set to ½ and the constraint length is set to 7. In FIG. 71, there are disposed delay units SC01 to SC06 and adders SC07 to SC14 for calculating an exclusive OR. The convolutional coder S01 codes a given information sequence by convoluting, using the adders SC07 to SC14, past information sequences stored in the delay units SC01 to SC06, and then supplies the coded result as a convolutional code sequence.

Figure 72A:
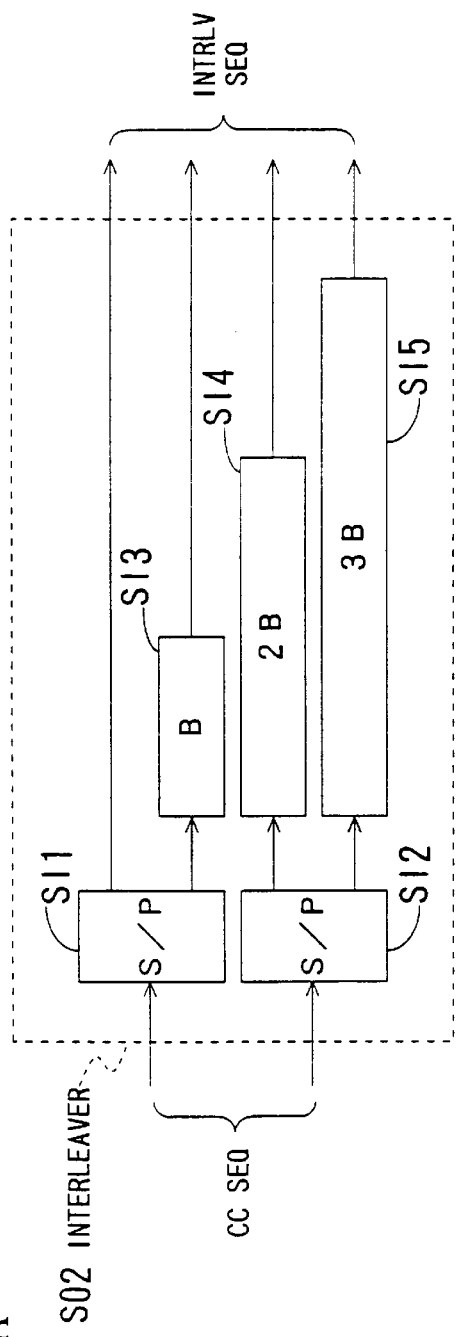
FIGS. 72A and 72B are block diagrams respectively illustrating in detail the arrangements of the interleaver and the deinterleaver in FIG. 70.
Figure 72B:
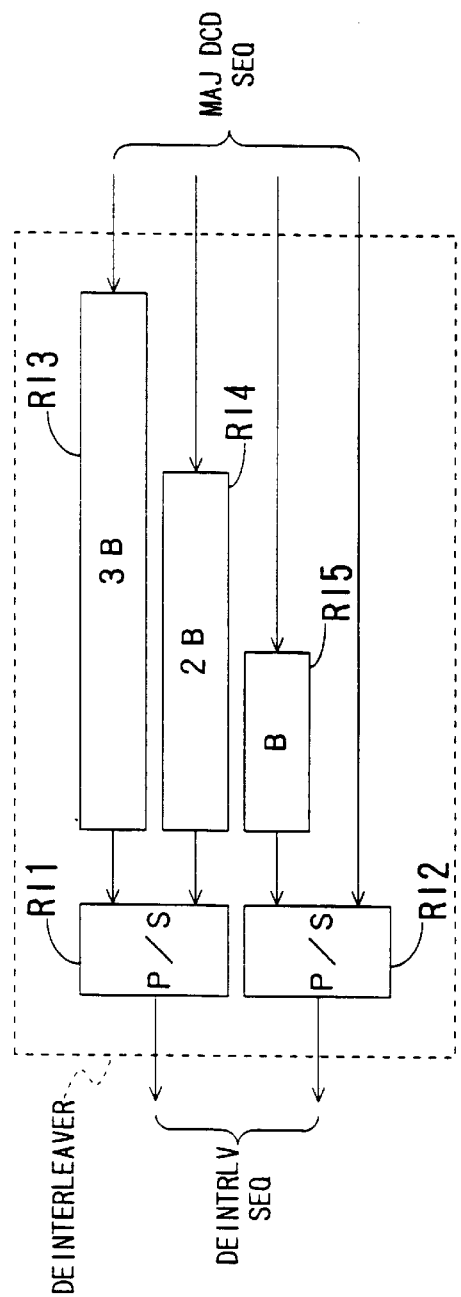

FIG. 72A and FIG. 72B respectively show in detail examples of the arrangements of the interleaver S02 and the deinterleaver R06 in FIG. 70. Shown in FIG. 72 are serial-to-parallel converters SI1 to SI2, parallel-to-serial converters RI1 to RI2, shift registers SI3, RI5 each having a length of B, shift registers SI4, RI4 having a length of 2B and shift registers SI5, RI3 having a length of 3B. It is noted that B is a positive integer. In the interleaver S02, a convolutional code sequence entered in 2-bit parallel is converted, by the serial-to-parallel converters SI1, SI2, into a 4-bit parallel sequence, which passes through the shift registers SI3, SI4, SI5 respectively having different lengths. This causes the respective bits to be arranged as dispersed in a time direction, thus forming an interleave sequence. In the deinterleaver R06, a given majority decoding sequence is passed through the shift registers RI3, RI4, RI5 disposed in the reverse order with respect to the shift registers in the interleaver S02 such that the respective bits dispersed in the time direction are returned back, and two-bit data are converted into serial data by the parallel-to-serial converters RI1, RI2, thus forming a 2-bit parallel deinterleave sequence. The value of B is set such that errors in the transmission line are sufficiently dispersed in the time direction. As the set value of B is greater, the invulnerability to burst error is stronger.

Figure 73A:
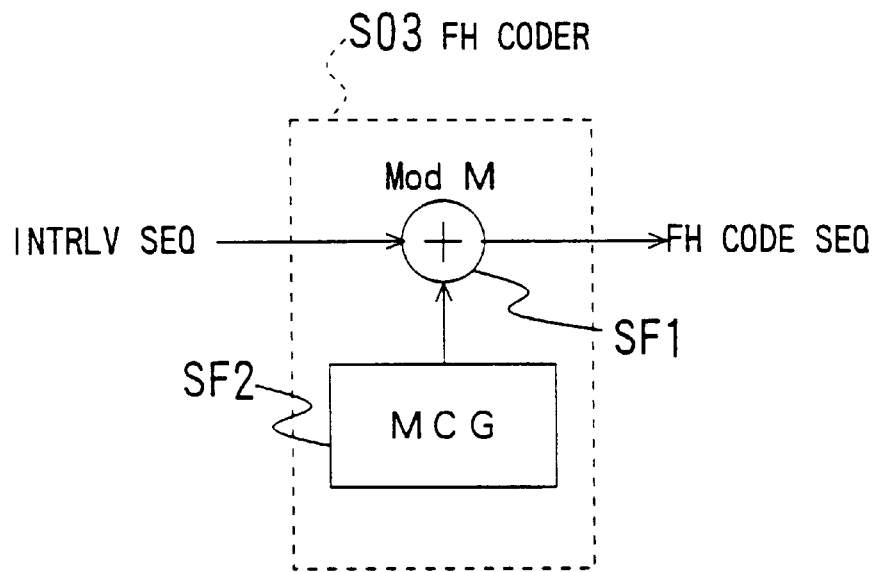
FIGS. 73A and 73B are block diagrams respectively illustrating in detail the arrangements of the FH coder and the FH decoder in FIG. 70.
Figure 73B:
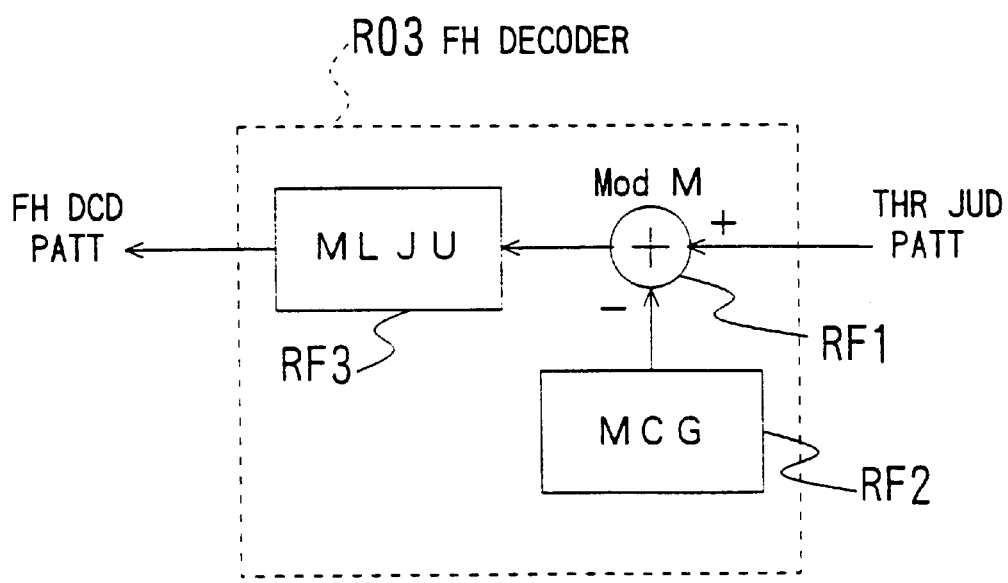

FIG. 73A and FIG. 73B respectively show in detail examples of the arrangements of the FH coder S03 and the FH decoder R03 in FIG. 70. Shown in FIG. 70 are an adder SF1 modulo M, a subtracter RF1 modulo M, multiplexing code generators SF2, RF2 and a majority logic judgment unit RF3. In the FH coder S03 in FIG. 73A, the adder SF1 executes addition modulo M on the interleave sequence and the multiplexing code supplied from the multiplexing code generator SF2, and the addition result is supplied as the FH code sequence. This causes one word of the interleave sequence to be divided into L time elements such that L time elements are randomly spread in the level direction. In the FH decoder R03 in FIG. 73B, the subtracter RF1 subtracts (inversely spreads) the multiplexing code supplied from the multiplexing code generator RF2, from each of the level values of the threshold judgment pattern, and supplies the subtraction results to the majority logic judgment unit RF3. Based on the output of the subtracter RF1, the majority logic judgment unit RF3 judges the level value containing the most numerous time elements as a proper level value, and then supplies the judgment result as the FH decoding pattern.

Figures 74A, 74B, 74C:
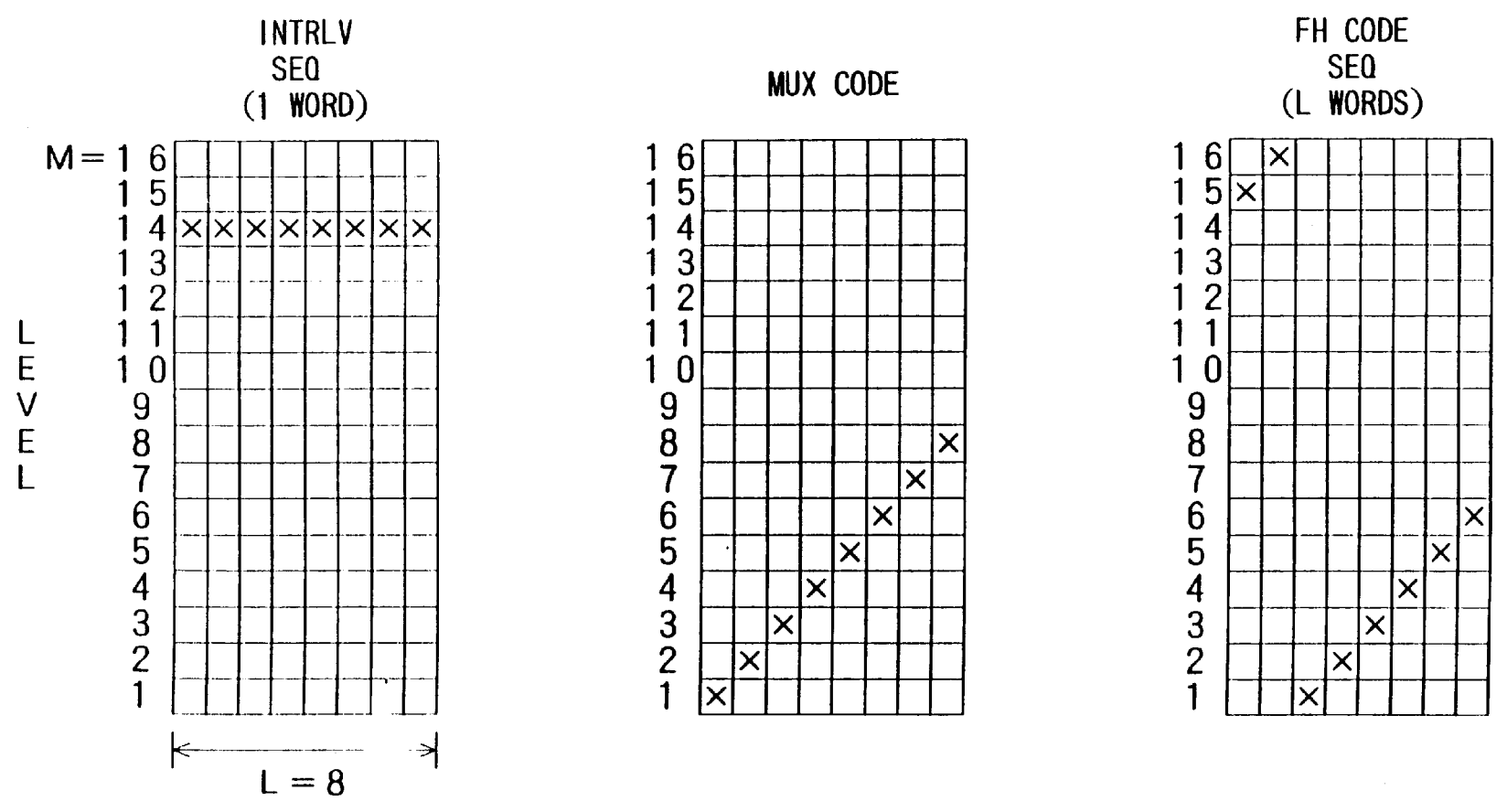

FIGS. 74A, 74B, 74C respectively show examples of the interleave sequence matrix, multiplexing code matrix and FH code sequence matrix in the FH coder S03 in FIG. 73A. FIGS. 75A, 75B, 75C, 75D respectively show examples of the threshold judgment pattern matrix, multiplexing code matrix, judgment matrix and FH decoding pattern matrix in the FH decoder R03 in FIG. 73B. The judgment matrix in FIG. 75C represents an output of the subtracter RF1. In FIGS. 74 and 75, crosses show the level values per word of each sequence when M is equal to 16 and L is equal to 8, and circles show the level values of an undesired sequence resulting from other user in the FH decoder R03. The threshold judgment pattern matrix in FIG. 75A contains both the level values of the desired sequence (crosses) and the level values of the undesired sequence (circles). However, the inverse spread causes the desired sequence to be arranged in a line of a specific level and causes the undesired sequence to be randomly dispersed in the level direction as shown in the judgment matrix in FIG. 75C. Accordingly, there is obtained, by the majority logic judgment unit RF3, the FH decoding pattern containing only the desired sequence as shown in FIG. 75D. In the threshold judgment pattern, however, a level value which is not to be present, is generated due to noise or a spurious response, and a level value which is to be present, is erased due to miss detection. In this connection, there are instances where the result of majority judgment is erroneous or where a majority judgment itself cannot be made (where there are present a plurality of level values each of which contains the most numerous elements). When an error takes place, the Viterbi decoder R07 in FIG. 70 executes an error correction. When the majority judgment itself cannot be made, all the level values each containing the most numerous elements are supplied and a majority judgment is made on each bit by the majority decoder R05 in FIG. 70.

Figure 76A:
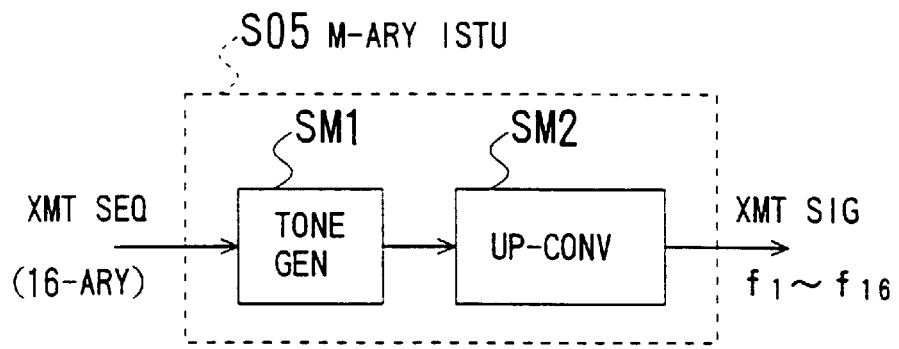
FIGS. 76A and 76B are block diagrams respectively illustrating in detail the arrangements of the M-ary independent signal transmission unit and the M-ary independent signal reception unit in FIG. 70.
Figure 76B:
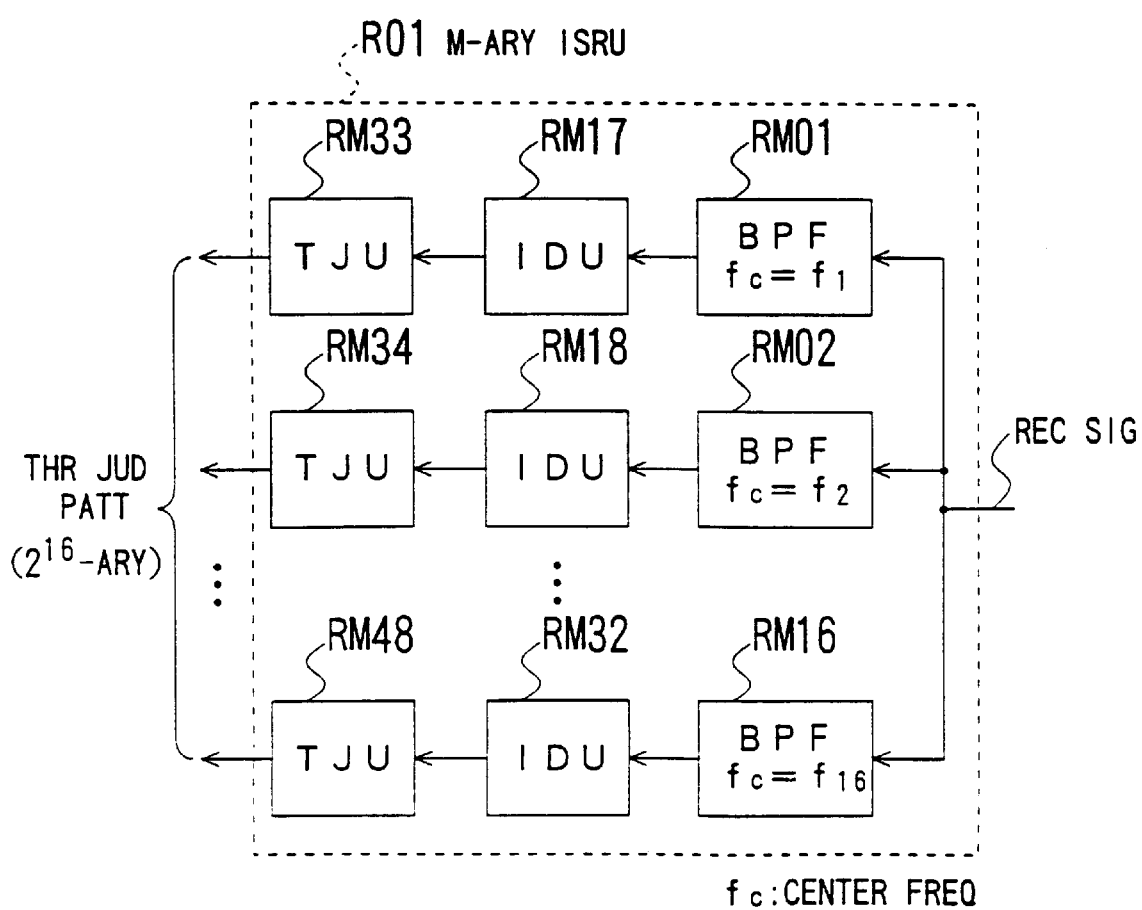

FIGS. 76A and 76B respectively show in detail examples (M=16) of the arrangements of the M-ary independent signal transmission unit S05 and the M-ary independent signal reception unit R01 in FIG. 70. Shown in FIGS. 76A and 76B are a tone generator SM1, an up-converter SM2, band pass filters RM01 to RM16 respectively having center frequencies f1 to f16, intensity detectors RM17 to RM32 and threshold judgment units RM33 to RM48. The M-ary independent signal transmission unit S05 executes an MFSK modulation on a hexadecimal transmission sequence, and the M-ary independent signal reception unit R01 executes an MFSK demodulation on a reception signal. In the M-ary independent signal transmission unit S05, the tone generator SM1 generates frequency tones for the word values of a given transmission sequence, and the up-converter SM2 pulls the frequency tones up to the desired band, which is then supplied as a transmission signal. In the M-ary independent signal reception unit R01, the band pass filters RM01 to RM16 take out frequency components f1 to f16 from the reception signal. The intensity detectors RM17 to RM32 detect the signal intensities of the frequency components. The threshold judgment units RM33 to RM48 make a threshold judgment on the signal intensities and supply the results as a $2^{16}$-ary threshold judgment pattern. The value of each of the bits of the threshold judgment pattern is set to 1 when the signal intensity exceeds the threshold value, and to 0 otherwise. The threshold judgment pattern contains the desired sequence transmitted from the desired user and an undesired sequence transmitted from other user.

Figure 77:
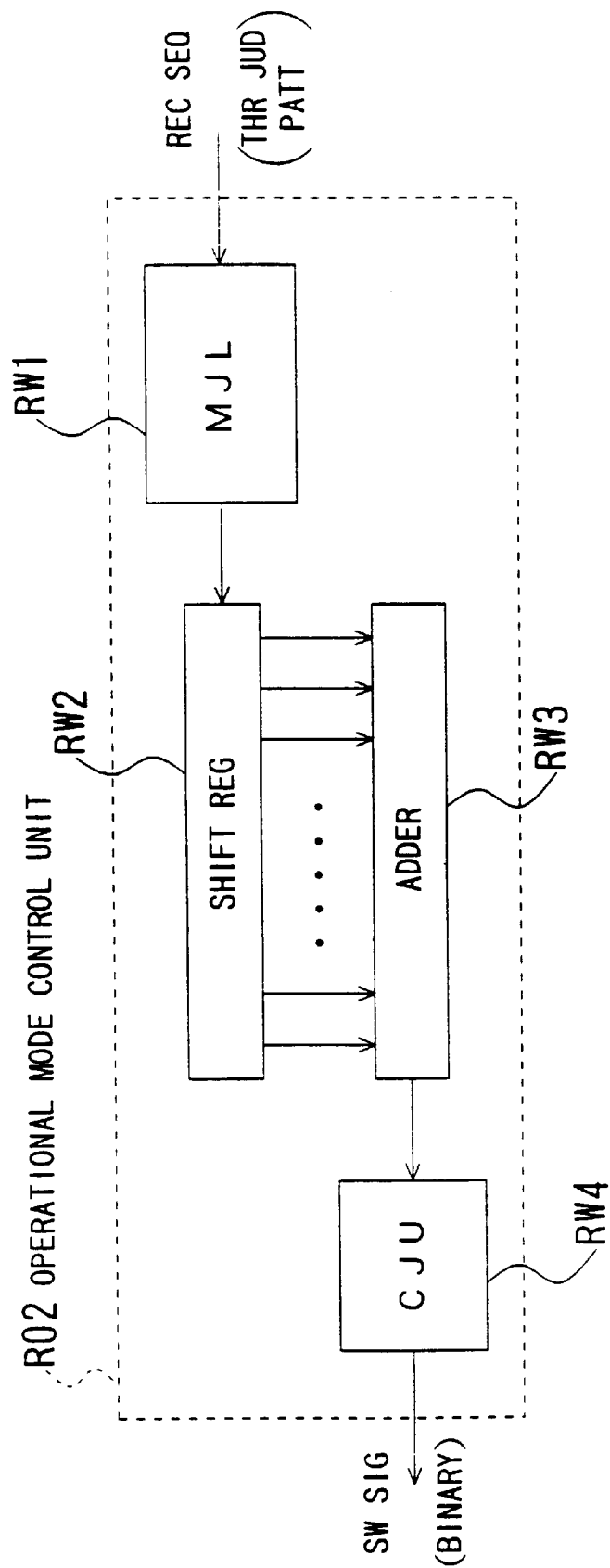
FIG. 77 is a block diagram illustrating in detail an example of the arrangement of the operational mode control circuit in FIG. 70.

FIG. 77 shows in detail an example of the arrangement of the operational mode control unit R02 in FIG. 70. Shown in FIG. 77 are a multiplicity judgment logic RW1, a shift register RW2, an adder RW3 and a changeover judgment unit RW4. The operational mode control unit R02 in FIG. 77 makes a judgment based on the threshold judgment pattern whether the multiplicity is singular or plural, and supplies a binary switching signal to be entered into the two switching units S04, R04 in FIG. 70. More specifically, the multiplicity judgment logic RW1 supplies a logical value of "0" when the Hamming weight of the threshold judgment pattern (the number of bits each presenting a value 1) is equal to 0 or 1, and a logical value of "1" when the Hamming weight is not less than 2. The logical value "0" represents that the multiplicity is singular, while the logical value "1" represents the multiplicity is plural. However, there are instances where the multiplicity here displayed is not accurate due to noise or a spurious response. Such an error often appears in the form of subtle variations. To remove such variations to enhance the reliability of operational mode control, the operational mode control unit R02 in FIG. 77 is so arranged as to adopt, out of two (singular and plural) judgement values of multiplicity, the judgment value of multiplicity for which the number of judgment times is larger. In this connection, the shift register RW2 successively delays the logical value supplied from the multiplicity judgment logic RW1 and supplies, to the adder RW3, the result as an n-bit parallel sequence. It is noted that n is an odd number not less than 3. The adder RW3 calculates the Hamming weight of the n-bit parallel sequence. The changeover judgment unit RW4 judges which is larger, the result of the adder RW3 or the integer n/2. Then, the changeover judgment unit RW4 supplies, as a switching signal, the logical value "0" when the logical value "0" appears more often than the logical value "1", in the n logical values obtained through the past n judgments, and the logical value "1" when the logical value "1" appears more often.

Figure 78:
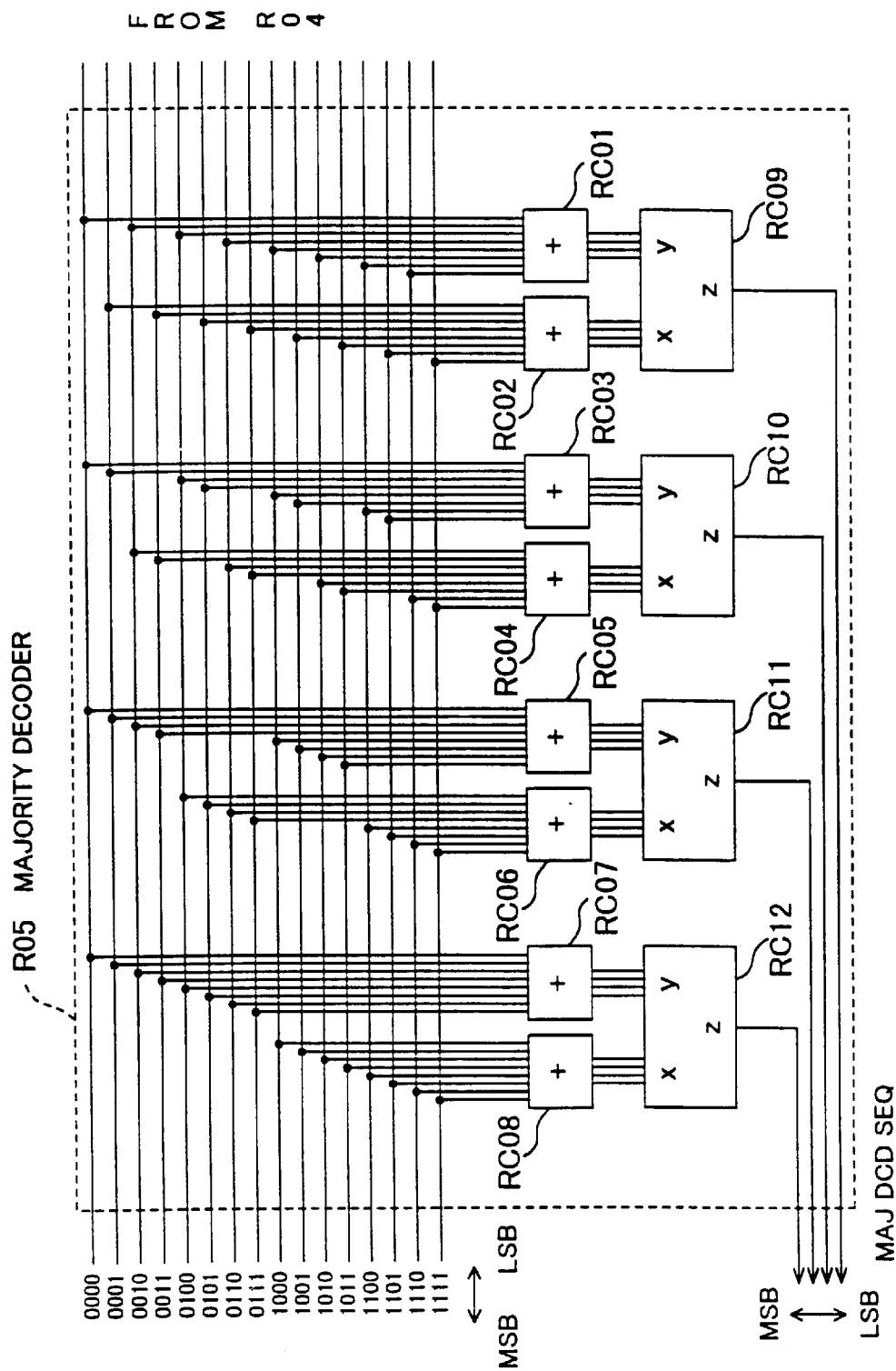
FIG. 78 is a block diagram illustrating in detail an example of the arrangement of the majority decoder in FIG. 70.

FIG. 78 shows in detail an example of the arrangement (M=16) of the majority decoder R05 in FIG. 70. Shown in FIG. 78 are adders RC01 to RC08 and comparators RC09 to RC12. In the comparators RC09 to RC12, each of x and y refers to a 4-bit (total 8-bit) comparator input, and each z refers to a 1-bit comparator output. In FIG. 78, each of the numerals put to the 16 lines extending from the switching unit R04 represents, in a binary notation, the word value of the corresponding line. In an ideal environment, a detection value of "1" indicative of a reception word appears only on one line out of the 16 lines. Actually, however, the detection value "1" appears on a plurality of lines under the influence of noise or spurious responses. In this connection, the Hamming weight of an input (the number of appearances of value "1" in the 8-bit parallel sequence) is calculated. The calculated Hamming weight has a value of any of 0 to 8, and represents the probability that each of the bits forming one word is equal to 0 or 1. More specifically, each of the four comparators RC09 to RC12 judges which input is larger out of the inputs from two corresponding adders, and supplies 0 as z when x is smaller than y, and 1 as z when x is not less than y. The outputs of the four comparators RC09 to RC12 form a 4-bit majority decoding sequence. However, when x is equal to y, the possibility of each of the bits forming one word being equal to 0, is equal to the possibility of each bit being equal to 1. Therefore, it cannot be said which probability is higher. That is, the bit for which x is equal to y, is an undeterminable bit. However, a bit which is even an undeterminable bit, must be determined as 0 or 1. In the majority decoder R05 in FIG. 78, provision is made such that z is equal to 1 when x is equal to y. However, when the data equilibrium is established (the probability of 0 appearing is equal to the probability of 1 appearing), z may be equal to 0 with the same performance provided.

The foregoing has discussed in detail examples of the arrangements of the respective components of the digital communication apparatus in FIG. 70. According to the arrangement in FIG. 70, when the convolutional coder S01 and the interleaver S02 are used as combined with each other in the transmitter T, transmission data are randomized, thus producing a transmission signal having an even frequency distribution. In the receiver R, the majority decoder R05 makes a majority judgment on each of the bits forming a word, thereby to determine the maximum likelihood word. This reduces errors which result from an undeterminable bit. It is noted that the values of M and L are not limited to the examples above-mentioned (M=16, L=8). Further, the coding rate and the constraint length in the convolutional coder S01 are not limited to the values in the examples above-mentioned. Each of the adder SF1 and the subtracter RF1 may be replaced with a circuit for calculating an exclusive OR per bit. In such a case, the adder and the subtracter have the same circuit arrangement.

Figure 79:
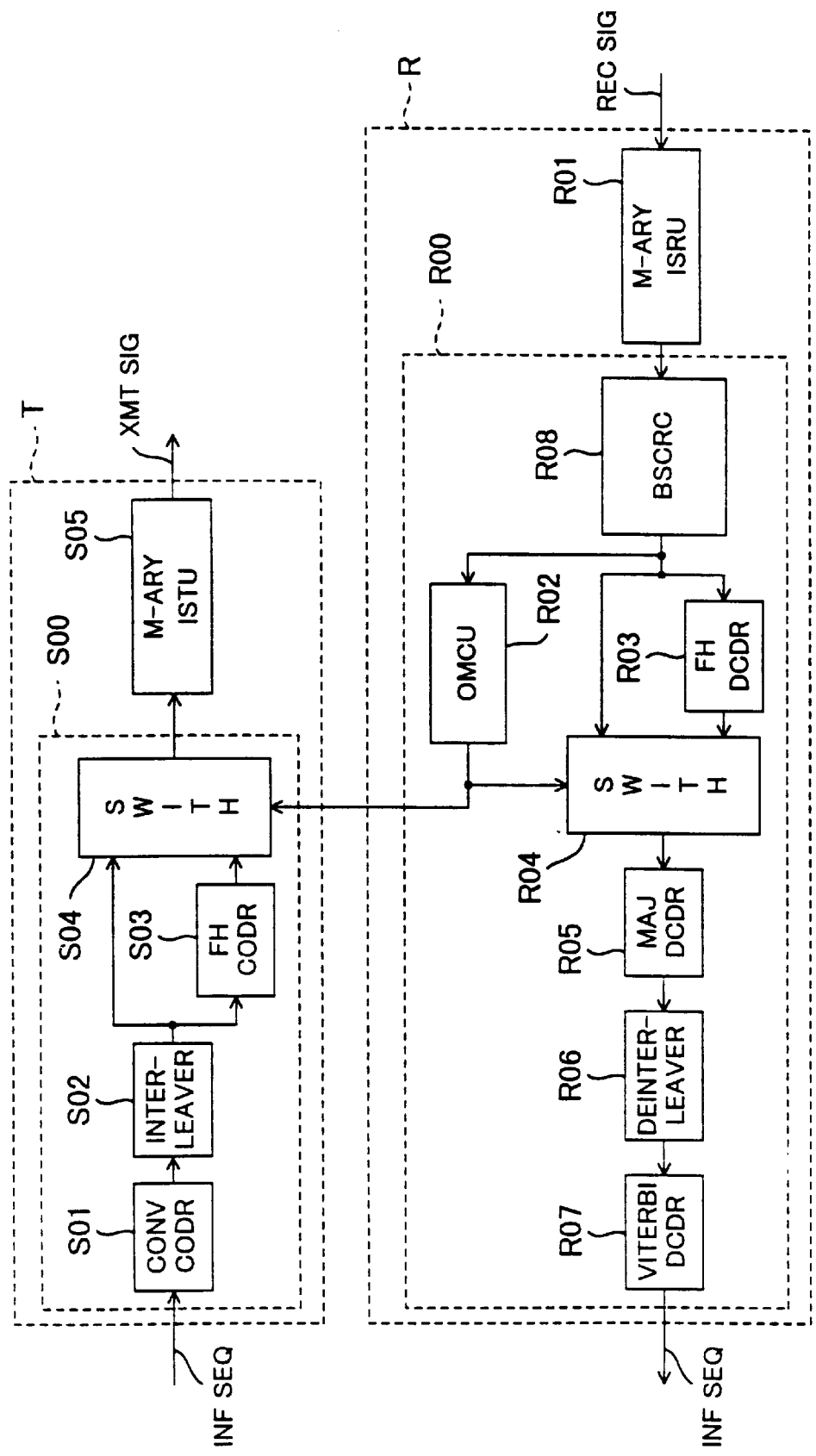
FIG. 79 is a block diagram illustrating a modification of the arrangement in FIG. 70.

FIG. 79 shows a modification of the arrangement in FIG. 70. In FIG. 79, a burst signal component removal circuit R08 is disposed downstream of the M-ary independent signal reception unit R01.

Figure 80:
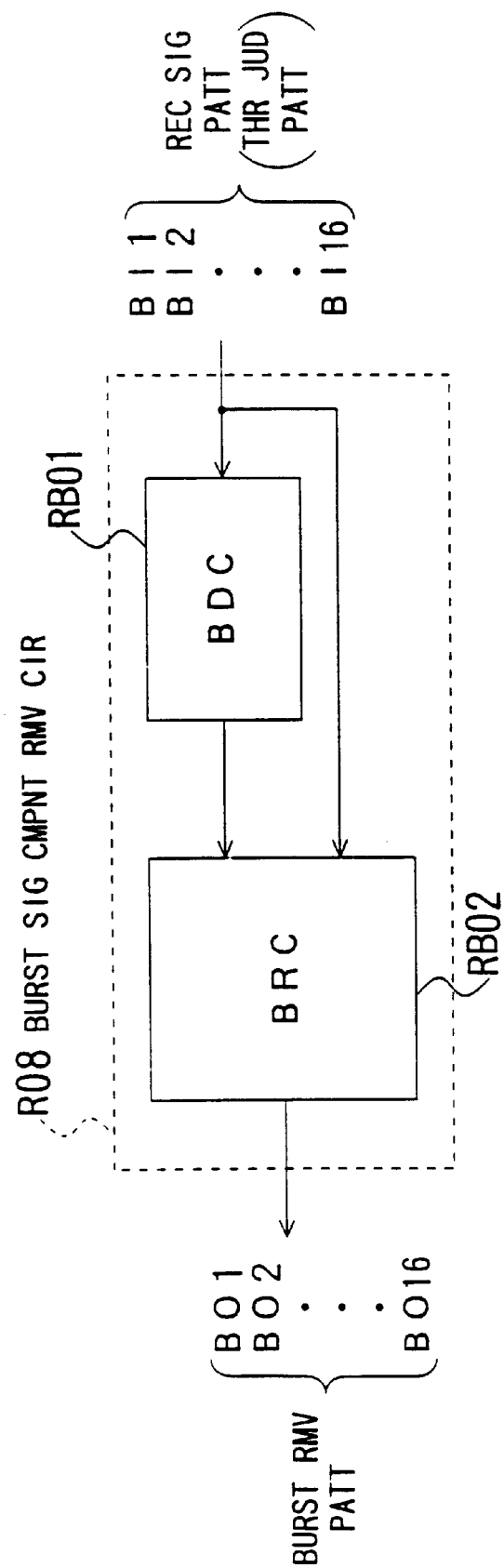
FIG. 80 is a block diagram illustrating in detail an example of the arrangement of the burst signal component removal circuit in FIG. 79.

FIG. 80 shows in detail an example of the arrangement of the burst signal component removal circuit R08 (M=16). Shown in FIG. 80 are a burst detection circuit RB01, a burst removal circuit RB02, 16 bits BI1 to BI16 forming a threshold judgment pattern and 16 bits BO1 to BO16 forming a burst removal pattern. The threshold judgment pattern BI1 to BI16 corresponds to 16 carrier frequencies. Each bit presents a value of "1" when the corresponding carrier frequency is received, and a value of "0" when the corresponding carrier frequency is not received. The burst detection circuit RB01 judges whether or not a value of "1" appears in the form of a burst for the threshold judgment pattern bits BI1 to BI16, and supplies the results as a burst judgment pattern. The burst removal circuit RB02 regards, out of the bits of the threshold judgment pattern, the bit judged as a burst, as a false detection bit resulting from a single carrier jamming wave, and then changes the value of such a bit to "0" for invalidating the same. As an exception, however, when all the bits not judged as bursts are equal to 0, the bits are not invalidated and the threshold judgment pattern BI1 to BI16 is used, as it is, as a burst removal pattern B01 to B016.

Figure 81:
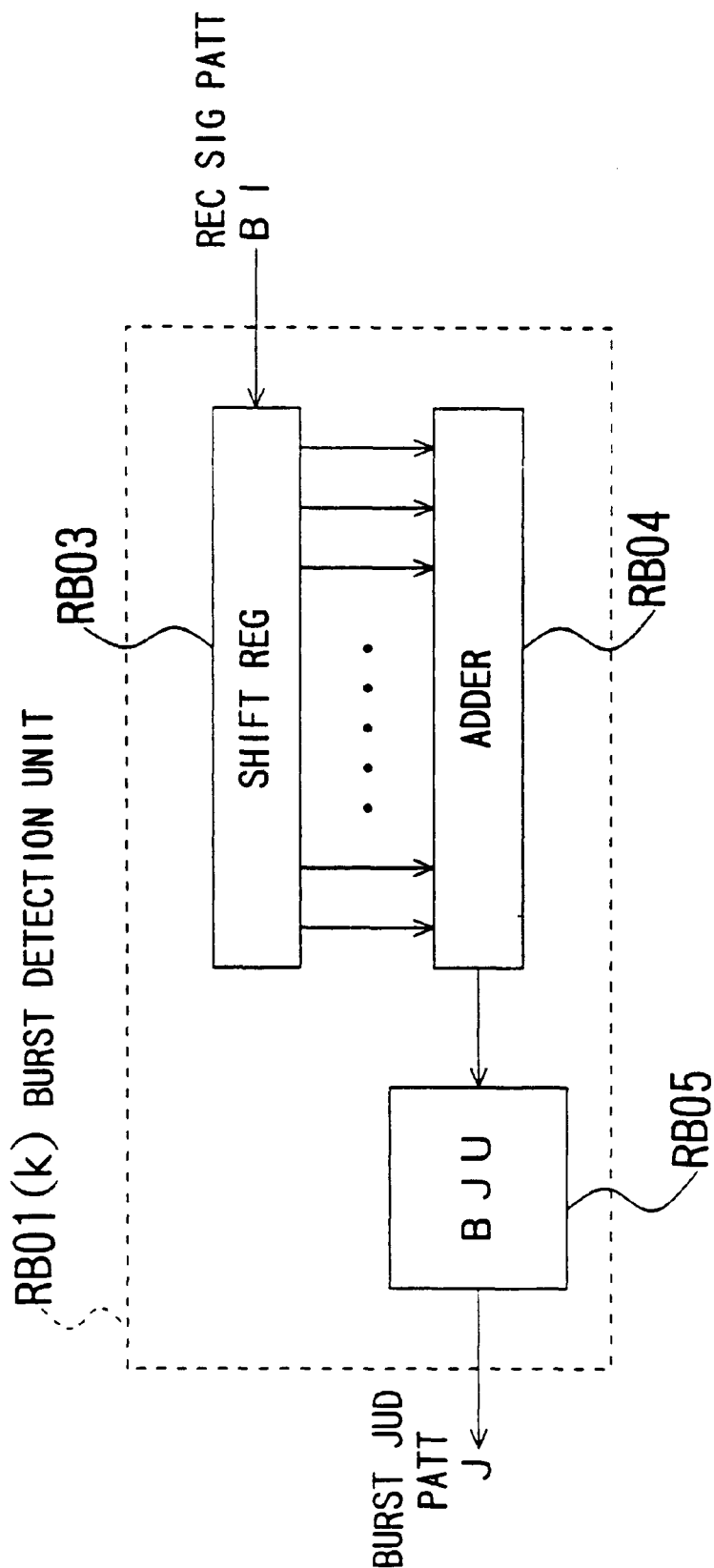
FIG. 81 is a block diagram illustrating in detail an example of the arrangement of each of 16 burst detection units forming the burst detection circuit in FIG. 80.

FIG. 81 shows in detail an example of the arrangement of each of the 16 burst detection units forming the burst detection circuit RB01 in FIG. 80. Shown in the burst detection unit RB01(k) in FIG. 81 are a shift register RB03, an adder RB04, a burst judgment unit RB05, each bit BI of the threshold judgment pattern and each bit J of the burst judgment pattern. The shift register RB03 successively delays the bits BI forming the threshold judgment pattern and supplies, to the adder RB04, the results as a p-bit parallel sequence. Here, p is an integer not less than 2. The adder RB04 calculates the Hamming weight of the p-bit parallel sequence. The burst judgment unit RB05 judges which is larger, the result of the adder RB04 or an integer q. Thus, the burst properties of the value "1" are judged. Here, q is an integer not less than 0 and not greater than p. More specifically, j is equal to 1 when the adder output is larger than q, and j is equal to 0 when the adder output is not greater than q.

Figure 82:
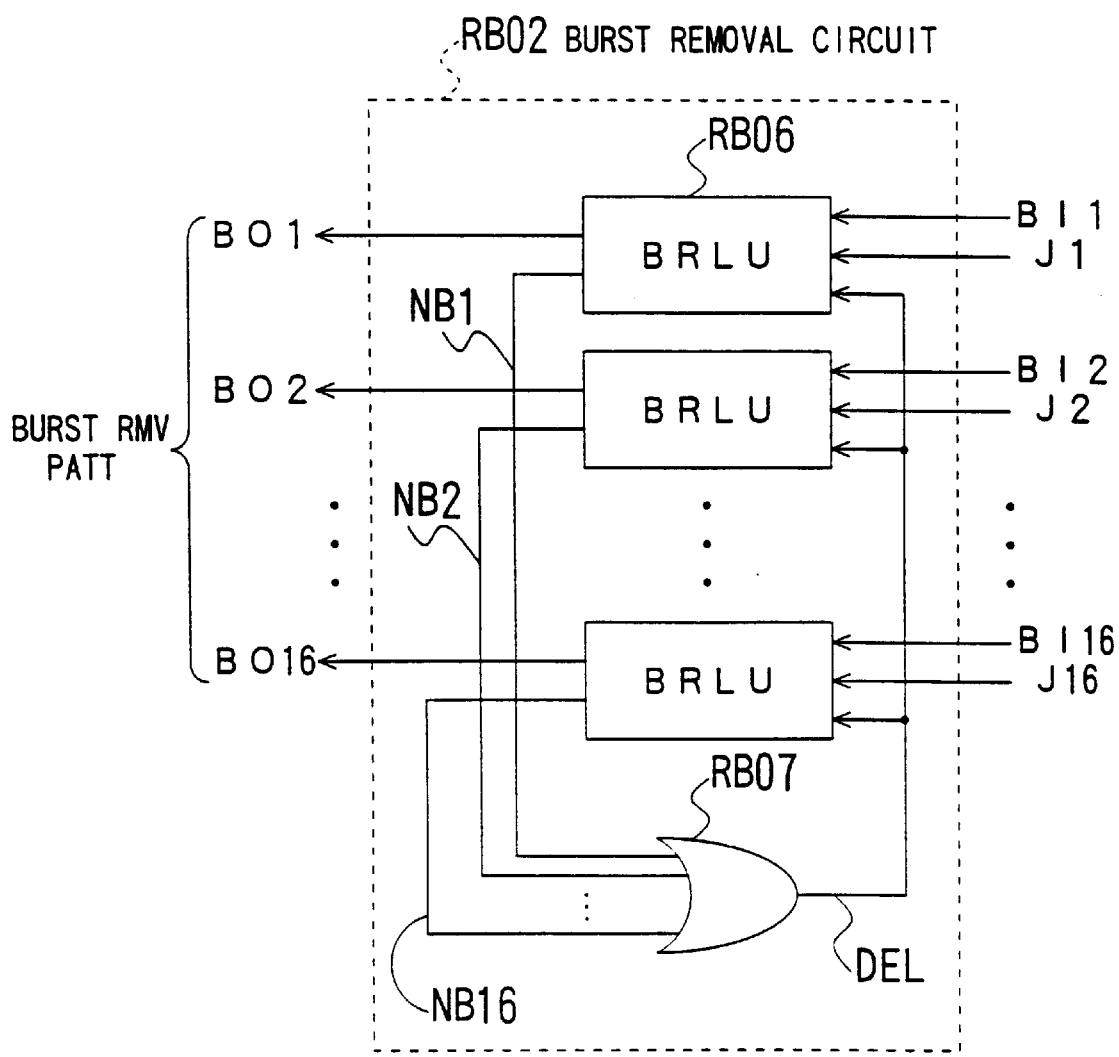
FIG. 82 is a block diagram illustrating in detail an example of the arrangement of the burst removal circuit in FIG. 80.

FIG. 82 shows in detail an example of the arrangement of the burst removal circuit RB02 in FIG. 80. Shown in FIG. 82 are burst removal logic units RB06, an OR circuit RB07, 16 bits BI1 to BI16 forming the threshold judgment pattern, 16 bits J to J16 forming the burst judgment pattern, 16 bits B01 to B016 forming the burst removal pattern, 16 bits NB1 to NB16 forming a non-burst detection signal and a burst bit invalidating signal DEL.

Figure 83:
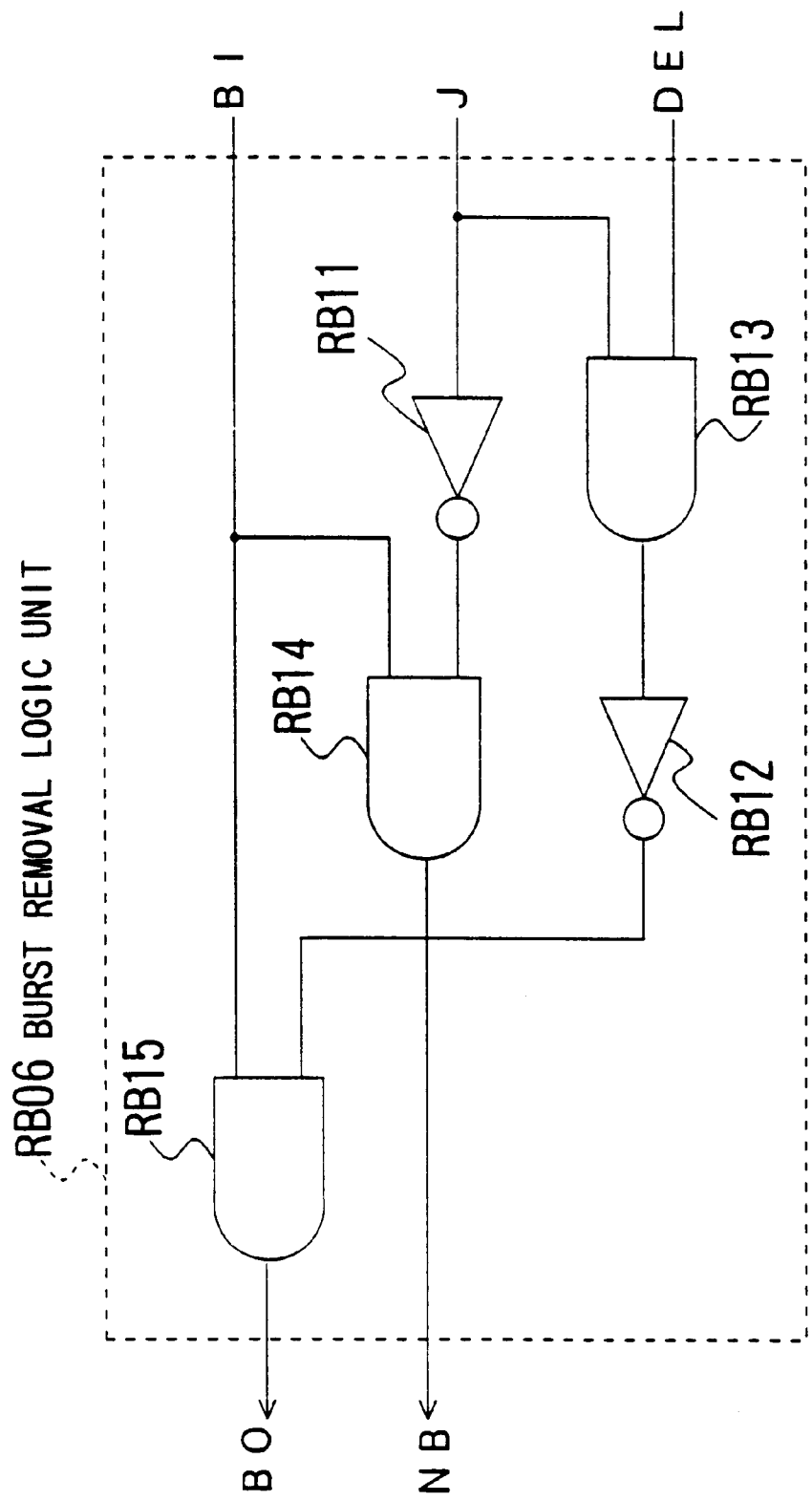
FIG. 83 is a block diagram illustrating in detail an example of the arrangement of each of 16 burst removal logic units in FIG. 82.

FIG. 83 shows in detail an example of the arrangement of each of the 16 burst removal logic units RB06. Shown in FIG. 83 are inverter circuits RB11, RB12, AND circuits RB13, B14, RB15, each bit BI of the threshold judgment pattern, each bit J of the burst judgment pattern, the burst bit invalidating signal DEL, each bit BO of the burst removal pattern and each bit NB of the non-burst detection signal.

Each burst removal logic unit RB06 in FIG. 82 generates a non-burst detection signal NB based on the threshold judgment pattern BI and the burst judgment pattern J. NB is equal to BI when J is equal to 0, and NB is equal to 0 when J is equal to 1. Then, the logical OR of the 16 bits NB1 to NB16 forming the non-burst detection signal, is supplied to each burst removal logic unit RB06 as the burst bit invalidating signal DEL. More specifically, the burst bit invalidating signal DEL instructs to each burst removal logic unit RB06 that, when at least one of the values of the non-burst detection signal bits NB1 to NB16 is equal to 1, the burst bit is invalidated. Each burst removal logic unit RB06 causes BO to be equal to 0 when DEL is equal to 1 and J is equal to 1, and causes BO to be equal to BI otherwise.

Thus, according to the arrangement in FIG. 79, the burst signal component removal circuit R08 removes consecutive constant signal components, thus lowering the influence of a jamming wave in a specific frequency band.

Figure 84:
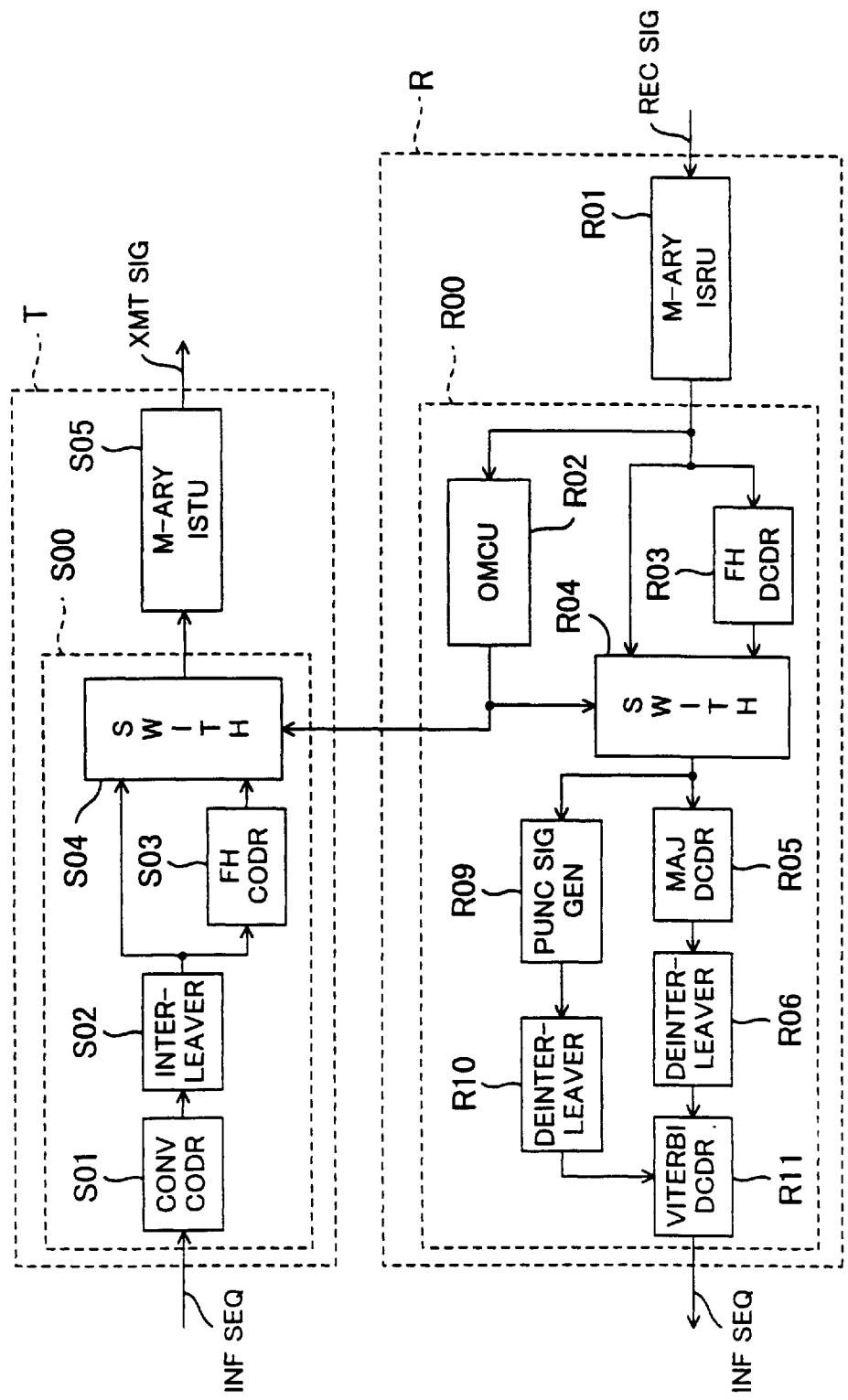
FIG. 84 is a block diagram illustrating a further modification of the arrangement in FIG. 70.

FIG. 84 shows a further modification of the arrangement in FIG. 70. In the decoding unit ROO in FIG. 84, a puncture signal generator R09 is disposed downstream of the switching unit R04, a deinterleaver R10 is disposed downstream of the puncture signal generator R09, and a Viterbi decoder R11 is arranged to process a puncture signal input.

Figure 85:
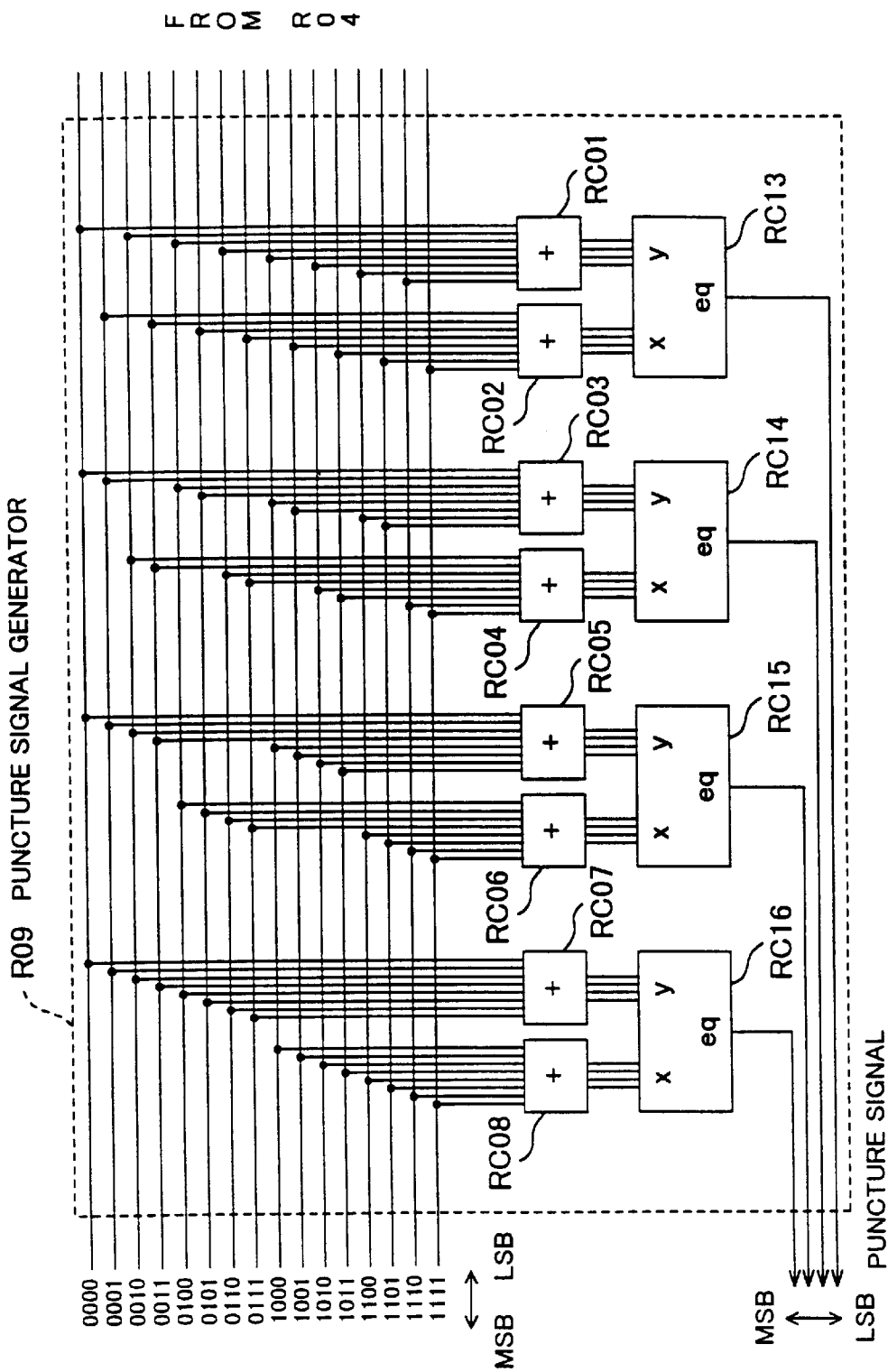
FIG. 85 is a block diagram illustrating in detail an example of the arrangement of the puncture signal generator in FIG. 84.

FIG. 85 shows in detail an example of the arrangement of the puncture signal generator R09 (M=16). Shown in FIG. 85 are adders RC01 to RC08 and comparators RC13 to RC16. In the comparators RC13 to RC16, each of x and y refers to a 4-bit comparator input, and each eq refers to a 1-bit comparator output. Except for the operations of the comparators RC13 to RC16, the puncture signal generator R09 is the same as the majority decoder R05 shown in FIG. 78. Each of the four comparators RC13 to RC16 compares the inputs from the two corresponding adders with each other, and supplies 0 as eq when x is not equal to y, and 1 as eq when x is equal to y. The outputs of the four comparators RC13 to RC16 form a 4-bit puncture signal. That is, the puncture signal generator R09 is arranged to display an undeterminable bit. More specifically, when a certain bit of a puncture signal is equal to 1, the corresponding bit of an output of the majority decoder R05 is an undeterminable bit.

As shown in FIG. 84, to maintain the corresponding relationship with the sequence obtained by the majority decoder R05, the puncture signal is processed by the deinterleaver R10 having the inside arrangement identical with that of the deinterleaver R06, and is then entered into the Viterbi decoder R11 as a deinterleave-puncture signal. While a bit designated by the deinterleave-puncture signal is handled as an erasure bit, the Viterbi decoder R11 executes a Viterbi decoding on the sequence supplied from the deinterleaver R06. Thus, when it is difficult to judge whether an output bit of the majority decoder R05 is "0" or "1", such an output bit is handled as erasure without any judgment forcibly made thereon. Thus, a more accurate error correction can be made. Since the Viterbi decoding of a punctured code is an already established technique, the detailed description thereof is here omitted.

Thus, according to the arrangement in FIG. 84, the undeterminable bit designated by the puncture signal from the puncture signal generator R09, is regarded as an erasure bit in the Viterbi decoder R11, enabling an error correction to be made more efficiently.

Figure 86:
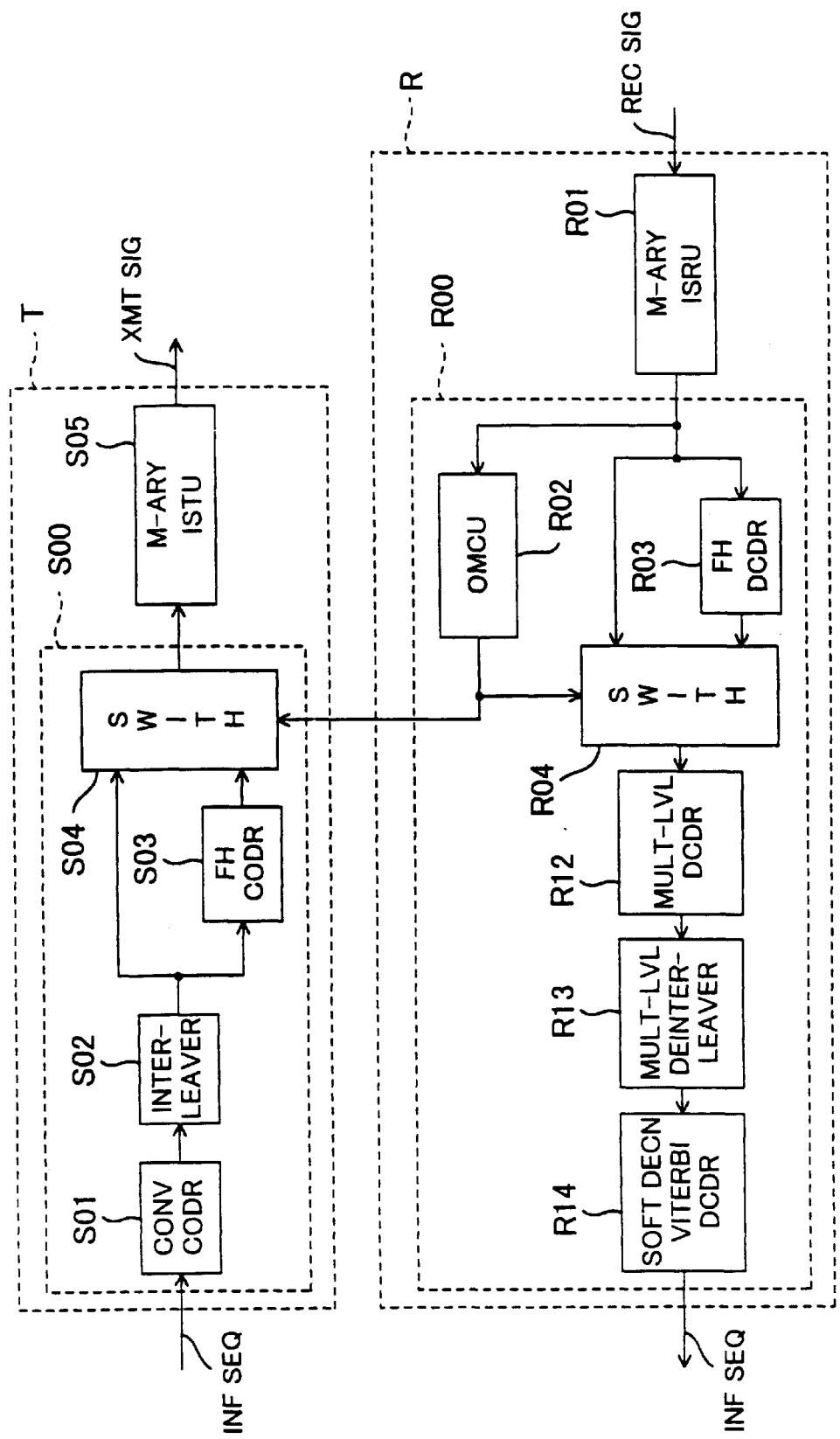
FIG. 86 is a block diagram illustrating a further modification of the arrangement in FIG. 70.

FIG. 86 shows a further modification of the arrangement in FIG. 70. In the decoder R00 in FIG. 86, a multi-level decoder R12, a multi-level deinterleaver R13 and a soft decision Viterbi decoder R14 are disposed downstream of the switching unit R04.

Figure 87:
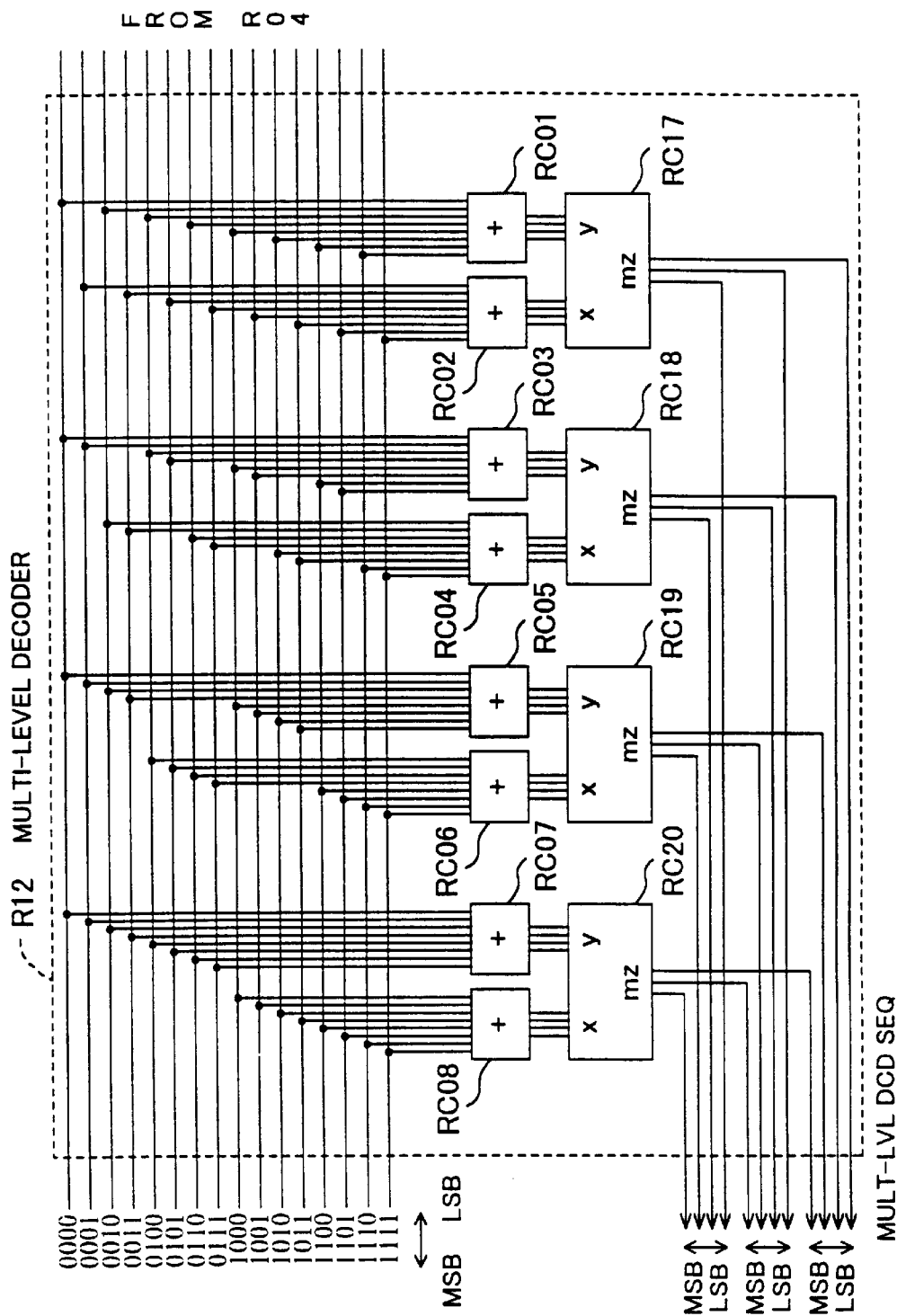
FIG. 87 is a block diagram illustrating in detail an example of the arrangement of the multi-level decoder in FIG. 86.

FIG. 87 shows in detail an example of the arrangement of the multi-level decoder R12 (M=16). Shown in FIG. 87 are adders RC01 to RC08 and comparators RC17 to RC20. In the comparators RC17 to RC20, each of x and y refers to a 4-bit comparator input, and each mz refers to a 3-bit comparator output. Except for the operations of the comparators RC17 to RC20, the multi-level decoder R12 is the same as the majority decoder R05 shown in FIG. 78. Each of the four comparators RC17 to RC20 executes an operation of the following equation (14):

$$mz = x/(x+y) \tag{14}$$

The outputs of the four comparators RC17 to RC20 form a multi-level decoding sequence, more specifically, a 12-bit 3-level decoding sequence. As compared with a binary judgement made in each of the comparators of the majority decoder R05 in FIG. 78, each of the comparators of the multi-level decoder R12 in FIG. 87 makes an octal decision (soft decision). Accordingly, the possibility of a decoding bit being equal to "0" or "1", is displayed more finely. As the value of mz is larger, the possibility of a decoding bit being equal to "1" is greater, and as the value of mz is smaller, the possibility of the decoding bit being equal to "0" is greater.

As shown in FIG. 86, a 3-level decoding sequence is supplied to the multi-level deinterleaver R13. The multi-level deinterleaver R13 is formed of three deinterleavers each having the same inside arrangement as that of the deinterleaver R06 in FIG. 72B. This multi-level deinterleaver R13 supplies a 6-bit 3-level deinterleave sequence to the soft decision Viterbi decoder R14. The soft decision Viterbi decoder R14 executes a soft decision decoding of the 3-level deinterleave sequence. This soft decision Viterbi decoder R14 has an error-correcting capability higher than that of the Viterbi decoder R07 in FIG. 70. Since the soft decision Viterbi decoding is a known technique, the detailed description thereof is here omitted.

Thus, according to the arrangement in FIG. 86, a soft decision Viterbi decoding is executed on that sequence from the multi-level decoder R12, on which a soft decision has been made in multiple levels, thus achieving a more efficient error correction. It is noted that the number of soft decision levels in the multi-level decoder R12 is not limited to the numeral in the above-mentioned example, or 3.

Figure 88A:
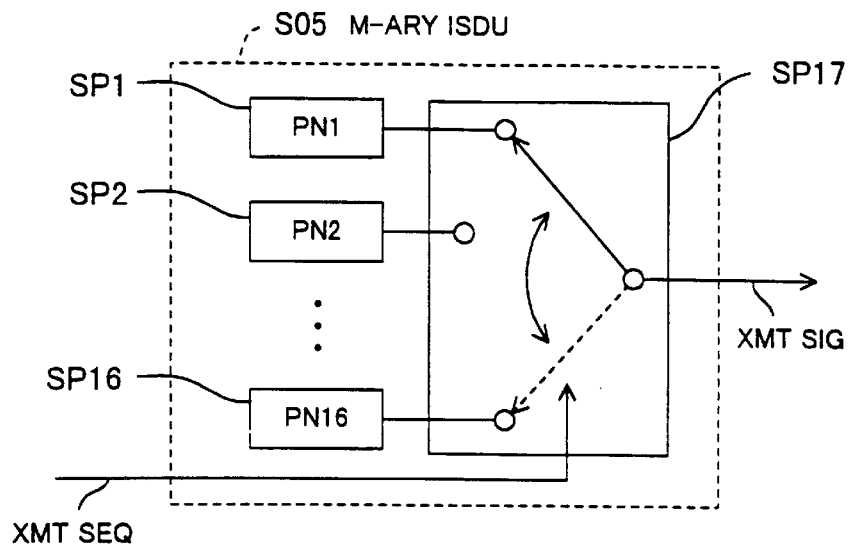
FIGS. 88A and 88B are block diagrams respectively illustrating modifications of the arrangements in FIGS. 76A, 76B.
Figure 88B:
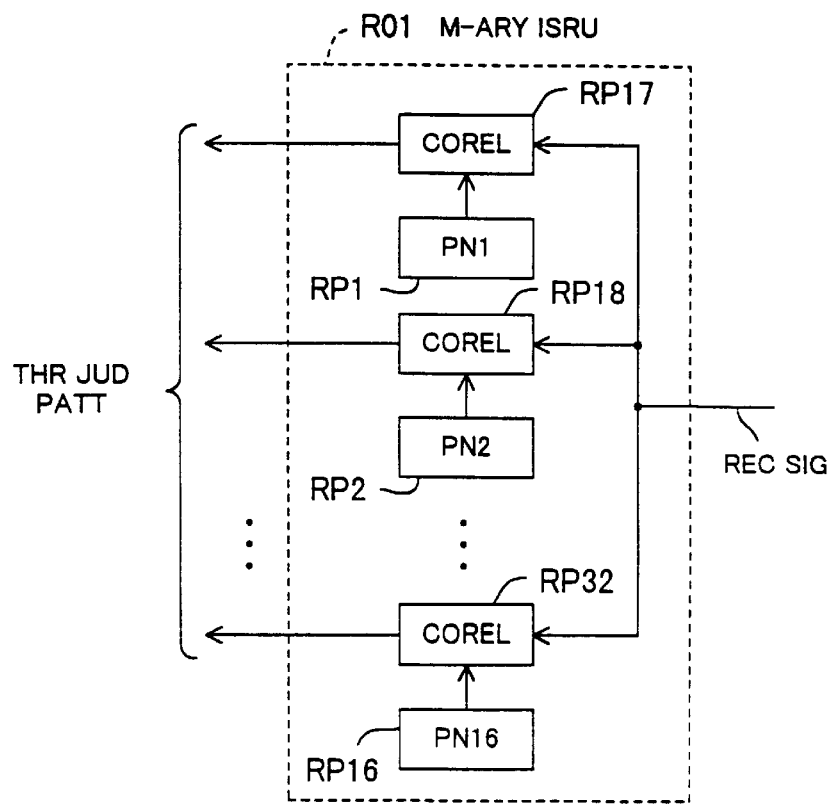

FIGS. 88A and 88B respectively show modifications of the arrangements in FIGS. 76A and 76B (M=16). The M-ary independent signal transmission unit S05 in FIG. 88A comprises PN-sequence generators SP1 to SP16 for respectively generating different pseudorandom noise (PN) sequences PN1 to PN16, and a switch SP17. The switch SP17 selects, out of the PN sequences generated by the PN- sequence generators SP1 to SP16, a sequence corresponding to the value of a transmission sequence, and supplies the sequence thus selected as a transmission signal. The M-ary independent signal reception unit R01 in FIG. 88B comprises PN-sequence generators RP1 to RP16 for respectively generating different PN sequences PN1 to PN16 and correlation units RP17 to RP32. Each of the correlation units RP17 to RP32 calculates the correlation value between the received signal and the corresponding PN sequence out of the 16 PN-sequences PN1 to PN16, and supplies "1" when the correlation value thus calculated exceeds a predetermined threshold value, and "0" when the correlation value does not exceed the predetermined threshold value. The threshold value is so set as to be smaller than the self-correlation value of the corresponding PN-sequence and larger than the mutual correlation value with respect to each of other PN sequences.

According to the arrangements in FIGS. 88A and 88B, a coder and a decoder each of the direct spread (DS) type can be achieved. As the correlation units RP17 to RP32, SAW convolvers may be used.

Figure 89:
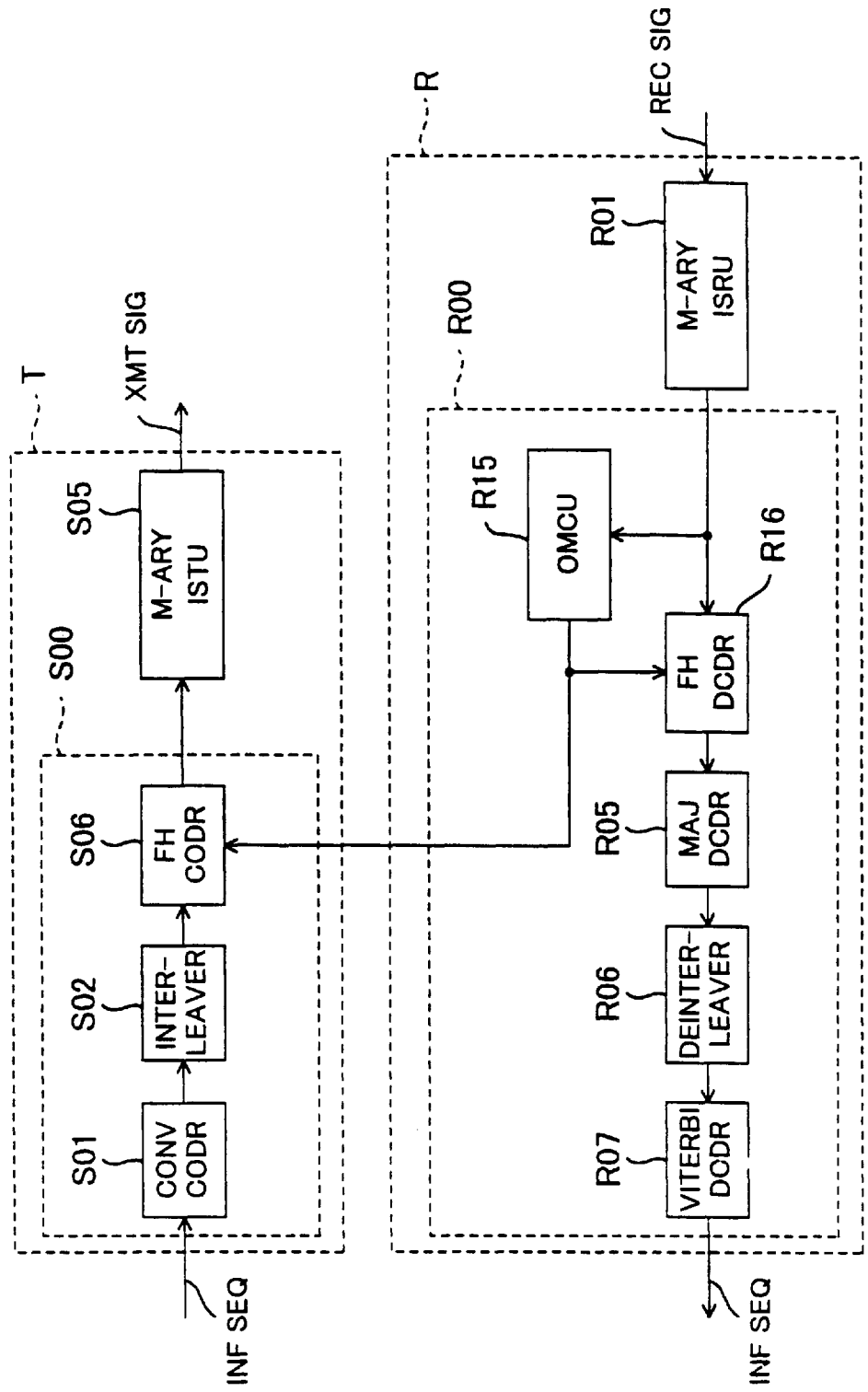
FIG. 89 is a block diagram illustrating a further modification of the arrangement in FIG. 70.

FIG. 89 shows a further modification of the arrangement in FIG. 70. In FIG. 89, the two switching units S04, R04 in FIG. 70 are omitted. Shown in FIG. 89 are an FH coder S06, an operational mode control unit R15 and an FH decoder R16. These circuit blocks are different in inside arrangement and operation from the corresponding circuit blocks S03, R02, R03 in FIG. 70. A switching signal from the operational mode control unit R15 is supplied to the FH coder S06 and the FH decoder R16. Other arrangements are the same as those in FIG. 70.

Figure 90A:
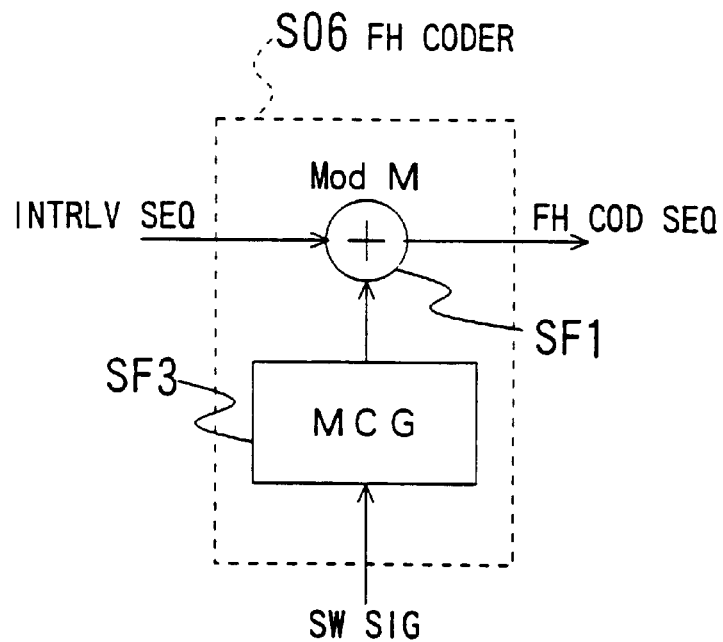
FIGS. 90A and 90B are block diagrams respectively illustrating in detail the arrangements of the FH coder and the FH decoder in FIG. 89.
Figure 90B:
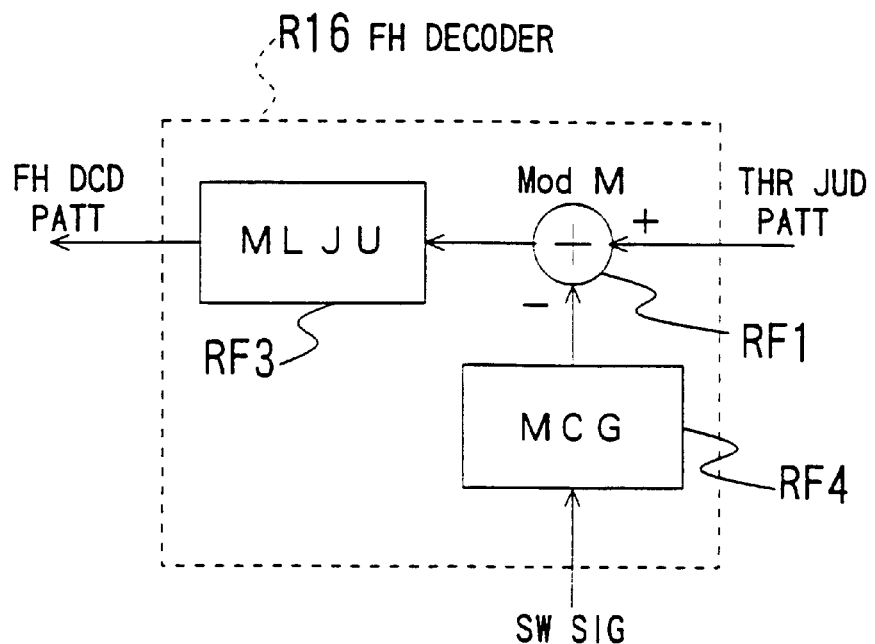

FIGS. 90A and 90B show in detail the arrangements of the FH coder S06 and the FH decoder R16 in FIG. 89. Shown in FIGS. 90A and 90B are an adder SF1 modulo M, a subtracter RF1 modulo M, code-length variable multiplexing code generators SF3, RF4 and a majority logic judgment unit RF3. Unlike in the FH coder S03 and the FH decoder R03 in FIGS. 73A and 73B, the multiplexing code generators SF3, RF4 are arranged such that the length L of a multiplexing code is variable according to a switching signal.

Figure 91:
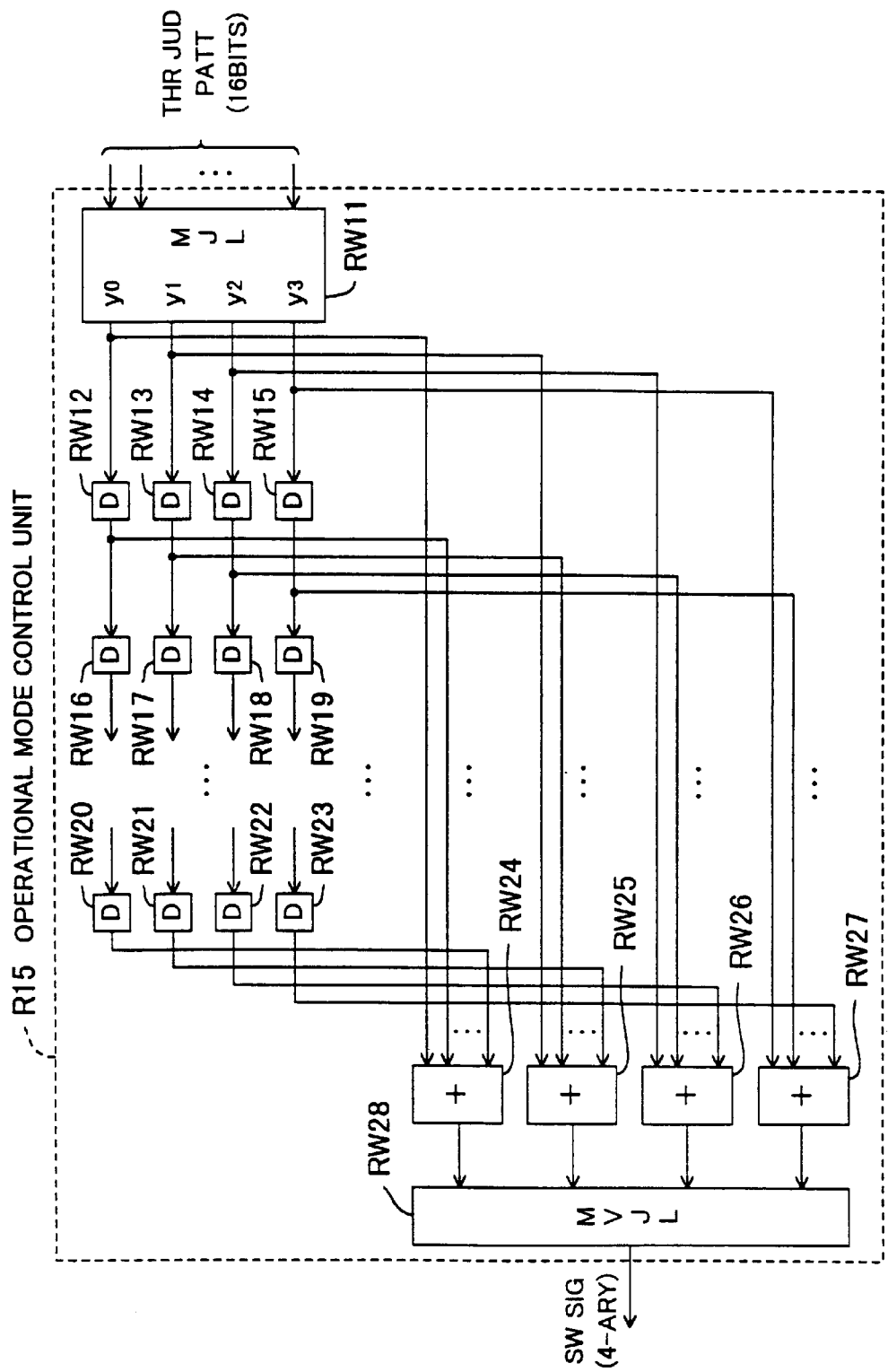
FIG. 91 is a block diagram illustrating in detail an example of the arrangement of the operational mode control circuit in FIG. 89.

FIG. 91 shows in detail an example of the arrangement of the operational mode control unit R15 in FIG. 89 (M 16). Shown in FIG. 91 are a multiplicity judgment logic RW11, delay units RW12 to RW23, adders RW24 to RW27 and a maximum value judgment logic RW28. It is now supposed that the largest multiplicity is 4 and the number of operational modes is 4. The operational mode control unit R15 in FIG. 91 calculates the multiplicity based on a threshold judgment pattern and supplies a switching signal (quaternary value) for switching the operational mode of each of the FH coder S06 and the FH decoder R16 to the operational mode corresponding to the multiplicity. An output of the multiplicity judgment logic RW11 has four bits y0 to y3.

FIG. 92 shows the relationships between the input and output of the multiplicity judgment logic RW11. First, the multiplicity judgment logic RW11 calculates, out of the 16 bits forming the threshold judgment pattern, the number of bits represented by "1", and then judges the multiplicity based on the bit number. In FIG. 92, only one bit out of the four output bits y0 to y3 is always represented by "1". That is, the multiplicity judgment logic RW11 shows the multiplicity based on the output bits represented by "1". However, there are instances where the multiplicity thus shown is not accurate under the influence of noise or a spurious response. Such an error often appears in the form of subtle variations. To remove such variations to enhance the reliability of operational mode control, the operational mode control unit R15 in FIG. 91 is arranged to select the multiplicity which has been judged at the most numerous frequency in a predetermined period of time. In this connection, the 4 output bits y0 to y3 of the multiplicity judgment logic RW11 are supplied, together with the past bits already entered into the delay units RW12 to RW23, to the corresponding adders RW24 to RW27. The adders RW24 to RW27 calculate the Hamming weights of the inputs, and display the number of times of judgment made on each of the four different multiplicity values. The maximum value judgment logic RW28 selects the multiplicity which has been judged at the most numerous frequency, and then supplies a switching signal of the operational mode corresponding to the multiplicity thus selected.

Figure 93:
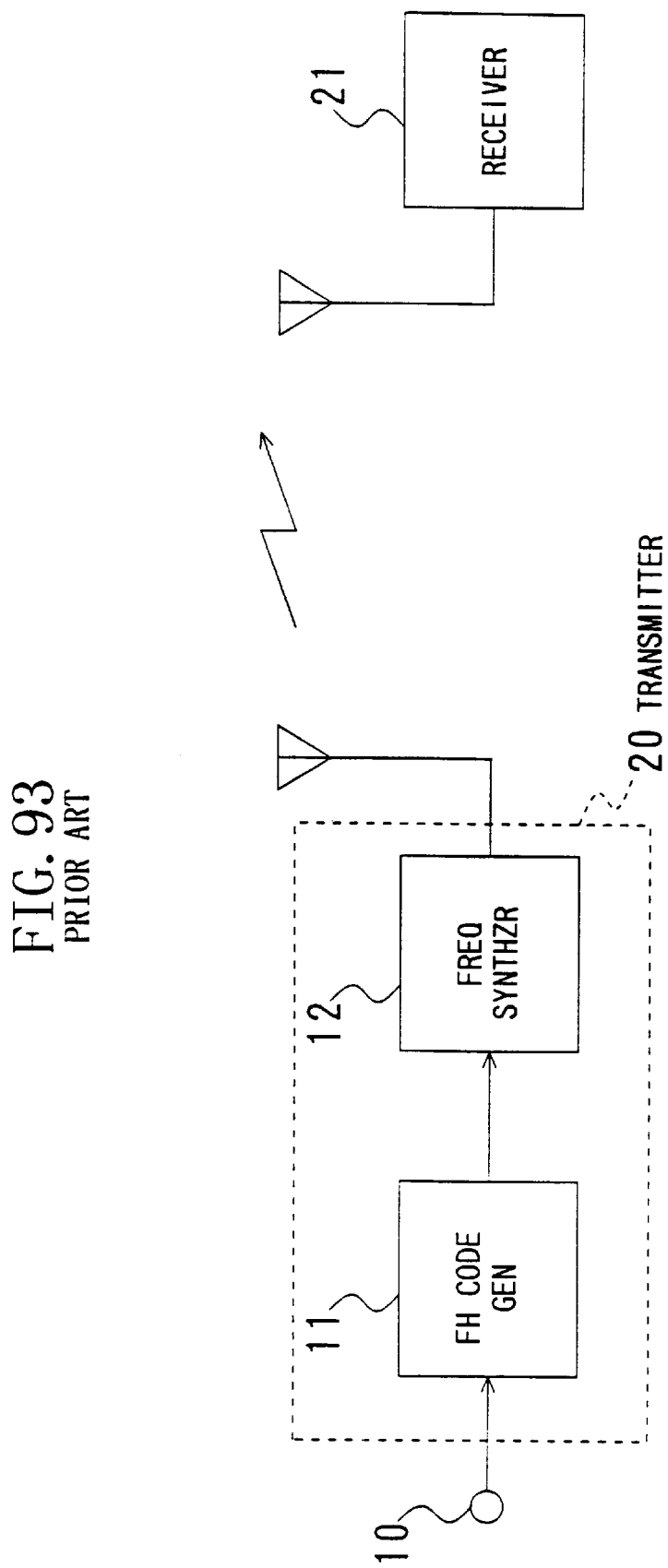
FIG. 93 is a block diagram illustrating an FH-MFSK digital communication system of prior art.

Thus, according to the arrangement in FIG. 89, the operational mode control unit R15 selects the multiplicity which has been judged at the most numerous frequency, and then supplies a switching signal corresponding to the multiplicity thus selected. This lowers the occurrence of errors about the operational mode, thereby to achieve a highly reliable operational mode control. Further, the operational mode can be switched finely according to multiplicity, thus making a more efficient data transmission. The largest multiplicity is selected from integers which are not less than 2 and not greater than M. The number of operational modes is selected from integers which are not less than 2 and not greater than the largest multiplicity. Each of the adder SF1 and the subtracter RF1 may be replaced with a circuit for calculating an exclusive OR per bit. In this case, the adder and the subtracter are the same in circuit arrangement. FIG. 93 shows the arrangement of an asynchronous digital communication system of the FH-MFSK mode of prior art. Shown in FIG. 93 are a transmitter 20, a receiver 21, a transmission data input terminal 10, a frequency hopping (FH) code generator 11 and a frequency synthesizer 12. According to transmission data, the FH code generator (FH coder) 11 generates hopping codes, based on which the frequency synthesizer 12 hops carrier frequencies. The FH code generator 11 utilizes a Reed-Solomon code. The following shows one set of Reed-Solomon code vectors having three chips based on a 4-element Galois field:

| | | | |
|---|---|---|---|
| (0,0,0), | (1,2,3), | (2,3,1), | (3,1,2) |
| (1,1,1). | (0,3,2), | (3,2,0), | (2,0,3) |
| (2,2,2), | (3,0,1), | (0,1,3), | (1,3,0) |
| (3,3,3), | (2,1,0), | (1,0,2), | (0,2,1) |

Here, the vector components show the Nos. of carrier frequencies disposed on a frequency band. The number of the components forming each vector represents the number of chips for one hopping cycle.

Generally, when one of the primitive elements of a Q-element Galois field is defined as a, the spread code vector $\sim\alpha$ of L components is defined by the following equation (15):

$$\sim\alpha = (1, \alpha, \alpha^2, \ldots \alpha^{L-1}) \quad (15)$$

wherein L means the number of chips per hopping cycle and L is smaller than Q. When the user identification No. is defined as i, the data value is defined as X and a unit vector of L components is defined as $^-e=(1, 1, \ldots, 1)$, a hopping code vector $^-y_i(x)$ composed of L components is calculated by the following equation (16):

$$^-y_i(x) = x \cdot {}^-\alpha + i \cdot {}^-e \quad (16)$$

The user identification No. i, the data value x and the components of the hopping code vector $^-y_i(x)$ are elements of the Q-element Galois field. The operation represented by the equation (16) is an operation on the Q-element Galois field. When Q is equal to $4(=2^2)$ and L is equal to 3, the equation (16) is modified as shown in the following equation (17):

$$^-y_i(x) = x \cdot (1,2,3) + i \cdot (1,1,1) \quad (17)$$

FIGS. 94A and 94B respectively show the definitions of Galois addition and Galois multiplication used in the FH code generator 11 in FIG. 93. For example, the hopping code vector $^-y_2(1)$ at the time when a user having an identification No. i=2 transmits a data value x=1, is calculated as shown in the following equation (18):

$$\begin{aligned}^{\wedge}y_2(1) &= 1 \cdot (1, 2, 3) + 2 \cdot (1, 1, 1) \\ &= (1, 2, 3) + (2, 2, 2) \\ &= (3, 0, 1)\end{aligned} \quad (18)$$

FIG. 95 is a table showing hopping code vector values calculated in the manner above-mentioned. Here, the data value x is equal to 0, 1, 2, or 3. That is, when the number of values that the data can present, is defined as M, M is equal to 4 $(=2^2)$ and the relationship between M and the number Q of the elements of the Galois field, is as follows:

$$Q=M$$

One set of hopping code vector shown in FIG. 95 is identical with one set of a Reed-Solomon code vector having three chips based on the 4-element Galois field mentioned earlier, and has an excellent feature that mutual interference among users is very small in an asynchronous code multiple communication system. As shown in FIG. 95, however, the hopping code vector at the time when the user having an identification No. i=0 transmits a data value x=0, has three components each having the same value. The hopping code vector at the time when other user transmits a data value x=0, also has three components each having the same value. This is a phenomenon taken place not only in the case where Q is equal to 4, but also in each case where the equation (16) is adopted. In this system, therefore, when a data value x=0, a signal having predetermined carrier frequencies is transmitted. Thus, this system is susceptible to an influence of frequency-selective fading.

Figure 96A:
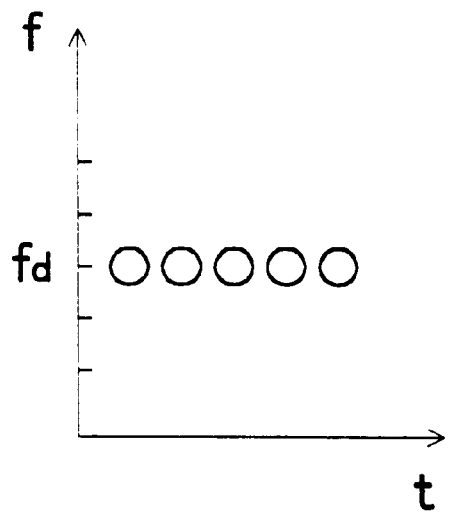
FIGS. 96A and 96B show time/frequency matrices, under the influence of frequency-selective fading, in the transmitter and receiver in FIG. 93.
Figure 96B:
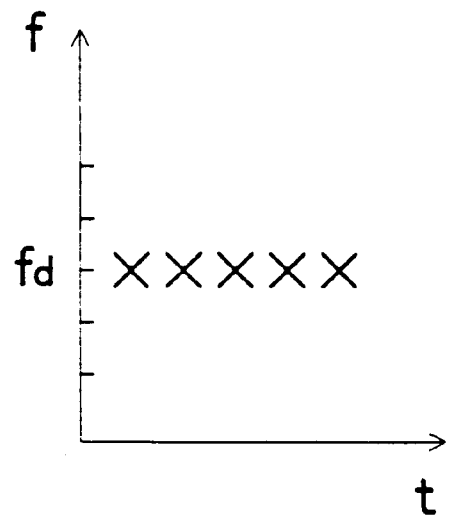

FIGS. 96A and 96B respectively show time/frequency matrices in the transmitter 20 and the receiver 21 in FIG. 93 under the influence of frequency-selective fading. It is now supposed that a strong fading occurs at frequency fd. Circles show predetermined carrier frequencies of a transmission signal, while crosses show carrier frequencies for which a miss detection has occurred due to fading. As shown in FIG. 96, there are instances where a miss detection occurs in all the carrier frequencies at the worst case.

To lower such an influence of frequency-selective fading, the present invention is arranged such that a Q-element Galois field (Q is larger than the number M of values that a data can present) is adopted, that a data value x is previously converted into a non-zero code w and that a hopping code vector $^-y$ is calculated based on the code w, thus enhancing the randomized property of frequency hopping codes.

The following description will discuss an example where M is equal to 4 $(=2^2)$, Q is equal to 5 and L is equal to 3. Using a 1:1 function f, the data value x $(0 \geq x \geq 3)$ is converted into a non-zero code w $(1 \geq w \geq 4)$. As an example of such a function, a function of is defined using the following equation (19):

$$f_0(x) = x+1 \quad (19)$$

Using the data value x, the code w is expressed as shown in the following equation (20):

$$w = f_0(x) \quad (20)$$

Then, the data value x in the equation (16) is replaced with the code w in the equation (20). Then, the following equation (21) is obtained:

$$^-y_i(w) = w \cdot {}^-\alpha + i \cdot {}^-e \quad (21)$$

Since $^-\alpha$ is equal to $(1, 2^1, 2^2)$ and $^-e$ is equal to (1,1,1), the equation (21) is modified to the following equation (22):

$$\begin{aligned}^{\wedge}y_i(w) &= w \cdot (1, 2^1, 2^2) + i \cdot (1, 1, 1) \\ &= w \cdot (1, 2, 4) + i \cdot (1, 1, 1)\end{aligned} \quad (22)$$

When the equation (22) is rewritten using the data value x, the following equation (23) is obtained:

$$^-y_i(x) = f_0(x) \cdot (1,2,4) + i \cdot (1,1,1) \quad (23)$$

FIGS. 97A and 97B respectively show the definitions of Galois addition and Galois multiplication in the equations (22), (23). For example, the hopping code vector $^-y_2(1)$ at the time when a user having an identification No. i=2 transmits a data value x=1, is calculated as shown in the following equation (24):

$$\hat{y}_2(1) = f_0 \cdot (1) \cdot (1, 2, 4) + 2 \cdot (1, 1, 1) \quad (24)$$

$$= 2 \cdot (1, 2, 4) + (2, 2, 2)$$

$$= (4, 1, 0)$$

FIG. 98 shows a list of hopping code vectors calculated in the manner above-mentioned. As shown in FIG. 98, a hopping code vector formed of three components each having the same value, is never generated when any user having any identification No. transmits any data value. This means that the randomized property of a frequency hopping code is enhanced.

Figure 99A:
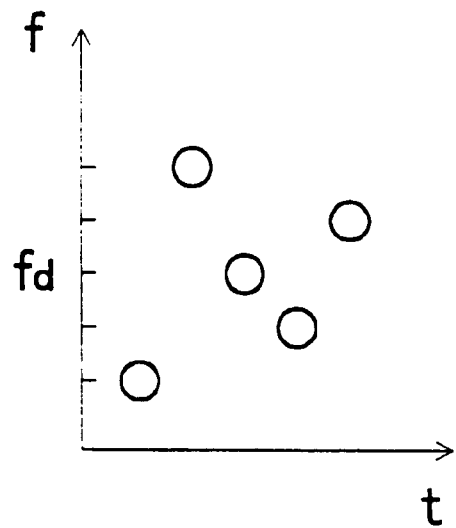
FIGS. 99A and 99B show time/frequency matrices, under the influence of frequency-selective fading, in the transmitter and receiver in the digital communication system according to the present invention.
Figure 99B:
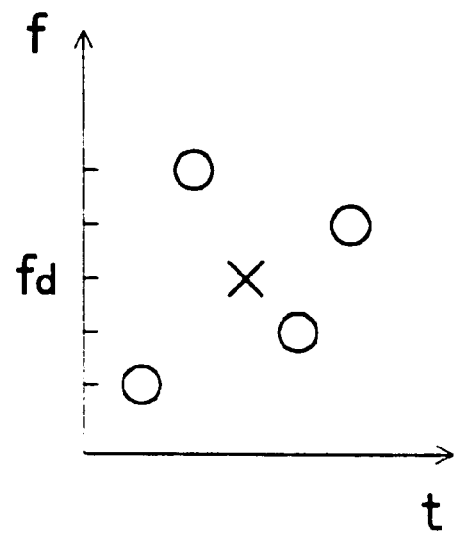

FIGS. 99A and 99B respectively show time/frequency matrices in a transmitter and a receiver when there is adopted a frequency hopping code enhanced in randomized property as above-mentioned. It is now supposed that a strong fading occurs at frequency fd likewise in FIGS. 96A and 96B. Since the carrier frequencies are dispersed, the number of carrier frequencies for which a miss detection occurs, is advantageously relatively small as shown in FIG. 99B.

Figure 100:
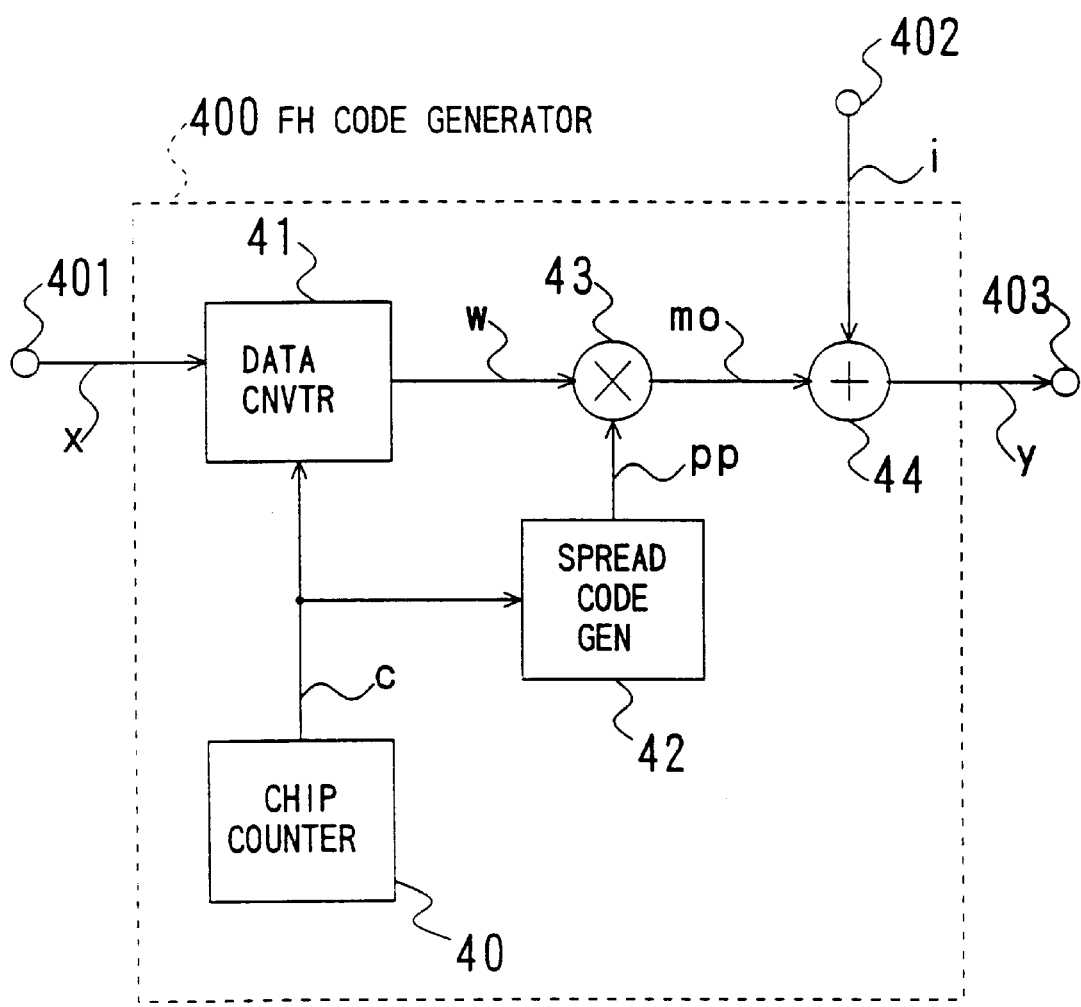
FIG. 100 is a block diagram showing the arrangement of the FH code generator in the digital communication system according to the present invention.
Figures 101, 102, 103:
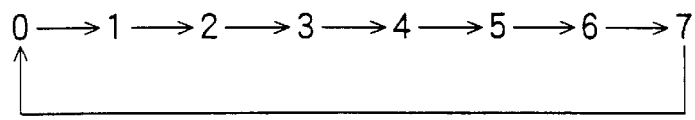
FIG. 101 shows the operation of the chip counter in FIG. 100.
FIG. 102 shows the operation of the data conversion unit in FIG. 100.
FIG. 103 shows the operation of the spread code generator in FIG. 100.

FIG. 100 shows an example of the arrangement of an FH code generator (FH coder) 400 in the digital communication apparatus according to the present invention. The FH code generator 400 in FIG. 100 comprises a chip counter 40, a data converter 41, a spread code generator 42, a multiplier 43, an adder 44, a data value x input terminal 401, a user identification No. i input terminal 402 and a hopping code y output terminal 403. It is now supposed that M is equal to 16 ($=2^4$), Q is equal to 17 and L is equal to 8. As shown in FIG. 101, the chip counter 40 executes a counting operation modulo L=8 and supplies a counting value c to the data converter 41 and the spread code generator 42. Each time the counting value c is equal to 0, the data converter 41 converts a data value x ($0 \geq x \geq 15$) supplied from the input terminal 401, into a non-zero code w ($1 \geq w \geq 16$). FIG. 102 shows a rule of conversion from the data value x into the code w. As shown in FIG. 103, the spread code generator 42 supplies, as a spread code pp, the primitive element to the c-th power, that is $\alpha^c$, which is corresponding to the counting value c. Since L is equal to 8 in this example, it is enough that the spread code generator 42 supplies a spread code pp=1, 2, ..., 11 corresponding to the counting value c=0, 1, ..., 7. The multiplier 43 executes Galois multiplication modulo Q=17 between the code w obtained by the data converter 41 and the spread code pp supplied from the spread code generator 42, and supplies the result mo to the adder 44. The adder 44 executes Galois addition modulo Q=17 between the multiplication result mo obtained by the multiplier 43 and the user identification No. i supplied from the input terminal 402, and supplies, through the output terminal 403, the addition result as a hopping code y. This hopping code y is supplied to a frequency synthesizer having a choice of at least 17 carrier frequencies.

According to the arrangement in FIG. 100, since the randomized property of a frequency hopping code is enhanced, the influence of frequency-selective fading can be reduced. The data converter 41 may adopt other conversion rule.

Figure 104:
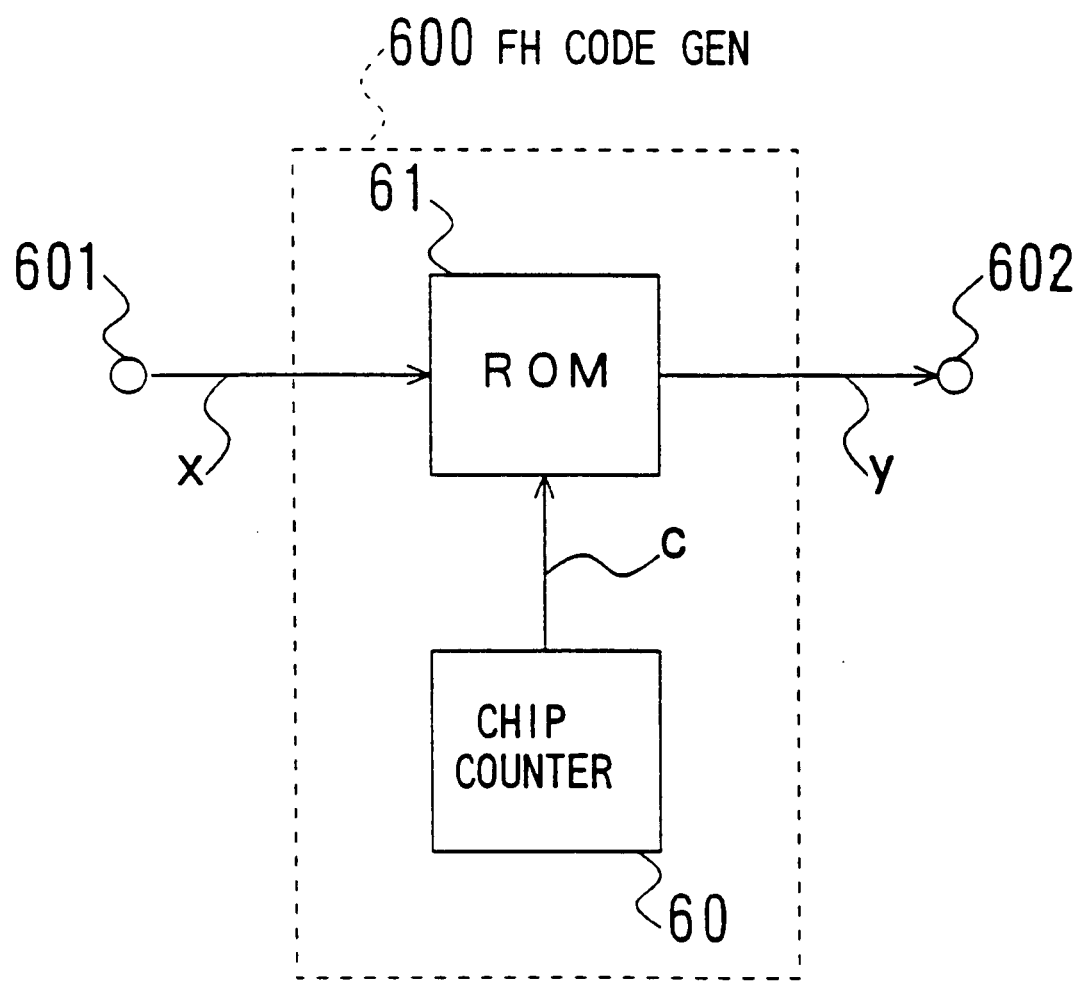
FIG. 104 shows a modification of the arrangement in FIG. 100.

FIG. 104 shows a modification of the arrangement in FIG. 100. An FH code generator 600 in FIG. 104 comprises a chip counter 60, a read-only memory (ROM) 61, a data value x input terminal 601 and a hopping code y output terminal 602. The ROM 61 contains hopping codes previously calculated in the manner above-mentioned and supplies a hopping code according to the data value x and the counting value c. This arrangement eliminates the need for calculation of a hopping code, thus achieving a high-speed process.

Figure 105:
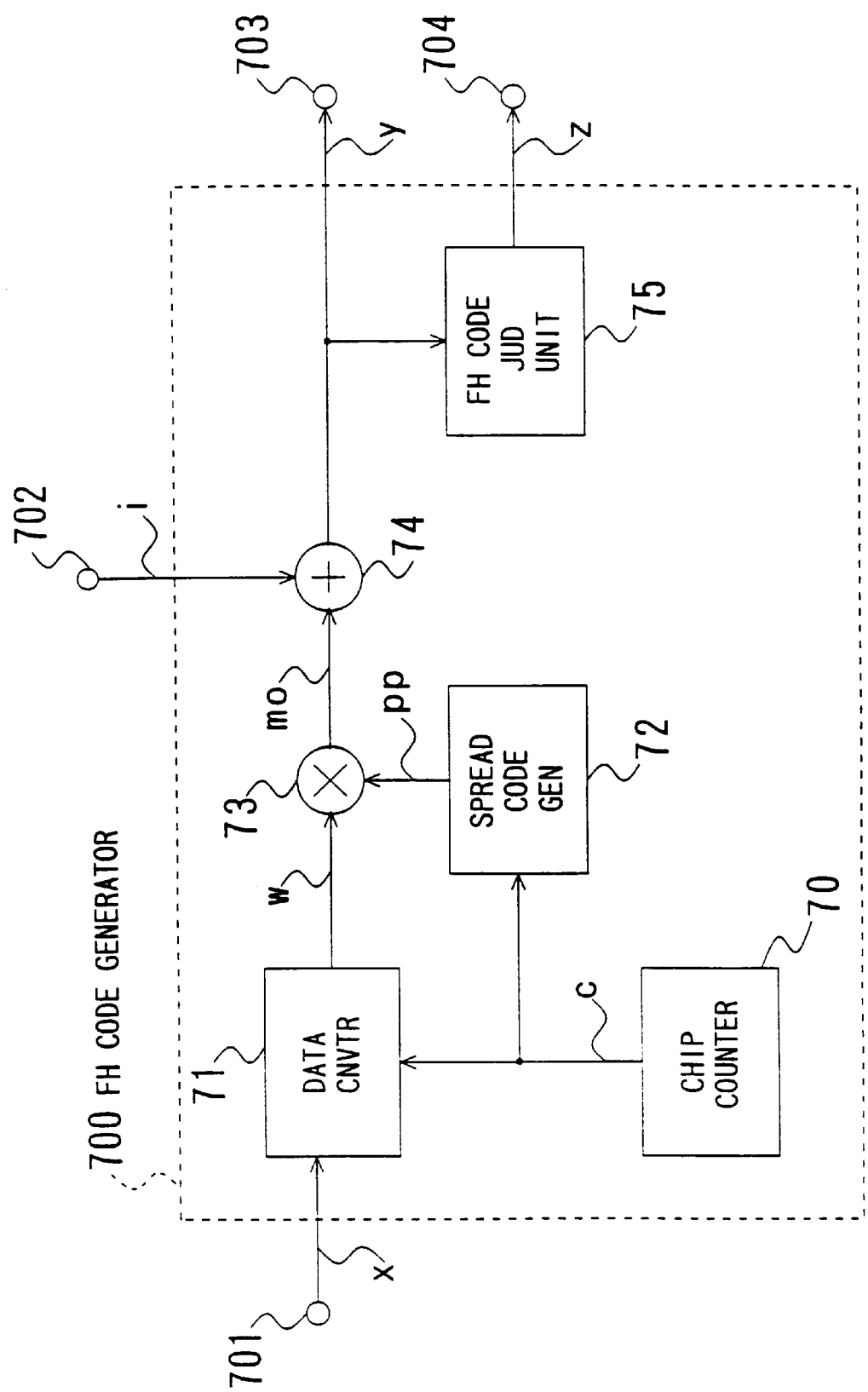
FIG. 105 shows a further modification of the arrangement in FIG. 100.

FIG. 105 shows a further modification of the arrangement in FIG. 100. An FH code generator 700 in FIG. 105 has means for calculating a binary judgment vector formed of L components which shows whether or not each of the components of an acquired hopping code vector ⁻y is contained in a list F consisting of M different elements out of the Q elements of a Galois field. Shown in FIG. 105 are a chip counter 70, a data converter 71, a spread code generator 72, a multiplier 73, an adder 74, an FH code judgment unit 75, a data value×input terminal 701, a user identification No. i input terminal 702, a hopping code y output terminal 703 and a binary judgment signal z output terminal 704. Also shown in FIG. 105 are a counting value c of the chip counter 70, a non-zero code w obtained by the data converter 71, a spread code pp, a result mo of the multiplier 73 and a user identification No. i. The hopping code y and the binary judgment signal z respectively supplied through the terminals 703, 704 are supplied to a frequency synthesizer having a choice of at least 16 carrier frequencies and provided with a carrier non-transmission mode.

FIG. 106 shows the operation of the FH code judgment unit 75. In this example, Q is equal to 17 and the value of the hopping code y obtained by the adder 74 may be in the range from 0 to 16. For the hopping code y, the FH code judgment unit 75 judges only predetermined M ($=16=2^4$) different values, i.e., y=0, 1, ..., 15, as effective (z=1), and judges other values as ineffective (z=0). The frequency synthesizer connected to the FH code generator 700 in FIG. 105, is brought to the carrier non-transmission mode when z is equal to 0, and transmits the carrier frequency corresponding to the hopping code y when z is equal to 1.

According to the arrangement in FIG. 105, there is positively utilized the feature of the FH mode that decoding can be made even though some of a plurality of carrier frequencies are lost. That is, with a portion of hopping codes y invalidated, there are used hopping codes in number of two's power, thus preventing the frequency synthesizer from being complicated in hardware.

In each of the examples of the FH code generator, the number of values that a data can present, is set to $M=2^k$ (k is a positive integer) and the number Q of the elements of a Galois field is set to $p^r$ (>M) in which p is a prime number and r is a positive integer. The number of chips L is an integer not less than 2 and not greater than $p^r-1$. Preferably, the number Q of the elements of a Galois field is set to the minimum value out of all the values Q each of which satisfies the condition of $Q=p^r$ (>M).

FIG. 107 shows examples of M and Q which satisfy the condition above-mentioned. In the Q column in FIG. 107, for example, "5" is a prime number 5 to the first power, "9" is a prime number 3 to the second power, and "17" is a prime number 17 to the first power. According to FIG. 107, for example, when M is equal to 512, Q is equal to 521. Accordingly, the number of invalidated hopping codes is as small as 9. More specifically, by maximizing the probability of hopping codes being validated, the maximum system reliability can be achieved. That is, decoding is practically sufficiently made even though the quality is somewhat deteriorated as compared with the case where all Q hopping codes are used.

What is claimed is:

1. A digital communication apparatus using either a multilevel frequency shift keying (MFSK) modulation mode or a code multiplexing MFSK modulation mode, using M carrier frequencies per sub-band, M being an integer not less than 4, said digital communication apparatus comprising:

a reference oscillator unit which comprises:
- a plurality of oscillators for generating a plurality of reference oscillating signals of which frequency intervals are set to M×4×Δf or M×2×Δf such that a plurality of sub-bands do not overlap one another, where a period of one time slot is T and a frequency step width Δf equals to 1/T; and
- a selector for selecting one of said plurality of oscillators and specifying a frequency of the reference oscillating signal generated by the selected oscillator as a local oscillating frequency fc, according to a frequency hopping of a desired sub-band;

a transmitter for transmitting, per time slot, a result of orthogonal modulation performed on the local oscillating frequency fc so that said M carrier frequencies per sub-band are orthogonally disposed at frequency intervals not less than 2/T; and a receiver for supplying all received frequencies per time slot, upon receipt of a reception signal, said receiver comprising;

a down-converter unit for converting in frequency the reception signal to a low frequency band so that signal components of the reception signal having frequencies not higher than the local oscillating frequency fc are turned back and are arranged in gaps between frequencies not lower than the local oscillating frequency fc with the orthogonal relationship maintained;

a low-pass filter for taking out signal components for a ½ band width of the desired sub-band from an output of the down-converter unit;

a discrete Fourier transform (DFT) operation unit for operating a DFT operation on an output of the low-pass filter; and a level judgment unit for supplying reception frequency data obtained by judging in level an output of the DFT operation unit.

2. A digital communication apparatus using either a multilevel frequency shift keying (MFSK) modulation mode or a code multiplexing MFSK modulation mode, using M consecutive carrier frequencies randomly selected per predetermined time interval L, M being an integer not less than 4, L being an integral multiple of one period of time slot T, said digital communication apparatus comprising:

a reference oscillation unit for generating any of a plurality of reference oscillating signals of which frequency intervals are set in accordance with frequency intervals of a plurality of sub-bands such that the plurality of sub-bands overlap one another, and for specifying a frequency of the generated reference oscillating signal as a local oscillating frequency fc, according to a frequency hopping of a desired sub-band;

a transmitter for transmitting, per time slot, a result of orthogonal modulation performed on the local oscillating frequency fc so that said M carrier frequencies are orthogonally disposed at frequency intervals not less than 2/T; and a receiver for supplying all received frequencies per time slot, upon receipt of a reception signal, said receiver comprising:

a down converter unit for converting in frequency the reception signal to a low frequency band so that signal components of the reception signal having frequencies not higher than the local oscillating frequency fc are turned back and are arranged in gaps between frequencies not lower than the local oscillating frequency fc with the orthogonal relationship maintained;

a low-pass filter for taking out signal components for a ½ band width of the desired sub-band from an output of the down-converter unit;

a discrete Fourier transform (DFT) operation unit for operating a DFT operation on an output of the low-pass filter; and a level judgment unit for supplying reception frequency data obtained by judging in level an output of the DFT operation unit.

* * * * *